(12) United States Patent
Miura et al.

(10) Patent No.: US 11,941,223 B2
(45) Date of Patent: Mar. 26, 2024

(54) USER INTERFACES FOR RETRIEVING CONTEXTUALLY RELEVANT MEDIA CONTENT

(71) Applicant: Apple Inc., Cupertino, CA (US)

(72) Inventors: Britt S. Miura, Menlo Park, CA (US);
Simon Bovet, Zurich (CH); Eric Circlaeys, Los Gatos, CA (US); Alan C. Dye, San Francisco, CA (US);
Daniel E. Gobera Rubalcava, San Jose, CA (US); Cyrus Daniel Irani, Los Altos, CA (US); Brendan J. Langoulant, Saratoga, CA (US);
Stephen O. Lemay, Palo Alto, CA (US); Justin S. Titi, San Jose, CA (US); Gary Ian Butcher, Los Gatos, CA (US); Paulo Michaelo Lopez, Los Gatos, CA (US); Henrique Penha, San Francisco, CA (US); Christopher Wilson, Sonoma, CA (US)

(73) Assignee: Apple Inc.

(*) Notice: Subject to any disclaimer, the term of this patent is extended or adjusted under 35 U.S.C. 154(b) by 0 days.

(21) Appl. No.: 18/137,353

(22) Filed: Apr. 20, 2023

(65) Prior Publication Data
US 2023/0297206 A1 Sep. 21, 2023

Related U.S. Application Data

(63) Continuation of application No. 17/744,499, filed on May 13, 2022, now Pat. No. 11,681,408, which is a
(Continued)

(51) Int. Cl.
*G06F 3/0481* (2022.01)
*G06F 3/0354* (2013.01)
*G06F 3/04817* (2022.01)
*G06F 3/04842* (2022.01)
*G06F 3/04883* (2022.01)
(Continued)

(52) U.S. Cl.
CPC ........ *G06F 3/0481* (2013.01); *G06F 3/03547* (2013.01); *G06F 3/04817* (2013.01);
(Continued)

(58) Field of Classification Search
CPC ....... G06F 2203/04105; G06F 3/04817; G06F 3/004842; G06F 3/04883; G06F 3/04886;
(Continued)

(56) References Cited

U.S. PATENT DOCUMENTS 5,416,895 A 5/1995 Anderson et al.
5,463,725 A 10/1995 Henckel et al.
(Continued)

FOREIGN PATENT DOCUMENTS

CA 2662726 A1 5/2012
CN 1404233 A 3/2003
(Continued)

OTHER PUBLICATIONS

US 2002/0018582 A1, 02/2002, Hagiwara et al. (withdrawn)
(Continued)

*Primary Examiner* — Anil K Bhargava
(74) *Attorney, Agent, or Firm* — DLA Piper LLP (US)

(57) ABSTRACT

The present disclosure generally relates to retrieving and displaying contextually-relevant media content. In some embodiments, a device receives a request to display contextually-relevant media and, in response, displays a representation of a collection of media items relevant to a context of the device. In some embodiments, a device displays a visual media item of a sequence of items and, in response to receiving a swipe gesture, displays a detail user interface comprising related content for the media item. In some embodiments, a device, while displaying a first detail user interface, displays an affordance corresponding to a plurality of individuals identified as having attended a first event, that
(Continued)

when selected, causes display of visual media corresponding to a plurality of events attended by the individuals. In some embodiments, a device, in response to user input, obtains an automatically-generated collection of visual media and displays a corresponding affordance.

27 Claims, 81 Drawing Sheets

Related U.S. Application Data continuation of application No. 17/125,744, filed on Dec. 17, 2020, now Pat. No. 11,334,209, which is a continuation of application No. 16/109,487, filed on Aug. 22, 2018, now Pat. No. 10,891,013, which is a continuation of application No. 15/275,294, filed on Sep. 23, 2016, now Pat. No. 10,073,584.

(60) Provisional application No. 62/349,109, filed on Jun. 12, 2016.

(51) Int. Cl.
*G06F 3/04886* (2022.01)
*G06F 16/178* (2019.01)
*G06F 16/435* (2019.01)
*G06F 16/438* (2019.01)
*G06F 16/44* (2019.01)
*G06T 1/00* (2006.01)

(52) U.S. Cl.
CPC ...... *G06F 3/04842* (2013.01); *G06F 3/04883* (2013.01); *G06F 3/04886* (2013.01); *G06F 16/178* (2019.01); *G06F 16/435* (2019.01); *G06F 16/438* (2019.01); *G06F 16/44* (2019.01); *G06F 2203/04105* (2013.01); *G06T 1/0007* (2013.01); *G06T 2200/24* (2013.01)

(58) Field of Classification Search
CPC .... G06F 3/0481; G06F 16/435; G06F 16/438; G06F 16/44; G06F 16/178; G06F 3/03547; G06T 1/0007; G06T 2200/24
See application file for complete search history.

(56) References Cited

U.S. PATENT DOCUMENTS

| | | | |
|---|---|---|---|
| 5,565,888 A | 10/1996 | Selker | |
| 5,583,542 A | 12/1996 | Capps | |
| 5,604,861 A | 2/1997 | Douglas et al. | |
| 5,677,708 A | 10/1997 | Matthews et al. | |
| 5,724,985 A | 3/1998 | Snell et al. | |
| 5,757,368 A | 5/1998 | Gerpheide et al. | |
| 5,784,061 A | 7/1998 | Moran et al. | |
| 5,825,349 A | 10/1998 | Meier et al. | |
| 5,956,035 A | 9/1999 | Sciammarella et al. | |
| 5,973,694 A | 10/1999 | Steele et al. | |
| 6,073,036 A | 6/2000 | Heikkinen et al. | |
| 6,128,012 A | 10/2000 | Seidensticker et al. | |
| 6,154,210 A | 11/2000 | Anderson | |
| 6,167,469 A | 12/2000 | Safai et al. | |
| 6,237,010 B1 | 5/2001 | Hui et al. | |
| 6,252,596 B1 | 6/2001 | Garland et al. | |
| 6,272,246 B1 | 8/2001 | Takai | |
| 6,279,018 B1 | 8/2001 | Kudrolli et al. | |
| 6,292,273 B1 | 9/2001 | Dow et al. | |
| 6,301,586 B1 | 10/2001 | Yang et al. | |
| 6,334,025 B1 | 12/2001 | Yamagami et al. | |
| 6,351,556 B1 | 2/2002 | Loui et al. | |
| 6,441,824 B2 | 8/2002 | Hertzfeld et al. | |
| 6,452,597 B1 | 9/2002 | Goldberg et al. | |
| 6,477,117 B1 | 11/2002 | Narayanaswami et al. | |
| 6,606,411 B1 | 8/2003 | Loui et al. | |
| 6,686,938 B1 | 2/2004 | Jobs et al. | |
| 6,741,268 B1 | 5/2004 | Hayakawa et al. | |
| 6,784,925 B1 | 8/2004 | Tomat et al. | |
| 6,915,011 B2 | 7/2005 | Loui et al. | |
| 6,920,619 B1 | 7/2005 | Milekic | |
| 6,950,989 B2 | 9/2005 | Rosenzweig et al. | |
| 7,015,910 B2 | 3/2006 | Card et al. | |
| 7,139,982 B2 | 11/2006 | Card et al. | |
| 7,164,410 B2 | 1/2007 | Kupka | |
| 7,178,111 B2 | 2/2007 | Glein et al. | |
| 7,286,256 B2 | 10/2007 | Herbert | |
| 7,325,198 B2 | 1/2008 | Adcock et al. | |
| 7,380,212 B2 | 5/2008 | Cody et al. | |
| 7,421,449 B2 | 9/2008 | Williams et al. | |
| 7,434,177 B1 | 10/2008 | Ording et al. | |
| 7,437,005 B2 | 10/2008 | Drucker et al. | |
| 7,515,903 B1 | 4/2009 | Cast | |
| 7,587,671 B2 | 9/2009 | Saft et al. | |
| 7,627,828 B1 | 12/2009 | Collison et al. | |
| 7,636,733 B1 | 12/2009 | Rothmuller et al. | |
| 7,680,340 B2 | 3/2010 | Luo et al. | |
| 7,716,194 B2 | 5/2010 | Williams et al. | |
| 7,724,242 B2 | 5/2010 | Hillis et al. | |
| 7,747,625 B2 | 6/2010 | Gargi et al. | |
| 7,779,358 B1 | 8/2010 | Gupta et al. | |
| 7,788,592 B2 | 8/2010 | Williams et al. | |
| 7,823,080 B2 | 10/2010 | Miyajima et al. | |
| 7,831,100 B2 | 11/2010 | Gallagher et al. | |
| 7,843,454 B1 | 11/2010 | Biswas | |
| 7,865,215 B2 | 1/2011 | Bells et al. | |
| 7,970,240 B1 | 6/2011 | Chao et al. | |
| 7,991,234 B2 | 8/2011 | Fujioka et al. | |
| 8,024,658 B1 | 9/2011 | Fagans et al. | |
| 8,028,249 B2 | 9/2011 | Loui et al. | |
| 8,106,856 B2 | 1/2012 | Matas et al. | |
| RE43,260 E | 3/2012 | Paalasmaa et al. | |
| 8,132,116 B1 | 3/2012 | Schendel | |
| 8,200,669 B1* | 6/2012 | Iampietro | G06F 16/907 707/914 |
| 8,305,355 B2 | 11/2012 | Forstall et al. | |
| 8,339,420 B2 | 12/2012 | Hiraoka et al. | |
| 8,352,471 B2 | 1/2013 | Oami | |
| 8,406,473 B2 | 3/2013 | Tanaka et al. | |
| 8,566,403 B2 | 10/2013 | Pascal et al. | |
| 8,571,331 B2 | 10/2013 | Cifarelli et al. | |
| 8,698,762 B2 | 4/2014 | Wagner et al. | |
| 8,707,419 B2 | 4/2014 | Kurapati et al. | |
| 8,934,717 B2 | 1/2015 | Newell et al. | |
| 9,021,034 B2 | 4/2015 | Narayanan et al. | |
| 9,042,646 B2 | 5/2015 | Das et al. | |
| 9,122,697 B1 | 9/2015 | Bono et al. | |
| 9,123,086 B1 | 9/2015 | Freeland et al. | |
| 9,143,601 B2 | 9/2015 | Padmanabhan et al. | |
| 9,183,560 B2 | 11/2015 | Abelow | |
| 9,286,546 B2 | 3/2016 | O'malley et al. | |
| 9,338,057 B2 | 5/2016 | Jangra et al. | |
| 9,338,242 B1 | 5/2016 | Suchland et al. | |
| 9,349,414 B1 | 5/2016 | Furment et al. | |
| 9,361,625 B2 | 6/2016 | Parker et al. | |
| 9,411,506 B1 | 8/2016 | Marra et al. | |
| 9,459,792 B2 | 10/2016 | Matas et al. | |
| 9,472,196 B1 | 10/2016 | Wang et al. | |
| 9,679,570 B1 | 6/2017 | Edara | |
| 9,857,894 B2 | 1/2018 | Park | |
| 9,870,554 B1 | 1/2018 | Leung et al. | |
| 9,904,906 B2 | 2/2018 | Kim et al. | |
| 9,916,538 B2 | 3/2018 | Zadeh et al. | |
| 9,990,176 B1 | 6/2018 | Gray | |
| 10,019,136 B1 | 7/2018 | Ozog | |
| 10,051,103 B1 | 8/2018 | Gordon et al. | |
| 10,204,338 B2 | 2/2019 | Lee | |
| 10,289,265 B2 | 5/2019 | Kulkarni | |
| 10,303,448 B2 | 5/2019 | Steven et al. | |
| 10,376,153 B2 | 8/2019 | Tzvieli et al. | |
| 10,417,588 B1* | 9/2019 | Kreisel | G06Q 10/063 |
| 10,489,982 B2 | 11/2019 | Johnson et al. | |
| 10,509,907 B2 | 12/2019 | Shear et al. | |
| 10,540,400 B2 | 1/2020 | Dumant et al. | |

(56) References Cited

U.S. PATENT DOCUMENTS

| | | |
|---|---|---|
| 10,776,965 B2 | 9/2020 | Stetson et al. |
| 10,796,480 B2 * | 10/2020 | Chen .................. G06V 40/166 |
| 10,878,047 B1 | 12/2020 | Mutagi et al. |
| 11,592,959 B2 * | 2/2023 | Wagner ................ G06F 3/0488 |
| 2001/0014184 A1 | 8/2001 | Bubie et al. |
| 2001/0019330 A1 | 9/2001 | Bickmore et al. |
| 2002/0000998 A1 | 1/2002 | Scott et al. |
| 2002/0008763 A1 | 1/2002 | Kawamura et al. |
| 2002/0015064 A1 | 2/2002 | Robotham et al. |
| 2002/0021758 A1 | 2/2002 | Chui et al. |
| 2002/0054233 A1 | 5/2002 | Juen |
| 2002/0057461 A1 | 5/2002 | Dow et al. |
| 2002/0059623 A1 | 5/2002 | Rodriguez et al. |
| 2002/0070982 A1 | 6/2002 | Hill et al. |
| 2002/0093531 A1 | 7/2002 | Barile |
| 2002/0106199 A1 | 8/2002 | Ikeda |
| 2002/0135621 A1 | 9/2002 | Angiulo et al. |
| 2002/0168108 A1 | 11/2002 | Loui et al. |
| 2003/0033296 A1 | 2/2003 | Rothmuller et al. |
| 2003/0048291 A1 | 3/2003 | Dieberger |
| 2003/0081011 A1 | 5/2003 | Sheldon et al. |
| 2003/0081135 A1 | 5/2003 | Boll |
| 2003/0090504 A1 | 5/2003 | Brook et al. |
| 2003/0108241 A1 | 6/2003 | Colmenarez et al. |
| 2003/0122787 A1 | 7/2003 | Zimmerman et al. |
| 2003/0149990 A1 | 8/2003 | Anttila et al. |
| 2003/0161003 A1 | 8/2003 | Herbert |
| 2003/0197687 A1 | 10/2003 | Shetter |
| 2003/0206170 A1 | 11/2003 | Bickmore et al. |
| 2004/0019640 A1 | 1/2004 | Bartram et al. |
| 2004/0046886 A1 | 3/2004 | Ambiru et al. |
| 2004/0119758 A1 | 6/2004 | Grossman et al. |
| 2004/0125150 A1 | 7/2004 | Adcock et al. |
| 2004/0135904 A1 | 7/2004 | Shiota et al. |
| 2004/0143590 A1 | 7/2004 | Wong et al. |
| 2004/0158555 A1 | 8/2004 | Seedman et al. |
| 2004/0167898 A1 | 8/2004 | Margolus et al. |
| 2004/0179039 A1 | 9/2004 | Blattner et al. |
| 2004/0183830 A1 | 9/2004 | Cody et al. |
| 2004/0205504 A1 | 10/2004 | Phillips |
| 2004/0207722 A1 | 10/2004 | Koyama et al. |
| 2004/0212617 A1 | 10/2004 | Fitzmaurice et al. |
| 2005/0020317 A1 | 1/2005 | Koyama |
| 2005/0041035 A1 | 2/2005 | Nagatomo et al. |
| 2005/0044066 A1 | 2/2005 | Hooper et al. |
| 2005/0052427 A1 | 3/2005 | Wu et al. |
| 2005/0062130 A1 | 3/2005 | Ciancio et al. |
| 2005/0071736 A1 | 3/2005 | Schneider et al. |
| 2005/0071767 A1 | 3/2005 | Kirkland et al. |
| 2005/0073601 A1 | 4/2005 | Battles et al. |
| 2005/0076056 A1 | 4/2005 | Paalasmaa et al. |
| 2005/0083406 A1 | 4/2005 | Cozier |
| 2005/0102635 A1 | 5/2005 | Jiang et al. |
| 2005/0104848 A1 | 5/2005 | Yamaguchi et al. |
| 2005/0108253 A1 | 5/2005 | Metsatahti et al. |
| 2005/0128305 A1 | 6/2005 | Hamasaki et al. |
| 2005/0134719 A1 | 6/2005 | Beck |
| 2005/0134945 A1 | 6/2005 | Gallagher |
| 2005/0160377 A1 | 7/2005 | Sciammarella et al. |
| 2005/0183026 A1 | 8/2005 | Amano et al. |
| 2005/0188326 A1 | 8/2005 | Ikeda |
| 2005/0195221 A1 * | 9/2005 | Berger ................ G06F 16/9577 |
| | | 345/660 |
| 2005/0198024 A1 | 9/2005 | Sakata et al. |
| 2005/0261905 A1 | 11/2005 | Pyo et al. |
| 2005/0275636 A1 | 12/2005 | Dehlin et al. |
| 2006/0001652 A1 | 1/2006 | Chiu et al. |
| 2006/0004685 A1 | 1/2006 | Pyhalammi et al. |
| 2006/0017692 A1 | 1/2006 | Wehrenberg et al. |
| 2006/0025218 A1 | 2/2006 | Hotta |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0036568 A1 | 2/2006 | Moore et al. |
| 2006/0036960 A1 | 2/2006 | Loui et al. |
| 2006/0061663 A1 | 3/2006 | Park |
| 2006/0072028 A1 | 4/2006 | Hong |
| 2006/0077266 A1 | 4/2006 | Nurmi et al. |
| 2006/0080386 A1 | 4/2006 | Roykkee et al. |
| 2006/0088228 A1 | 4/2006 | Marriott et al. |
| 2006/0090141 A1 | 4/2006 | Loui et al. |
| 2006/0125799 A1 | 6/2006 | Hillis et al. |
| 2006/0136839 A1 | 6/2006 | Makela et al. |
| 2006/0155757 A1 | 7/2006 | Williams et al. |
| 2006/0156237 A1 | 7/2006 | Williams et al. |
| 2006/0156245 A1 | 7/2006 | Williams et al. |
| 2006/0156246 A1 | 7/2006 | Williams et al. |
| 2006/0164535 A1 | 7/2006 | Oyama |
| 2006/0184540 A1 | 8/2006 | Kung et al. |
| 2006/0265643 A1 | 11/2006 | Saft et al. |
| 2007/0008321 A1 | 1/2007 | Gallagher et al. |
| 2007/0016868 A1 | 1/2007 | Nurmi |
| 2007/0031115 A1 | 2/2007 | Oshikiri et al. |
| 2007/0040810 A1 | 2/2007 | Dowe et al. |
| 2007/0081740 A1 | 4/2007 | Ciudad et al. |
| 2007/0097151 A1 | 5/2007 | Rosenberg |
| 2007/0097421 A1 | 5/2007 | Sorensen et al. |
| 2007/0101355 A1 | 5/2007 | Chung et al. |
| 2007/0112754 A1 | 5/2007 | Haigh et al. |
| 2007/0115373 A1 | 5/2007 | Gallagher et al. |
| 2007/0136778 A1 | 6/2007 | Birger et al. |
| 2007/0152984 A1 | 7/2007 | Ording et al. |
| 2007/0186154 A1 | 8/2007 | Anthony et al. |
| 2007/0192741 A1 | 8/2007 | Yoritate et al. |
| 2007/0204225 A1 | 8/2007 | Berkowitz et al. |
| 2007/0229678 A1 | 10/2007 | Barrus et al. |
| 2007/0245236 A1 * | 10/2007 | Lee ........................ G06F 40/103 |
| | | 715/234 |
| 2007/0262964 A1 | 11/2007 | Zotov et al. |
| 2007/0271340 A1 | 11/2007 | Goodman et al. |
| 2008/0030456 A1 | 2/2008 | Asadi et al. |
| 2008/0036743 A1 | 2/2008 | Westerman et al. |
| 2008/0057941 A1 | 3/2008 | Scott et al. |
| 2008/0059888 A1 | 3/2008 | Dunko |
| 2008/0062141 A1 * | 3/2008 | Chandhri ............... G06F 16/444 |
| | | 345/173 |
| 2008/0091637 A1 | 4/2008 | Escamilla et al. |
| 2008/0133697 A1 | 6/2008 | Stewart et al. |
| 2008/0152201 A1 * | 6/2008 | Zhang ................ G06F 18/2321 |
| | | 707/E17.026 |
| 2008/0152297 A1 | 6/2008 | Ubillos |
| 2008/0155474 A1 | 6/2008 | Duhig et al. |
| 2008/0168349 A1 | 7/2008 | Lamiraux et al. |
| 2008/0168402 A1 | 7/2008 | Blumenberg |
| 2008/0256577 A1 | 10/2008 | Funaki et al. |
| 2008/0282202 A1 | 11/2008 | Sunday |
| 2008/0309632 A1 | 12/2008 | Westerman et al. |
| 2009/0006965 A1 | 1/2009 | Bodin et al. |
| 2009/0021576 A1 | 1/2009 | Linder et al. |
| 2009/0044113 A1 | 2/2009 | Jones et al. |
| 2009/0063542 A1 | 3/2009 | Bull et al. |
| 2009/0077460 A1 | 3/2009 | Li et al. |
| 2009/0113315 A1 | 4/2009 | Fisher et al. |
| 2009/0113350 A1 | 4/2009 | Hibino et al. |
| 2009/0132921 A1 | 5/2009 | Hwangbo et al. |
| 2009/0144639 A1 | 6/2009 | Nims et al. |
| 2009/0161962 A1 | 6/2009 | Gallagher et al. |
| 2009/0198359 A1 * | 8/2009 | Chaudhri ............... G06F 16/904 |
| | | 345/173 |
| 2009/0210793 A1 * | 8/2009 | Yee ......................... G06F 16/58 |
| | | 715/723 |
| 2009/0216806 A1 * | 8/2009 | Feuerstein ............ G06F 16/904 |
| 2009/0237367 A1 | 9/2009 | Ryu et al. |
| 2009/0259967 A1 | 10/2009 | Davidson et al. |
| 2009/0278806 A1 | 11/2009 | Duarte et al. |
| 2009/0282371 A1 | 11/2009 | Curl et al. |
| 2009/0284551 A1 | 11/2009 | Stanton |
| 2009/0287470 A1 | 11/2009 | Farnsworth et al. |
| 2009/0300146 A1 | 12/2009 | Park et al. |
| 2009/0307623 A1 | 12/2009 | Agarawala et al. |
| 2009/0313580 A1 | 12/2009 | Nakata et al. |
| 2009/0319472 A1 * | 12/2009 | Jain ........................ G11B 27/34 |
| 2009/0325701 A1 | 12/2009 | Andres Del Valle |
| 2010/0042926 A1 | 2/2010 | Bull et al. |

(56) References Cited

U.S. PATENT DOCUMENTS

| | | |
|---|---|---|
| 2010/0045828 A1 | 2/2010 | Gallagher et al. |
| 2010/0046842 A1 | 2/2010 | Conwell |
| 2010/0076976 A1 | 3/2010 | Sotirov et al. |
| 2010/0083173 A1 | 4/2010 | Germann et al. |
| 2010/0097375 A1 | 4/2010 | Tadaishi et al. |
| 2010/0103321 A1 | 4/2010 | Ishikawa et al. |
| 2010/0110228 A1 | 5/2010 | Ozawa et al. |
| 2010/0114891 A1 | 5/2010 | Oami |
| 2010/0124967 A1 | 5/2010 | Lutnick et al. |
| 2010/0125786 A1 | 5/2010 | Ozawa et al. |
| 2010/0150456 A1 | 6/2010 | Tanaka et al. |
| 2010/0153386 A1 | 6/2010 | Tysowski |
| 2010/0179874 A1 | 7/2010 | Higgins et al. |
| 2010/0207892 A1 | 8/2010 | Lin et al. |
| 2010/0211575 A1 | 8/2010 | Collins et al. |
| 2010/0214442 A1 | 8/2010 | Uemura et al. |
| 2010/0251167 A1 | 9/2010 | Deluca et al. |
| 2010/0253807 A1 | 10/2010 | Matsumoto et al. |
| 2010/0287053 A1* | 11/2010 | Ganong ............... G06V 10/32 709/204 |
| 2010/0299601 A1 | 11/2010 | Kaplan et al. |
| 2010/0302179 A1 | 12/2010 | Ahn et al. |
| 2011/0025719 A1 | 2/2011 | Yanase et al. |
| 2011/0035700 A1 | 2/2011 | Meaney et al. |
| 2011/0050564 A1 | 3/2011 | Alberth et al. |
| 2011/0050640 A1 | 3/2011 | Lundback et al. |
| 2011/0072394 A1 | 3/2011 | Victor et al. |
| 2011/0078717 A1 | 3/2011 | Drummond et al. |
| 2011/0099199 A1 | 4/2011 | Stalenhoef et al. |
| 2011/0099478 A1 | 4/2011 | Gallagher et al. |
| 2011/0126148 A1* | 5/2011 | Krishnaraj ............ G06F 3/0482 345/589 |
| 2011/0145275 A1* | 6/2011 | Stewart ................. G06F 16/435 707/769 |
| 2011/0145327 A1 | 6/2011 | Stewart |
| 2011/0163969 A1 | 7/2011 | Freddy et al. |
| 2011/0163971 A1* | 7/2011 | Wagner ............... G06F 3/04817 345/173 |
| 2011/0191661 A1 | 8/2011 | Phillips et al. |
| 2011/0246463 A1 | 10/2011 | Carson et al. |
| 2011/0248992 A1 | 10/2011 | Van et al. |
| 2011/0252344 A1 | 10/2011 | Van Os |
| 2011/0267368 A1 | 11/2011 | Casillas et al. |
| 2011/0282867 A1* | 11/2011 | Palermiti, II ........... G06F 18/40 707/769 |
| 2011/0320938 A1 | 12/2011 | Schorsch et al. |
| 2012/0056830 A1 | 3/2012 | Suzuki et al. |
| 2012/0057081 A1 | 3/2012 | Petersson et al. |
| 2012/0058801 A1* | 3/2012 | Nurmi .................... G06F 3/011 455/566 |
| 2012/0059855 A1 | 3/2012 | Dey et al. |
| 2012/0110438 A1 | 5/2012 | Peraza et al. |
| 2012/0190386 A1 | 7/2012 | Anderson |
| 2012/0206495 A1 | 8/2012 | Endo et al. |
| 2012/0243735 A1 | 9/2012 | Wu et al. |
| 2012/0256967 A1 | 10/2012 | Baldwin et al. |
| 2012/0293686 A1 | 11/2012 | Karn et al. |
| 2012/0311444 A1 | 12/2012 | Chaudhri |
| 2012/0314047 A1 | 12/2012 | Kasahara et al. |
| 2013/0013650 A1 | 1/2013 | Shum |
| 2013/0021368 A1 | 1/2013 | Lee et al. |
| 2013/0022282 A1 | 1/2013 | Cooper |
| 2013/0036380 A1 | 2/2013 | Symons |
| 2013/0038759 A1 | 2/2013 | Jo et al. |
| 2013/0040660 A1 | 2/2013 | Fisher et al. |
| 2013/0054634 A1 | 2/2013 | Chakraborty et al. |
| 2013/0061175 A1 | 3/2013 | Matas et al. |
| 2013/0117365 A1 | 5/2013 | Padmanabhan et al. |
| 2013/0145292 A1 | 6/2013 | Cohen et al. |
| 2013/0156275 A1* | 6/2013 | Amacker ............... G06F 16/51 382/118 |
| 2013/0177296 A1 | 7/2013 | Geisner et al. |
| 2013/0198176 A1 | 8/2013 | Kim |
| 2013/0198210 A1 | 8/2013 | Lee et al. |
| 2013/0205210 A1 | 8/2013 | Jeon et al. |
| 2013/0239049 A1 | 9/2013 | Perrodin et al. |
| 2013/0285948 A1 | 10/2013 | Zhang |
| 2013/0286161 A1 | 10/2013 | Lv et al. |
| 2013/0293686 A1 | 11/2013 | Blow et al. |
| 2013/0342730 A1 | 12/2013 | Lee et al. |
| 2013/0346016 A1 | 12/2013 | Suzuki et al. |
| 2014/0025737 A1 | 1/2014 | Kruglick |
| 2014/0046914 A1 | 2/2014 | Das et al. |
| 2014/0055495 A1 | 2/2014 | Kim et al. |
| 2014/0064572 A1 | 3/2014 | Panzer et al. |
| 2014/0074825 A1 | 3/2014 | Wood et al. |
| 2014/0074893 A1 | 3/2014 | Griffin |
| 2014/0081633 A1 | 3/2014 | Badaskar |
| 2014/0082533 A1 | 3/2014 | Kelley et al. |
| 2014/0089330 A1 | 3/2014 | Cui et al. |
| 2014/0092291 A1 | 4/2014 | Aoshima et al. |
| 2014/0123005 A1 | 5/2014 | Forstall et al. |
| 2014/0143693 A1 | 5/2014 | Goossens et al. |
| 2014/0157321 A1 | 6/2014 | Kurita et al. |
| 2014/0164938 A1 | 6/2014 | Petterson et al. |
| 2014/0165000 A1 | 6/2014 | Fleizach et al. |
| 2014/0181089 A1 | 6/2014 | Desmond et al. |
| 2014/0181205 A1 | 6/2014 | Sherrets et al. |
| 2014/0189584 A1 | 7/2014 | Weng et al. |
| 2014/0195918 A1 | 7/2014 | Friedlander |
| 2014/0198234 A1 | 7/2014 | Kobayashi et al. |
| 2014/0218371 A1 | 8/2014 | Du et al. |
| 2014/0218394 A1* | 8/2014 | Hochmuth .............. G06F 18/23 345/629 |
| 2014/0222809 A1 | 8/2014 | Hochmuth et al. |
| 2014/0225925 A1 | 8/2014 | Hayashi et al. |
| 2014/0229831 A1 | 8/2014 | Chordia et al. |
| 2014/0236882 A1 | 8/2014 | Rishe et al. |
| 2014/0250126 A1 | 9/2014 | Baldwin et al. |
| 2014/0250374 A1 | 9/2014 | Ohki et al. |
| 2014/0267618 A1 | 9/2014 | Esteban et al. |
| 2014/0282011 A1* | 9/2014 | Dellinger ............ G06F 3/04845 715/731 |
| 2014/0282016 A1 | 9/2014 | Hosier, Jr. |
| 2014/0282262 A1 | 9/2014 | Gregotski et al. |
| 2014/0289222 A1* | 9/2014 | Sharpe ................. G06F 16/489 707/722 |
| 2014/0330824 A1 | 11/2014 | Johnson et al. |
| 2014/0337324 A1 | 11/2014 | Chao et al. |
| 2014/0337370 A1 | 11/2014 | Aravamudan et al. |
| 2014/0341476 A1 | 11/2014 | Kulick et al. |
| 2014/0351720 A1 | 11/2014 | Yin |
| 2014/0359441 A1 | 12/2014 | Lehtiniemi et al. |
| 2014/0362274 A1 | 12/2014 | Christie et al. |
| 2014/0372436 A1 | 12/2014 | Makki et al. |
| 2014/0372889 A1 | 12/2014 | Lemay et al. |
| 2014/0372898 A1 | 12/2014 | Ayres et al. |
| 2015/0005013 A1 | 1/2015 | Cao et al. |
| 2015/0039616 A1 | 2/2015 | Rolston et al. |
| 2015/0068069 A1 | 3/2015 | Tran et al. |
| 2015/0077502 A1 | 3/2015 | Jordan et al. |
| 2015/0078680 A1* | 3/2015 | Shakib ................ G06F 16/5866 382/305 |
| 2015/0082250 A1 | 3/2015 | Wagner et al. |
| 2015/0091896 A1 | 4/2015 | Tarquini et al. |
| 2015/0095310 A1 | 4/2015 | Beaurepaire |
| 2015/0106752 A1 | 4/2015 | Yang |
| 2015/0130719 A1 | 5/2015 | Wehrenberg et al. |
| 2015/0143234 A1 | 5/2015 | Norris, III |
| 2015/0177937 A1 | 6/2015 | Poletto et al. |
| 2015/0177979 A1 | 6/2015 | Johansson et al. |
| 2015/0180980 A1 | 6/2015 | Welinder et al. |
| 2015/0185995 A1 | 7/2015 | Shoemaker et al. |
| 2015/0194187 A1 | 7/2015 | Cleven et al. |
| 2015/0213001 A1* | 7/2015 | Levy .................... G06F 40/106 715/202 |
| 2015/0213604 A1 | 7/2015 | Li et al. |
| 2015/0227166 A1 | 8/2015 | Lee et al. |
| 2015/0227611 A1 | 8/2015 | Xuan et al. |
| 2015/0227782 A1 | 8/2015 | Salvador et al. |
| 2015/0242689 A1 | 8/2015 | Mau |
| 2015/0244794 A1 | 8/2015 | Poletto et al. |
| 2015/0256491 A1 | 9/2015 | Eatough et al. |

(56) References Cited

U.S. PATENT DOCUMENTS

| | | |
|---|---|---|
| 2015/0262062 A1 | 9/2015 | Burger et al. |
| 2015/0281145 A1 | 10/2015 | Ji |
| 2015/0287162 A1 | 10/2015 | Canan et al. |
| 2015/0309698 A1* | 10/2015 | Senderek ............ G06F 3/04842 715/815 |
| 2015/0310852 A1 | 10/2015 | Spizzo et al. |
| 2015/0347824 A1 | 12/2015 | Saari et al. |
| 2015/0363409 A1 | 12/2015 | Wood et al. |
| 2015/0370323 A1 | 12/2015 | Cieplinski et al. |
| 2015/0382047 A1 | 12/2015 | Van Os et al. |
| 2016/0004820 A1 | 1/2016 | Moore |
| 2016/0005211 A1 | 1/2016 | Sarkis et al. |
| 2016/0019388 A1 | 1/2016 | Singla et al. |
| 2016/0041733 A1 | 2/2016 | Qian et al. |
| 2016/0044269 A1 | 2/2016 | Kang |
| 2016/0048263 A1 | 2/2016 | Hiraga et al. |
| 2016/0054845 A1* | 2/2016 | Takahashi ............ G06F 3/04817 345/173 |
| 2016/0073034 A1* | 3/2016 | Mukherjee ............ H04N 23/63 348/333.11 |
| 2016/0098137 A1 | 4/2016 | Kim et al. |
| 2016/0105308 A1 | 4/2016 | Dutt |
| 2016/0110355 A1 | 4/2016 | Charania et al. |
| 2016/0140146 A1* | 5/2016 | Wexler ................ G06F 16/5846 707/741 |
| 2016/0150215 A1 | 5/2016 | Chen et al. |
| 2016/0163312 A1 | 6/2016 | Naik et al. |
| 2016/0202889 A1 | 7/2016 | Shin et al. |
| 2016/0226804 A1 | 8/2016 | Hampson et al. |
| 2016/0234184 A1 | 8/2016 | Liu et al. |
| 2016/0239724 A1 | 8/2016 | Arfvidsson et al. |
| 2016/0255162 A1 | 9/2016 | Frieder et al. |
| 2016/0260436 A1 | 9/2016 | Lemay et al. |
| 2016/0283483 A1 | 9/2016 | Jiang et al. |
| 2016/0284123 A1 | 9/2016 | Hare et al. |
| 2016/0321831 A1 | 11/2016 | Nakamura et al. |
| 2016/0358311 A1 | 12/2016 | Chen et al. |
| 2017/0019587 A1 | 1/2017 | Matas et al. |
| 2017/0026430 A1 | 1/2017 | Beckhardt et al. |
| 2017/0041549 A1 | 2/2017 | Kim et al. |
| 2017/0041858 A1 | 2/2017 | Tong et al. |
| 2017/0063753 A1 | 3/2017 | Probasco et al. |
| 2017/0068423 A1 | 3/2017 | Napolitano et al. |
| 2017/0068670 A1 | 3/2017 | Orr et al. |
| 2017/0078621 A1 | 3/2017 | Sahay et al. |
| 2017/0093780 A1 | 3/2017 | Lieb et al. |
| 2017/0139554 A1 | 5/2017 | Nakabayashi et al. |
| 2017/0140041 A1 | 5/2017 | Dotan-Cohen et al. |
| 2017/0169295 A1 | 6/2017 | Park et al. |
| 2017/0180811 A1 | 6/2017 | Quirino et al. |
| 2017/0192625 A1 | 7/2017 | Kim et al. |
| 2017/0236298 A1 | 8/2017 | Vetter |
| 2017/0244959 A1* | 8/2017 | Ranjeet ................ G06T 7/292 |
| 2017/0323266 A1 | 11/2017 | Seo |
| 2017/0344257 A1 | 11/2017 | Gnedin et al. |
| 2017/0345420 A1 | 11/2017 | Barnett, Jr. |
| 2017/0357382 A1 | 12/2017 | Miura et al. |
| 2017/0357409 A1 | 12/2017 | Wagner et al. |
| 2017/0358305 A1 | 12/2017 | Kudurshian et al. |
| 2017/0374176 A1 | 12/2017 | Agrawal et al. |
| 2018/0028918 A1 | 2/2018 | Tang et al. |
| 2018/0034765 A1 | 2/2018 | Keszler et al. |
| 2018/0039406 A1 | 2/2018 | Kong et al. |
| 2018/0047288 A1 | 2/2018 | Cordell et al. |
| 2018/0068019 A1 | 3/2018 | Novikoff et al. |
| 2018/0083901 A1 | 3/2018 | Mcgregor et al. |
| 2018/0091732 A1 | 3/2018 | Wilson et al. |
| 2018/0121063 A1 | 5/2018 | Lieb et al. |
| 2018/0121432 A1 | 5/2018 | Parson et al. |
| 2018/0124458 A1 | 5/2018 | Knox |
| 2018/0143761 A1 | 5/2018 | Choi et al. |
| 2018/0150212 A1 | 5/2018 | Chen et al. |
| 2018/0165801 A1 | 6/2018 | Kim et al. |
| 2018/0166076 A1 | 6/2018 | Higuchi et al. |
| 2018/0181668 A1* | 6/2018 | Zhang ................ G06F 16/9038 |
| 2018/0204111 A1 | 7/2018 | Zadeh et al. |
| 2018/0232608 A1 | 8/2018 | Pradeep et al. |
| 2018/0253194 A1 | 9/2018 | Javadi |
| 2018/0321048 A1 | 11/2018 | Li et al. |
| 2018/0364872 A1 | 12/2018 | Miura et al. |
| 2018/0367862 A1 | 12/2018 | Horii et al. |
| 2019/0042627 A1 | 2/2019 | Osotio et al. |
| 2019/0073081 A1 | 3/2019 | Takahashi et al. |
| 2019/0155382 A1 | 5/2019 | Ikuta et al. |
| 2019/0158735 A1 | 5/2019 | Wilson et al. |
| 2019/0188326 A1 | 6/2019 | Daianu et al. |
| 2019/0251339 A1 | 8/2019 | Hawker |
| 2019/0258383 A1 | 8/2019 | Wagner et al. |
| 2019/0258852 A1 | 8/2019 | Shimauchi et al. |
| 2019/0313012 A1 | 10/2019 | Matas |
| 2019/0333523 A1 | 10/2019 | Kim et al. |
| 2019/0339822 A1 | 11/2019 | Devine et al. |
| 2019/0341027 A1 | 11/2019 | Vescovi et al. |
| 2019/0342507 A1 | 11/2019 | Dye et al. |
| 2020/0058299 A1 | 2/2020 | Lee et al. |
| 2020/0104038 A1 | 4/2020 | Kamath et al. |
| 2020/0159579 A1 | 5/2020 | Shear et al. |
| 2020/0225746 A1 | 7/2020 | Bar-Zeev et al. |
| 2020/0234508 A1 | 7/2020 | Shaburov et al. |
| 2020/0322571 A1 | 10/2020 | Awai |
| 2020/0335133 A1 | 10/2020 | Vaucher |
| 2020/0356222 A1 | 11/2020 | Clarke et al. |
| 2020/0356589 A1 | 11/2020 | Rekik et al. |
| 2020/0356590 A1 | 11/2020 | Clarke et al. |
| 2020/0363932 A1 | 11/2020 | Wagner et al. |
| 2020/0372904 A1 | 11/2020 | Vescovi et al. |
| 2020/0379560 A1 | 12/2020 | Krasadakis |
| 2021/0027785 A1 | 1/2021 | Kahan et al. |
| 2021/0141839 A1 | 5/2021 | Tang et al. |
| 2021/0191578 A1 | 6/2021 | Miura et al. |
| 2021/0243356 A1 | 8/2021 | Matas et al. |
| 2021/0407502 A1 | 12/2021 | Vescovi et al. |
| 2022/0027039 A1* | 1/2022 | Wagner ................ G06F 3/04845 |
| 2022/0206647 A1 | 6/2022 | Clarke et al. |
| 2022/0276750 A1 | 9/2022 | Miura et al. |
| 2022/0345785 A1 | 10/2022 | Yang et al. |
| 2022/0382443 A1 | 12/2022 | Clarke et al. |
| 2023/0221836 A1 | 7/2023 | Clarke et al. |
| 2023/0315253 A1 | 10/2023 | Wagner et al. |
| 2023/0376168 A1 | 11/2023 | Ryan et al. |
| 2023/0379573 A1 | 11/2023 | Wilson et al. |

FOREIGN PATENT DOCUMENTS

| | | |
|---|---|---|
| CN | 1619541 A | 5/2005 |
| CN | 1717918 A | 1/2006 |
| CN | 1756273 A | 4/2006 |
| CN | 101196786 A | 6/2008 |
| CN | 101291409 A | 10/2008 |
| CN | 101796476 A | 8/2010 |
| CN | 101854278 A | 10/2010 |
| CN | 102271241 A | 12/2011 |
| CN | 102473178 A | 5/2012 |
| CN | 102483758 A | 5/2012 |
| CN | 102622085 A | 8/2012 |
| CN | 102681847 A | 9/2012 |
| CN | 102693311 A | 9/2012 |
| CN | 102854979 A | 1/2013 |
| CN | 103081496 A | 5/2013 |
| CN | 103516894 A | 1/2014 |
| CN | 103703438 A | 4/2014 |
| CN | 103927190 A | 7/2014 |
| CN | 104035666 A | 9/2014 |
| CN | 104182741 A | 12/2014 |
| CN | 104246793 A | 12/2014 |
| CN | 104584010 A | 4/2015 |
| CN | 104981762 A | 10/2015 |
| CN | 105103154 A | 11/2015 |
| CN | 105190700 A | 12/2015 |
| CN | 105264480 A | 1/2016 |
| CN | 105378728 A | 3/2016 |
| CN | 105611275 A | 5/2016 |
| CN | 105874447 A | 8/2016 |
| CN | 106462617 A | 2/2017 |

(56) References Cited

FOREIGN PATENT DOCUMENTS

| | | |
|---|---|---|
| CN | 107430483 A | 12/2017 |
| CN | 107710197 A | 2/2018 |
| EP | 1124175 A2 | 8/2001 |
| EP | 1148412 A2 | 10/2001 |
| EP | 1215867 A2 | 6/2002 |
| EP | 1289210 A2 | 3/2003 |
| EP | 1736931 A2 | 12/2006 |
| EP | 2431890 A1 | 3/2012 |
| EP | 2509074 A2 | 10/2012 |
| EP | 3047884 A1 | 7/2016 |
| EP | 3190563 A1 | 7/2017 |
| FR | 2830093 A3 | 3/2003 |
| GB | 2420260 A | 5/2006 |
| GB | 2550639 A | 11/2017 |
| JP | 3-217976 A | 9/1991 |
| JP | 6-309138 A | 11/1994 |
| JP | 8-106469 A | 4/1996 |
| JP | 9-9072 A | 1/1997 |
| JP | 10-93848 A | 4/1998 |
| JP | 10-293860 A | 11/1998 |
| JP | 11-164175 A | 6/1999 |
| JP | 11-168694 A | 6/1999 |
| JP | 11-312159 A | 11/1999 |
| JP | 11-341425 A | 12/1999 |
| JP | 2000-76460 A | 3/2000 |
| JP | 2000-112997 A | 4/2000 |
| JP | 2000-138883 A | 5/2000 |
| JP | 2000-138888 A | 5/2000 |
| JP | 2000-148591 A | 5/2000 |
| JP | 2000-163031 A | 6/2000 |
| JP | 2000-221879 A | 8/2000 |
| JP | 2000-244637 A | 9/2000 |
| JP | 2000-244673 A | 9/2000 |
| JP | 2000-350134 A | 12/2000 |
| JP | 2001-136303 A | 5/2001 |
| JP | 2001-265481 A | 9/2001 |
| JP | 2001-309019 A | 11/2001 |
| JP | 2002-152559 A | 5/2002 |
| JP | 2003-163820 A | 6/2003 |
| JP | 2003-219217 A | 7/2003 |
| JP | 2003-338975 A | 11/2003 |
| JP | 2003-345491 A | 12/2003 |
| JP | 2003-348432 A | 12/2003 |
| JP | 2004-15586 A | 1/2004 |
| JP | 2004-32346 A | 1/2004 |
| JP | 2004-145291 A | 5/2004 |
| JP | 2004-153832 A | 5/2004 |
| JP | 2004-288208 A | 10/2004 |
| JP | 2004-336536 A | 11/2004 |
| JP | 2004-336711 A | 11/2004 |
| JP | 2005-38101 A | 2/2005 |
| JP | 2005-92386 A | 4/2005 |
| JP | 2005-100084 A | 4/2005 |
| JP | 2005-515530 A | 5/2005 |
| JP | 2005-150836 A | 6/2005 |
| JP | 2005-175991 A | 6/2005 |
| JP | 2005-182320 A | 7/2005 |
| JP | 2005-202483 A | 7/2005 |
| JP | 2005-202651 A | 7/2005 |
| JP | 2005-303728 A | 10/2005 |
| JP | 2005-321516 A | 11/2005 |
| JP | 2005-339420 A | 12/2005 |
| JP | 2006-67344 A | 3/2006 |
| JP | 2006-102327 A | 4/2006 |
| JP | 2006-139340 A | 6/2006 |
| JP | 2006-140865 A | 6/2006 |
| JP | 2006-195592 A | 7/2006 |
| JP | 2006-203809 A | 8/2006 |
| JP | 2006-520053 A | 8/2006 |
| JP | 2006-236249 A | 9/2006 |
| JP | 2007-515775 A | 6/2007 |
| JP | 2007-525775 A | 9/2007 |
| JP | 2007-287014 A | 11/2007 |
| JP | 2008-59614 A | 3/2008 |
| JP | 2008-106469 A | 5/2008 |
| JP | 2008-518330 A | 5/2008 |
| JP | 2008-236794 A | 10/2008 |
| JP | 2009-59042 A | 3/2009 |
| JP | 2010-503130 A | 1/2010 |
| JP | 2010-118056 A | 5/2010 |
| JP | 2011-209887 A | 10/2011 |
| JP | 2012-18569 A | 1/2012 |
| JP | 2013-83689 A | 5/2013 |
| JP | 2013-84282 A | 5/2013 |
| JP | 2013-97760 A | 5/2013 |
| JP | 2013-140171 A | 7/2013 |
| JP | 2014-93003 A | 5/2014 |
| JP | 2014-95979 A | 5/2014 |
| JP | 5771242 B2 | 8/2015 |
| JP | 2016-35776 A | 3/2016 |
| JP | 2016-136324 A | 7/2016 |
| JP | 2016-167299 A | 9/2016 |
| JP | 2016-201135 A | 12/2016 |
| JP | 2017-527917 A | 9/2017 |
| KR | 10-2004-0046272 A | 6/2004 |
| KR | 10-2005-0101162 A | 10/2005 |
| KR | 10-2006-0032793 A | 4/2006 |
| KR | 10-2008-0050336 A | 6/2008 |
| KR | 10-2010-0086052 A | 7/2010 |
| KR | 10-2011-0028581 A | 3/2011 |
| KR | 10-2012-0058539 A | 6/2012 |
| KR | 10-2012-0092644 A | 8/2012 |
| KR | 10-2013-0026541 A | 3/2013 |
| KR | 10-2014-0033088 A | 3/2014 |
| KR | 10-2014-0049340 A | 4/2014 |
| KR | 10-2014-0067965 A | 6/2014 |
| KR | 10-2015-0067197 A | 6/2015 |
| KR | 10-1540544 B1 | 7/2015 |
| KR | 10-2015-0131257 A | 11/2015 |
| KR | 10-2015-0131262 A | 11/2015 |
| KR | 10-1587115 B1 | 1/2016 |
| KR | 10-1611895 B1 | 4/2016 |
| WO | 99/54807 A1 | 10/1999 |
| WO | 01/29702 A2 | 4/2001 |
| WO | 03/023593 A1 | 3/2003 |
| WO | 03/081458 A1 | 10/2003 |
| WO | 2005/093550 A2 | 10/2005 |
| WO | 2005/103863 A2 | 11/2005 |
| WO | 2006/020305 A2 | 2/2006 |
| WO | 2006/047697 A2 | 5/2006 |
| WO | 2008/030779 A2 | 3/2008 |
| WO | 2009/032998 A1 | 3/2009 |
| WO | 2009/073607 A2 | 6/2009 |
| WO | 2009/082814 A1 | 7/2009 |
| WO | 2009/133710 A1 | 11/2009 |
| WO | 2009/150425 A2 | 12/2009 |
| WO | 2009/155991 A1 | 12/2009 |
| WO | 2010/059188 A2 | 5/2010 |
| WO | 2011/017653 A1 | 2/2011 |
| WO | 2011/028424 A1 | 3/2011 |
| WO | 2011/051091 A1 | 5/2011 |
| WO | 2011/084856 A1 | 7/2011 |
| WO | 2011/127309 A1 | 10/2011 |
| WO | 2012/097385 A2 | 7/2012 |
| WO | 2012/170354 A2 | 12/2012 |
| WO | 2013/120851 A1 | 8/2013 |
| WO | 2014/053063 A1 | 4/2014 |
| WO | 2014/149473 A1 | 9/2014 |
| WO | 2014/149488 A1 | 9/2014 |
| WO | 2014/162659 A1 | 10/2014 |
| WO | 2014/195851 A1 | 12/2014 |
| WO | 2014/200734 A1 | 12/2014 |
| WO | 2016/036218 A1 | 3/2016 |
| WO | 2016/042926 A1 | 3/2016 |
| WO | 2016/077834 A1 | 5/2016 |
| WO | 2016/160632 A1 | 10/2016 |

OTHER PUBLICATIONS

Applicant-Initiated Interview Summary received for U.S. Appl. No. 17/542,947, dated Apr. 28, 2023, 4 pages.

(56) References Cited

OTHER PUBLICATIONS

Brief Communication Regarding Oral Proceedings received for European Patent Application No. 18197554.1, dated Feb. 6, 2023, 8 pages.
Canon IXUS 700—Additional Evidence and Information, 2023, 3 pages (Official Copy Only). {(See Communication under Rule 37 CFR § 1.98(a) (3))}.
Decision on Appeal received for U.S. Appl. No. 16/145,033, dated Apr. 4, 2023, 9 pages.
Decision to Refuse received for European Patent Application No. 18197554.1 dated Mar. 21, 2023, 17 pages.
International Search Report and Written Opinion received for PCT Patent Application No. PCT/US2022/044637, dated Mar. 15, 2023, 19 pages.
Invitation to Pay Additional Fees and Partial International Search Report received for PCT Patent Application No. PCT/US2022/044637, dated Jan. 20, 2023, 12 pages.
Minutes of the Oral Proceedings received for European Patent Application No. 18197554.1, dated Feb. 22, 2023, 9 pages.
Non-Final Office Action received for U.S. Appl. No. 17/542,947, dated Mar. 2, 2023, 59 pages.
Notice of Acceptance received for Australian Patent Application No. 2022200514, dated Apr. 17, 2023, 3 pages.
Notice of Acceptance received for Australian Patent Application No. 2022200965, dated May 11, 2023, 3 pages.
Notice of Allowance received for U.S. Appl. No. 16/145,033, dated May 3, 2023, 5 pages.
Office Action received for Australian Patent Application No. 2022200514, dated Feb. 15, 2023, 2 pages.
Office Action received for Australian Patent Application No. 2022200965, dated Feb. 14, 2023, 4 pages.
Office Action received for Australian Patent Application No. 2022201810, dated Mar. 15, 2023, 2 pages.
Office Action received for Chinese Patent Application No. 202011127969.7, dated Mar. 17, 2023, 14 pages (7 pages of English Translation and 7 pages of Official Copy).
Record of Oral Hearing received for U.S. Appl. No. 16/145,033, dated Apr. 19, 2023, 16 pages.
Summons to Attend Oral Proceedings received for European Patent Application No. 17853657.9, mailed on May 2, 2023, 8 pages.
Summons to Attend Oral Proceedings received for European Patent Application No. 19212057.4, mailed on Apr. 19, 2023, 9 pages.
Supplemental Notice of Allowance received for U.S. Appl. No. 17/697,539, dated Feb. 21, 2023, 2 pages.
Canon, "Camera User Guide Canon (UK) Ltd", Online available at: https://bedienungsanleitungdeutsch.de/bedienungsanleitunghandbuch/Canon_Digital_Ixus_700_EN.pdf, 2005, 196 pages.
Non-Final Office Action received for U.S. Appl. No. 18/112,421, dated Aug. 17, 2023, 15 pages.
Notice of Allowance received for U.S. Appl. No. 16/145,033, dated Aug. 17, 2023, 8 pages.
Notice of Allowance received for U.S. Appl. No. 18/114,794, dated Aug. 16, 2023, 11 pages.
Applicant-Initiated Interview Summary received for U.S. Appl. No. 17/542,947, dated Jul. 10, 2023, 4 pages.
Notice of Allowance received for Chinese Patent Application No. 201780058426.4, dated Jun. 30, 2023, 2 pages (1 page of English Translation and 1 page of Official Copy).
Office Action received for Australian Patent Application No. 2022235618, dated Jul. 4, 2023, 2 pages.
Office Action received for Chinese Patent Application No. 201780033901.2, dated Jun. 28, 2023, 28 pages (14 pages of English Translation and 14 pages of Official Copy).
Office Action received for Chinese Patent Application No. 202111487316.4, dated Jun. 7, 2023, 20 pages (10 pages of English Translation and 10 pages of Official Copy).
Advisory Action received for U.S. Appl. No. 14/253,783, dated Feb. 15, 2017, 6 Pages.
Advisory Action received for U.S. Appl. No. 16/145,033, dated Nov. 2, 2021, 5 pages.
Advisory Action received for U.S. Appl. No. 16/259,771, dated Feb. 26, 2020, 3 pages.
Advisory Action received for U.S. Appl. No. 16/259,771, dated Jul. 14, 2020, 6 pages.
Applicant Initiated Interview Summary received for U.S. Appl. No. 16/109,487, dated Apr. 21, 2020, 5 pages.
Applicant Initiated Interview Summary received for U.S. Appl. No. 16/259,771, dated May 5, 2020, 10 pages.
Applicant Initiated Interview Summary received for U.S. Appl. No. 16/584,783, dated May 4, 2020, 3 pages.
Applicant-Initiated Interview Summary for U.S. Appl. No. 16/402,057, dated Mar. 16, 2020, 3 pages.
Applicant-Initiated Interview Summary received for U.S. Appl. No. 16/145,033, dated Apr. 30, 2021, 4 pages.
Applicant-Initiated Interview Summary received for U.S. Appl. No. 16/145,033, dated Jun. 29, 2020, 5 pages.
Applicant-Initiated Interview Summary received for U.S. Appl. No. 16/145,033, dated Nov. 24, 2020, 4 pages.
Applicant-Initiated Interview Summary received for U.S. Appl. No. 16/145,033, dated Oct. 7, 2021, 4 pages.
Applicant-Initiated Interview Summary received for U.S. Appl. No. 16/259,771, dated Apr. 18, 2022, 2 pages.
Applicant-Initiated Interview Summary received for U.S. Appl. No. 16/450,531, dated Aug. 11, 2020, 5 pages.
Applicant-Initiated Interview Summary received for U.S. Appl. No. 16/584,776, dated May 13, 2020, 9 pages.
Applicant-Initiated Interview Summary received for U.S. Appl. No. 16/584,776, dated Nov. 25, 2020, 5 pages.
Applicant-Initiated Interview Summary received for U.S. Appl. No. 17/153,703, dated May 11, 2022, 4 pages.
Applicant-Initiated Interview Summary received for U.S. Appl. No. 17/408,220, dated Oct. 18, 2022, 4 pages.
Applicant-Initiated Interview Summary received for U.S. Appl. No. 17/744,499, dated Jan. 27, 2023, 3 pages.
Applivgames, ""Super Mario Run" Stickers for iMessage: Free Delivery Started!", Available online at: <https://games.app-liv.jp/archives/178627>, Sep. 13, 2016, 3 pages.
Board Opinion received for Chinese Reexamination Patent Application No. 200780001142.8, mailed on Oct. 21, 2014, 13 pages.
Brief Communication Regarding Oral Proceedings received for European Patent Application No. 19724963.4, mailed on Jun. 22, 2021, 2 pages.
Certificate of Examination received for Australian Patent Application No. 2019100490, dated Oct. 16, 2019, 2 pages.
Chen et al., "Event Detection from Flickr Data through Wavelet-based Spatial Analysis", Proceeding of the 18th ACM Conference on Information and Knowledge Management, CIKM, Jan. 1, 2009, pp. 523-532.
Contents Pocket, "Line Stamp Information", Available online at: <https://web.archive.org/web/20150404080541/http://contents-pocket.net/linestamp.html>, Apr. 2015, 2 pages.
Corrected Notice of Allowance received for U.S. Appl. No. 13/666,943, dated Aug. 11, 2016, 2 pages.
Corrected Notice of Allowance received for U.S. Appl. No. 15/281,524, dated Jun. 3, 2019, 2 pages.
Corrected Notice of Allowance received for U.S. Appl. No. 15/713,490, dated May 1, 2019, 2 pages.
Corrected Notice of Allowance received for U.S. Appl. No. 16/402,057, dated Jul. 6, 2020, 2 pages.
Corrected Notice of Allowance received for U.S. Appl. No. 16/450,531, dated Nov. 12, 2020, 2 pages.
Corrected Notice of Allowance received for U.S. Appl. No. 16/450,531, dated Oct. 30, 2020, 2 pages.
Corrected Notice of Allowance received for U.S. Appl. No. 16/983,815, dated Mar. 31, 2021, 6 pages.
Corrected Notice of Allowance received for U.S. Appl. No. 17/125,744, dated Dec. 8, 2021, 2 pages.
Corrected Notice of Allowance received for U.S. Appl. No. 17/125,744, dated Dec. 24, 2021, 2 pages.
Corrected Notice of Allowance received for U.S. Appl. No. 17/125,744, dated Mar. 10, 2022, 2 pages.
Corrected Notice of Allowance received for U.S. Appl. No. 17/125,744, dated Mar. 30, 2022, 2 pages.

(56) References Cited

OTHER PUBLICATIONS

Corrected Notice of Allowance received for U.S. Appl. No. 17/153,703, dated Jan. 19, 2023, 2 pages.
Corrected Notice of Allowance received for U.S. Appl. No. 17/153,703, dated Nov. 10, 2022, 2 pages.
Corrected Notice of Allowance received for U.S. Appl. No. 17/153,703, dated Sep. 14, 2022, 2 pages.
Corrected Notice of Allowance received for U.S. Appl. No. 17/697,539, dated Feb. 1, 2023, 2 pages.
Corrected Notice of Allowance received for U.S. Appl. No. 17/744,499, dated Mar. 21, 2023, 4 pages.
Cyr Jim, "Apple Watch—Customize Modular Watch Face", available online at: https://www.youtube.com/watch?v=02W93HbKIK8, May 13, 2015, 2 pages.
Das et al., "Event Classification in Personal Image Collections", IEEE Intl. Workshop on Media Information Analysis for Personal and Social Applications at ICME, 2009, 2009, pp. 1660-1663.
Das et al., "Event-based Location Matching for Consumer Image Collections", CIVR, 2008, Proc. of the ACM Int. Conf. on Image and Video Retrieval, 2008, 5 pages.
Decision on Appeal received for Korean Patent Application No. 10-2021-7002582, dated May 13, 2022, 29 pages.
Decision on Appeal received for U.S. Appl. No. 16/259,771, dated Aug. 19, 2021, 12 pages.
Decision on Appeal received for U.S. Appl. No. 16/584,783, dated Oct. 14, 2021, 12 pages.
Decision to Grant received for Danish Patent Application No. PA201870385, dated Mar. 26, 2020, 2 pages.
Decision to Grant received for European Patent Application No. 11178259.5, dated Apr. 4, 2019, 3 pages.
Decision to Grant received for European Patent Application No. 19724963.4, dated Feb. 3, 2022, 2 pages.
Decision to Grant received for Japanese Patent Application No. 2009-526943, dated Dec. 2, 2011, Dec. 2, 2011, 3 pages.
Decision to Grant received for the European Patent Application No. 07814633.9, dated Sep. 2, 2010, 3 pages.
Decision to Grant received for the European Patent Application No. 10172417.7, dated Nov. 14, 2013, 3 pages.
Decision to Grant received for the European Patent Application No. 11178257.9, dated Jun. 20, 2013, 3 pages.
Decision to Refuse received for European Patent Application No. 17813778.2, dated Jan. 24, 2022, 17 pages.
European Search Report received for the European Application No. 11178259.5, dated Oct. 31, 2011, 8 pages.
European Search Report received for the European Patent Application No. 10172417.7, dated Jan. 7, 2011, Jan. 7, 2011, 4 pages.
Examiner's Answer to Appeal Brief received for U.S. Appl. No. 16/145,033, dated Aug. 4, 2022, 10 pages.
Examiner's Answer to Appeal Brief received for U.S. Appl. No. 16/259,771, dated Oct. 23, 2020, 15 pages.
Examiner's Answer to Appeal Brief received for U.S. Appl. No. 16/584,783, dated Feb. 17, 2021, 9 pages.
Examiner's Pre-Review Report received for Japanese Patent Application No. 2018-138559, dated Jul. 29, 2020, 6 pages.
Examiner's Pre-Review Report received for Japanese Patent Application No. 2019-215503, dated Aug. 20, 2021, 15 pages.
Extended European Search Report received for European Patent Application No. 11178257.9, dated Oct. 31, 2011, Oct. 31, 2011, 5 pages.
Extended European Search Report received for European Patent Application No. 17813778.2, dated Jan. 10, 2020, 12 pages.
Extended European Search Report received for European Patent Application No. 17853657.9, dated May 28, 2020, 9 pages.
Extended European Search Report received for European Patent Application No. 18197554.1, dated Jun. 3, 2019, 11 pages.
Extended European Search Report received for European Patent Application No. 19212057.4, dated Feb. 27, 2020, 8 pages.
Extended European Search Report received for European Patent Application No. 22152524.9, dated May 2, 2022, 10 pages.
Extended European Search Report received for European Patent Application No. 22164099.8, dated Aug. 25, 2022, 9 pages.
Final Office Action received for U.S. Appl. No. 15/281,524, dated Dec. 27, 2018, 6 pages.
Final Office Action received for U.S. Appl. No. 15/881,544, dated Jan. 29, 2019, 14 pages.
Final Office Action received for U.S. Appl. No. 16/145,033, dated Jul. 6, 2021, 113 pages.
Final Office Action received for U.S. Appl. No. 16/145,033, dated Sep. 22, 2020, 49 pages.
Final Office Action received for U.S. Appl. No. 16/259,771, dated Aug. 12, 2022, 25 pages.
Final Office Action received for U.S. Appl. No. 16/259,771, dated Nov. 18, 2019, 13 pages.
Final Office Action received for U.S. Appl. No. 16/402,057, dated Oct. 17, 2019, 23 pages.
Final Office Action received for U.S. Appl. No. 16/584,783, dated May 19, 2020, 19 pages.
Final Office Action received for U.S. Appl. No. 14/253,783, dated Sep. 30, 2016, 18 pages.
Fono et al., "EyeWindows: Evaluation of Eye-Controlled Zooming Windows for Focus Selection", CHI 2005, Conference Proceedings, Conference on Human Factors in Computing Systems, Apr. 2-7, 2005, pp. 151-160.
Gallagher et al., "Image Annotation Using Personal Calendars as Context", ACM Intl. Conf. on Multimedia, 2008, 2008, 4 pages.
Geek, "How to Put the Day of the Week into the Windows Taskbar Clock", available online at: https://www.howtogeek.com/194103/how-to-put-the-day-of-the-week-into-the-windows-taskbar-clock/, 2014, 3 pages.
Han et al., "Density-Based Methods", Data Mining Concepts and Techniques, Elsevier, 2006, pp. 418-420.
Hinckley et al., "Sensing Techniques for Mobile Interaction", Symposium on User Interface Software and Technology, CHI Letters, vol. 2, No. 2, Nov. 2000, pp. 91-100.
Hourunranta et al., "Video and Audio Editing for Mobile Applications", Proceedings/ 2006 IEEE international Conference on multimedia and expo, ICME 2006, Jul. 9, 2006, pp. 1305-1308.
Hughes Neil, "Apple Explores Merging Cloud Content with Locally Stored Media Library", Available at: <http://appleinsider.com/articles/11/02/10/apple_explores_merging_cloud_content_with_locally_stored_media_library.html>, XP55040717, Feb. 10, 2011, 2 pages.
Hurwitz Jon, "Interface for Small-Screen Media Playback Control", Technical Disclosure Commons, online available at: https://www.tdcommons.org/cgi/viewcontent.cgi?article=4231&context=dpubs_series, Apr. 17, 2020, pp. 1-9.
Intention to Grant received for Danish Patent Application No. PA201870385, dated Jan. 24, 2020, 2 pages.
Intention to Grant received for European Patent Application No. 10172417.7, dated Jul. 9, 2013, Jul. 9, 2013, 10 pages.
Intention to Grant received for European Patent Application No. 11178257.9, dated Jan. 30, 2013, Jan. 30, 2013, 9 pages.
Intention to Grant received for European Patent Application No. 11178259.5, dated Nov. 8, 2018, 16 pages.
Intention to Grant received for European Patent Application No. 19724963.4, dated Sep. 20, 2021, 7 pages.
Intention to Grant received for the European Patent Application No. 07814633.9, dated Mar. 19, 2010, 4 pages.
International Preliminary Report on Patentability received for PCT Patent Application No. PCT/US2007/077441, dated Mar. 10, 2009, 9 pages.
International Preliminary Report on Patentability received for PCT Patent Application No. PCT/US2011/020403, dated Jul. 19, 2012, 10 pages.
International Preliminary Report on Patentability received for PCT Patent Application No. PCT/US2016/035090, dated Dec. 14, 2017, 14 pages.
International Preliminary Report on Patentability received for PCT Patent Application No. PCT/US2017/035322, dated Dec. 27, 2018, 13 pages.
International Preliminary Report on Patentability received for PCT Patent Application No. PCT/US2017/049795, dated Apr. 4, 2019, 16 pages.

(56) References Cited

OTHER PUBLICATIONS

International Preliminary Report on Patentability received for PCT Patent Application No. PCT/US2019/024790, dated Nov. 19, 2020, 11 pages.
International Preliminary Report on Patentability received for PCT Patent Application No. PCT/US2020/031442, dated Nov. 18, 2021, 21 pages.
International Search Report and Written Opinion received for PCT Application No. PCT/US2017/049795, dated Dec. 27, 2017., 26 pages.
International Search Report and Written Opinion received for PCT Patent Application No. PCT/US2011/020403, dated May 26, 2011, May 26, 2011, 14 pages.
International Search Report and Written Opinion received for PCT Patent Application No. PCT/US2011/048169, dated Oct. 21, 2011., Oct. 21, 2011, 9 pages.
International Search Report and Written Opinion received for PCT Patent Application No. PCT/US2016/035090, dated Oct. 4, 2016, 17 pages.
International Search Report and Written Opinion Received for PCT Patent Application No. PCT/US2017/035322, dated Oct. 5, 2017, 18 pages.
International Search Report and Written Opinion received for PCT Patent Application No. PCT/US2019/024790, dated Sep. 11, 2019, 18 pages.
International Search Report and Written Opinion received for PCT Patent Application No. PCT/US2020/031442, dated Oct. 30, 2020, 28 pages.
International Search Report and Written Opinion received for PCT Patent Application No. PCT/US2022/030589, dated Sep. 5, 2022, 26 pages.
International Search Report and Written Opinion, received for PCT Patent Application No. PCT/US2007/077441, dated May 8, 2008, May 8, 2008, 13 pages.
Invitation to Pay Additional Fee received for PCT Patent Application No. PCT/US2019/024790, dated Jul. 18, 2019, 10 pages.
Invitation to Pay Additional Fees received for PCT Patent Application No. PCT/US2007/077441, dated Jan. 28, 2008, Jan. 28, 2008, 5 pages.
Invitation to Pay Additional Fees received for PCT Patent Application No. PCT/US2016/035090, dated Jul. 15, 2016, 2 pages.
Invitation to Pay Additional Fees received for PCT Patent Application No. PCT/US2017/035322, dated Aug. 7, 2017, 4 pages.
Invitation to Pay Additional Fees received for PCT Patent Application No. PCT/US2017/049795, dated Nov. 3, 2017, 3 pages.
Invitation to Pay Additional Fees received for PCT Patent Application No. PCT/US2020/031442, dated Aug. 25, 2020, 22 pages.
Jin-Chang et al., "Multi-modal Interface Techniques and Its Application for Multimedia Retrieval", China Academic Journal Electronic Publishing House, 2002, pp. 115-117.
Jobs Steve, "iPhone Introduction in 2007 (Complete)", available at <https://www.youtube.com/watch?v=9hUlxyE2Ns8>, Jan. 10, 2013, 3 pages.
Karlson et al., "AppLens and LaunchTile: Two Designs for One-Handed Thumb Use on Small Devices", CHI 2005, Papers: Small Devices 1, Apr. 2-7, 2005, pp. 201-210.
Liao, T.W., "Clustering of Time Series Data—a Survey", Pattern Recognition, vol. 38, 2005, pp. 1857-1874.
Marwan et al., "Generalised Recurrence Plot Analysis for Spatial Data", Physics Letters A, vol. 360, 2007, pp. 545-551.
Minutes of Oral Proceedings received for European Patent Application No. 11178259.5, mailed on Nov. 2, 2018, 9 pages.
Minutes of the Oral Proceedings received for European Patent Application No. 17813778.2, mailed on Jan. 21, 2022, 7 pages.
Minutes of the Oral Proceedings received for European Patent Application No. 19724963.4, mailed on Sep. 3, 2021, 6 pages.
Mozilla Developer Network, "Mouse Gesture Events", Available online at <https://developer.mozilla.org/en-US/docs/Web/Guide/Events/Mouse_gesture_events>, May 14, 2009, 3 pages.
MS Excel 2013, Jan. 29, 2013, 2 pages.
Non-Final Office Action received for U.S. Appl. No. 15/881,544, dated Jun. 7, 2018, 15 pages.
Non-Final Office Action received for U.S. Appl. No. 12/789,441, dated Jan. 17, 2013, Jan. 17, 2013, 24 pages.
Non-Final Office Action received for U.S. Appl. No. 14/253,783, dated Feb. 23, 2016, 18 pages.
Non-Final Office Action received for U.S. Appl. No. 11/848,210, dated Jun. 30, 2011, Jun. 30, 2011, 8 pages.
Non-Final Office Action received for U.S. Appl. No. 13/361,912, dated Mar. 22, 2012, Mar. 22, 2012, 8 pages.
Non-Final Office Action received for U.S. Appl. No. 14/839,889, dated Mar. 7, 2017, 26 pages.
Non-Final Office Action received for U.S. Appl. No. 15/275,294, dated Dec. 23, 2016, 18 pages.
Non-Final Office Action received for U.S. Appl. No. 15/275,294, dated Nov. 3, 2017, 29 pages.
Office Action received for U.S. Appl. No. 15/281,524, dated Jun. 19, 2018, 23 pages.
Office Action received for U.S. Appl. No. 15/391,269, dated Aug. 22, 2019, 44 pages.
Office Action received for U.S. Appl. No. 15/687,384, dated Jul. 6, 2018, 19 pages.
Office Action received for U.S. Appl. No. 16/109,487, dated Feb. 5, 2020, 19 pages.
Office Action received for U.S. Appl. No. 16/145,033, dated Feb. 9, 2021, 55 pages.
Office Action received for U.S. Appl. No. 16/145,033, dated Mar. 4, 2020, 50 pages.
Office Action received for U.S. Appl. No. 16/259,771, dated Jan. 25, 2022, 20 pages.
Non-Final Office Action received for U.S. Appl. No. 16/259,771, dated May 8, 2019, 11 pages.
Office Action received for U.S. Appl. No. 16/402,057, dated May 23, 2019, 16 pages.
Non-Final Office Action received for U.S. Appl. No. 16/450,531, dated Jun. 10, 2020, 10 pages.
Non-Final Office Action received for U.S. Appl. No. 16/584,776, dated Aug. 18, 2020, 36 pages.
Non-Final Office Action received for U.S. Appl. No. 16/584,776, dated Feb. 13, 2020, 31 pages.
Non-Final Office Action received for U.S. Appl. No. 16/584,783, dated Jan. 30, 2020, 18 pages.
Non-Final Office Action received for U.S. Appl. No. 17/153,703, dated Mar. 30, 2022, 10 pages.
Non-Final Office Action received for U.S. Appl. No. 17/408,220, dated Aug. 3, 2022, 15 pages.
Non-Final Office Action received for U.S. Appl. No. 17/744,499, dated Dec. 7, 2022, 14 pages.
Non-Final Office Action received for U.S. Appl. No. 13/666,943, dated Oct. 6, 2015, 12 Pages.
Notice of Acceptance received for Australian Patent Application No. 2011265412, dated Nov. 12, 2014, 2 pages.
Notice of Acceptance received for Australian Patent Application No. 2015201028, dated Mar. 21, 2017, 3 Pages.
Notice of Acceptance received for Australian Patent Application No. 2017201548, dated Sep. 3, 2018, 3 pages.
Notice of Acceptance received for Australian Patent Application No. 2017330212, dated Apr. 28, 2020, 3 pages.
Notice of Acceptance received for Australian Patent Application No. 2018214074, dated Aug. 6, 2019, 3 pages.
Notice of Acceptance received for Australian Patent Application No. 2019264623, dated Jan. 4, 2021, 3 pages.
Notice of Acceptance received for Australian Patent Application No. 2019266054, dated Nov. 25, 2021, 3 pages.
Notice of Acceptance received for Australian Patent Application No. 2019271873, dated Nov. 30, 2020, 3 pages.
Notice of Acceptance received for Australian Patent Application No. 2020213402, dated Sep. 21, 2020, 3 pages.
Notice of Acceptance received for Australian Patent Application No. 2020267310, dated Feb. 23, 2022, 3 pages.
Notice of Acceptance received for Australian Patent Application No. 2020267396, dated Dec. 7, 2021, 3 pages.

(56) References Cited

OTHER PUBLICATIONS

Notice of Acceptance received for Australian Patent Application No. 2020294208, dated Mar. 2, 2022, 3 pages.
Notice of acceptance received for Australian Patent Application No. 2021202225, dated Jun. 20, 2022, 3 pages.
Notice of Acceptance received for Australian Patent Application No. 2022201561, dated Jul. 22, 2022, 3 pages.
Notice of Acceptance received for Australian Patent Application No. 2017284958, dated Sep. 3, 2019, 3 Pages.
Notice of Allowance received for Canadian Patent Application No. 2,935,875, dated May 3, 2017, 1 page.
Notice of Allowance received for Canadian Patent Application No. 2,984,527, dated Apr. 30, 2020, 1 page.
Notice of Allowance received for Chinese Patent Application No. 201811136445.7, dated Aug. 11, 2021, 2 pages.
Notice of Allowance received for Chinese Patent Application No. 201811616429.8, dated Aug. 5, 2020, 3 pages.
Notice of Allowance received for Chinese Patent Application No. 201910315328.5, dated Aug. 24, 2022, 4 pages.
Notice of Allowance received for Japanese Patent Application No. 2013-140171, dated May 29, 2015, 4 pages.
Notice of Allowance received for Japanese Patent Application No. 2014-259225, dated Feb. 27, 2017, 3 pages.
Notice of Allowance received for Japanese Patent Application No. 2015-129152, dated May 8, 2017, 3 pages.
Notice of Allowance received for Japanese Patent Application No. 2017-057997, dated Apr. 23, 2018, 4 pages.
Notice of Allowance received for Japanese Patent Application No. 2017-132229, dated Jun. 25, 2018, 4 pages.
Notice of Allowance received for Japanese Patent Application No. 2018-138559, dated Dec. 3, 2021, 3 pages.
Notice of Allowance received for Japanese Patent Application No. 2019-123115, dated Nov. 30, 2020, 4 pages.
Notice of Allowance received for Japanese Patent Application No. 2019-215503, dated Aug. 26, 2022, 3 pages.
Notice of Allowance received for Japanese Patent Application No. 20193-511767, dated Mar. 30, 2020, 4 pages.
Notice of Allowance received for Japanese Patent Application No. 2020-079486, dated Oct. 21, 2022, 4 pages.
Notice of Allowance received for Japanese Patent Application No. 2021-000224, dated May 7, 2021, 4 pages.
Notice of Allowance received for Japanese Patent Application No. 2021-092483, dated Sep. 30, 2022, 4 pages.
Notice of Allowance received for Japanese Patent Application No. 2021-094529, dated Sep. 6, 2021, 4 pages.
Notice of Allowance received for Japanese Patent Application No. 2021-566100, dated Jan. 27, 2023, 4 pages.
Notice of Allowance received for Korean Patent Application No. 10-2018-7034875, dated Dec. 12, 2018, 4 pages.
Notice of Allowance received for Korean Patent Application No. 10-2019-7005369, dated Oct. 26, 2020, 4 pages.
Notice of Allowance received for Korean Patent Application No. 10-2019-7007053, dated Dec. 19, 2019, 6 pages.
Notice of Allowance received for Korean Patent Application No. 10-2019-7007053, dated Mar. 12, 2020, 6 pages.
Notice of Allowance received for Korean Patent Application No. 10-2020-7005314, dated Mar. 23, 2020, 6 pages.
Notice of Allowance received for Korean Patent Application No. 10-2020-7018255, dated Feb. 24, 2021, 5 pages.
Notice of Allowance received for Korean Patent Application No. 10-2021-7036310, dated Apr. 26, 2022, 5 pages.
Notice of Allowance received for the Canadian Patent Application No. 2,853,273, dated Jan. 12, 2016, Jan. 12, 2016, 1 page.
Notice of Allowance received for U.S. Appl. No. 11/848,210, dated Dec. 20, 2011, Dec. 20, 2011, 5 pages.
Notice of Allowance received for U.S. Appl. No. 12/789,441, dated Dec. 6, 2013, Dec. 6, 2013, 11 pages.
Notice of Allowance received for U.S. Appl. No. 13/361,912, dated Jul. 2, 2012, Jul. 2, 2012, 7 pages.
Notice of Allowance received for U.S. Appl. No. 13/666,943, dated Jun. 2, 2016, 9 pages.
Notice of Allowance received for U.S. Appl. No. 13/666,943, dated Jun. 17, 2015, 7 pages.
Notice of Allowance received for U.S. Appl. No. 14/253,783, dated Apr. 14, 2017, 12 Pages.
Notice of Allowance received for U.S. Appl. No. 14/253,783, dated Jul. 12, 2017, 5 pages.
Notice of Allowance received for U.S. Appl. No. 14/253,783, dated Sep. 5, 2017, 8 pages.
Notice of Allowance received for U.S. Appl. No. 14/839,889, dated Oct. 30, 2017, 16 pages.
Notice of Allowance received for U.S. Appl. No. 15/275,294, dated Jun. 6, 2018, 8 pages.
Notice of Allowance received for U.S. Appl. No. 15/275,294, dated Jun. 30, 2017, 8 Pages.
Notice of Allowance received for U.S. Appl. No. 15/281,524, dated Apr. 11, 2019, 7 pages.
Notice of Allowance received for U.S. Appl. No. 15/687,384, dated Jan. 8, 2019, 8 pages.
Notice of Allowance received for U.S. Appl. No. 15/713,490, dated Mar. 20, 2019, 15 pages.
Notice of Allowance received for U.S. Appl. No. 15/881,544, dated June 26, 2019, 6 pages.
Notice of Allowance received for U.S. Appl. No. 15/881,544, dated Nov. 7, 2019, 5 pages.
Notice of Allowance received for U.S. Appl. No. 16/109,487, dated Aug. 18, 2020, 8 pages.
Notice of Allowance received for U.S. Appl. No. 16/109,487, dated May 12, 2020, 8 pages.
Notice of Allowance received for U.S. Appl. No. 16/109,487, dated Nov. 23, 2020, 3 pages.
Notice of Allowance received for U.S. Appl. No. 16/402,057, dated Mar. 25, 2020, 8 pages.
Notice of Allowance received for U.S. Appl. No. 16/450,531 dated Sep. 25, 2020, 7 pages.
Notice of Allowance received for U.S. Appl. No. 16/584,776, dated Feb. 1, 2021, 9 pages.
Notice of Allowance received for U.S. Appl. No. 16/584,783, dated Dec. 20, 2021, 7 pages.
Notice of Allowance received for U.S. Appl. No. 16/983,815, dated Jul. 26, 2021, 3 pages.
Notice of Allowance received for U.S. Appl. No. 16/983,815, dated Mar. 18, 2021, 11 pages.
Notice of Allowance received for U.S. Appl. No. 17/125,744, dated Feb. 7, 2022, 10 pages.
Notice of Allowance received for U.S. Appl. No. 17/125,744, dated Oct. 21, 2021, 11 pages.
Notice of Allowance received for U.S. Appl. No. 17/153,703, dated Aug. 30, 2022, 8 pages.
Notice of Allowance received for U.S. Appl. No. 17/153,703, dated Dec. 22, 2022, 7 pages.
Notice of Allowance received for U.S. Appl. No. 17/408,220, dated Nov. 15, 2022, 11 pages.
Notice of Allowance received for U.S. Appl. No. 17/697,539, dated Nov. 29, 2022, 10 pages.
Notice of Allowance received for U.S. Appl. No. 17/744,499, dated Mar. 15, 2023, 7 pages.
Notice of Allowance received for U.S. Appl. No. 12/789,441, dated Aug. 20, 2013, Aug. 20, 2013, 9 pages.
Office Action received for Australian Patent Application No. 2015201028, dated Mar. 15, 2016, 2 pages.
Office Action received for Australian Patent Application No. 2017201548, dated Feb. 26, 2018, 2 pages.
Office Action received for Australian Patent Application No. 2017330212, dated Feb. 21, 2020, 2 pages.
Office Action received for Australian Patent Application No. 2018214074, dated May 9, 2019, 2 pages.
Office Action received for Australian Patent Application No. 2019100490, dated Jul. 26, 2019, 4 pages.
Office Action received for Australian Patent Application No. 2019264623, dated Sep. 14, 2020, 3 pages.

(56) References Cited

OTHER PUBLICATIONS

Office Action received for Australian Patent Application No. 2019266054, dated Aug. 23, 2021, 4 pages.
Office Action received for Australian Patent Application No. 2019266054, dated Jun. 29, 2021, 3 pages.
Office Action received for Australian Patent Application No. 2019271873, dated Oct. 5, 2020, 3 pages.
Office Action received for Australian Patent Application No. 2020267310, dated Nov. 4, 2021, 2 pages.
Office Action received for Australian Patent Application No. 2020294208, dated Dec. 17, 2021, 2 pages.
Office Action received for Australian Patent Application No. 2021202225, dated Apr. 7, 2022, 3 pages.
Office Action received for Australian Patent Application No. 2022200514, dated Jan. 17, 2023, 3 pages.
Office Action received for Australian Patent Application No. 2022201561, dated May 2, 2022, 3 pages.
Office Action received for Australian Patent Application No. 2017284958, dated Dec. 13, 2018, 3 pages.
Office Action received for Canadian Patent Application No. 2,853,273, dated Feb. 23, 2015, 5 pages.
Office Action received for Canadian Patent Application No. 2,984,527 dated Sep. 11, 2018, 5 pages.
Office Action received for Canadian Patent Application No. 2,984,527, dated Jul. 25, 2019, 4 pages.
Office Action received for Chinese Patent Application No. 201780033901.2, dated Nov. 23, 2022, 44 pages.
Office Action received for Chinese Patent Application No. 201780058426.4, dated Dec. 2, 2022, 11 pages.
Office Action received for Chinese Patent Application No. 201811136445.7, dated Apr. 14, 2021, 7 pages.
Office Action received for Chinese Patent Application No. 201811136445.7, dated Oct. 28, 2020, 17 pages.
Office Action received for Chinese Patent Application No. 201811616429.8, dated May 7, 2020, 8 pages.
Office Action received for Chinese Patent Application No. 201811616429.8, dated Sep. 4, 2019, 26 pages.
Office Action received for Chinese Patent Application No. 201910315328.5, dated Nov. 30, 2021, 21 pages.
Office Action received for Chinese Patent Application No. 201911199054.4, dated Jan. 20, 2021, 19 pages.
Office Action received for Chinese Patent Application No. 201911199054.4, dated Jul. 3, 2020, 15 pages.
Office Action received for Chinese Patent Application No. 201911199054.4, dated Jun. 10, 2021, 13 pages.
Office Action received for Chinese Patent Application No. 202011127969.7, dated Jul. 28, 2022, 25 pages.
Office Action received for Chinese Patent Application No. 202011127969.7, dated Nov. 24, 2022, 26 pages.
Office Action received for Chinese Patent Application No. 202111487316.4, dated Aug. 8, 2022, 25 pages.
Office Action received for Chinese Patent Application No. 202111487316.4, dated Dec. 28, 2022, 13 pages.
Office Action received for Danish Patent Application No. PA201670608, dated Jan. 14, 2019, 7 pages.
Office Action received for Danish Patent Application No. PA201670608, dated Jan. 23, 2018, 10 pages.
Office Action received for Danish Patent Application No. PA201670609, dated Jan. 26, 2018, 8 pages.
Office Action received for Danish Patent Application No. PA201670609, dated Mar. 1, 2019, 9 pages.
Office Action received for Danish Patent Application No. PA201670609, dated May 4, 2020, 7 pages.
Office Action received for Danish Patent Application No. PA201670609, dated May 7, 2018, 4 pages.
Office Action received for Danish Patent Application No. PA201870385, dated Aug. 23, 2019, 3 Pages.
Office Action received for Danish Patent Application No. PA201970535, dated May 20, 2020, 3 pages.
Office Action received for Danish Patent Application No. PA201970535, dated Oct. 27, 2020, 6 pages.
Office Action received for European Patent Application No. 07814633.9, dated Aug. 10, 2009, 3 pages.
Office Action received for European Patent Application No. 10172417.7, dated Oct. 31, 2011, 6 pages.
Office Action received for European Patent Application No. 11178259.5, dated Jan. 4, 2013, 8 pages.
Office Action received for European Patent Application No. 11178259.5, dated Nov. 10, 2015, 4 pages.
Office Action received for European Patent Application No. 17813778.2, dated Nov. 26, 2020, 10 pages.
Office Action received for European Patent Application No. 17853657.9, dated Apr. 1, 2021, 6 pages.
Office Action received for European Patent Application No. 18197554.1, dated Jun. 15, 2020, 4 pages.
Office Action received for European Patent Application No. 19212057.4, dated Mar. 9, 2021, 6 pages.
Office Action received for European Patent Application No. 19724963.4, dated Jul. 28, 2020, 6 pages.
Office Action received for European Patent Application No. 20729331.7, dated Jan. 4, 2023, 12 pages.
Office Action received for German Patent Application No. 112007000067.8, dated Apr. 23, 2009, 15 pages.
Office Action received for German Patent Application No. 112007000067.8, dated Sep. 14, 2010, 4 pages.
Office Action received for Indian Patent Application No. 202048019639, dated Sep. 27, 2022, 5 pages.
Office Action received for Indian Patent Application No. 9044/CHENP/2014, dated Jan. 24, 2020, 6 pages.
Office action received for Indian Patent Application No. 2797CHENP2008, dated Jan. 29, 2014, 3 pages.
Office Action received for Japanese Patent Application No. 2013-140171, dated Jul. 22, 2014, 4 pages.
Office Action received for Japanese Patent Application No. 2014-259225, dated May 27, 2016, 4 pages.
Office Action Received for Japanese Patent Application No. 2014-259225, dated Nov. 20, 2015, 2 pages.
Office Action received for Japanese Patent Application No. 2015-129152, dated Sep. 23, 2016, 3 pages.
Office Action received for Japanese Patent Application No. 2017-057997, dated Jan. 9, 2018, 6 pages.
Office Action received for Japanese Patent Application No. 2017-132229, dated Mar. 16, 2018, 7 pages.
Office Action received for Japanese Patent Application No. 2018-138559, dated Apr. 9, 2021, 30 pages.
Office Action received for Japanese Patent Application No. 2018-138559, dated Jan. 27, 2020, 7 pages.
Office Action received for Japanese Patent Application No. 2018-138559, dated Jul. 26, 2021, 37 pages.
Office Action received for Japanese Patent Application No. 2018-138559, dated May 13, 2019, 10 pages.
Office Action received for Japanese Patent Application No. 2019-123115, dated Aug. 31, 2020, 9 pages.
Office Action received for Japanese Patent Application No. 2019-215503, dated Feb. 5, 2021, 12 pages.
Office Action received for Japanese Patent Application No. 2019-215503, dated Jul. 3, 2020, 12 pages.
Office Action received for Japanese Patent Application No. 2020-079486, dated Jul. 16, 2021, 10 pages.
Office Action received for Japanese Patent Application No. 2020-079486, dated Mar. 11, 2022, 8 pages.
Office Action received for Japanese Patent Application No. 2021-092483, dated Apr. 1, 2022, 8 pages.
Office Action received for Japanese Patent Application No. 2021-566100, dated May 27, 2022, 7 pages.
Office Action received for Korean Patent Application No. 10-2019-7005369, dated Mar. 13, 2020, 12 pages.
Office Action received for Korean Patent Application No. 10-2019-7007053, dated Mar. 18, 2019, 12 pages.
Office Action received for Korean Patent Application No. 10-2019-7007053, dated Sep. 26, 2019, 9 pages.

(56) References Cited

OTHER PUBLICATIONS

Office Action received for Korean Patent Application No. 10-2020-7018255, dated Sep. 10, 2020, 12 pages.
Office Action received for Korean Patent Application No. 10-2021-7002582, dated Apr. 16, 2021, 13 pages.
Office Action received for Korean Patent Application No. 10-2021-7002582, dated Oct. 29, 2021, 6 pages.
Office Action received for Korean Patent Application No. 10-2021-7036310, dated Feb. 23, 2022, 6 pages.
Office Action received for Korean Patent Application No. 10-2022-7003364, dated Apr. 22, 2022, 14 pages.
Office Action received for Korean Patent Application No. 10-2022-7003364, dated Dec. 26, 2022, 8 pages.
Partial European Search Report received for European Patent Application No. 18197554.1, dated Jan. 22, 2019, 8 pages.
Record of Oral Hearing received for U.S. Appl. No. 16/259,771, mailed on Aug. 4, 2021, 15 pages.
Result of Consultation received for European Patent Application No. 17813778.2, dated Dec. 6, 2021, 17 pages.
Result of Consultation received for European Patent Application No. 18197554.1, dated Feb. 3, 2023, 3 pages.
Result of Consultation received for European Patent Application No. 19724963.4, dated Jul. 8, 2021, 3 pages.
Result of Consultation received for European Patent Application No. 19724963.4, dated May 31, 2021, 3 pages.
Search Report and opinion received for Danish Patent Application No. PA201670608, dated Jan. 3, 2017, 15 pages.
Search Report and Opinion received for Danish Patent Application No. PA201670609, dated Feb. 1, 2017, 11 pages.
Search Report and Opinion received for Danish Patent Application No. PA201870385, dated Nov. 16, 2018, 10 Pages.
Search Report and Opinion received for Danish Patent Application No. PA201970535, dated Nov. 5, 2019, 10 pages.
Summons to Attend Oral Proceeding received for European Patent Application No. 10172417.7, Jan. 28, 2013, 6 pages., Jan. 28, 2013, 6 pages.
Summons to Attend Oral Proceedings received for European Patent Application No. 11178259.5, mailed on Feb. 11, 2015, 9 pages.
Summons to Attend Oral Proceedings received for European Patent Application No. 11178259.5, mailed on Feb. 19, 2018, 12 pages.
Summons to Attend Oral Proceedings received for European Patent Application No. 17813778.2, mailed on Aug. 13, 2021, 13 pages.
Summons to Attend Oral Proceedings received for European Patent Application No. 18197554.1, mailed on Mar. 23, 2022, 7 pages.
Summons to Attend Oral Proceedings received for European Patent Application No. 19724963.4, mailed on Dec. 23, 2020, 8 pages.
Summons to Oral Proceedings received for German Patent Application No. 112007000067.8, mailed on Dec. 8, 2021, 11 pages.
Supplemental Notice of Allowance received for U.S. Appl. No. 15/713,490, dated May 30, 2019, 2 pages.
Supplemental Notice of Allowance received for U.S. Appl. No. 16/584,776, dated Feb. 18, 2021, 3 pages.
Supplemental Notice of Allowance received for U.S. Appl. No. 16/584,776, dated May 13, 2021, 4 pages.
T&GG Channel, "Canon IXUS 700 / Screenshots of deleting an image", Online available at: https://www.youtube.com/watch?v=8BL_L5hKZUM, May 2015, 2 pages.
Van Wijk et al., "Cluster and Calendar based Visualization of Time Series Data", IEEE Comput. Soc., 1999, 7 pages.
Way to Use a Camera, JP, Nov. 18, 2005, pp. 206-212.
Willcom, "Operation Manual for WS003SH", Jp, Dec. 2005, pp. 4-1 to 4-7.
ZY News, "Generate Cartoon Face within Three Seconds, you are the New-generation Expression Emperor", Online available at: <http://inews.ifeng.com/48551936/news.shtml>, Apr. 22, 2016, 3 pages.
Applicant-Initiated Interview Summary received for U.S. Appl. No. 16/057,396, dated Mar. 16, 2021, 3 pages.
Applicant-Initiated Interview Summary received for U.S. Appl. No. 16/990,643, dated Oct. 26, 2022, 2 pages.
Examiner's Answer to Appeal Brief received for U.S. Appl. No. 16/259,771, dated May 26, 2023, 23 pages.
Final Office Action received for U.S. Appl. No. 17/542,947, dated May 25, 2023, 55 pages.
Non-Final Office Action received for U.S. Appl. No. 16/057,396 dated Jun. 2, 2020, 13 pages.
Non-Final Office Action received for U.S. Appl. No. 16/057,396, dated Nov. 16, 2020, 22 pages.
Non-Final Office Action received for U.S. Appl. No. 16/990,643, dated Sep. 15, 2022, 26 pages.
Notice of Allowance received for U.S. Appl. No. 16/057,396, dated Jun. 8, 2021, 11 pages.
Notice of Allowance received for U.S. Appl. No. 16/990,643, dated Apr. 28, 2023, 11 pages.
Office Action received for Australian Patent Application No. 2022235618, dated May 19, 2023, 2 pages.
Office Action received for Chinese Patent Application No. 201910352204.4, dated Mar. 25, 2023, 23 pages (15 pages of English Translation and 8 pages of Official Copy).
Office Action received for Chinese Patent Application No. 201910352204.4, dated Nov. 22, 2022, 25 pages (15 pages of English Translation and 10 pages of Official Copy).
Summons to Attend Oral Proceedings received for European Patent Application No. 20729331.7, mailed on May 22, 2023, 15 pages.
Supplemental Notice of Allowance received for U.S. Appl. No. 16/990,643, dated May 19, 2023, 2 pages.
Corrected Notice of Allowance received for U.S. Appl. No. 16/145,033, dated Jun. 23, 2023, 3 pages.
Non-Final Office Action received for U.S. Appl. No. 17/468,559, dated Jun. 12, 2023, 14 pages.
Notice of Acceptance received for Australian Patent Application No. 2022201810, dated Jun. 14, 2023, 3 pages.
Notice of Allowance received for Korean Patent Application No. 10-2022-7003364, dated Jul. 28, 2023, 7 pages (2 pages of English Translation and 5 pages of Official Copy).
Notice of Allowance received for U.S. Appl. No. 16/990,643, dated Aug. 10, 2023, 11 pages.
Notice of Acceptance received for Australian Patent Application No. 2022235618, dated Aug. 25, 2023, 3 pages.
Supplemental Notice of Allowance received for U.S. Appl. No. 18/114,794, dated Aug. 31, 2023, 2 pages.
Decision to Refuse received for European Patent Application No. 20729331.7, dated Oct. 19, 2023, 28 pages.
Non-Final Office Action received for U.S. Appl. No. 18/117,998, dated Oct. 10, 2023, 21 pages.
Applicant-Initiated Interview Summary received for U.S. Appl. No. 18/112,421, dated Oct. 27, 2023, 4 pages.
Applicant-Initiated Interview Summary received for U.S. Appl. No. 18/117,998, dated Nov. 1, 2023, 2 pages.
Office Action received for Indian Patent Application No. 202117050360, dated Oct. 30, 2023, 10 pages.
Final Office Action received for U.S. Appl. No. 18/112,421, dated Dec. 12, 2023, 22 pages.
Notice of Allowance received for U.S. Appl. No. 18/114,794, dated Dec. 5, 2023, 8 pages.
Office Action received for Australian Patent Application No. 2023237163, dated Nov. 24, 2023, 3 pages.
Office Action received for European Patent Application No. 22152524.9, dated Dec. 5, 2023, 8 pages.
Notice of Allowance received for U.S. Appl. No. 17/468,559, dated Sep. 21, 2023, 11 pages.
Result of Consultation received for European Patent Application No. 20729331.7, dated Sep. 27, 2023, 27 pages.
International Search Report and Written Opinion received for PCT Patent Application No. PCT/US2023/021734, dated Sep. 7, 2023, 17 pages.
Invitation to Pay Additional Fees and Partial International Search Report received for PCT Patent Application No. PCT/US2023/021734, dated Jul. 12, 2023, 12 pages.
Office Action received for Australian Patent Application No. 2022263576, dated Nov. 13, 2023, 3 pages.

(56) References Cited

OTHER PUBLICATIONS

Office Action received for Chinese Patent Application No. 201780033901.2, dated Oct. 31, 2023, 17 pages (10 pages of English Translation and 7 pages of Official Copy).
Office Action received for Japanese Patent Application No. 2022-170806, dated Nov. 17, 2023, 14 pages (7 pages of English Translation and 7 pages of Official Copy).
Supplemental Notice of Allowance received for U.S. Appl. No. 18/114,794, dated Nov. 17, 2023, 2 pages.
Notice of Acceptance received for Australian Patent Application No. 2022263576, dated Dec. 12, 2023, 3 pages.

* cited by examiner

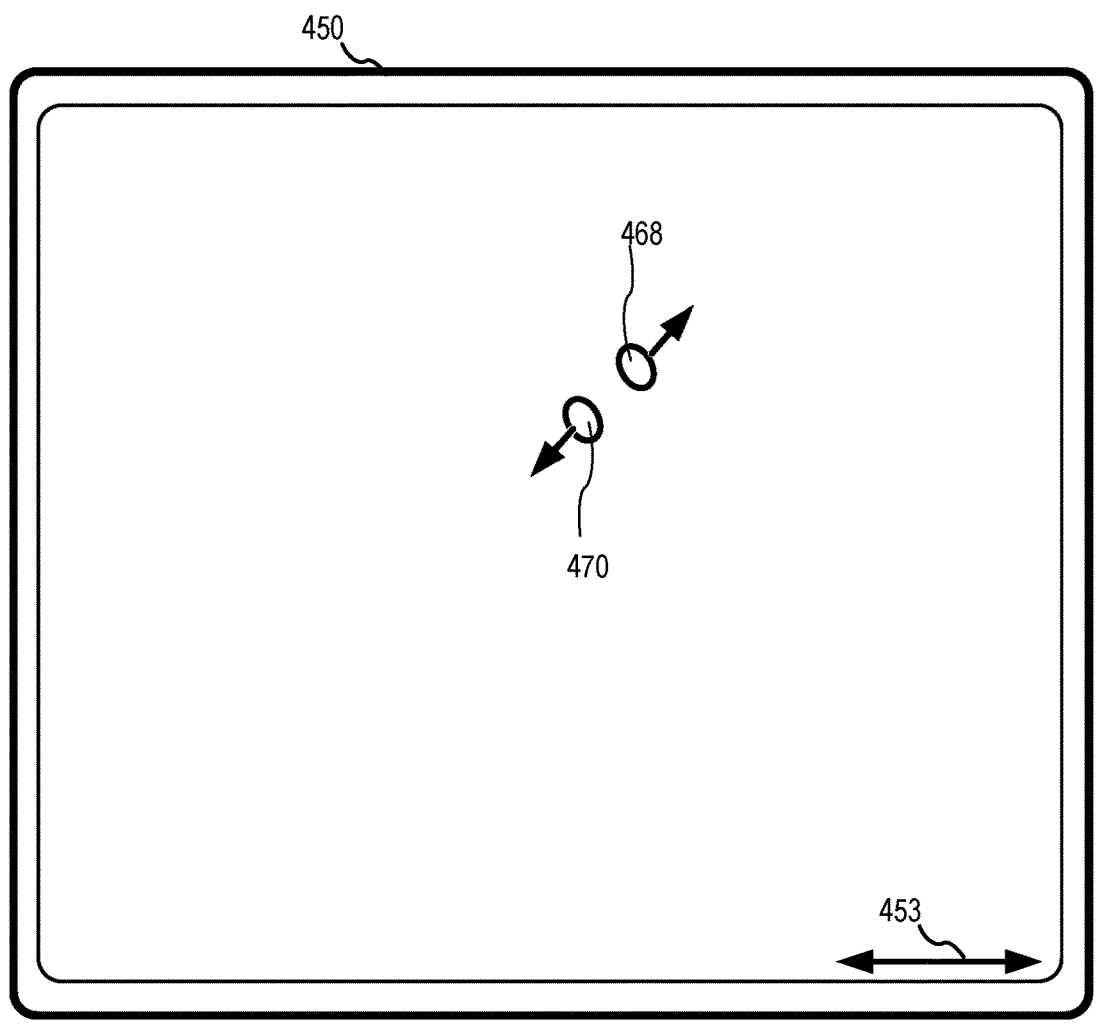
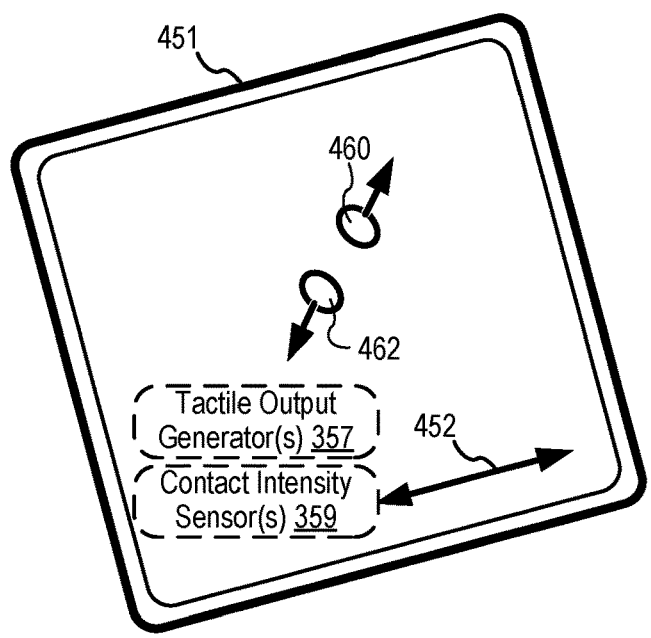
*FIG. 4B*

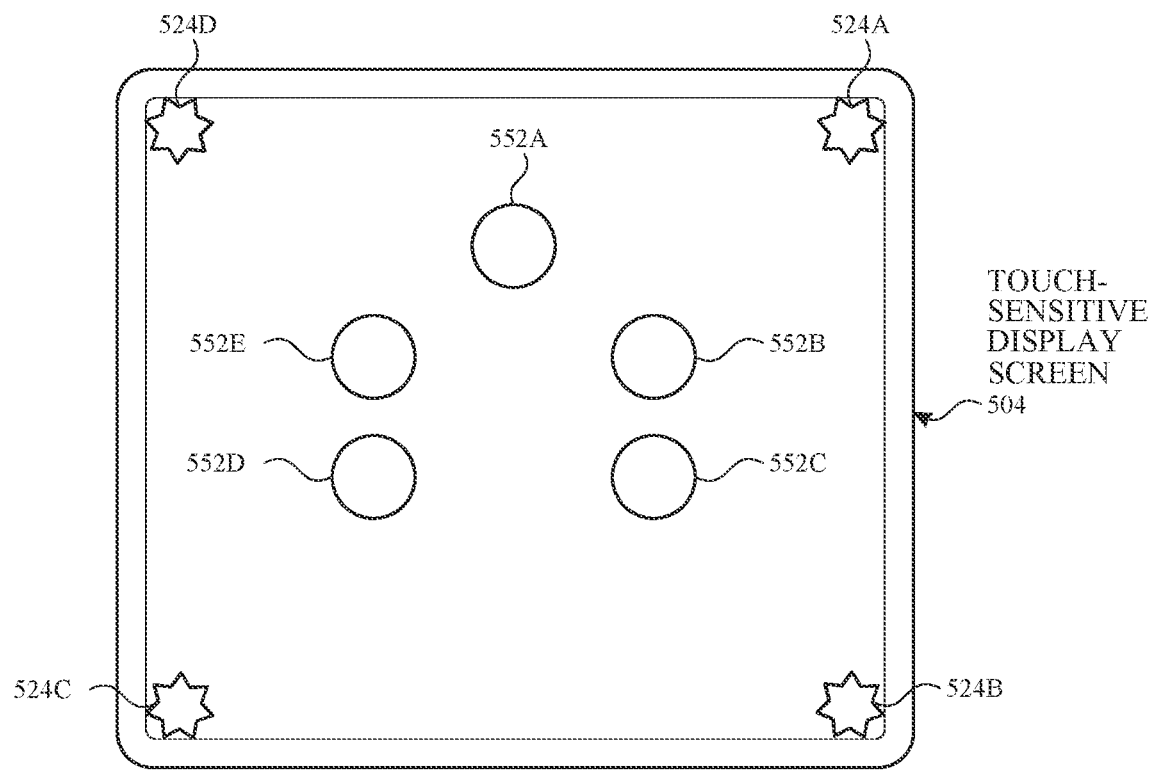
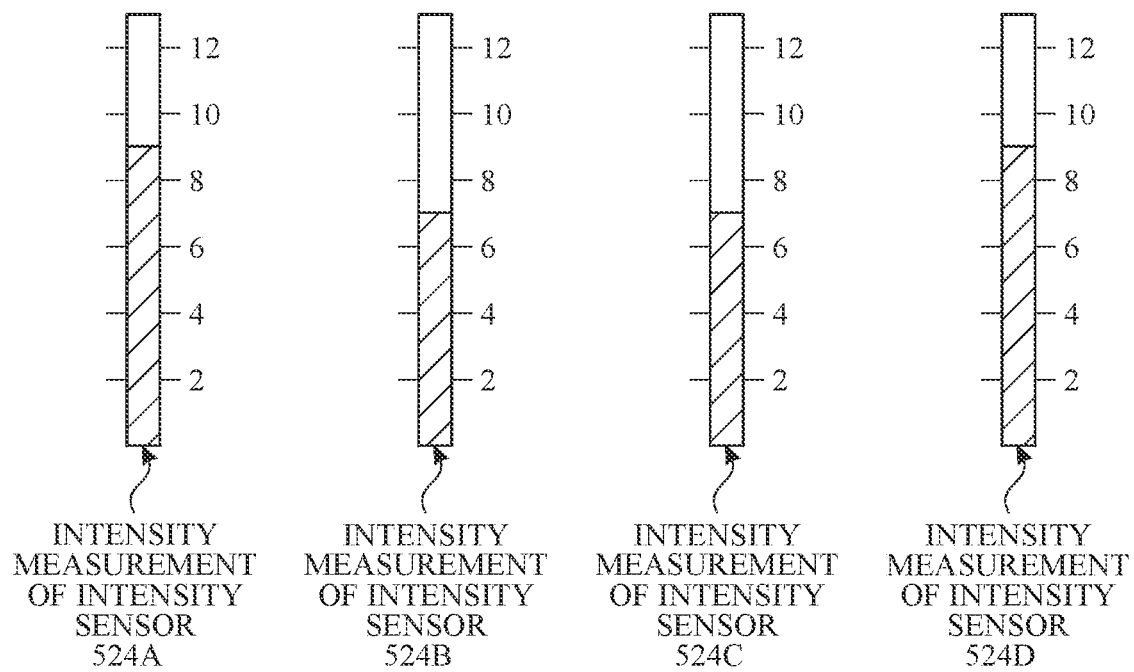
FIG. 5C

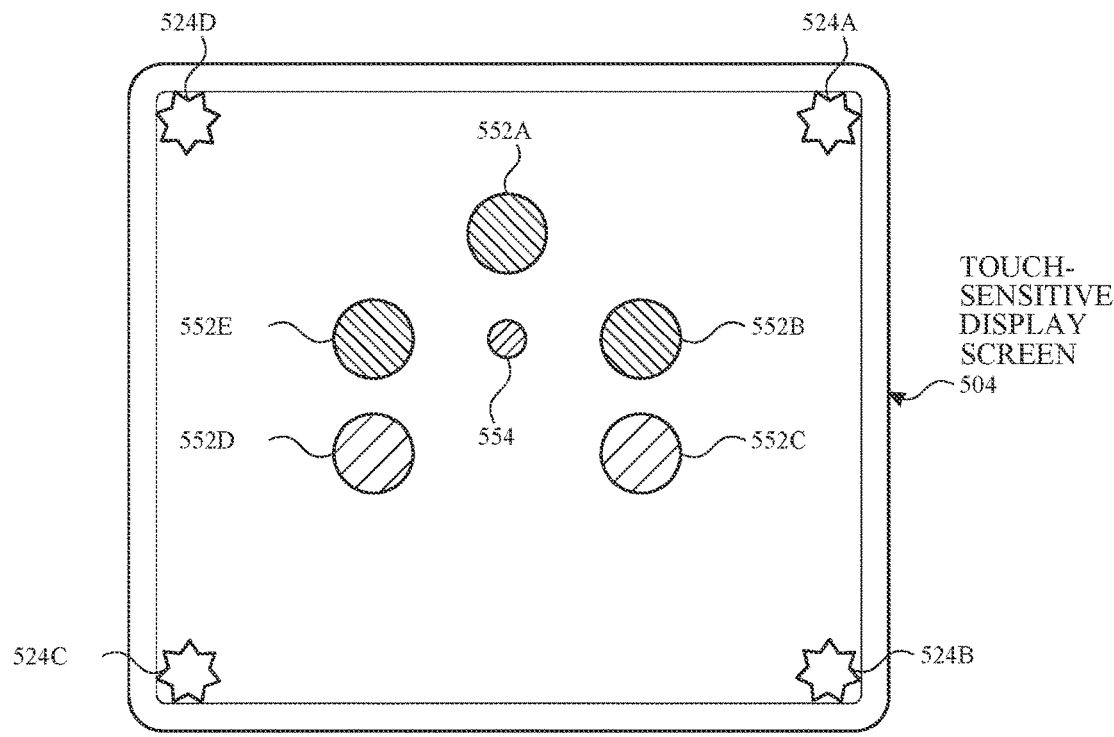
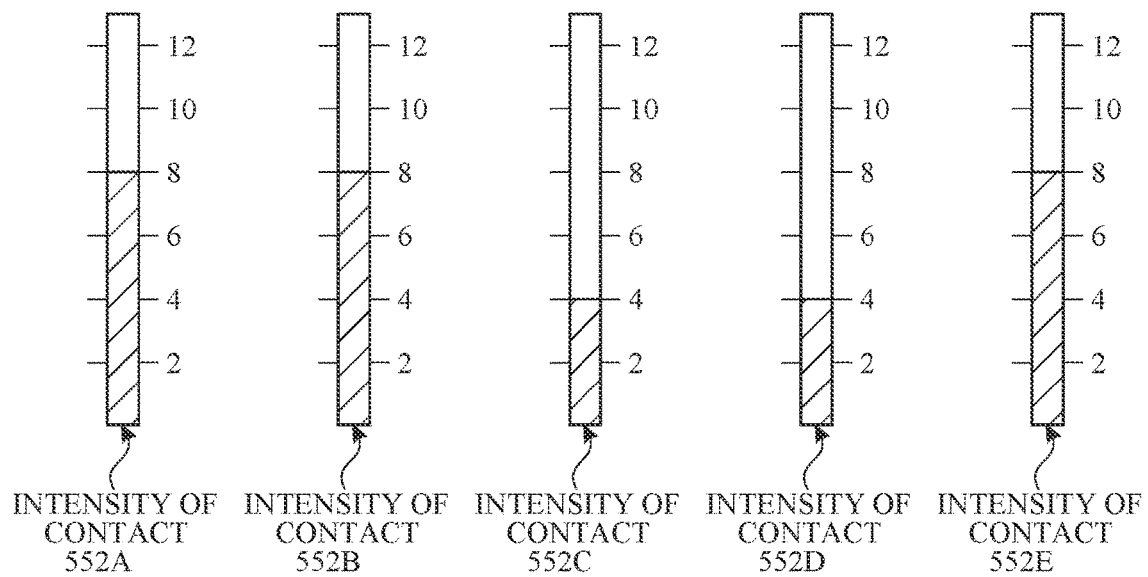
*FIG. 5D*

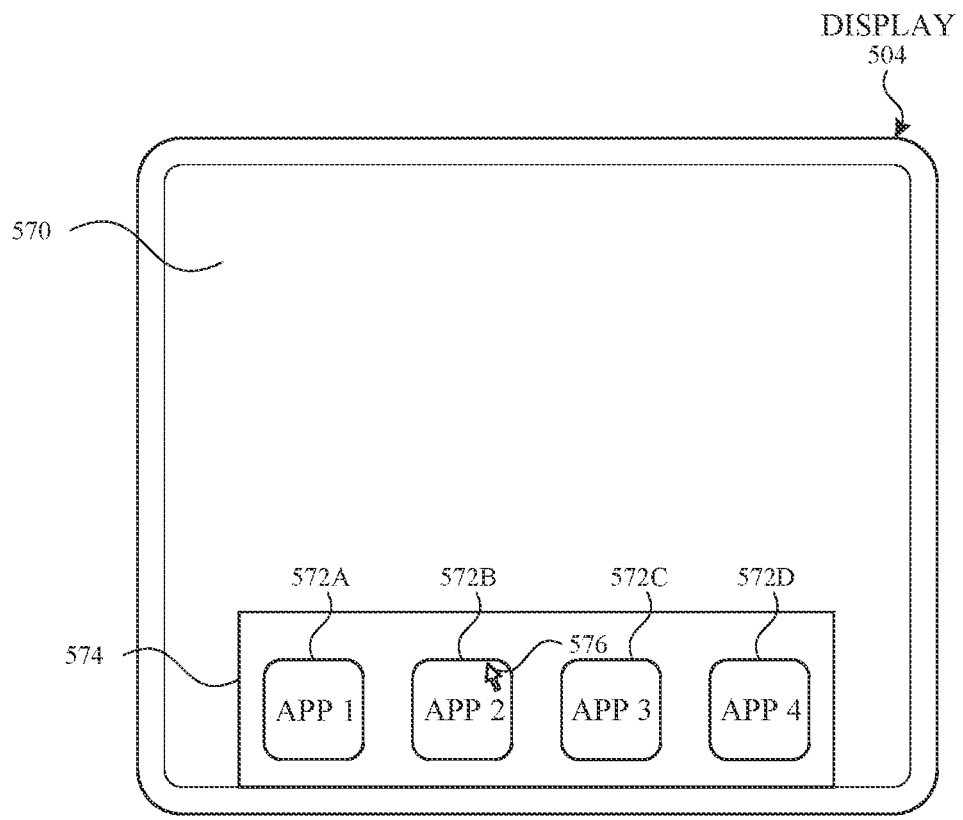
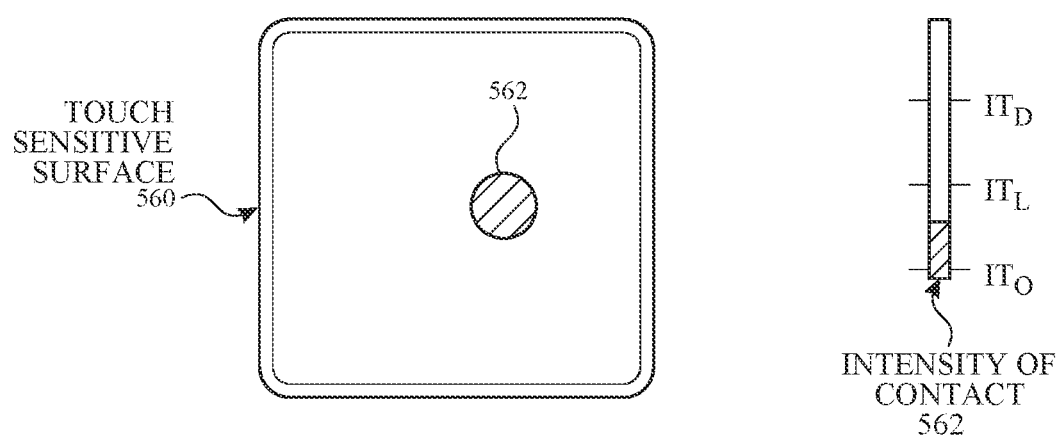
FIG. 5E

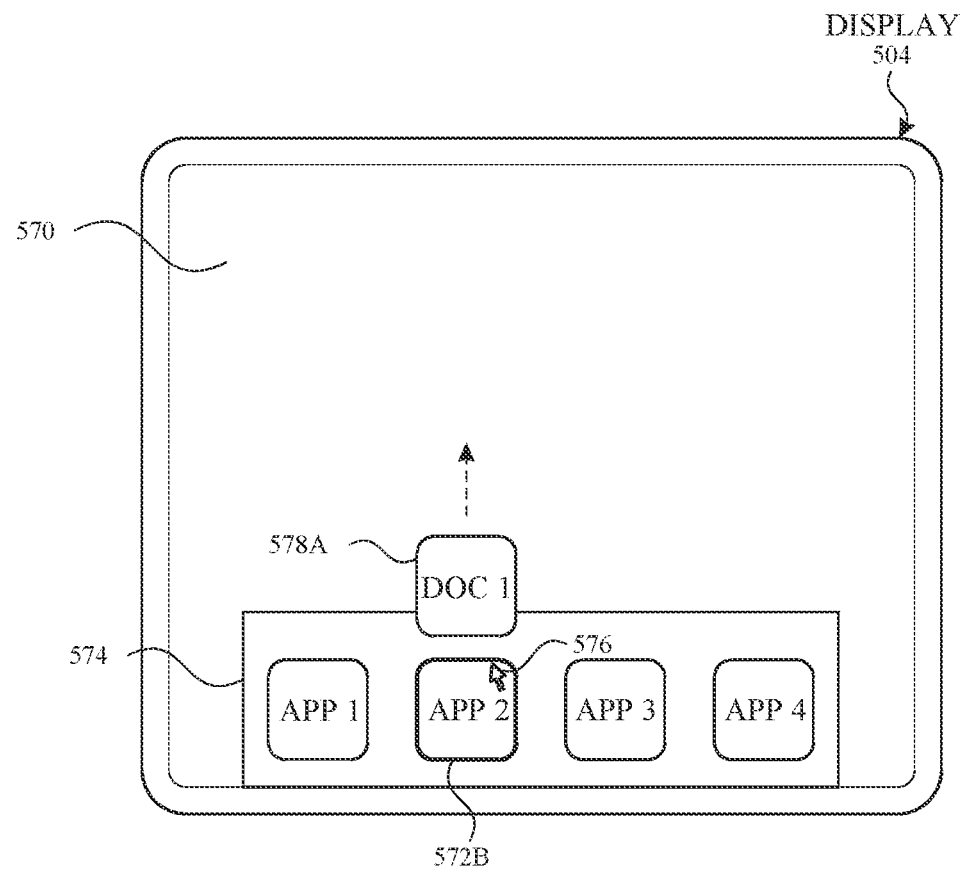
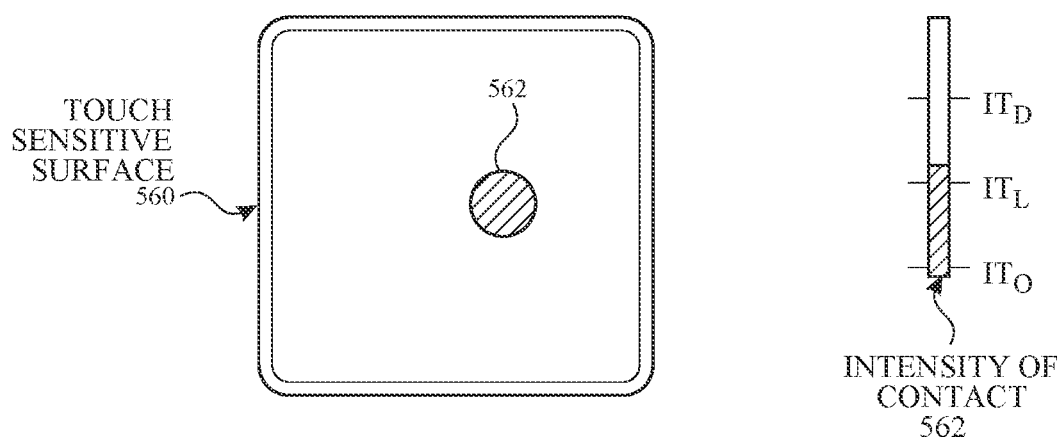
*FIG. 5F*

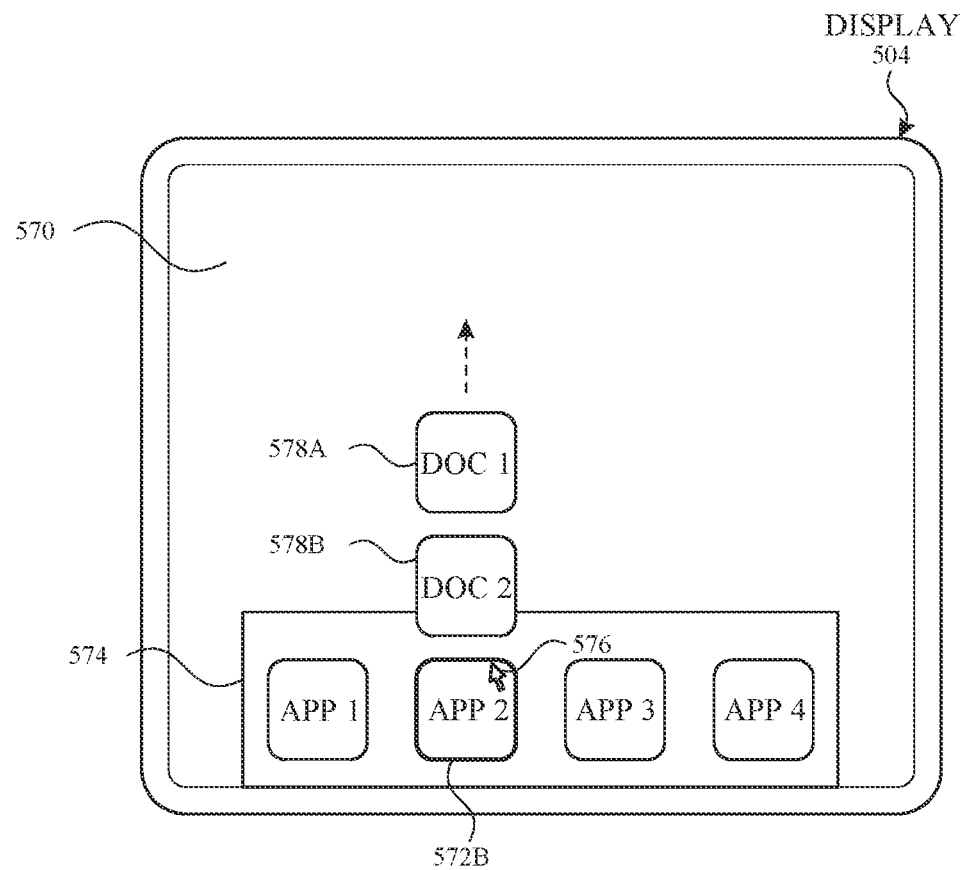
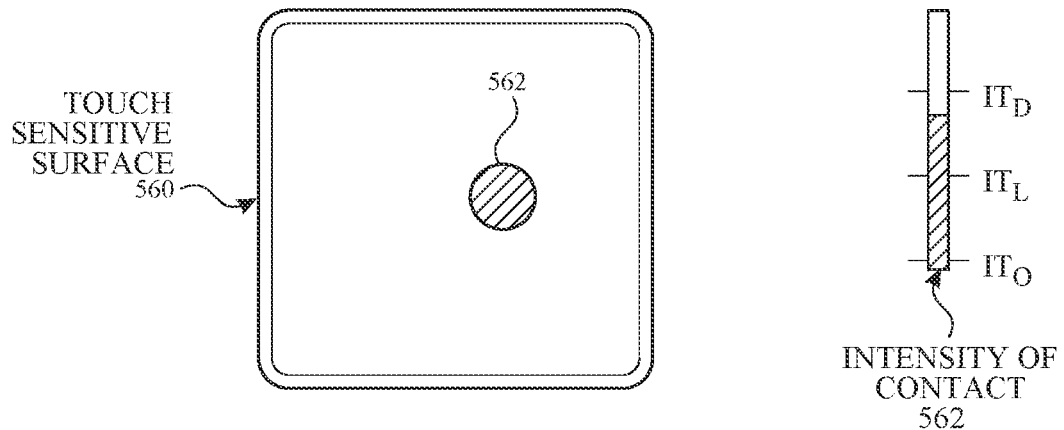
FIG. 5G

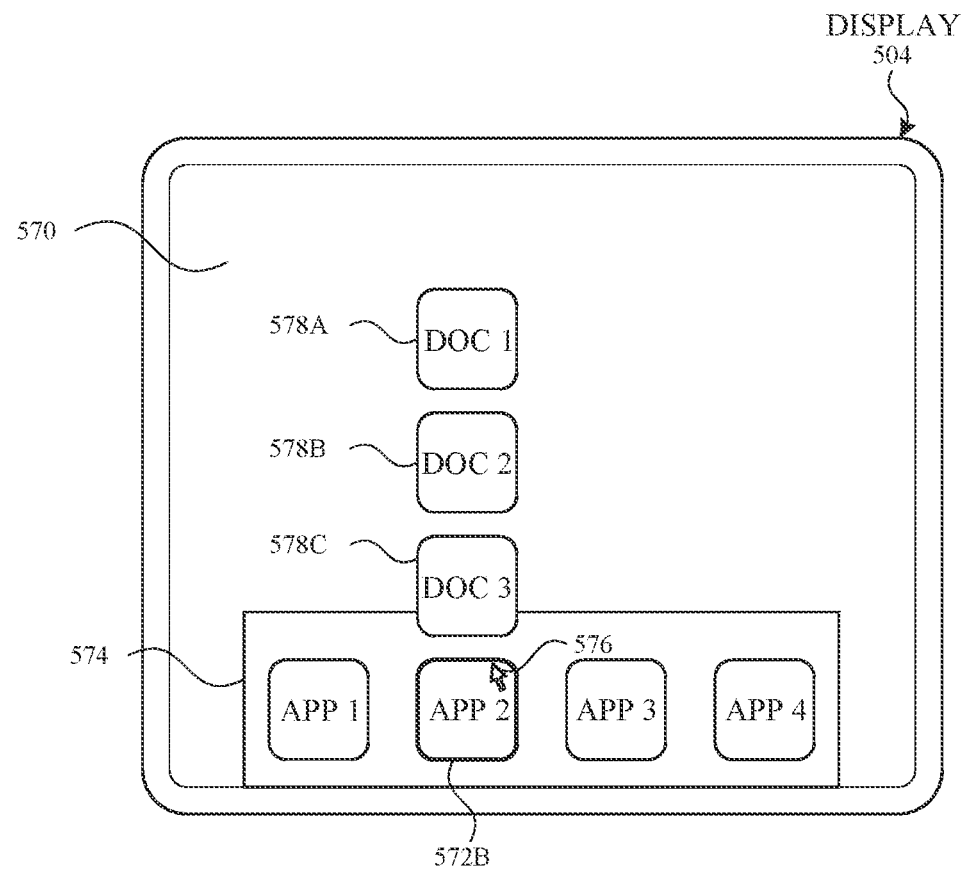
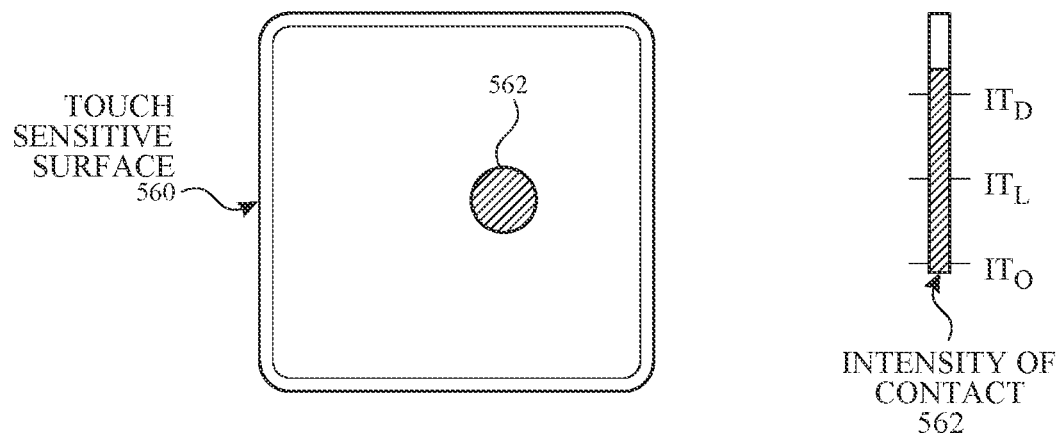
FIG. 5H

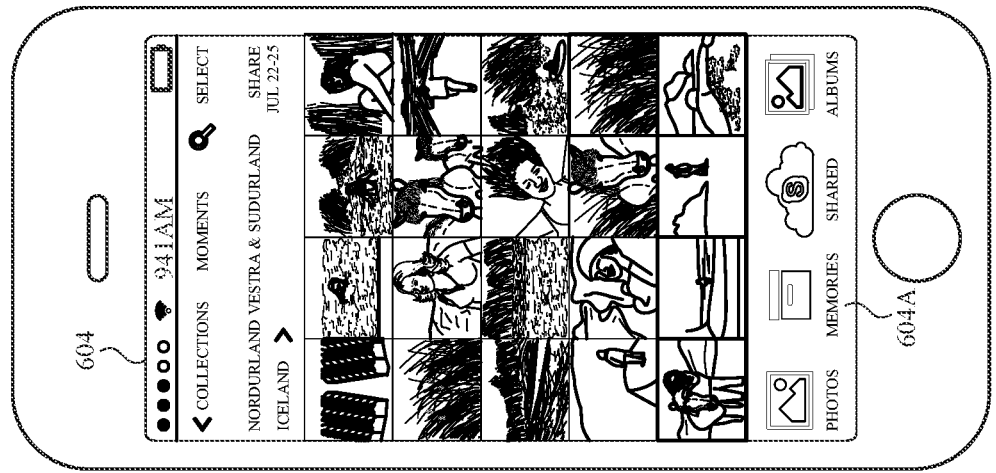
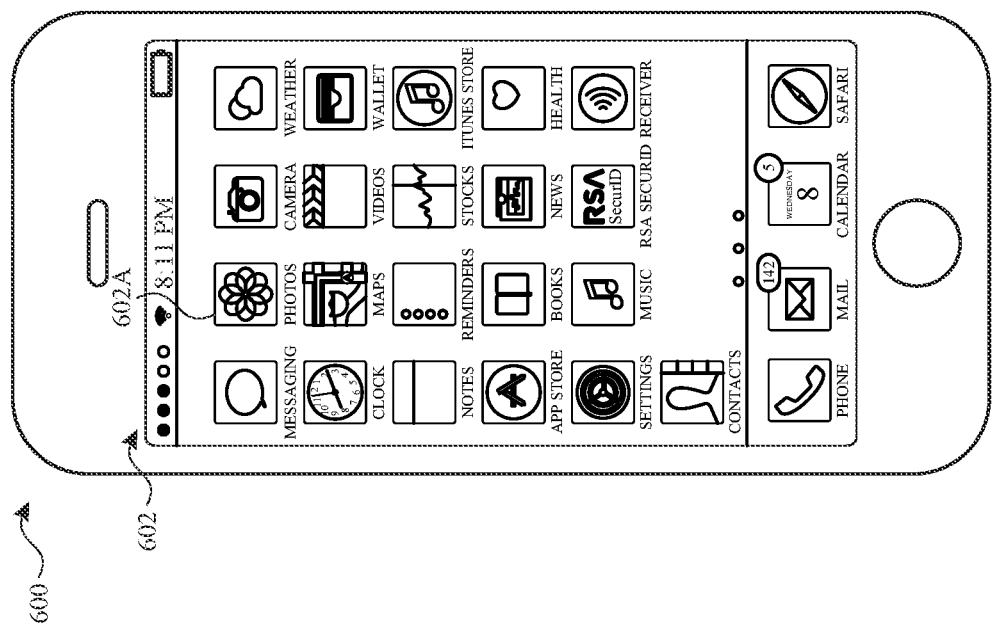
FIG. 6A

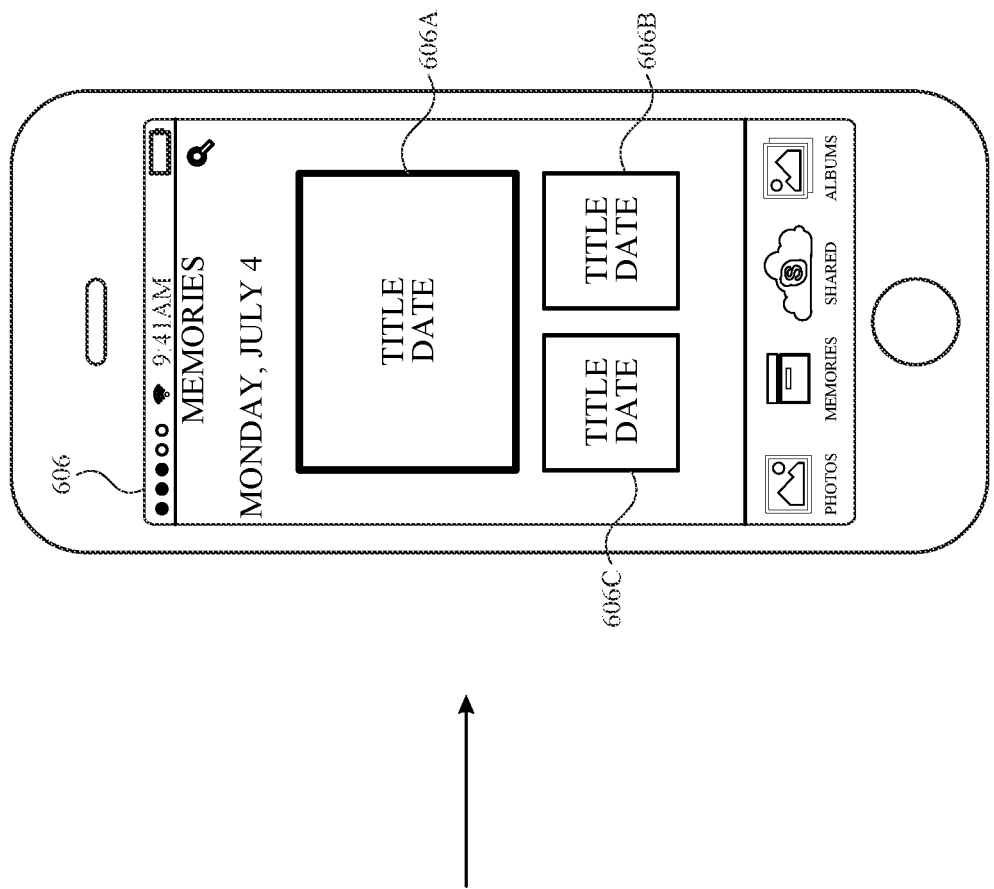
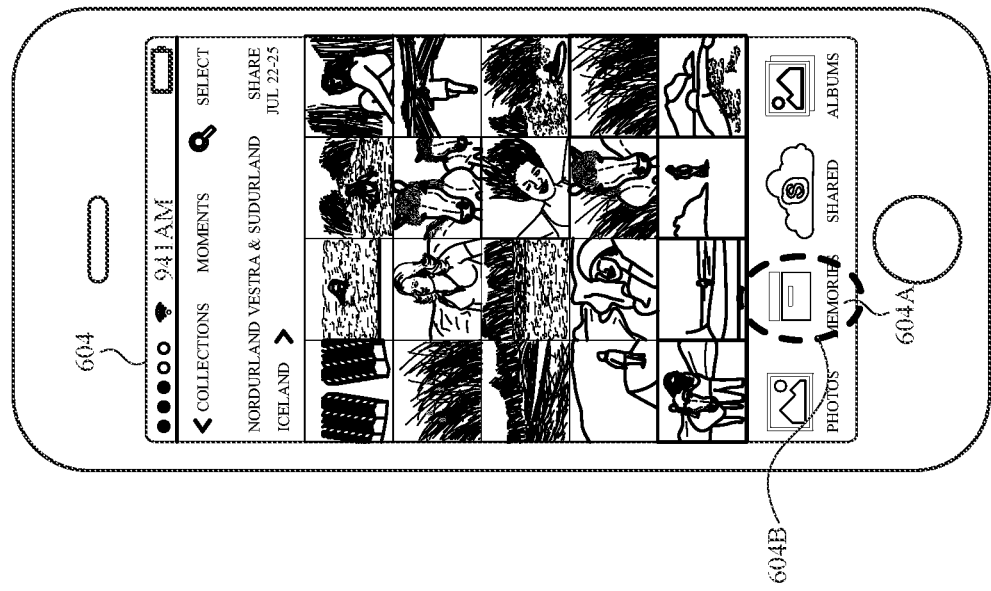
FIG. 6B

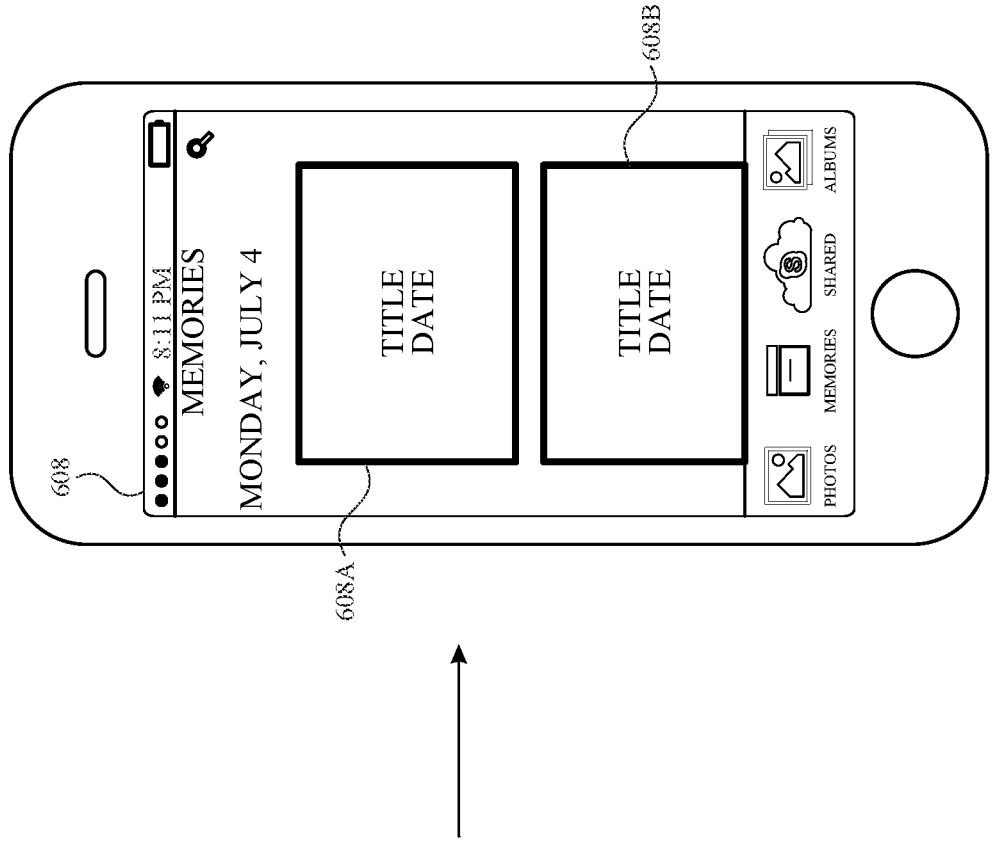
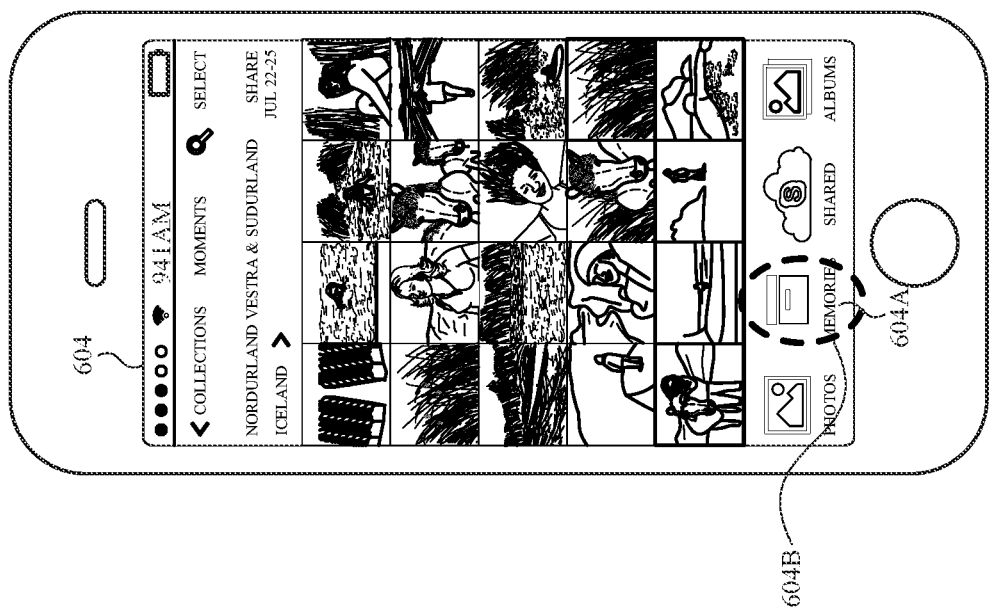
FIG. 6C

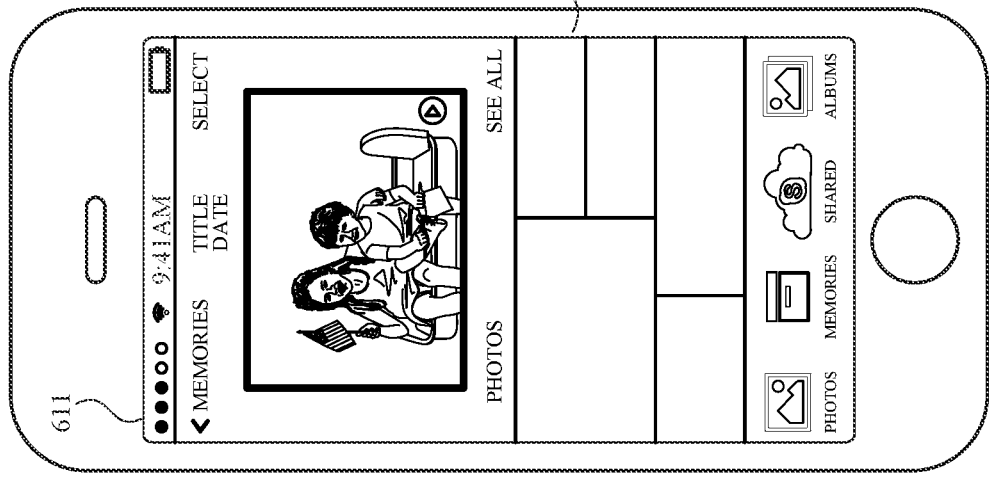
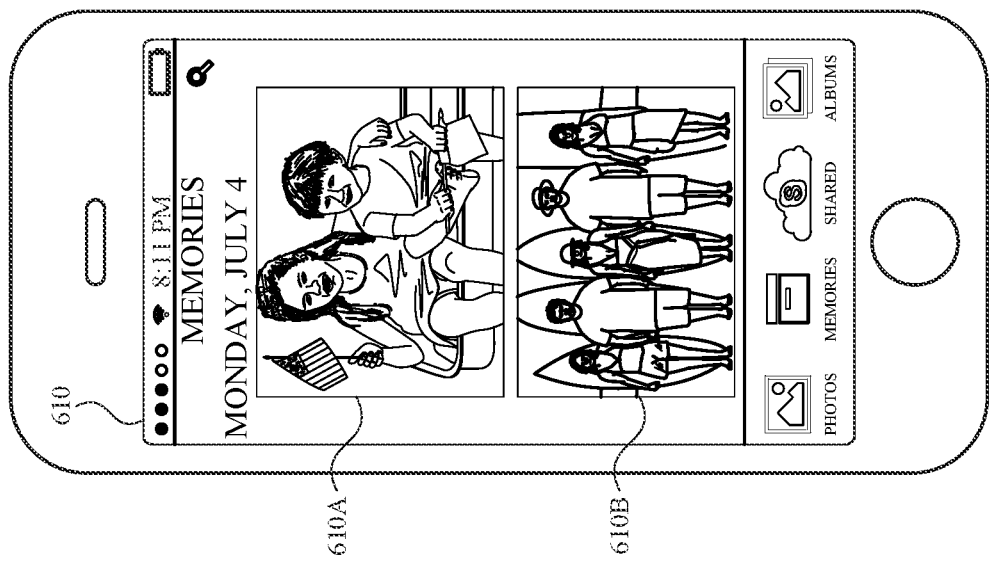
FIG. 6D

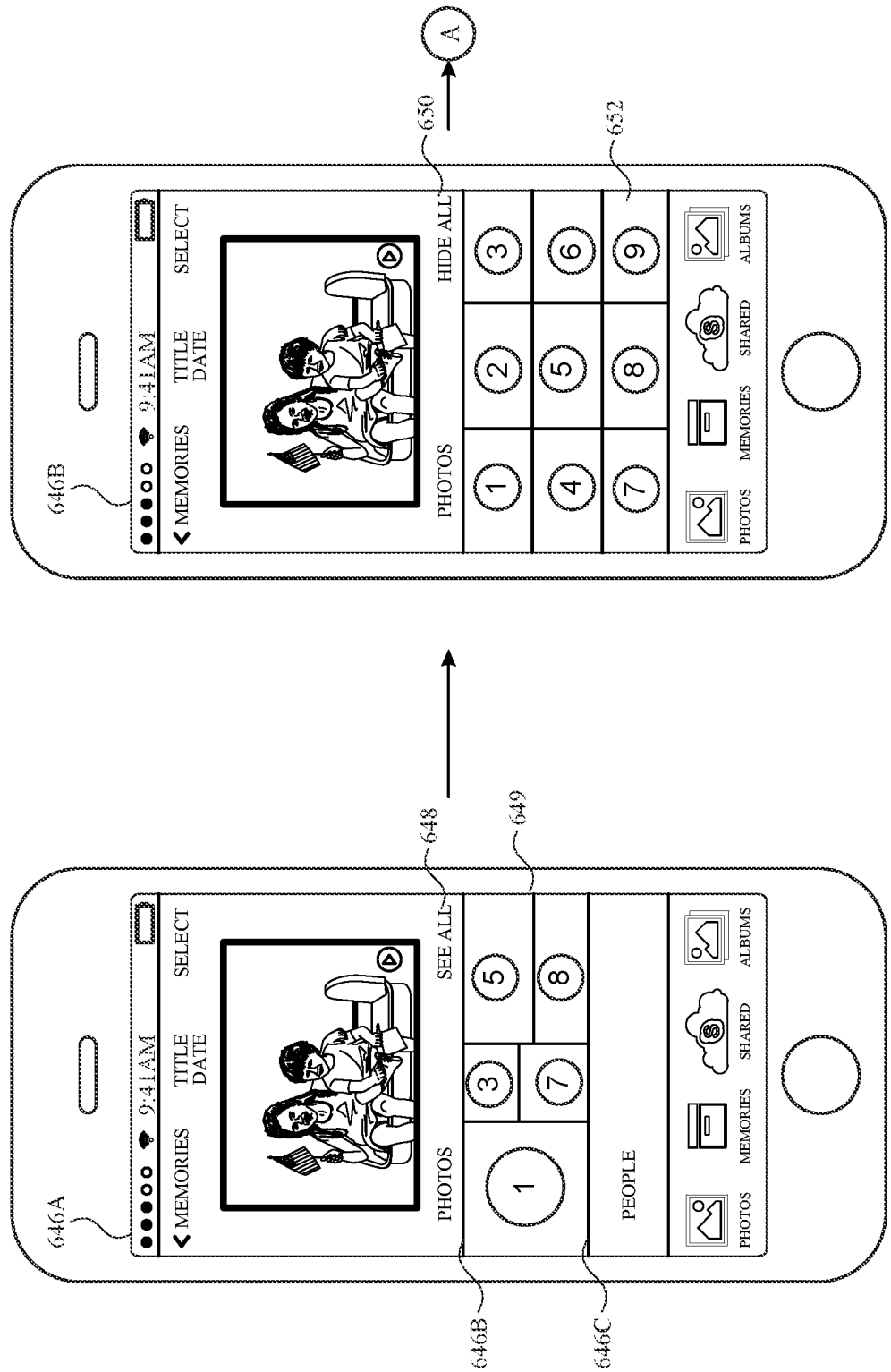

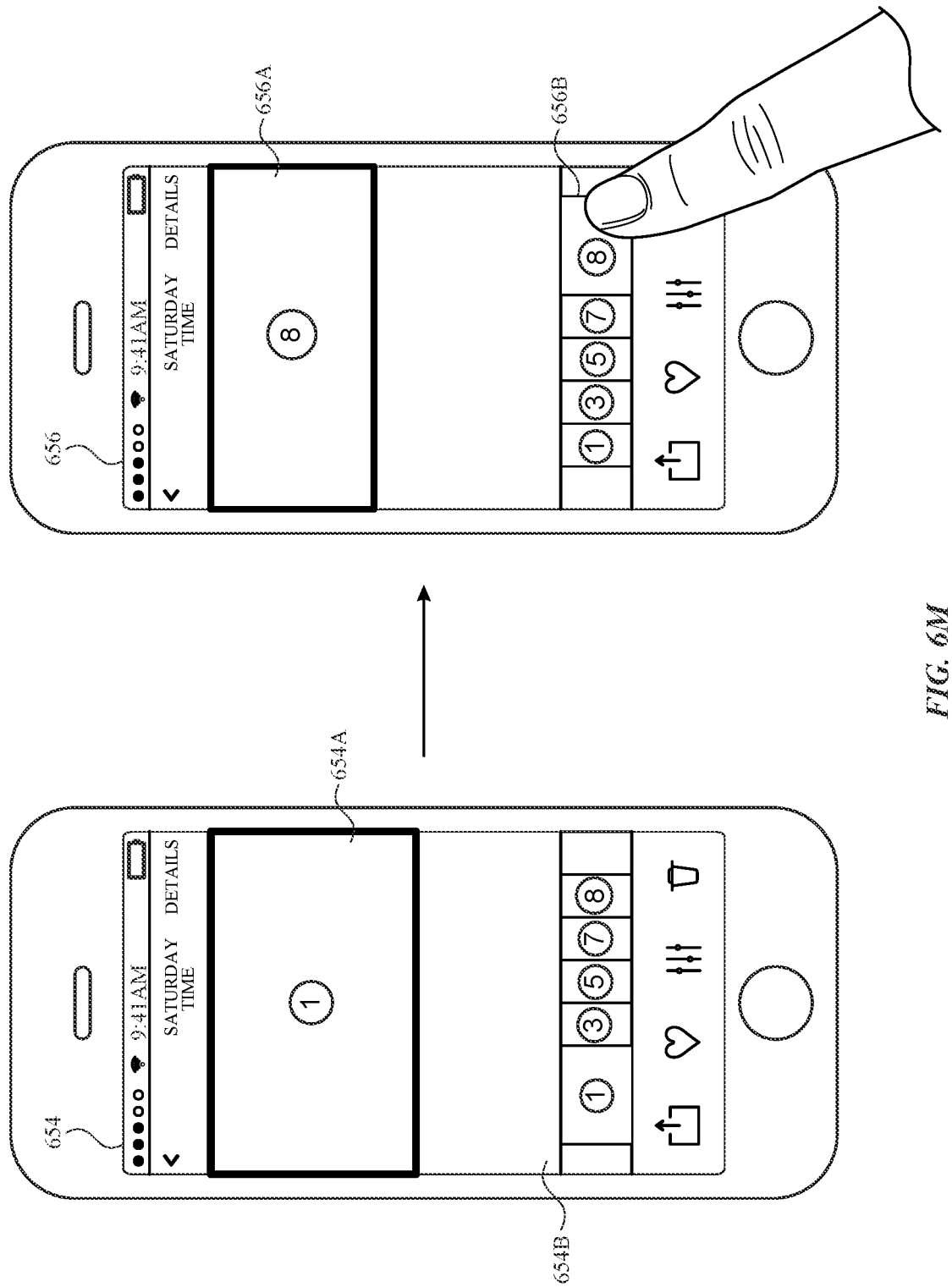

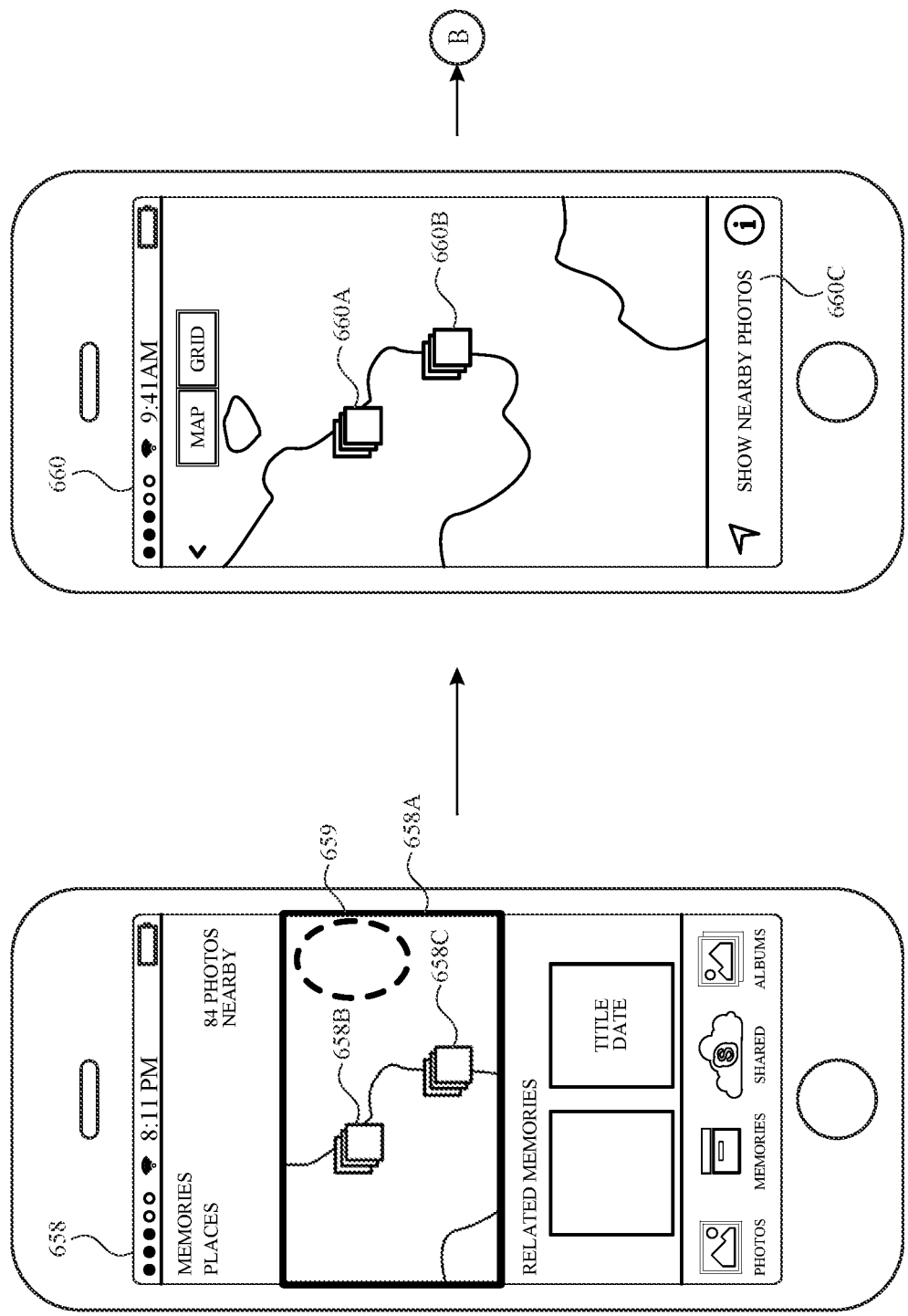

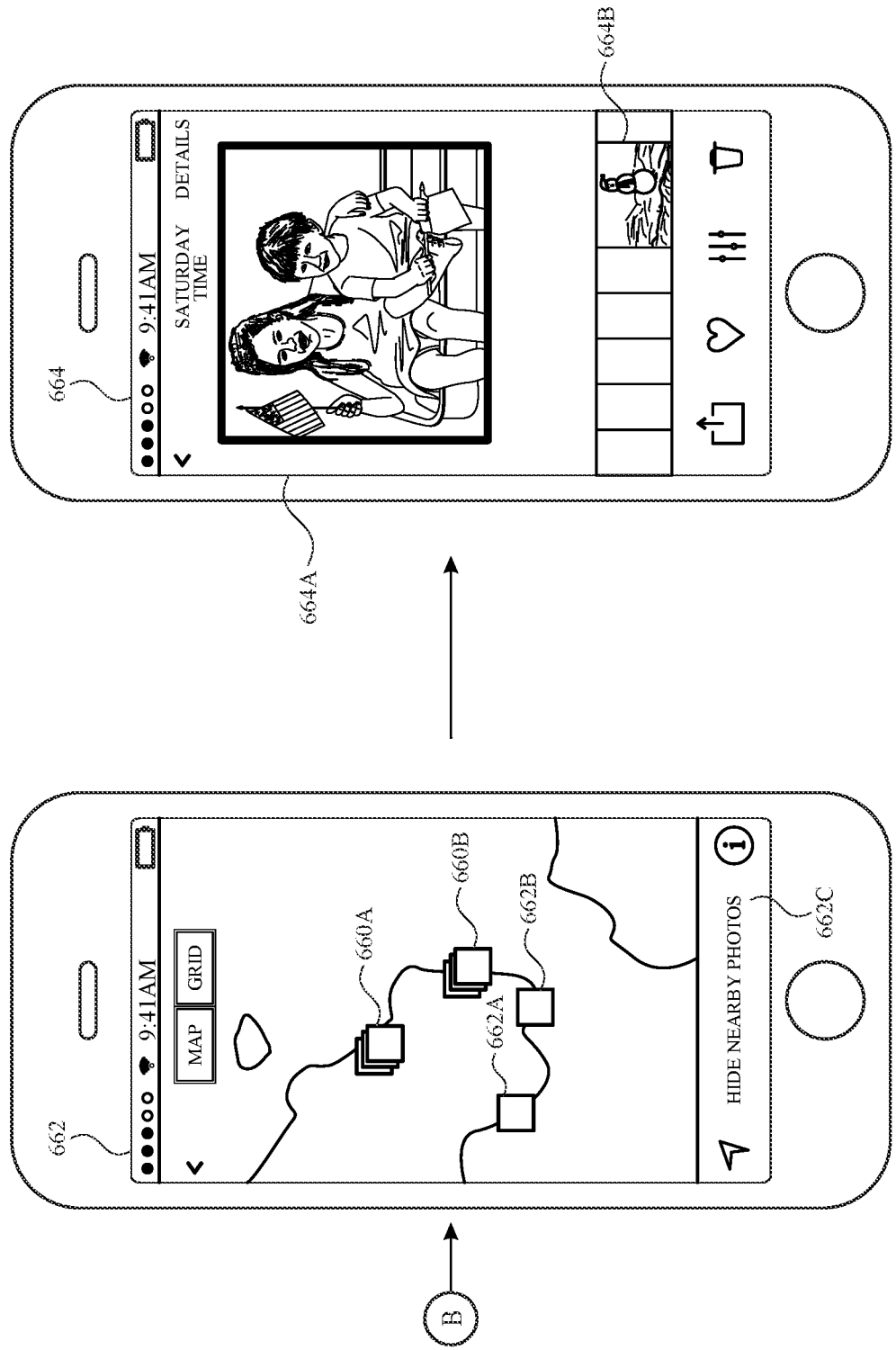

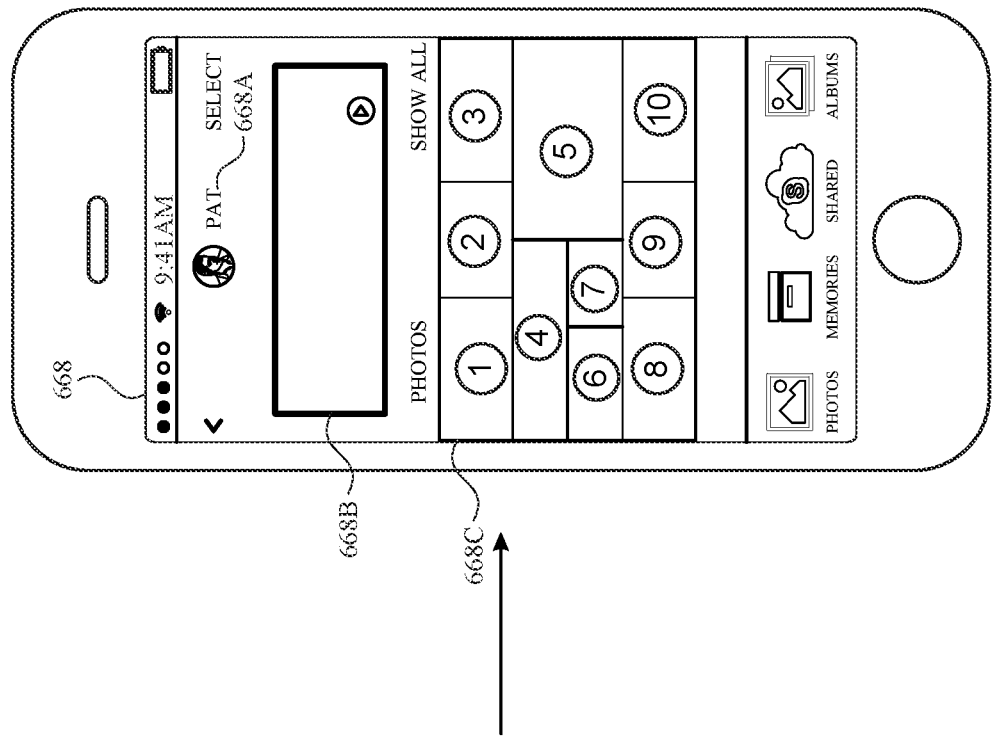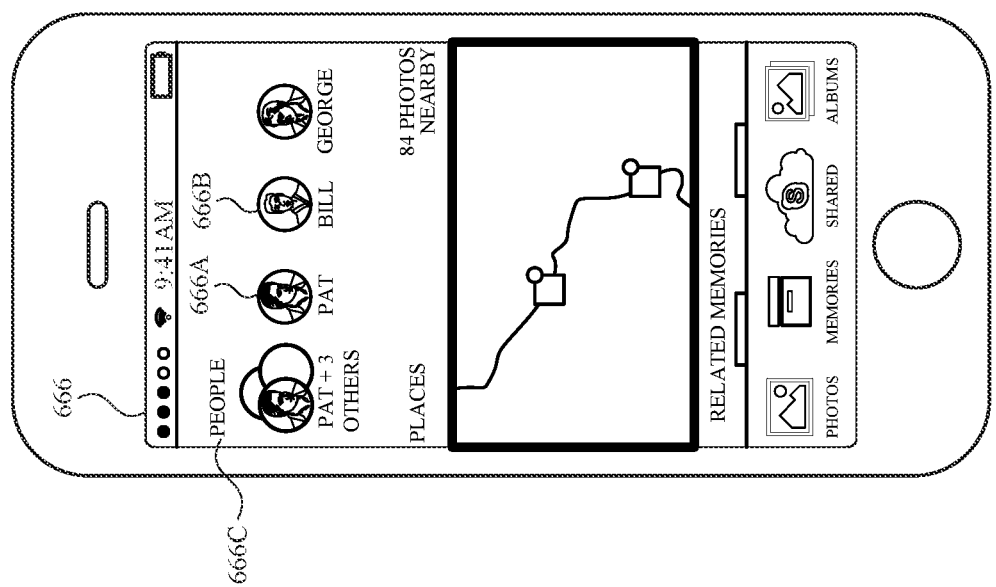
FIG. 6P

700

702
Receive a request to display contextually relevant media.

704
In response to the request:

706
In accordance with a determination that the device is in a first context, display a representation of a first collection of media items that share a set of common characteristics and are relevant to the first context.

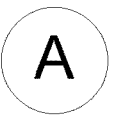

716
Representation of the first collection of media items is a first affordance. Receive user input corresponding to selection of the first affordance, and, in response to receiving the user input, display a detail user interface that includes at least a portion of the first collection of media items

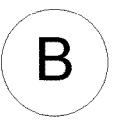

708
In accordance with a determination that the device is in a second context, display a representation of a second collection of media items that share a set of common characteristics and are relevant to the second context, wherein the second collection of media items is different from the first collection of media items.

*FIG. 7A*

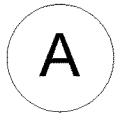

710
In accordance with a determination that the device is in the first context, display a representation of a third collection of media items that share a set of common characteristics and are relevant to the first context, wherein the first collection of media items are relevant to the first context based on a first contextual property and the third collection of media items are relevant to the first context based on a second contextual property and the second contextual property is different from the first contextual property.

712
Representation of the first collection of media items includes a reduced-scale version of a media item selected from the first collection of media items.

714
Generate a textual identifier associated with the first collection of media items, identify a face in the selected media item, wherein the selected media item is an image, and display the textual identifier overlaid on the representation of the first collection of media items, wherein the overlaid textual identifier does not overlap the identified face in the selected media item displayed as the representation of the first collection of media items.

718
While displaying the detail user interface, display a slideshow including a plurality of media items of the first collection of media items, receive user input corresponding to a selection of the slideshow, and, in response to receiving the user input corresponding to the selection of the slideshow, display a video including a plurality of media items of the first collection of media items, wherein the slideshow and the video are different.

720
Detail user interface includes a first region, wherein the first region includes a curated view including a subset of the media items of the first collection of media items and the subset of media items are selected so as to exclude lower quality photos.

722
First region further comprises a second affordance.
Receive user input corresponding to selection of the second affordance, and, in response to receiving the user input corresponding to selection of the second affordance, display an expanded view including representations of additional media items of the first collection of media items that were not displayed prior to receiving the input corresponding to selection of the second affordance.

724
Subset of media items included in the curated view are arranged in a curated arrangement and the subset of media items included in the curated arrangement of media items are arranged so that edges of the media items are aligned so as to create substantially straight borders at the top and the bottom of the curated arrangement.

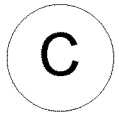

726
Detail user interface includes a second region comprising a geographic map. Displaying the detail user interface further comprises displaying a location indicator on the geographic map corresponding to a location associated with a fifth media item of the first collection of media items.

728
While displaying the geographic map, display a third affordance, receive user input corresponding to selection of the third affordance, and, in response to receiving the user input corresponding to selection of the third affordance, display an additional location indicator in the geographic map view corresponding to the location of a media item that is not included in the first collection of media items.

730
Detail user interface includes a third region comprising an indicator corresponding to an identified face in a media item of the first collection of media items.
Receive user input corresponding to selection of the indicator corresponding to the identified face, and, in response to receiving user input corresponding to selection of the indicator corresponding to the identified face, display a fourth collection of media items, wherein the media items of the fourth collection of media items each include the identified face.

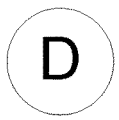

FIG. 7D

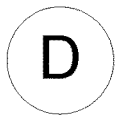

732
Detail user interface includes a fourth region comprising a representation of a fifth collection of media items that share a set of common characteristics, and wherein a media item of the fifth collection of media items shares a first characteristic with a media item of the first collection of media items.
Receive user input corresponding to selection of the representation of the fifth collection of media items, and, in response to receiving the user input corresponding to selection of the representation of the fifth collection of media items, display a detail user interface that includes the fifth collection of media items.

734
Subsequent to displaying the detail user interface that includes the first collection of media items, receive data representing a sixth collection of media items that share a set of common characteristics, wherein the sixth collection of media items is distinct from the first collection of media items.
Receive user input corresponding to a request to display the detail user interface that includes the first collection of media items.
In response to receiving the user input corresponding to the request to display the detail user interface that includes the first collection of media items, display the detail user interface and a representation of the sixth collection of media items in the fourth region.

*FIG. 7E*

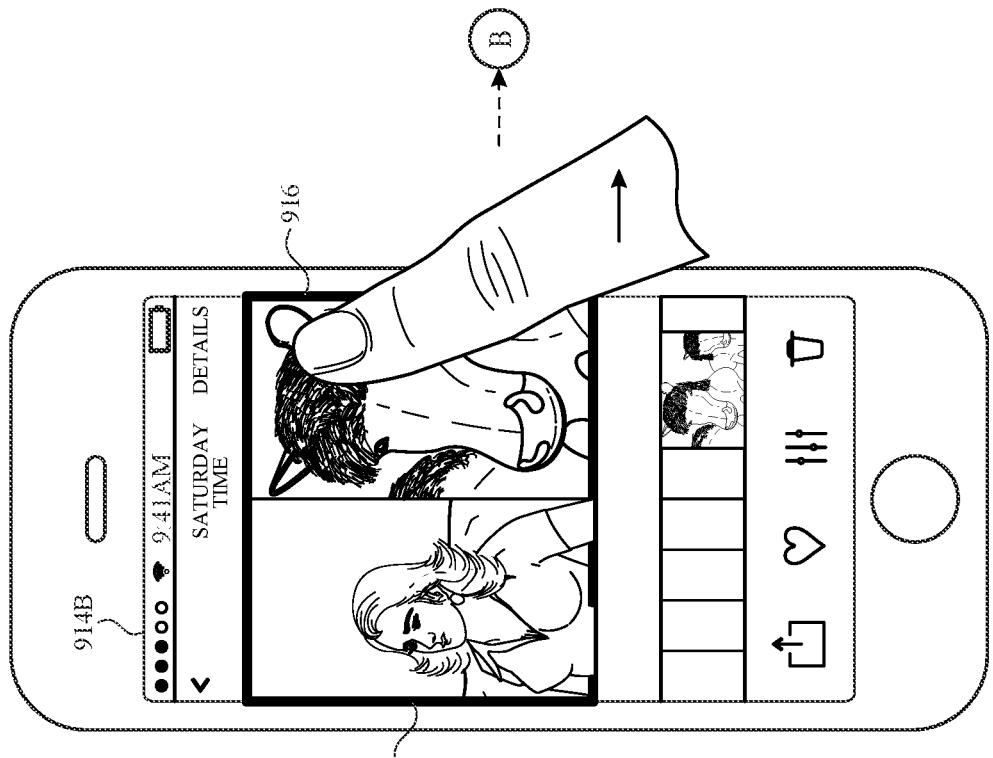
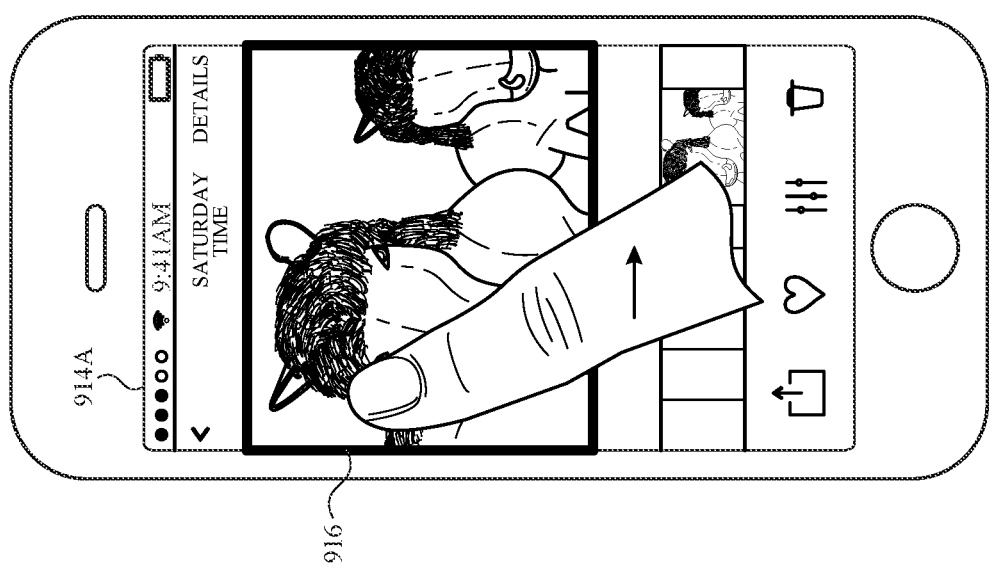
FIG. 9D

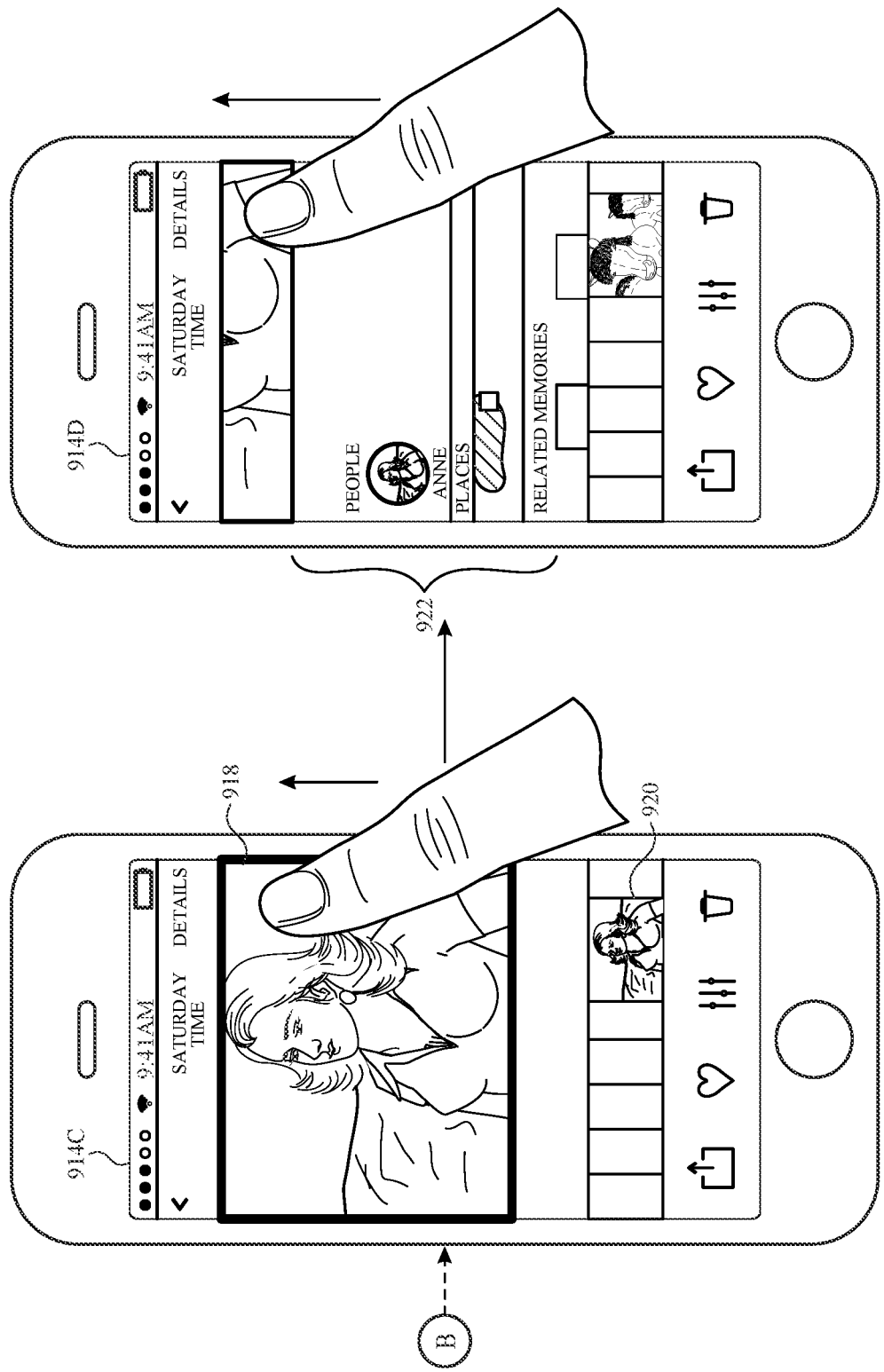

1000

1002
Display a first visual media item of a sequence of visual media items.

1004
While displaying the first visual media item, receive a user input that includes movement in a respective direction.

1012
User input that includes movement in a respective direction is a first user input. While displaying the first visual media item, receive a second user input that includes movement in a respective direction, determine whether the second user input corresponds to a swipe gesture in a second direction, different than the first direction, and, in accordance with a determination that the user input corresponds to a swipe gesture in the second direction, replace display of the first visual media item with display of a second visual media item of the sequence of visual media items.

1014
Detail user interface is a first detail user interface.
While displaying the second visual media item, receive a second user input that includes movement in a respective direction, determine whether the second user input corresponds to a swipe gesture in the first direction, and, in accordance with a determination that the user input corresponds to a swipe gesture in the first direction, display a second detail user interface comprising related content for the second visual media item that has been determined to be related to the second visual media item, wherein the related content for the second visual media item is different from the related content for the first media item.

1016
Detail user interface includes a first region that includes related content organized by the first category, the first category is faces identified in the first visual media item, and the first region includes an identified face from the first visual media item.
Receive user input corresponding to selection of the identified face, and, in response to receiving user input corresponding to selection of the identified face, display a first collection of media items, wherein each item in the first collection of media items is selected so as to include the identified face.

1018
Detail user interface includes a second region that includes related content organized by the second category, wherein the second category is location and the second region includes a geographic map that includes a location indicator corresponding to a location associated with the first visual media item.

1020
Receive user input corresponding to selection of the second region, and, in response to the user input corresponding to selection of the second region, display a map user interface that includes a visual representation of the location associated with the first visual media.

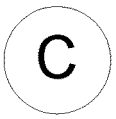

1022
Detail user interface includes a third region that includes related content organized by a third category, wherein the third category is collections of visual media items that share a set of common characteristics, the third region includes a representation of a second collection of visual media items that share a set of common characteristics, and a visual media item of the second collection of visual media items shares a first characteristic with the first visual media item.
Receive user input corresponding to selection of the representation of the second collection of visual media items, and, in response to receiving the user input corresponding to selection of the representation of the first collection of media items, display a representation of the visual media items of the second collection of visual media items.

1024
Second collection of visual media items excludes the first visual media item.

1026
Displaying the detail user interface comprising related content for the first visual media item comprises scrolling the displayed first visual media item in the first direction to reveal the detail user interface.

1028
Scrolling the displayed first visual media item in the first direction to reveal the detail user interface comprises scrolling the displayed first visual media item in the first direction until the portion of the first visual media item that remains displayed is a predetermined portion of the first visual media item, and, after scrolling until the predetermined portion is the displayed portion, cease scrolling of the first visual media item and continue scrolling to reveal the detail user interface while the predetermined portion of the first media item remains stationary.

*FIG. 10D*

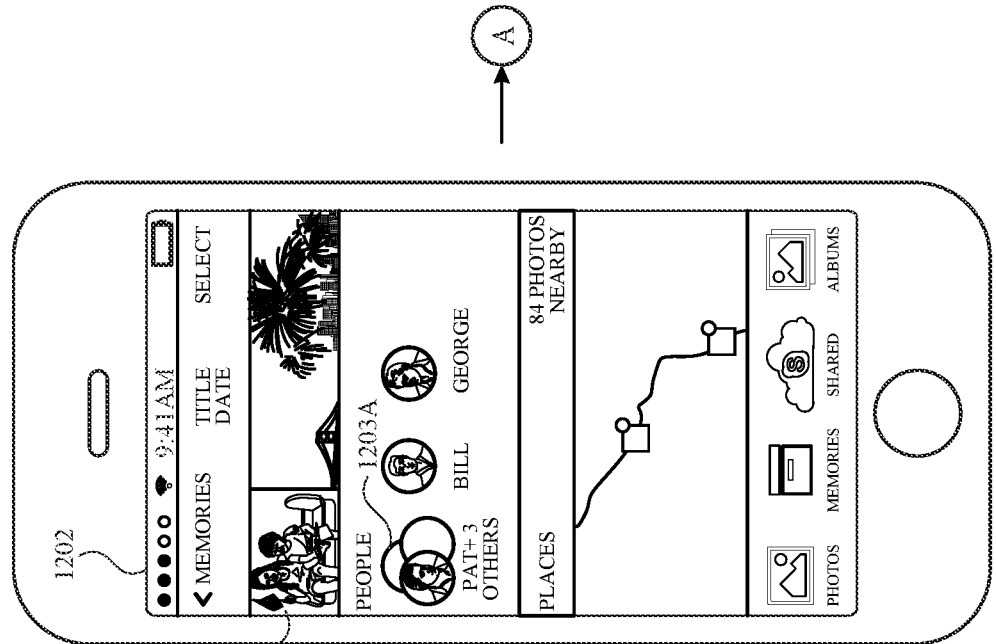
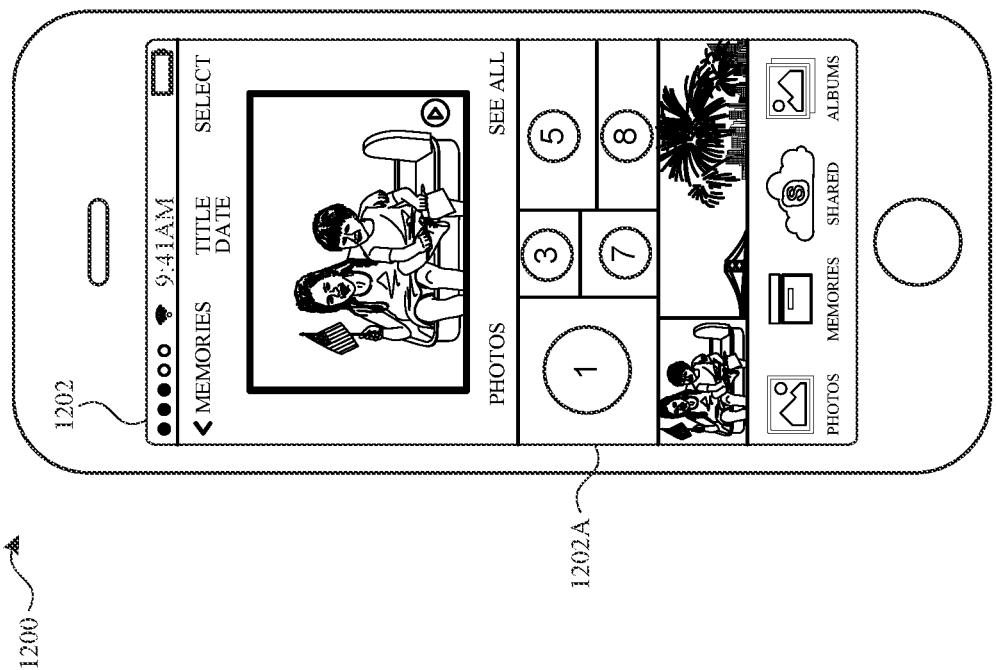
FIG. 12A

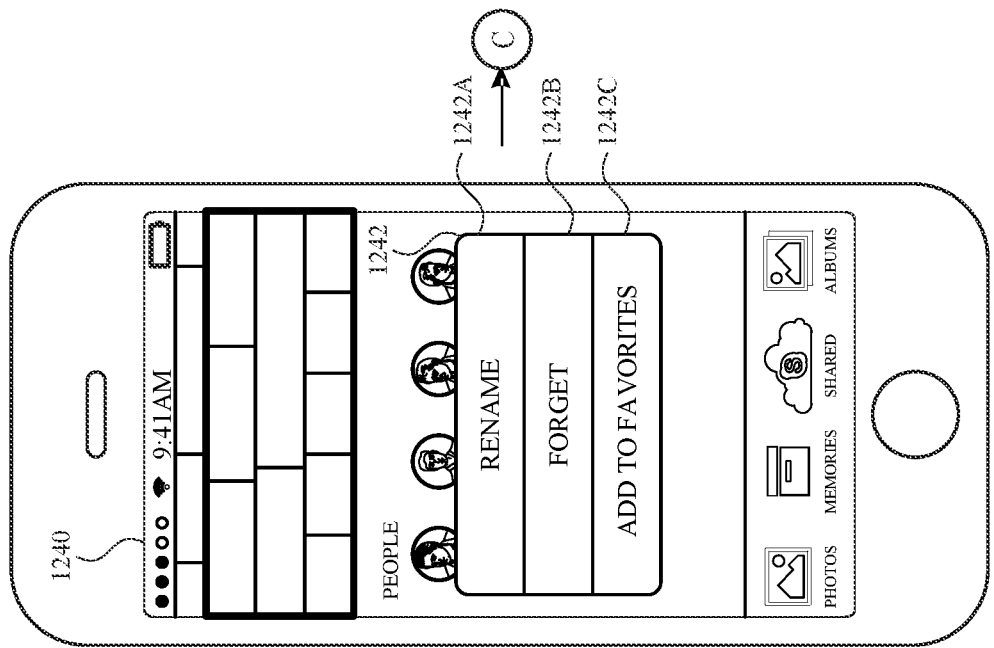
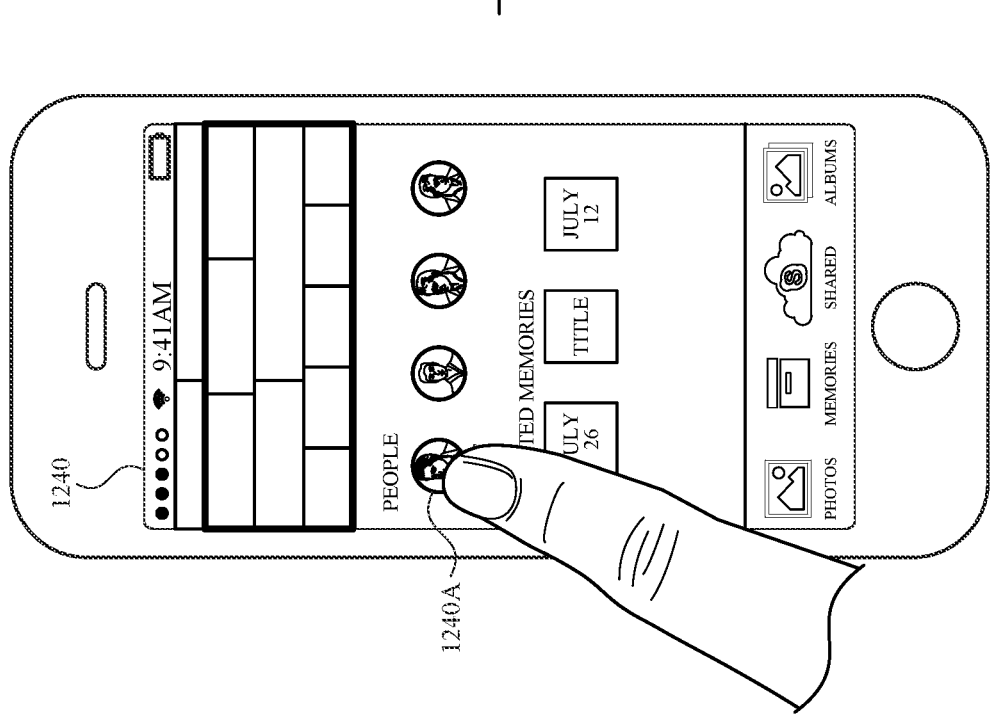
FIG. 12H

```
                                    1300
```

1302
Display a first detail user interface that includes a representation of first visual media corresponding to a first event.

1304
While displaying the first detail user interface:

1306
Display an affordance corresponding to a plurality of individuals identified as having attended the first event.

1312
Attendance of a particular event by the plurality of individuals is identified based on the face of an individual of the plurality of individuals in at least one media item corresponding to the particular event.

1314
Attendance of a particular event by the plurality of individuals is identified based on location data associated with the plurality of individuals, wherein the location data includes data identifying a device corresponding to an individual of the plurality of individuals as having been at a location of the particular event at a time of the particular event.

1308
Receive a user input corresponding to selection of the affordance.

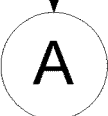

*FIG. 13A*

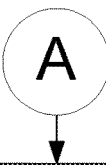

1310
In response to receiving the user input, display a second detail user interface that includes a representation of second visual media, wherein the second visual media includes a first plurality of media items corresponding to a second event identified as having been attended by the plurality of individuals and a second plurality of media items corresponding to a third event identified as having been attended by the plurality of individuals, and wherein the second event and the third event are different.

1316
Second visual media includes a first media item that depicts fewer than all of the individuals of the plurality of individuals.

1318
While displaying the second detail user interface, display a fifth region that includes a plurality of affordances, each corresponding to a single different individual of the plurality of individuals, receive user input corresponding to selection of an affordance of the plurality of affordances in the fifth region, wherein the affordance corresponds to a first individual, and, in response to receiving the user input corresponding to selection of the affordance that corresponds to the first individual, display a third detail user interface that includes a representation of third visual media, wherein the third visual media includes a third plurality of media items, each of the third plurality of media items is identified as depicting the first individual, the third plurality of media items comprises a media item corresponding to a fourth event identified as having been attended by the first individual, and the second event, the third event, and the fourth event are different.

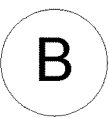

1332
Second detail user interface comprises a fourth affordance. Receive user input corresponding to selection of the fourth affordance, and, in response to receiving the user input corresponding to selection of the fourth affordance, add the second detail user interface to a set of detail user interfaces saved by the user, and cease display of the second detail user interface, and, subsequent to ceasing display of the second detail user interface, receive user input corresponding to a request to display the second detail user interface, and display the second detail user interface.

---
1320
Receive user input corresponding to a request to scroll the fifth region, and, in response to receiving the user input corresponding to the request to scroll the fifth region, scroll the plurality of affordances included in the fifth region while the fifth region remains stationary, wherein scrolling the plurality of affordances causes a previously non-displayed affordance to be displayed in the fifth region and the previously non-displayed affordance corresponds to a second individual that is not included in the plurality of individuals.

---
1322
While displaying the third detail user interface, display a second affordance, receive user input corresponding to selection of the second affordance, and, in response to receiving the user input corresponding to selection of the second affordance, display an individual confirmation user interface that includes a candidate visual media item that has been identified as potentially depicting the first individual, wherein the candidate visual media item is not included in the third visual media.

---
1324
User input corresponding to selection of the affordance of the plurality of affordances is a touch user input with a first characteristic intensity detected on the touch-sensitive surface.
Determine a first characteristic intensity of the user input, and, in accordance with a determination that the user input meets intensity-dependent criteria, wherein the intensity-dependent criteria require that first characteristic intensity of the touch user input exceeds an intensity threshold in order for the intensity-dependent criteria to be met, display a contextual menu user interface.

1326
Contextual menu user interface comprises a first contextual affordance. Receive user input corresponding to selection of the first contextual affordance, and, in response to receiving the user input corresponding to selection of the first contextual affordance, display a name editing user interface for editing a name used as an identifier for the first individual, and, while displaying the name editing user interface, receive an updated name of the first individual, and, in response to receiving the updated name of the first individual, update the existing name associated with the first individual stored in memory to the updated name.

1328
Display an affordance corresponding to a suggested individual, wherein the suggested individual corresponds to a contact in a contacts list accessible to the device, receive user input corresponding to selection of the affordance corresponding to the suggested individual, and, in response to receiving the user input corresponding to selection of the affordance corresponding to the suggested individual, update the existing name associated with the first individual stored in memory to a name of the suggested individual.

---

1330
Contextual menu user interface comprises a second contextual affordance. Receive user input corresponding to selection of the second contextual affordance, and, in response to receiving the user input corresponding to selection of the second contextual affordance, associate an identifier of the first individual with a list of identifiers of selected individuals, and display a user interface that includes a third affordance and representations of identified individuals, wherein the representations of identified individuals includes the individuals of the list of selected individuals, and receive user input corresponding to selection of the third affordance, and, in response to receiving the user input corresponding to selection of the third affordance, cease display of representations of individuals that do not correspond to an identifier associated with the list of identifiers of selected individuals.

*FIG. 13D*

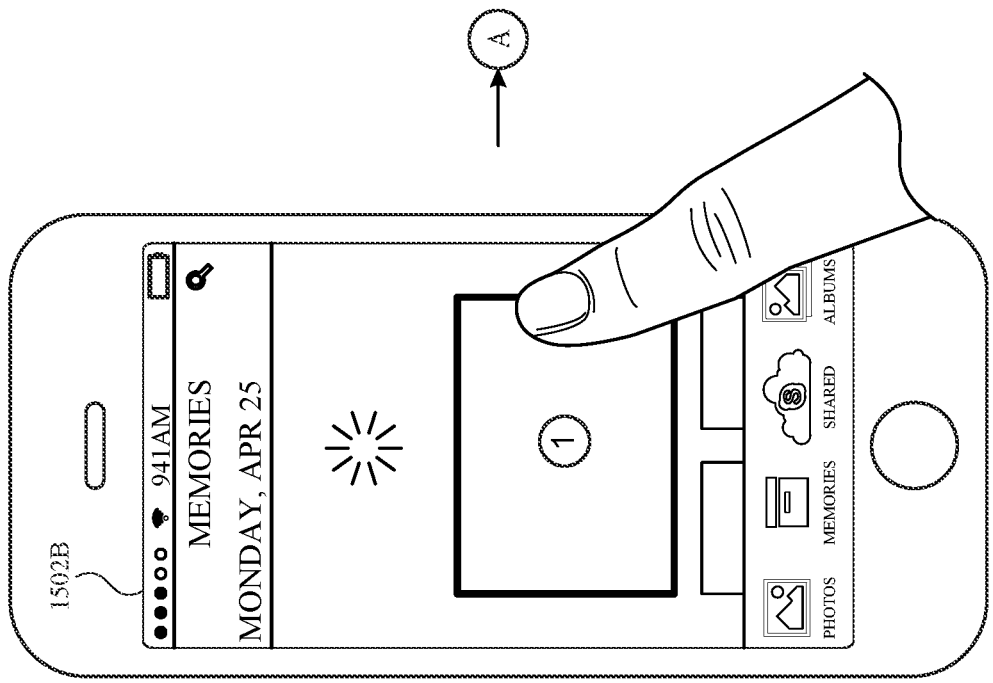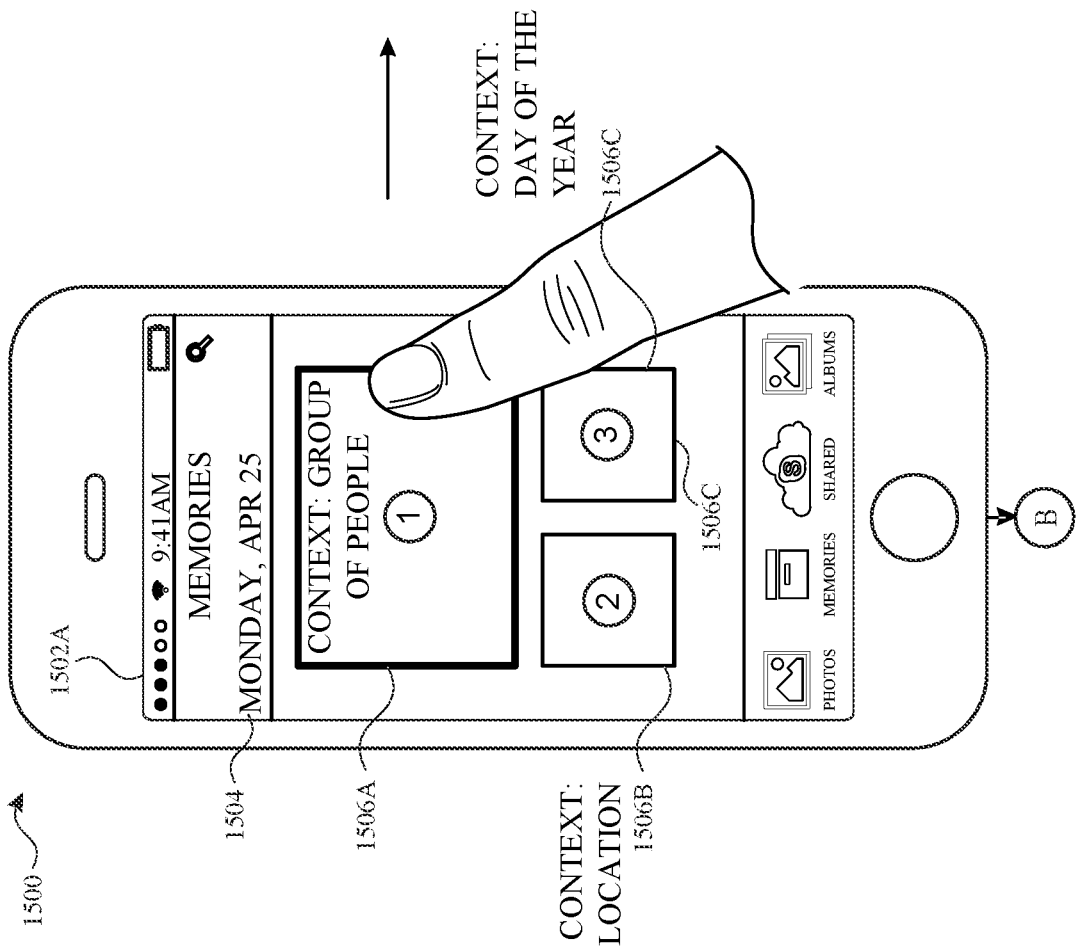
FIG. 15A

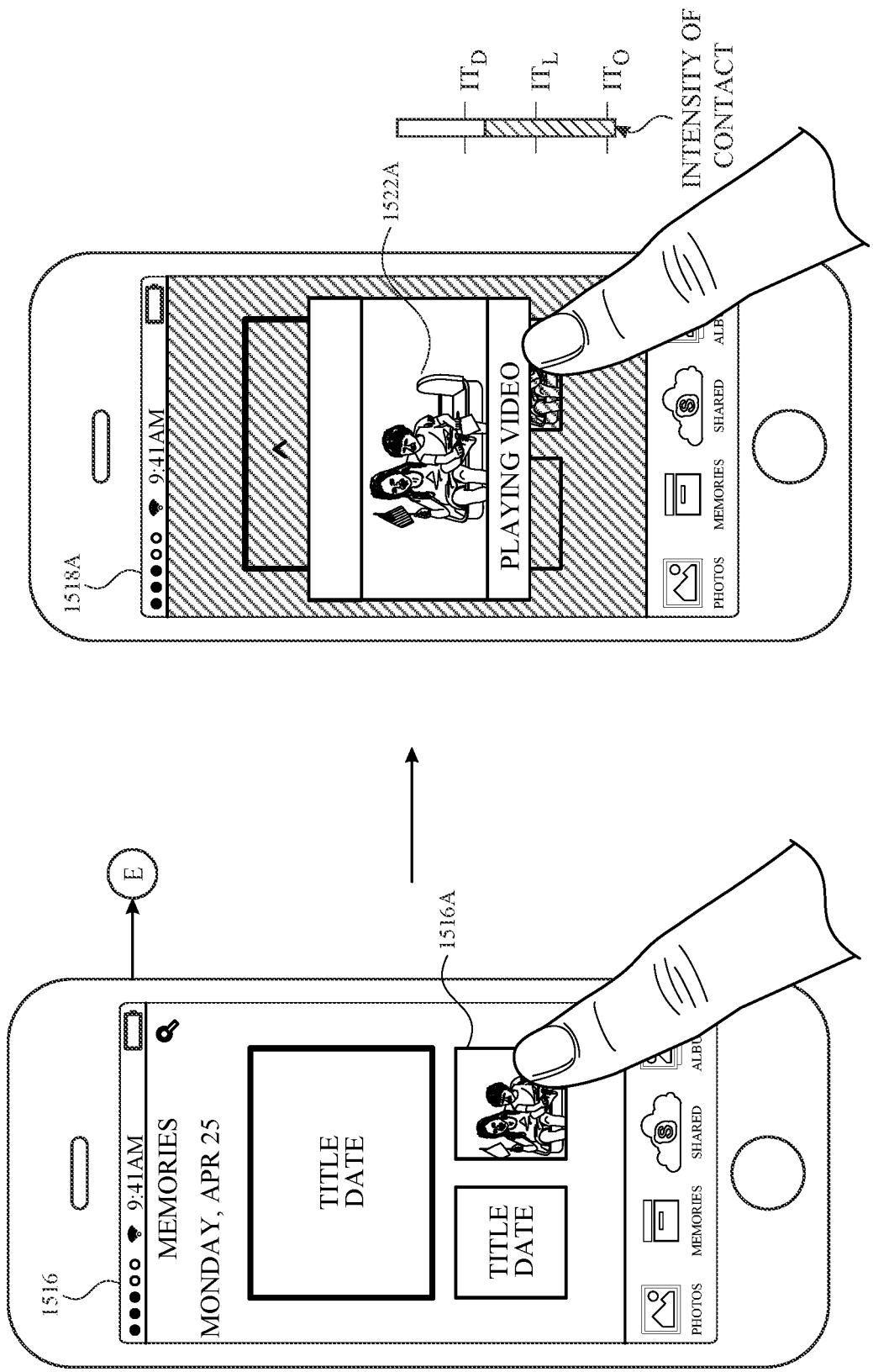

(A)

1616
Obtaining the automatically-generated first collection of visual media that was not previously included in the plurality of collections of visual media comprises generating the first collection of media items in response to the first user input.

1618
Generating the first collection of media items in response to the first user input comprises determining a collection of media items that share a set of common characteristics and selecting a smaller subset of the set of the collection of media items that share the set of common characteristics to create a curated set of media items.

1620
Automatically-generated collections of visual media were determined to be contextually relevant to a general context of the device.

1622
First collection of visual media is contextually relevant to a specific context of the device.

*FIG. 16B*

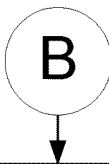

1612
Receive a second user input corresponding to selection of the first affordance.

1624
Device includes a touch-sensitive surface and the second user input is a touch user input with a first characteristic intensity detected on the touch-sensitive surface.
Determine a first characteristic intensity of the touch user input.
In accordance with a determination that the touch user input meets selection criteria, wherein the selection criteria do not require that the first characteristic intensity of the touch user input exceeds a first intensity threshold or a second intensity threshold in order for the selection criteria to be met, replace display of the plurality of affordances with display of the detail user interface.
In accordance with a determination that the touch user input meets a first intensity-dependent criteria, display, while continuing to display a portion of the plurality of affordances, a preview user interface that includes a representation of the second collection of visual media, wherein the first intensity-dependent criteria require that the first characteristic intensity of the touch user input exceeds the first intensity threshold in order for the first intensity-dependent criteria to be met and the first intensity-dependent criteria do not require that the first characteristic intensity of the touch user input exceeds the second intensity threshold in order for the first intensity-dependent criteria to be met.
In accordance with a determination that the touch user input meets a second intensity-dependent criteria, replace display of the plurality of affordances with display of the detail user interface, wherein the second intensity-dependent criteria require that the first characteristic intensity of the touch user input exceeds the first intensity threshold and the second intensity threshold in order for the second intensity-dependent criteria to be met.

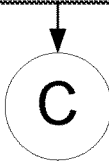

*FIG. 16C*

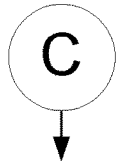

1626
Prior to receiving the second user input, receive a third user input, and, in response to receiving the third user input, scroll the displayed plurality of affordances corresponding to the plurality of automatically-generated collections of visual media.

1628
Scrolling the displayed plurality of affordances corresponding to the plurality of automatically-generated collections of visual media comprises scrolling the displayed plurality of affordances to reveal a second affordance corresponding to an automatically-generated second collection of visual media, wherein the second affordance was not previously included in the displayed plurality of affordances, the first affordance is associated with a first date, and the second affordance is associated with a second date different than the first.

1614
In response to receiving the second user input, display a detail user interface that includes a representation of the second collection of visual media.

*FIG. 16D*

USER INTERFACES FOR RETRIEVING CONTEXTUALLY RELEVANT MEDIA CONTENT

CROSS-REFERENCE TO RELATED APPLICATIONS

This application is a continuation of U.S. patent application Ser. No. 17/744,499, entitled "USER INTERFACE FOR RETRIEVING CONTEXTUALLY RELEVANT MEDIA CONTENT", filed May 13, 2022, which is a continuation of U.S. patent application Ser. No. 17/125,744, now U.S. Pat. No. 11,334,209, entitled "USER INTERFACES FOR RETRIEVING CONTEXTUALLY RELEVANT MEDIA CONTENT", filed Dec. 17, 2020, which is a continuation of U.S. patent application Ser. No. 16/109,487, now U.S. Pat. No. 10,891,013, entitled "USER INTERFACES FOR RETRIEVING CONTEXTUALLY RELEVANT MEDIA CONTENT", filed Aug. 22, 2018, which is a continuation of U.S. patent application Ser. No. 15/275,294, now U.S. Pat. No. 10,073,584 entitled "USER INTERFACES FOR RETRIEVING CONTEXTUALLY RELEVANT MEDIA CONTENT", filed on Sep. 23, 2016, which claims priority to U.S. Provisional Patent Application No. 62/349,109, entitled "USER INTERFACES FOR RETRIEVING CONTEXTUALLY RELEVANT MEDIA CONTENT", filed on Jun. 12, 2016, the content of each of which is hereby incorporated by reference in their entirety.

This application relates to U.S. Provisional Patent Application No. 62/349,092, entitled "NOTABLE MOMENTS IN A COLLECTION OF DIGITAL ASSETS", filed on Jun. 12, 2016, to U.S. Provisional Patent Application No. 62/349,094, entitled, "KNOWLEDGE GRAPH METADATA NETWORK BASED ON NOTABLE MOMENTS", filed on Jun. 12, 2016, and to U.S. Provisional Patent Application No. 62/349,099, entitled, "RELATING DIGITAL ASSETS USING NOTABLE MOMENTS", filed on Jun. 12, 2016. The content of these applications is hereby incorporated by reference in their entirety.

FIELD

The present disclosure relates generally to computer user interfaces, and more specifically to techniques for retrieving contextually-relevant media content.

BACKGROUND

As the storage capacity and processing power of devices continues to increase, coupled with the rise of effortless media sharing between interconnected devices, the size of the average user's library of media items (e.g., photos and videos) is increasing every day.

BRIEF SUMMARY

However, as libraries of content continue to grow, creating an archive of the user's life and experiences, they simultaneously become more difficult to manage and can become cumbersome to navigate. For example, many libraries arrange media items by default in a substantially chronological order. A user browsing a particular type of photo may wish to see content related to that photo, across their entire library, but does not remember the particular dates associated with the desired relevant content, and thus will be forced to peruse large numbers of media directories until locating the content that they seek. This is inefficient, a waste of user's time and device resources. Accordingly, it is therefore desirable to facilitate the retrieval and presentation of contextually-relevant media content and thereby provide an improved interface for engaging with media content.

Some techniques for retrieving and viewing contextually-relevant content using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for retrieving and viewing contextually-relevant content. Such methods and interfaces optionally complement or replace other methods for retrieving and viewing contextually-relevant content. Such methods and interfaces reduce the cognitive burden on a user and produce a more efficient human-machine interface. For battery-operated computing devices, such methods and interfaces conserve power and increase the time between battery charges. For example, intuitive interfaces for retrieving and viewing contextually-relevant content reduce the number of unnecessary, extraneous, or repetitive inputs received by the device, resulting in reduced battery usage by the display and one or more processors.

In some embodiments, a method is performed, the method comprising: at a device with a display: receiving a request to display contextually relevant media; and in response to the request: in accordance with a determination that the device is in a first context, displaying, on the display, a representation of a first collection of media items that share a set of common characteristics and are relevant to the first context; and in accordance with a determination that the device is in a second context, displaying, on the display, a representation of a second collection of media items that share a set of common characteristics and are relevant to the second context, wherein the second collection of media items is different from the first collection of media items.

In some embodiments, an electronic device comprises: a display; one or more processors; memory; and one or more programs, wherein the one or more programs are stored in the memory and configured to be executed by the one or more processors, the one or more programs including instructions for: receiving a request to display contextually relevant media; and in response to the request: in accordance with a determination that the device is in a first context, displaying, on the display, a representation of a first collection of media items that share a set of common characteristics and are relevant to the first context; and in accordance with a determination that the device is in a second context, displaying, on the display, a representation of a second collection of media items that share a set of common characteristics and are relevant to the second context, wherein the second collection of media items is different from the first collection of media items.

In some embodiments, a non-transitory computer-readable storage medium stores one or more programs, the one or more programs comprising instructions, which, when executed by an electronic device with a display, cause the device to: receive a request to display contextually relevant media; and in response to the request: in accordance with a determination that the device is in a first context, display, on the display, a representation of a first collection of media items that share a set of common characteristics and are relevant to the first context; and in accordance with a determination that the device is in a second context, display, on the display, a representation of a second collection of media items that share a set of common characteristics and are relevant to the second context, wherein the second collection of media items is different from the first collection of media items.

In some embodiments, a transitory computer-readable storage medium stores one or more programs, the one or more programs comprising instructions, which, when executed by an electronic device with a display, cause the device to: receive a request to display contextually relevant media; and in response to the request: in accordance with a determination that the device is in a first context, display, on the display, a representation of a first collection of media items that share a set of common characteristics and are relevant to the first context; and in accordance with a determination that the device is in a second context, display, on the display, a representation of a second collection of media items that share a set of common characteristics and are relevant to the second context, wherein the second collection of media items is different from the first collection of media items.

In some embodiments, a system comprises: a display; means for receiving a request to display contextually relevant media; and means, responsive to the request, for: in accordance with a determination that the device is in a first context, displaying, on the display, a representation of a first collection of media items that share a set of common characteristics and are relevant to the first context; and in accordance with a determination that the device is in a second context, displaying, on the display, a representation of a second collection of media items that share a set of common characteristics and are relevant to the second context, wherein the second collection of media items is different from the first collection of media items.

In some embodiments, a device comprises: a display unit; and a processing unit coupled to the display unit, the processing unit comprising: a receiving unit configured to receive a request to display contextually relevant media; and a display enabling unit configured to, in response to the request: in accordance with a determination that the device is in a first context, enable display, on the display unit, of a representation of a first collection of media items that share a set of common characteristics and are relevant to the first context; and in accordance with a determination that the device is in a second context, enable display, on the display unit, of a representation of a second collection of media items that share a set of common characteristics and are relevant to the second context, wherein the second collection of media items is different from the first collection of media items.

In some embodiments, a method is performed, the method comprising: at a device with a display and a touch-sensitive surface: displaying, on the display, a first visual media item of a sequence of visual media items; while displaying the first visual media item, receiving a user input that includes movement in a respective direction; in response to receiving the user input: determining whether the user input corresponds to a swipe gesture in a first direction; in accordance with a determination that the user input corresponds to a swipe gesture in the first direction, displaying, on the display, a detail user interface comprising related content for the first visual media item that has been determined to be related to the first visual media item, wherein the related content for the first visual media item includes one or more representations of related content organized by a first category and one or more representations of related content organized by a second category, and wherein the first category is different from the second category.

In some embodiments, an electronic device comprises: a display; a touch-sensitive surface; one or more processors; memory; and one or more programs, wherein the one or more programs are stored in the memory and configured to be executed by the one or more processors, the one or more programs including instructions for: displaying, on the display, a first visual media item of a sequence of visual media items; while displaying the first visual media item, receiving a user input that includes movement in a respective direction; in response to receiving the user input: determining whether the user input corresponds to a swipe gesture in a first direction; in accordance with a determination that the user input corresponds to a swipe gesture in the first direction, displaying, on the display, a detail user interface comprising related content for the first visual media item that has been determined to be related to the first visual media item, wherein the related content for the first visual media item includes one or more representations of related content organized by a first category and one or more representations of related content organized by a second category, and wherein the first category is different from the second category.

In some embodiments, a non-transitory computer-readable storage medium stores one or more programs, the one or more programs comprising instructions, which, when executed by an electronic device with a display and a touch-sensitive surface, cause the device to: display, on the display, a first visual media item of a sequence of visual media items; while displaying the first visual media item, receive a user input that includes movement in a respective direction; in response to receiving the user input: determine whether the user input corresponds to a swipe gesture in a first direction; in accordance with a determination that the user input corresponds to a swipe gesture in the first direction, display, on the display, a detail user interface comprising related content for the first visual media item that has been determined to be related to the first visual media item, wherein the related content for the first visual media item includes one or more representations of related content organized by a first category and one or more representations of related content organized by a second category, and wherein the first category is different from the second category.

In some embodiments, a transitory computer-readable storage medium stores one or more programs, the one or more programs comprising instructions, which, when executed by an electronic device with a display and a touch-sensitive surface, cause the device to: display, on the display, a first visual media item of a sequence of visual media items; while displaying the first visual media item, receive a user input that includes movement in a respective direction; in response to receiving the user input: determine whether the user input corresponds to a swipe gesture in a first direction; in accordance with a determination that the user input corresponds to a swipe gesture in the first direction, display, on the display, a detail user interface comprising related content for the first visual media item that has been determined to be related to the first visual media item, wherein the related content for the first visual media item includes one or more representations of related content organized by a first category and one or more representations of related content organized by a second category, and wherein the first category is different from the second category.

In some embodiments, a system comprises: a display; a touch-sensitive surface; means for displaying, on the display, a first visual media item of a sequence of visual media items; means, while displaying the first visual media item, for receiving a user input that includes movement in a respective direction; means, responsive to receiving the user input, for: determining whether the user input corresponds to a swipe gesture in a first direction; in accordance with a determination that the user input corresponds to a swipe gesture in the first direction, displaying, on the display, a detail user interface comprising related content for the first visual media item that has been determined to be related to the first visual media item, wherein the related content for the first visual media item includes one or more representations of related content organized by a first category and one or more representations of related content organized by a second category, and wherein the first category is different from the second category.

In some embodiments, a device comprises: a display unit; a touch-sensitive surface unit; and a processing unit coupled to the display unit and the touch-sensitive surface unit, the processing unit comprising: a display enabling unit configured to enable display, on the display unit, of a first visual media item of a sequence of visual media items; a receiving unit configured to, while displaying the first visual media item, receive a user input that includes movement in a respective direction; in response to receiving the user input: a determining unit configured to determine whether the user input corresponds to a swipe gesture in a first direction; and wherein the display enabling unit is further configured to, in accordance with a determination that the user input corresponds to a swipe gesture in the first direction, enable display, on the display unit, of a detail user interface comprising related content for the first visual media item that has been determined to be related to the first visual media item, wherein the related content for the first visual media item includes one or more representations of related content organized by a first category and one or more representations of related content organized by a second category, and wherein the first category is different from the second category.

In some embodiments, a method is performed, the method comprising: at a device with a display: displaying, on the display, a first detail user interface that includes a representation of first visual media corresponding to a first event; while displaying the first detail user interface: displaying, on the display, an affordance corresponding to a plurality of individuals identified as having attended the first event; and receiving a user input corresponding to selection of the affordance; and in response to receiving the user input, displaying, on the display, a second detail user interface that includes a representation of second visual media, wherein the second visual media includes a first plurality of media items corresponding to a second event identified as having been attended by the plurality of individuals and a second plurality of media items corresponding to a third event identified as having been attended by the plurality of individuals, and wherein the second event and the third event are different.

In some embodiments, an electronic device comprises: a display; one or more processors; memory; and one or more programs, wherein the one or more programs are stored in the memory and configured to be executed by the one or more processors, the one or more programs including instructions for: displaying, on the display, a first detail user interface that includes a representation of first visual media corresponding to a first event; while displaying the first detail user interface: displaying, on the display, an affordance corresponding to a plurality of individuals identified as having attended the first event; and receiving a user input corresponding to selection of the affordance; and in response to receiving the user input, displaying, on the display, a second detail user interface that includes a representation of second visual media, wherein the second visual media includes a first plurality of media items corresponding to a second event identified as having been attended by the plurality of individuals and a second plurality of media items corresponding to a third event identified as having been attended by the plurality of individuals, and wherein the second event and the third event are different.

In some embodiments, a non-transitory computer-readable storage medium stores one or more programs, the one or more programs comprising instructions, which, when executed by an electronic device with a display, cause the device to: display, on the display, a first detail user interface that includes a representation of first visual media corresponding to a first event; while displaying the first detail user interface: display, on the display, an affordance corresponding to a plurality of individuals identified as having attended the first event; and receive a user input corresponding to selection of the affordance; and in response to receiving the user input, display, on the display, a second detail user interface that includes a representation of second visual media, wherein the second visual media includes a first plurality of media items corresponding to a second event identified as having been attended by the plurality of individuals and a second plurality of media items corresponding to a third event identified as having been attended by the plurality of individuals, and wherein the second event and the third event are different.

In some embodiments, a transitory computer-readable storage medium stores one or more programs, the one or more programs comprising instructions, which, when executed by an electronic device with a display, cause the device to: display, on the display, a first detail user interface that includes a representation of first visual media corresponding to a first event; while displaying the first detail user interface: display, on the display, an affordance corresponding to a plurality of individuals identified as having attended the first event; and receive a user input corresponding to selection of the affordance; and in response to receiving the user input, display, on the display, a second detail user interface that includes a representation of second visual media, wherein the second visual media includes a first plurality of media items corresponding to a second event identified as having been attended by the plurality of individuals and a second plurality of media items corresponding to a third event identified as having been attended by the plurality of individuals, and wherein the second event and the third event are different.

In some embodiments, a system comprises: a display; means for displaying, on the display, a first detail user interface that includes a representation of first visual media corresponding to a first event; means, while displaying the first detail user interface, for: displaying, on the display, an affordance corresponding to a plurality of individuals identified as having attended the first event; and receiving a user input corresponding to selection of the affordance; and means, responsive to receiving the user input, for displaying, on the display, a second detail user interface that includes a representation of second visual media, wherein the second visual media includes a first plurality of media items corresponding to a second event identified as having been attended by the plurality of individuals and a second plurality of media items corresponding to a third event identified as having been attended by the plurality of individuals, and wherein the second event and the third event are different.

In some embodiments, a device comprises: a display unit; and a processing unit coupled to the display unit, the processing unit comprising: a display enabling unit configured to enable display, on the display unit, of a first detail user interface that includes a representation of first visual media corresponding to a first event; while displaying the first detail user interface: wherein the display enabling unit is further configured to, enable display, on the display unit, of an affordance corresponding to a plurality of individuals identified as having attended the first event; and a receiving unit configured to receive a user input corresponding to selection of the affordance; and wherein the display enabling unit is further configured to, in response to receiving the user input, enable display, on the display unit, of a second detail user interface that includes a representation of second visual media, wherein the second visual media includes a first plurality of media items corresponding to a second event identified as having been attended by the plurality of individuals and a second plurality of media items corresponding to a third event identified as having been attended by the plurality of individuals, and wherein the second event and the third event are different.

In some embodiments, a method is performed, the method comprising: at a device with a display: displaying, on the display, a plurality of affordances corresponding to a plurality of automatically-generated collections of visual media; while displaying the plurality of affordances, receiving a first user input; in response to receiving the first user input: obtaining an automatically-generated first collection of visual media that was not previously included in the plurality of collections of visual media, distinct from the each of the collections of the automatically-generated collections of visual media; and adding, to the plurality of affordances displayed, on the display, a first affordance corresponding to the first collection of visual media; receiving a second user input corresponding to selection of the first affordance; and in response to receiving the second user input, displaying, on the display, a detail user interface that includes a representation of the second collection of visual media.

In some embodiments, an electronic device comprises: a display; one or more processors; memory; and one or more programs, wherein the one or more programs are stored in the memory and configured to be executed by the one or more processors, the one or more programs including instructions for: displaying, on the display, a plurality of affordances corresponding to a plurality of automatically-generated collections of visual media; while displaying the plurality of affordances, receiving a first user input; in response to receiving the first user input: obtaining an automatically-generated first collection of visual media that was not previously included in the plurality of collections of visual media, distinct from the each of the collections of the automatically-generated collections of visual media; and adding, to the plurality of affordances displayed, on the display, a first affordance corresponding to the first collection of visual media; receiving a second user input corresponding to selection of the first affordance; and in response to receiving the second user input, displaying, on the display, a detail user interface that includes a representation of the second collection of visual media.

In some embodiments, a non-transitory computer-readable storage medium stores one or more programs, the one or more programs comprising instructions, which, when executed by an electronic device with a display, cause the device to: display, on the display, a plurality of affordances corresponding to a plurality of automatically-generated collections of visual media; while displaying the plurality of affordances, receive a first user input; in response to receiving the first user input: obtain an automatically-generated first collection of visual media that was not previously included in the plurality of collections of visual media, distinct from the each of the collections of the automatically-generated collections of visual media; and add, to the plurality of affordances displayed, on the display, a first affordance corresponding to the first collection of visual media; receive a second user input corresponding to selection of the first affordance; and in response to receiving the second user input, display, on the display, a detail user interface that includes a representation of the second collection of visual media.

In some embodiments, a transitory computer-readable storage medium stores one or more programs, the one or more programs comprising instructions, which, when executed by an electronic device with a display, cause the device to: display, on the display, a plurality of affordances corresponding to a plurality of automatically-generated collections of visual media; while displaying the plurality of affordances, receive a first user input; in response to receiving the first user input: obtain an automatically-generated first collection of visual media that was not previously included in the plurality of collections of visual media, distinct from the each of the collections of the automatically-generated collections of visual media; and add, to the plurality of affordances displayed, on the display, a first affordance corresponding to the first collection of visual media; receive a second user input corresponding to selection of the first affordance; and in response to receiving the second user input, display, on the display, a detail user interface that includes a representation of the second collection of visual media.

In some embodiments, a system comprises: a display; means for displaying, on the display, a plurality of affordances corresponding to a plurality of automatically-generated collections of visual media; means, while displaying the plurality of affordances, for receiving a first user input; means, responsive to receiving the first user input, for: obtaining an automatically-generated first collection of visual media that was not previously included in the plurality of collections of visual media, distinct from the each of the collections of the automatically-generated collections of visual media; and adding, to the plurality of affordances displayed, on the display, a first affordance corresponding to the first collection of visual media; means for receiving a second user input corresponding to selection of the first affordance; and means, responsive to receiving the second user input, for displaying, on the display, a detail user interface that includes a representation of the second collection of visual media.

In some embodiments, a device comprises: a display unit; and a processing unit coupled to the display unit, the processing unit comprising: a display enabling unit configured to enable display, on the display unit, of a plurality of affordances corresponding to a plurality of automatically-generated collections of visual media; a receiving unit configured to, while displaying the plurality of affordances, receive a first user input; in response to receiving the first user input: an obtaining unit configured to obtain an automatically-generated first collection of visual media that was not previously included in the plurality of collections of visual media, distinct from the each of the collections of the automatically-generated collections of visual media; and an adding unit configured to add, to the plurality of affordances displayed, on the display, a first affordance corresponding to the first collection of visual media; wherein the receiving unit is further configured to receive a second user input corresponding to selection of the first affordance; and wherein the display enabling unit is further configured to, in response to receiving the second user input, enable display, on the display unit, of a detail user interface that includes a representation of the second collection of visual media.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for viewing collections of media items that share a set of common characteristics and content related thereto, thereby increasing the effectiveness, efficiency, and user satisfaction with such devices. Such methods and interfaces may complement or replace other methods for viewing collections of media items that share a set of common characteristics and content related thereto.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 7A-7E is a flow diagram illustrating an exemplary process for conducting viewing contextually-relevant media and related content.

FIGS. 9A-9L illustrate exemplary user interfaces for viewing related content.

FIGS. 10A-10D is a flow diagram illustrating an exemplary process for viewing related content.

FIGS. 12A-12K illustrate exemplary user interfaces for viewing content relevant to identified individuals.

FIGS. 13A-13D is a flow diagram illustrating an exemplary process for viewing content relevant to identified individuals.

FIGS. 15A-15E illustrate exemplary user interfaces for obtaining automatically-generated collections of media.

FIGS. 16A-16D is a flow diagram illustrating an exemplary process for obtaining automatically-generated collections of media.

DESCRIPTION OF EMBODIMENTS

Figure 1A:
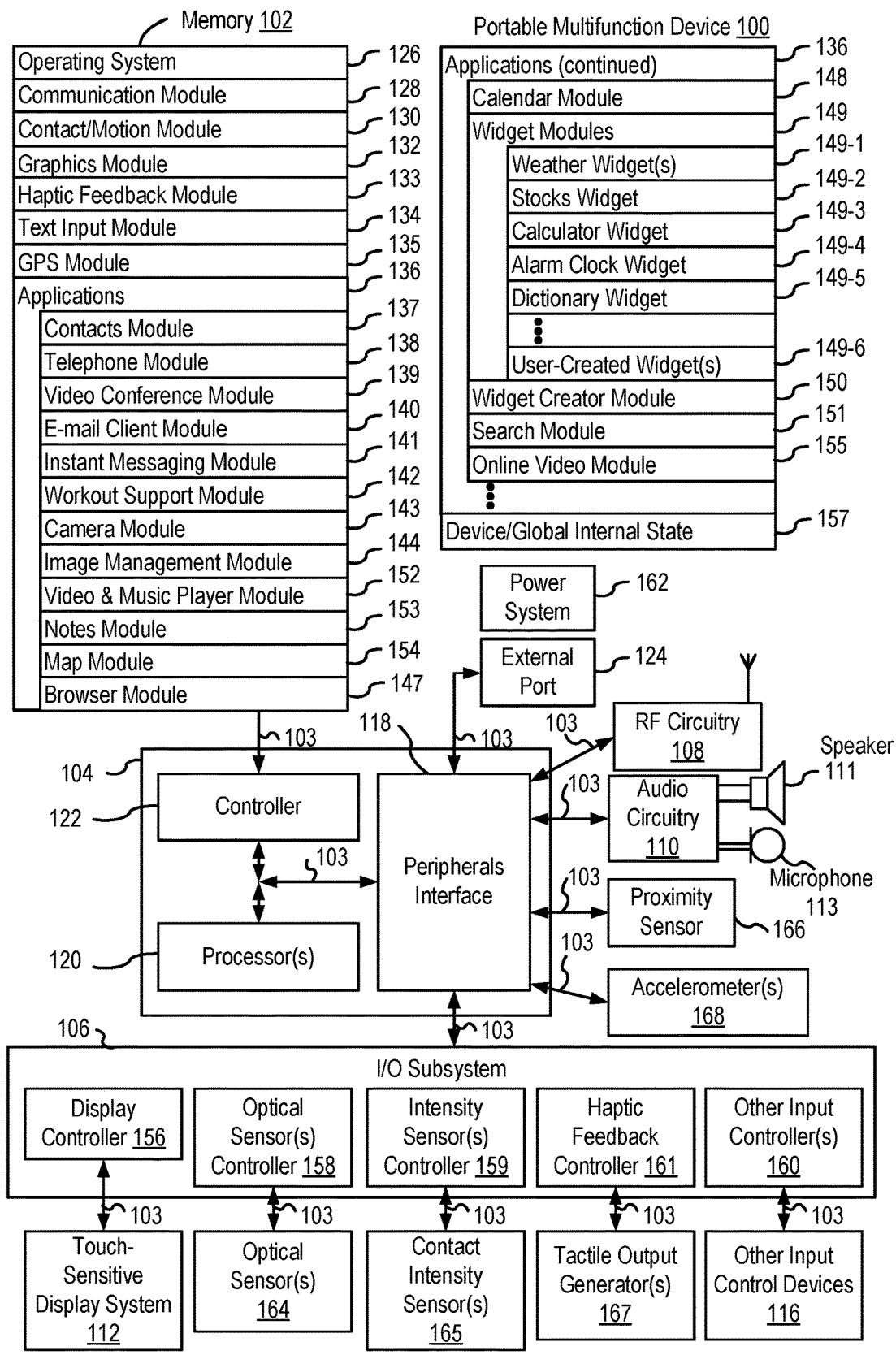
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for retrieving and viewing contextually-relevant content. For example, techniques that eliminate extensive manual effort by the user navigating interfaces in order to retrieve content that is related based on one or more contextual properties. Such techniques can reduce the cognitive burden on a user who accesses contextually-relevant media content, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for managing event notifications. FIGS. 6A-6R illustrate exemplary user interfaces for viewing contextually-relevant collections of media. FIGS. 7A-7E is a flow diagram illustrating an exemplary process for conducting viewing contextually-relevant media and related content. The user interfaces in FIGS. 6A-6R are used to illustrate the processes described below, including the processes in FIGS. 7A-7E. FIGS. 9A-9L illustrate exemplary user interfaces for viewing related content. FIGS. 10A-10D is a flow diagram illustrating an exemplary process for viewing related content. The user interfaces in FIGS. 9A-9L are used to illustrate the processes described below, including the processes in FIGS. 10A-10D. FIGS. 12A-12K illustrate exemplary user interfaces for viewing content relevant to identified individuals. FIGS. 13A-13D is a flow diagram illustrating an exemplary process for viewing content relevant to identified individuals. The user interfaces in FIGS. 12A-12K are used to illustrate the processes described below, including the processes in FIGS. 13A-13D. FIGS. 15A-15E illustrate exemplary user interfaces for obtaining automatically-generated collections of media. FIGS. 16A-16D is a flow diagram illustrating an exemplary process for obtaining automatically-generated collections of media. The user interfaces in FIGS. 15A-15E are used to illustrate the processes described below, including the processes in FIGS. 16A-16D.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.1 in, and/or IEEE 802.11 ac), voice over Internet Protocol (VoTP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2).

The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
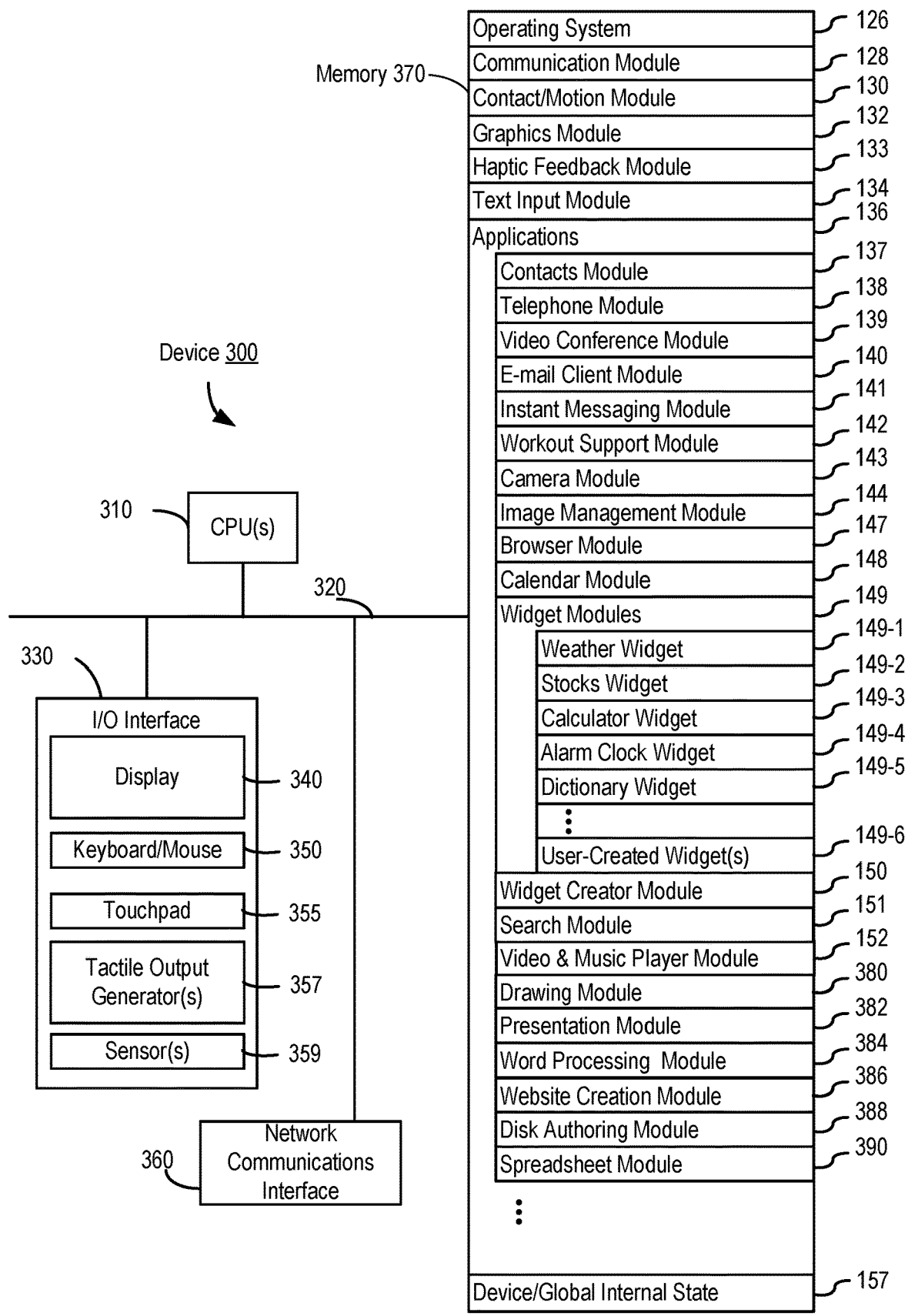
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
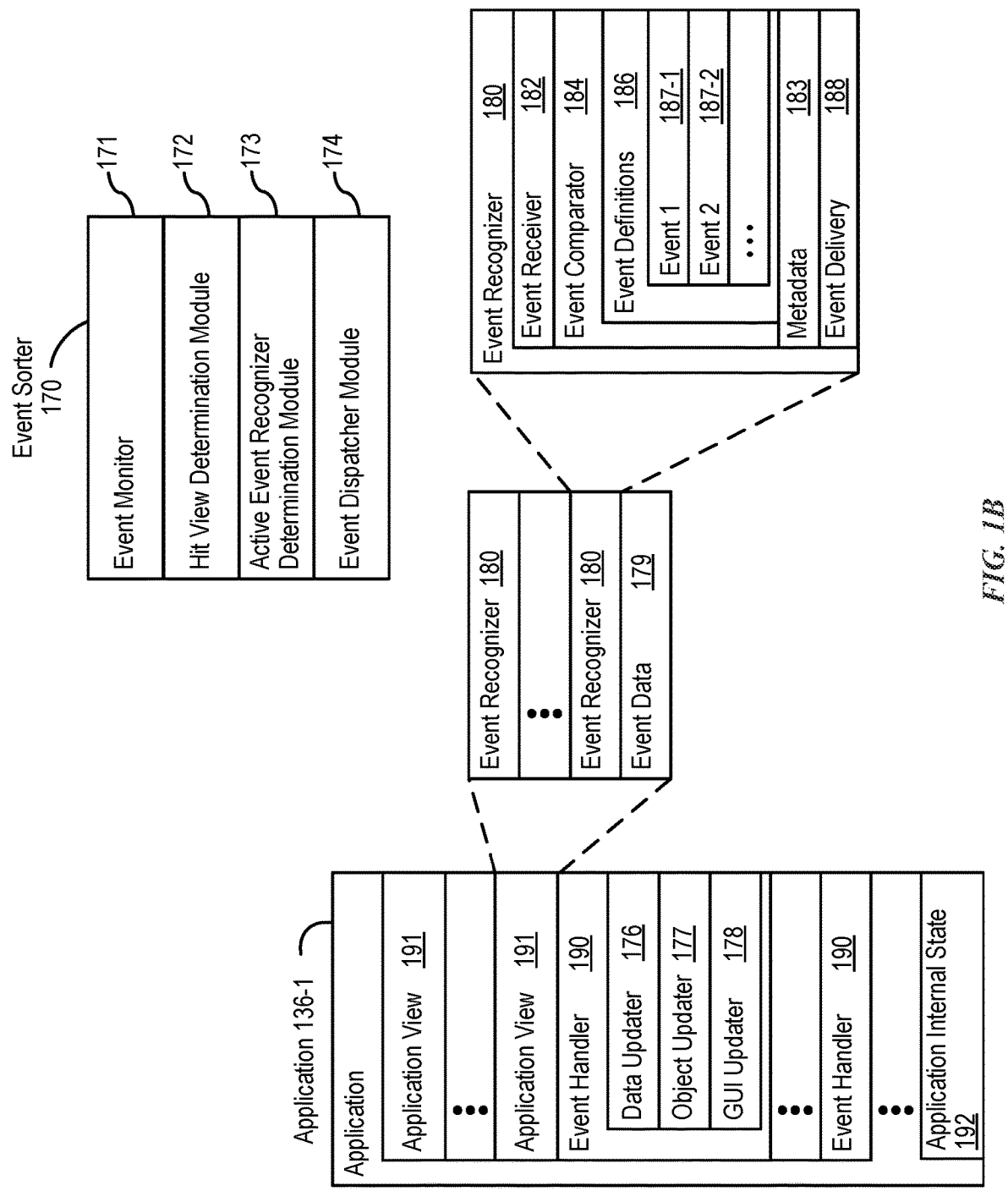
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
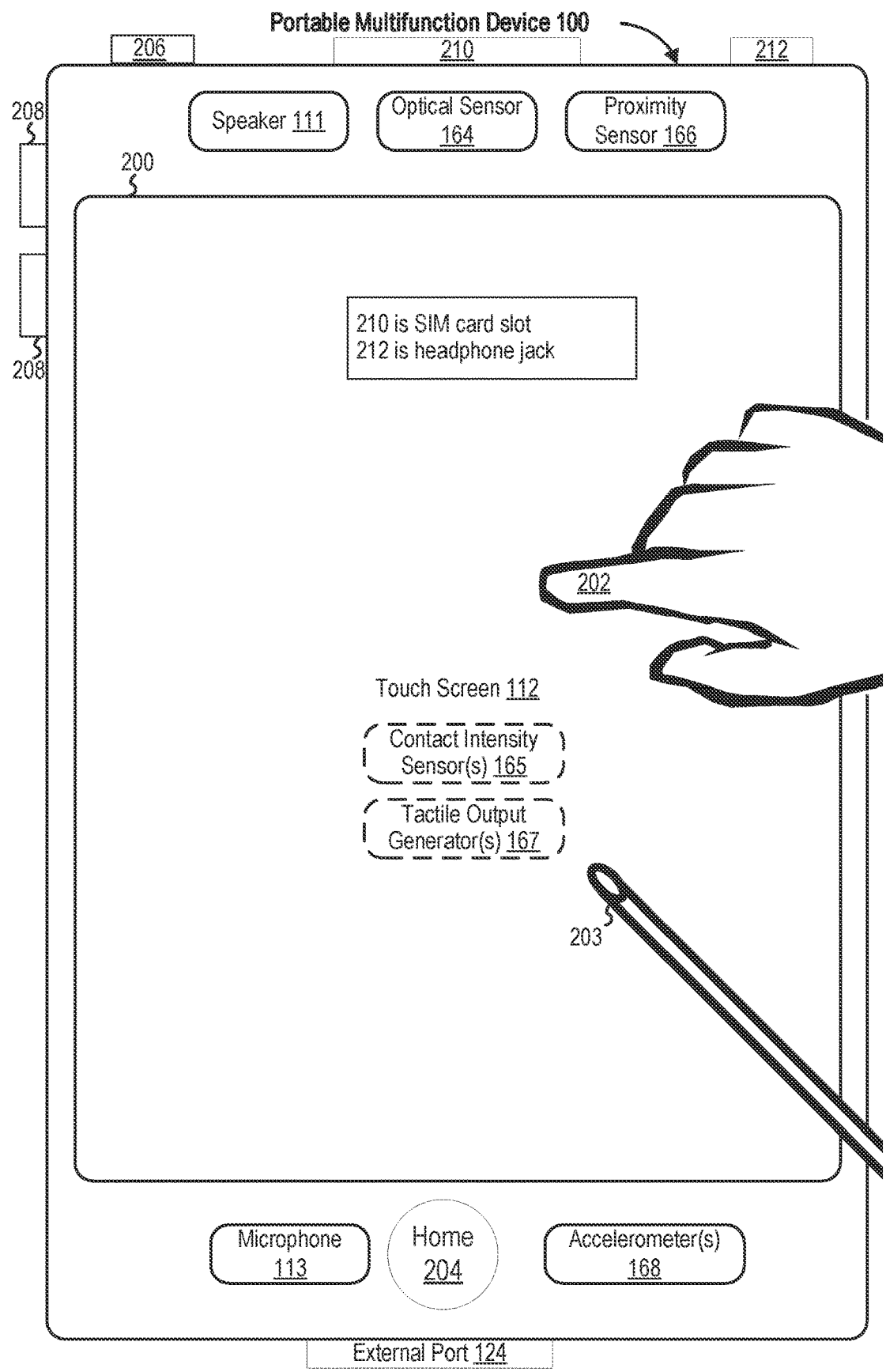
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
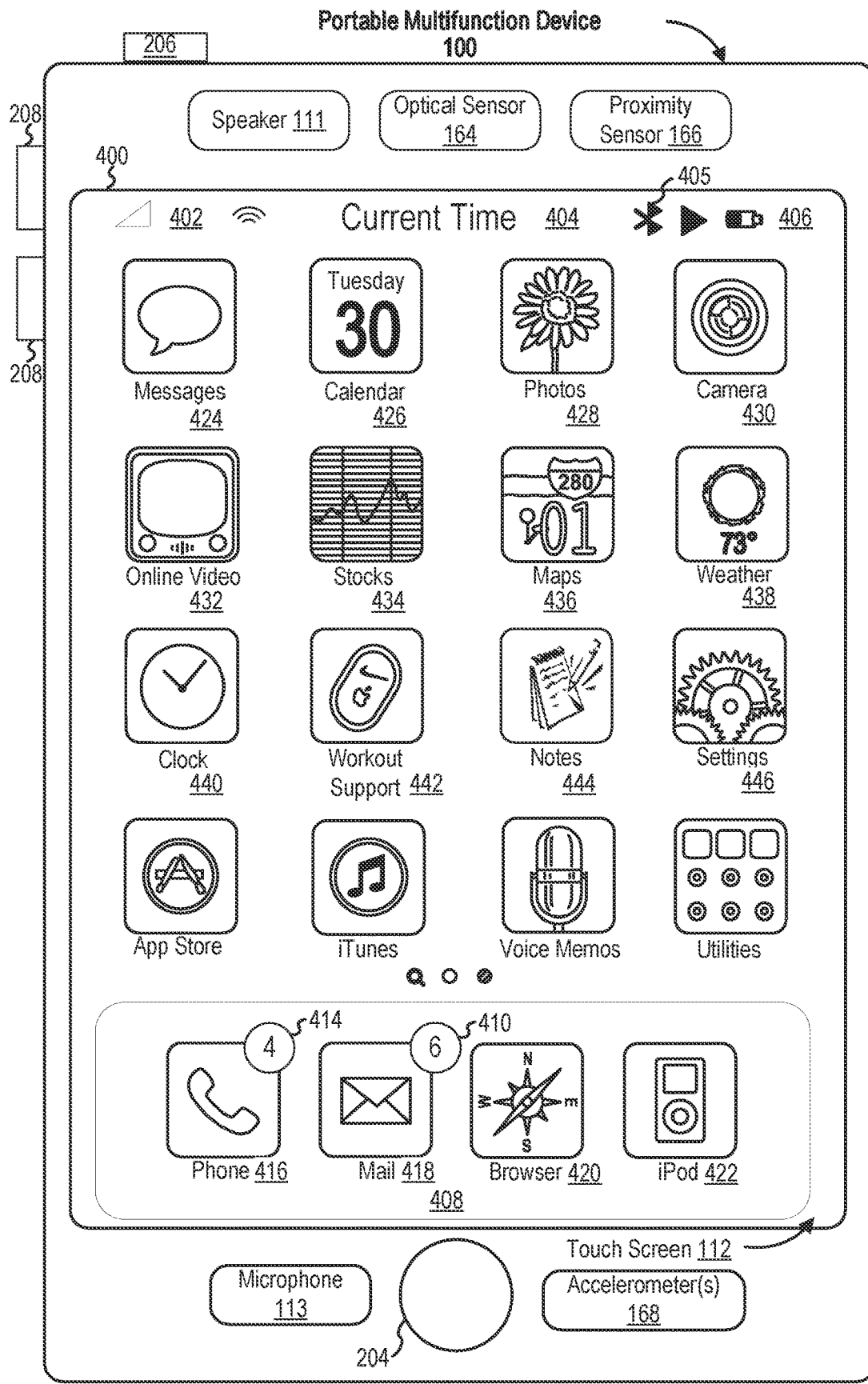
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:
  Signal strength indicator(s) 402 for wireless communication(s), such as cellular and Wi-Fi signals;
  Time 404;
  Bluetooth indicator 405;
  Battery status indicator 406;
  Tray 408 with icons for frequently used applications, such as:
    Icon 416 for telephone module 138, labeled "Phone," which optionally includes an indicator 414 of the number of missed calls or voicemail messages;
    Icon 418 for e-mail client module 140, labeled "Mail," which optionally includes an indicator 410 of the number of unread e-mails;
    Icon 420 for browser module 147, labeled "Browser;" and
    Icon 422 for video and music player module 152, also referred to as iPod (trademark of Apple Inc.) module 152, labeled "iPod;" and
  Icons for other applications, such as:
    Icon 424 for IM module 141, labeled "Messages;"
    Icon 426 for calendar module 148, labeled "Calendar;"
    Icon 428 for image management module 144, labeled "Photos;"
    Icon 430 for camera module 143, labeled "Camera;"
    Icon 432 for online video module 155, labeled "Online Video;"
    Icon 434 for stocks widget 149-2, labeled "Stocks;"
    Icon 436 for map module 154, labeled "Maps;"
    Icon 438 for weather widget 149-1, labeled "Weather;"
    Icon 440 for alarm clock widget 149-4, labeled "Clock;"
    Icon 442 for workout support module 142, labeled "Workout Support;"
    Icon 444 for notes module 153, labeled "Notes;" and
    Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). In some embodiments, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
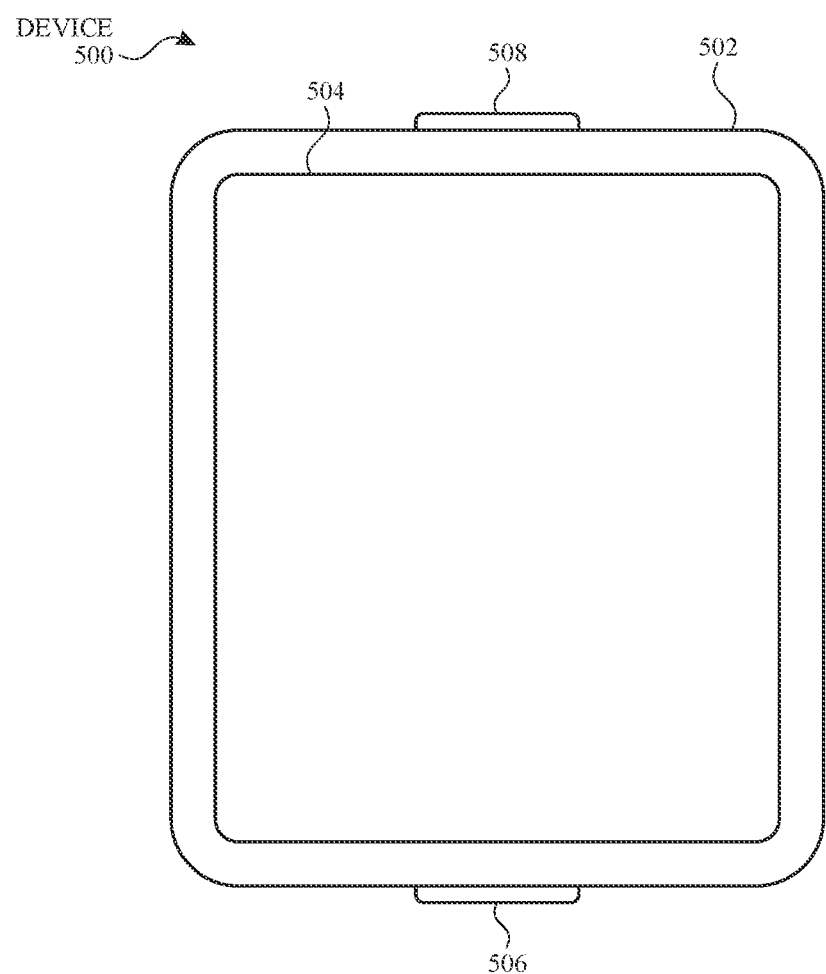
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
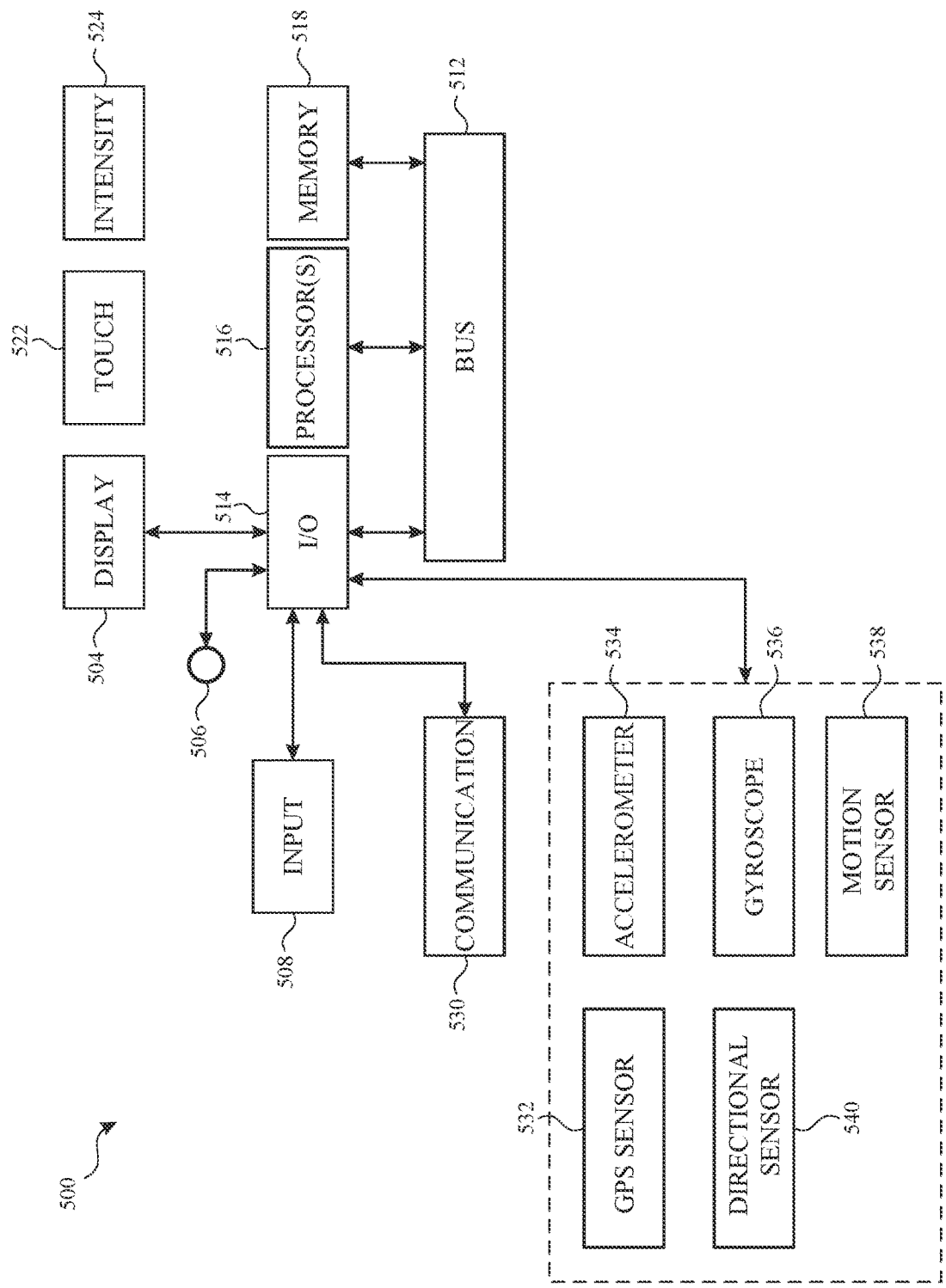
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 1000, 1300, and 1600 (FIGS. 7, 10, 13, and 16). Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity $I_j$ that is a portion of the aggregate intensity, A, in accordance with a predefined mathematical function, $I_j = A \cdot (D_j / \Sigma D_i)$, where $D_j$ is the distance of the respective contact j to the center of force, and $\Sigma D_i$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6R illustrate exemplary user interfaces for viewing collections of media items that share a set of common characteristics and content related thereto, in accordance with some embodiments. The user interfaces in these figures are used to illustrate the processes described below, including the processes in FIGS. 7A-7E.

Memories Overview

In FIG. 6A, user interface 602 depicts an exemplary home screen of device 600. In some embodiments, device 600 includes some or all of the features of device 100, device 300, or device 500, discussed above. In the example depicted, device 600 receives user input selection of application icon 602A of the home screen, which corresponds to a photos application. In response, device 600 displays user interface 604, which depicts an exemplary screen of the photos application. In user interface 604, an exemplary collection of photos are arranged as thumbnails of substantially equal size. The collection of photos shown in user interface 604 correspond to the dates July 22-25 (e.g., as shown by the text "July 22-25"), and correspond to the locations Nordurland vestra and Sudurland, Iceland (e.g., as shown by the text "NORDURLAND VESTRA & SUDURLAND ICELAND").

At the display of user interface 604, device 600 receives a request to display contextually relevant media. In some examples, device 600 receives user input selection of a memories tab 604A, at user interface 604. For example, user interface 604 is reproduced in FIG. 6B, and depicts receiving a user input touch 604B on memories tab 604A. In some examples, the request corresponds to a request to open the photos application, such as user input selection of application icon 602A at user interface 602.

In response to the request to display contextually relevant media, device 600 displays a representation of a collection of media items. In some examples, in response to selection of the memories tab 604A of user interface 604, device 600 displays user interface 606.

User interface 606 of FIG. 6B depicts an exemplary memory timeline. In some examples, a memory timeline includes one or more representations of one or more collections of media items, wherein the media items of a collection of media items share a set of common characteristics. A collection of media items that share a set of common characteristics may also be referred to as a "memory" collectively as "memories" throughout this specification.

User interface 606 (hereinafter "memory timeline 606") includes representations 606A-606C, each of which corresponds to a memory. In memory timeline 606, some representations are arranged visually to occupy a row (e.g., not explicitly depicted) alone (e.g., representation 606A), while other representations are arranged visually occupying the same row (e.g., not explicitly depicted) side-by-side (e.g., representations 606C and 606B).

In some examples, in response to selection of the memories tab 604A of user interface 604, device 600 displays user interface 608 of FIG. 6C. For example, user interface 604 is reproduced in FIG. 6C, and depicts receiving the user input touch 604B on memories tab 604A and, in response, device 600 displays user interface 608. User interface 608 (hereinafter "memory timeline 608") includes representations 608A and 608B. Memory timeline 608 depicts another arrangement of representations on a memory timeline (e.g., different than memory timeline 606). Representations 608A and 608B each correspond to a collection of media items that share a set of common characteristics (e.g., a memory). Memory timeline 608 depicts representations 608A and 608B in a vertical arrangement on the screen of device 600. In some examples, the memory timeline 608 can be scrolled in response to user input, to display additional representations on the display. In some examples, representations are arranged in any suitable arrangement on a memory timeline.

Figure 6E:
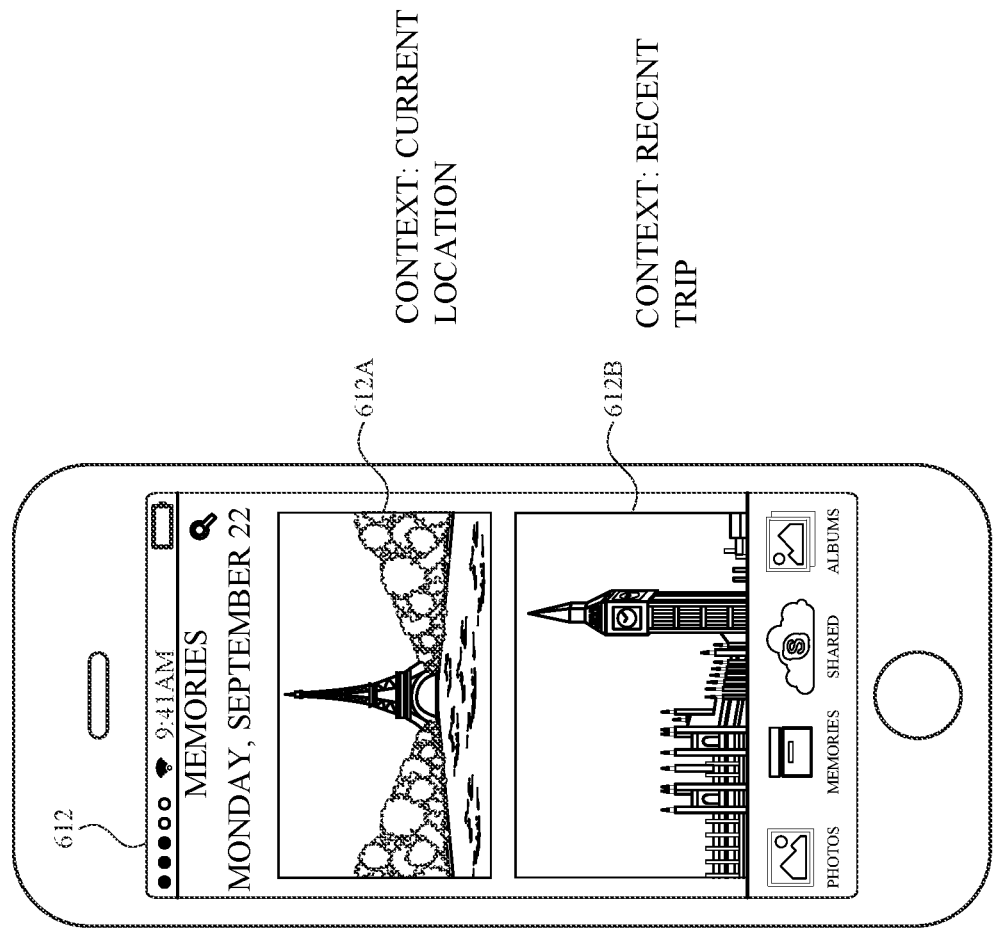
FIGS. 6A-6R illustrate exemplary user interfaces for viewing contextually-relevant collections of media.

FIGS. 6D and 6E depict two versions of a memory timeline, as described above with reference to user interface 608 of FIG. 6C. User interface 610 (hereinafter "memory timeline 610") depicts two representations 610A and 610B in a vertical arrangement. User interface 612 (hereinafter "memory timeline 612") depicts two representations 612A and 612B, also in a vertical arrangement. As can be seen, each of the representations in timelines 610 and 612 are different images, each representing a distinct memory.

In accordance with some embodiments, in response to the request to display contextually relevant media, and in accordance with a determination that device 600 is in a first context, device 600 displays a representation of a first collection of media items that share a set of common characteristics and are relevant to the first context. For example, memory representation 610A of memory timeline 610 depicts an exemplary representation of a first collection of media items that share a set of common characteristics and are relevant to the first context.

In some examples, a context is an identification of a contextual state of device 600. A context of device 600, for example, identifies that device 600 is/was at a particular time of day, at a particular day of the week, at a particular day of the year, in a particular location, and/or with a particular set of people. To illustrate the concept of device context, attention is turned to the examples described in FIGS. 6D and 6E In the example depicted in user interface 610 of FIG. 6D, device 600 is in an exemplary first context. The first context of device 600 includes one or more of: a first time of day (daytime); a first day of the year (e.g., as in any particular day of the year) (Jul. 4, 2020); a location (the park); and a first set of people (the user and his four cousins). As shown in memory timeline 610, representation 610A depicts an image of two children at a family picnic during a holiday (e.g., "Independence Day", also referred to as the "Fourth of July"). In this example, the collection of media items represented by representation 610A share characteristics, such as day (they were each taken on Jul. 4, 2019) and location (they were each taken the location of the park). In this example, the memory corresponding to representation 610A is relevant to the first context of device 600 based on the day of the year (July 4). For example, if one or more of the media items of the first collection represented by representation 610A were taken on Jul. 4, 2019, they are relevant to the current context of device 600, Jul. 4, 2020 (the current day of the current year in this example), by the particular day of the year (e.g., July 4th).

For further example, if the image of representation 610A was taken in a park, and the user (e.g., and their device) are currently in the same park, the first context can include the location of the park. Thus, the memory represented by representation 610A would be relevant to the first context based on a location, and thus device 600 displays representation 610A. As should be apparent, because the relevance would be based on location in this example, the representation 610A could still be displayed, even if the current context of device 600 did not include that the current day of the year is July 4th (e.g., in other words, because relevance is based on location, the same memory representation is displayed, even when the current day is some other day, such as November 17th). Thus, in this example, in accordance with a determination that device 600 is in a first context (e.g., in the park), device 600 displays representation 610A of a first collection of media items that are relevant (e.g., the collection contains a media item that is associated with (e.g., taken at or near) the location of the park).

In accordance with some embodiments, further in response to the request to display contextually relevant media, and in accordance with a determination that device 600 is in a second context, device 600 displays a representation of a second collection of media items that share a set of common characteristics and are relevant to the second context, wherein the second collection of media items is different from the first collection of media items. For example, if instead of being in the example first context described above, device 600 is in a second context, the collection of media items that are represented on a memory timeline can differ. In some examples, a collection of media items share a set of common characteristics if the media items all correspond to media captured within a particular time range at a particular location or set of locations.

In the example depicted in user interface 612 of FIG. 6E, device 600 is in an exemplary second context. The second context of device 600 includes one or more of: a second time of day (nighttime); a second day of the year (e.g., as in any particular day of the year) (Sep. 22, 2020); a location (Paris, France); and a second set of people (the user and two business associates). In this example, the user is on a business trip to Paris, France for work, and is accompanied by two business associates. As shown in memory timeline 612, representation 620A depicts an image of the Eiffel Tower in Paris, France. In this example, the collection of media items represented by representation 612A share characteristics, such as a period of time over which they were taken (they were each taken between May 4-May 26, 2020) and location (they were each taken in Paris, France). In this example, the memory corresponding to representation 612A is relevant to the first context of device 600, based on location (Paris, France). For example, because one or more of the media items of the first collection (e.g., the image of the Eiffel Tower) represented by representation 612A were taken in Paris, they are relevant to the current context of device 600 Paris, France (the current location of the device). As can be seen in FIG. 6E, the current date is September 22, however the memory represented by 612A corresponds to the dates May 4-26 (as outlined above). However, because the memory is relevant to the current context based on location, it is displayed by device 600.

In some embodiments, as seen in FIG. 6D, device 600 may display a plurality of memories relevant to a context of the device. In accordance with some embodiments, in accordance with a determination that device 600 is in the first context, the device displays a representation of a third collection of media items that share a set of common characteristics and are relevant to the first context. In some examples, the first collection of media items are relevant to the first context based on a first contextual property and the third collection of media items are relevant to the first context based on a second contextual property. In some examples, the second contextual property is different from the first contextual property. For example, referring back to user interface 610 of FIG. 6D, representation 610B represents a third collection of media items that are relevant to the first context. In this example, the third collection of media items corresponds to images and video of a family beach vacation that share a set of common characteristics, for example, in that they were taken near the same location and over a particular time period (e.g., Jun. 14, 2020-Jun. 20, 2020). As can be seen in FIG. 6D, the representation 610B depicts five adults—the user and their four cousins, in this example, each of whom attended the family beach vacation corresponding to the represented memory. Using the first context in the preceding example, the context of device 600 includes one or more exemplary contextual properties: a first time of day (daytime); a first day of the year (Jul. 4, 2020); a location (the park); and a first set of people (the user's four cousins). Thus, the third collection of media items are relevant to the first context based on the first set of people—that is, device 600 is associated with the user (e.g., it is the user's smartphone) and determines that one or more devices associated with the user's four cousins are nearby. For instance, because the current day is a holiday (Fourth of July), the user is currently at a party also attended by their four cousins.

As touched on above, in some examples, the first collection is relevant to the first context based on a first contextual property, and the third collection is relevant to the first context based on a second contextual property, and the first and second contextual properties are different. For instance, in the examples described above, the first collection is related to the first context based on the first contextual property of a particular day of the year (e.g., July 4th), and the third collection is related to the first context based on the second contextual property of a particular set of people (e.g., the user's four cousins).

In accordance with some embodiments, the a representation of the first collection of media items that share a set of common characteristics is concurrently displayed with the representation of the first collection of media items that share a set of common characteristics. For example, at user interface 610 of FIG. 6D, the representations 610A and 610B are concurrently displayed on memory timeline 610.

In some embodiments, representation 612B of FIG. 6E represents a memory of media items that share the characteristics that they are from the user's vacation to London, England. As described above with regard to memory timeline 612, the second context of device 600 includes one or more of: a second time of day (nighttime); a second day of the year (e.g., as in any particular day of the year) (Sep. 22, 2020); a location (Paris, France); and a second set of people (the user and two business associates). The memory represented by representation 610B is related to the second context based on the contextual property of the day of the year. In this example, the represented memory is related based on the current date because it was a recent trip taken by the user—the current date is Sep. 22, 2020 and the trip is from August 8-Aug. 13, 2020.

In accordance with some embodiments, the representation of the first collection of media items is a first affordance. For example, the representation is selectable and can correspond to an action taken by device 600 in response to selection.

In accordance with some embodiments, device 600 receives user input corresponding to selection of the first affordance and, in response, displays a detail user interface that includes at least a portion of the first collection of media items. For example, user interface 611 of FIG. 6D depicts an exemplary detail user interface (also referred to as a "memory detail view" hereinafter) for the first collection of media items (also referred to as the "first memory" hereinafter). In some examples, a memory detail view includes at least a portion of the collection of media items of the memory. For example, user interface 611 (also referred to as "memory detail view 611" hereinafter) includes images 611A, which depict media items of the first collection of media items.

In some examples, the display of a memory detail view does not depict all of the media items included in that memory. In some embodiments, the first collection of media items includes more media items than can be displayed on the display at once, and displaying the detail user interface includes displaying a portion of the first collection of media items, wherein additional media items can be displayed in the detail user interface by scrolling the detail view. In some examples, the additional media items are displayed in the detail user interface in response to a swipe gesture, or some other directional gesture, on a touch-sensitive surface.

In accordance with some embodiments, the representation of the first collection of media items includes a reduced-scale version of a media item selected from the first collection of media items. For example, as shown in memory timeline 610 of FIG. 6D, the representation 610A is a reduced-scale version of the image depicted (e.g., is displayed at a smaller size). This reduced-scale version of a media item may also be referred to as a "key photo". In some examples, the key photo is selected from the media items included in the collection of media items represented by the representation. For example, the image depicted as representation 610A is a media item of the corresponding collection of media items (e.g., memory) represented. Thus, the key photo is displayed as an affordance. In some embodiments, the representation of the first collection of media items includes reduced-scale versions of a plurality of the media items from the first collection of media items. In some embodiments, a representation includes several media items arranged concurrently and/or several media items displayed in a sequence (e.g., an animation). Similarly, other representations of collections of media items described herein optionally include reduced-scale versions of one or more media items selected from the corresponding collection of media items.

In accordance with some embodiments, device 600 generates a textual identifier associated with the first collection of media items. For example, FIG. 6F depicts exemplary textual identifier 615A.

In accordance with some embodiments, device 600 identifies a face in the selected media item, wherein the selected media item is an image. For example, FIG. 6F depicts an exemplary image 614. As shown, image 614 includes two faces, one from each child in the photo. In some examples, device 600 identifies a plurality of faces in an image. In this example, device 600 identifies the faces of both children in image 614. In some embodiments, device 600 identifies a face in an image by analyzing the image using a face detection algorithm, or using information associated with the image (e.g., the information identifying faces in the image), or both.

In accordance with some embodiments, device 600 displays the generated textual identifier overlaid on the representation of the first collection of media items, wherein the overlaid textual identifier does not overlap the identified face in the selected media item displayed as the representation of the first collection of media items. For example, FIG. 6F depicts exemplary representation 614A, created from image 614. In the example depicted, textual identifier 615A is overlaid on representation 614A (representing the first collection of media items). As can be seen, textual identifier 615A does not overlap the face (e.g., identified face) of either child of the exemplary selected media item, image 614. In contrast, representation 614B depicts a textual identifier overlaid such that it overlaps an identified face in the selected media item, image 614. Textual identifier 615B overlaps the face of the child on the right of the photo.

A textual identifier which is placed without regard to a face in a photo, and which overlaps or otherwise obscures a face, is undesirable and makes the browsing of media items more cumbersome for a user. For example, if a textual identifier were to obscure all of the faces in the key photo, a user may not be able to determine who was in the image. In response, the user might select the memory and view the memory detail user interface, only to determine that they intended to select another memory. Such interactions waste the user's time and reduce the battery life of device 600 by requiring superfluous input processing and illumination of the display.

In some embodiments, the location of the generated textual identifier on in the representation is determined based at least in part on a location of faces in the selected media item. For example, the generated textual identifier is optionally shifted up or down or to the left or right (or some combination of directions) to avoid overlapping an identified face. For example, representation 614C depicts a similar representation as shown in representation 614B, but the textual identifier 615C has been shifted slightly down so as not to overlap either child's face. Thus, the location of a detected face optionally affects the placement of the textual identifier on a representation.

In some embodiments, the selected media item is cropped for display in the representation of the collection of media items, and the cropping is adjusted to move the face out from underneath the text. For example, instead of shifting the textual identifier, the image of representation 614B could be shifted up (not depicted) so as not be have the identified faces be overlapped by the textual identifier 615B. For instance, if the text is centered, the media item is shifted within a cropping mask so that the detected face is not obscured by the text.

In accordance with some embodiments, the textual identifier associated with the first collection of media items is selected based on the relevance of the first collection of media items to the first context and includes one or more words that explain relevance of the first collection of media items to the first context. For example, exemplary textual identifiers 615A-615C each read "Fourth of July 2019/Jul. 4, 2019", which explain the relevance of first collection to the first context (e.g., the current day is Jul. 4, 2020, and the relevance is that the memory is from the same day of the year, July 4th). In some examples, the textual identifier simply reads "Fourth of July 2019", "Independence Day 2019" (e.g., does not include a date) or "Jul. 4, 2019" (e.g., includes a date). Other examples of textual identifiers based on day of the year include "Last Week", "Last Month", "Last Year", or the like. In some examples, if context is a recent trip, the textual identifier can be "Your Recent Trip" or "Your Recent Trip/DATE" with the date of the trip indicated. In some examples, if the context relevance is based on location, the identifier can be the name of the location (e.g., "Location Name", "City", "City, State", "City, Country", "Yosemite National Park", "San Francisco" or the like). In some examples, if the context relevance is based on a set of people, the identifier can be the names of one or more individuals in the set of people, including or excluding the user, or any other appropriate identifier that identifies a group of people (e.g., "User and Mom", "User and 3 Others", "Sophia, Lucas, and Olivia", "The Smith Family" or the like).

Figure 6G:
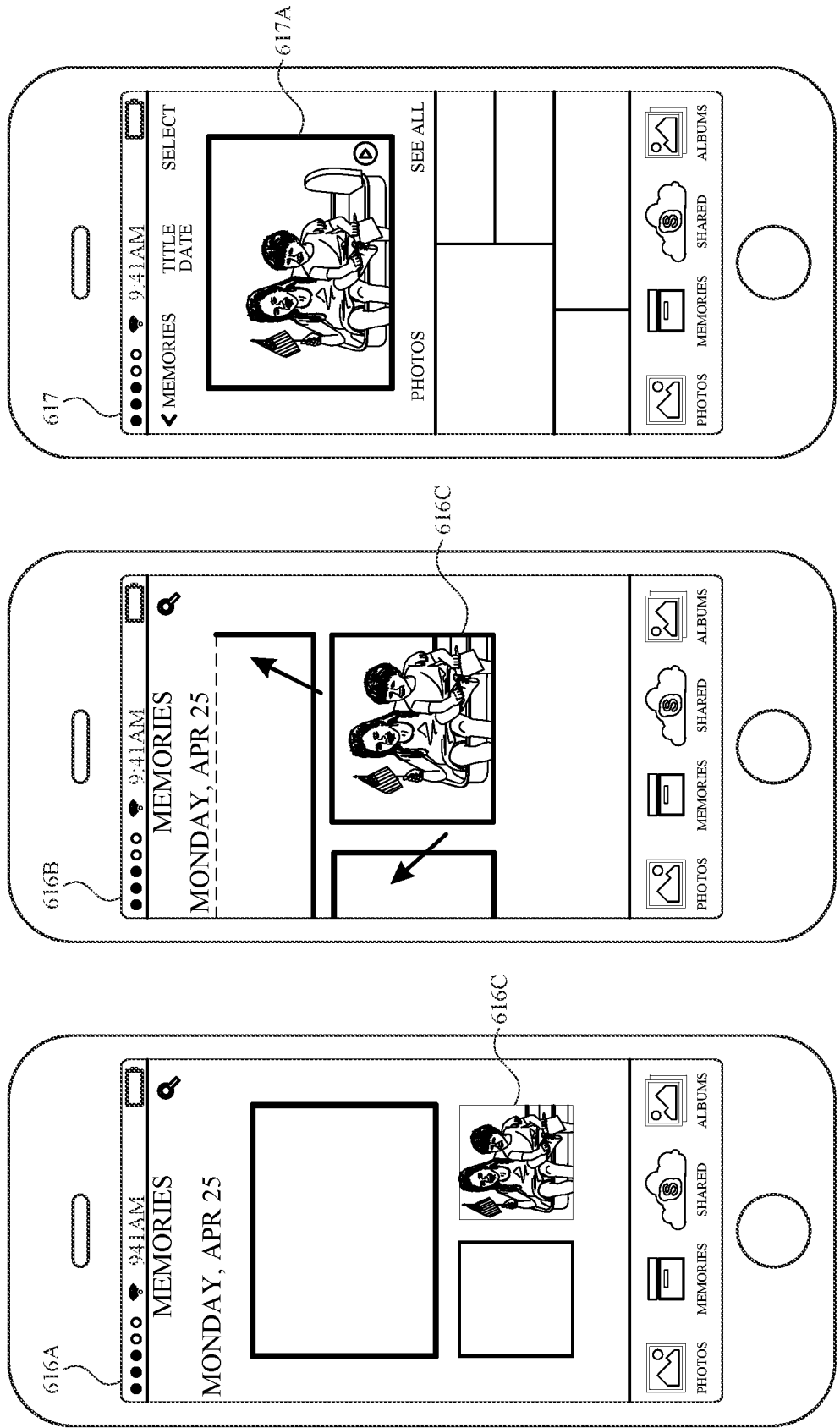

In accordance with some embodiments, prior to displaying the detail user interface, device 600 displays the representation of the first collection of media items visually occupying a first portion of the display. For example, in FIG. 6G, user interface 616A depicts exemplary representation 616C, an affordance which is in a first position on the display. Subsequent to receiving the user input corresponding to selection of the first affordance, and while displaying the detail user interface, device 600 displays, on the display, a key media item of the first collection of media items visually occupying a second portion of the display, distinct from the first portion of the display. For example, user interface 617 of FIG. 6G depicts a key media item 617A (e.g., depicting the same image as representation 616C) displayed at a second portion of the display. The second portion in this example is near the top of the display, and the first portion is near the bottom, and thus they are distinct portions. In this example, key media item 617A is a slideshow of media items in the memory (discussed in more detail in the description of FIG. 6H).

In accordance with some embodiments, further in response to receiving the user input corresponding to selection of the first affordance, device 600 displays an animated transition of the representation of the first collection of media items transitioning into the key media item. For example, user interface 616B depicts an intermediate screen (between the display of 616A before the user input, and the display of detail user interface 617) during an exemplary animated transition. In some examples, the key photo smoothly transitions from the first position (e.g., a first portion of the display) in a sequence of representations of contextually relevant collections of media items (e.g., in a memory timeline) to the second position (e.g., a second portion of the display) in the detail user interface for the first collection of media items. In this example, in intermediate screen 616B, the representation 616C is shifting upward and to the left, and expanding, in order to animatedly transition to occupy the exemplary second portion occupied by key media item 617A in detail user interface 617. In some examples, other representations (or any other displayed content) also animatedly transitions. For example, the other representations in memory timeline 616B are also shifted upward and to the left, and expanded, during the animated transition. Animatedly transitioning the interface as described provides a clear visual cue to the user as to which memory they selected at the display of a memory timeline, and can thusly reduce the cognitive burden when navigating and interacting with an application for managing collections of photos.

In accordance with some embodiments, while displaying the detail user interface, device 600 displays a slideshow including a plurality of media items of the first collection of media items. For example, at FIG. 6H, memory detail view 618 includes slideshow 620. A slideshow is optionally included in a memory detail view, and can include a plurality of media items of the corresponding memory. For example, slideshow 620 depicts a media item from the corresponding memory (e.g., "Fourth of July 2019"), and can animatedly transition the display to display other media items of the collection of media items included in the memory.

Figure 6H:
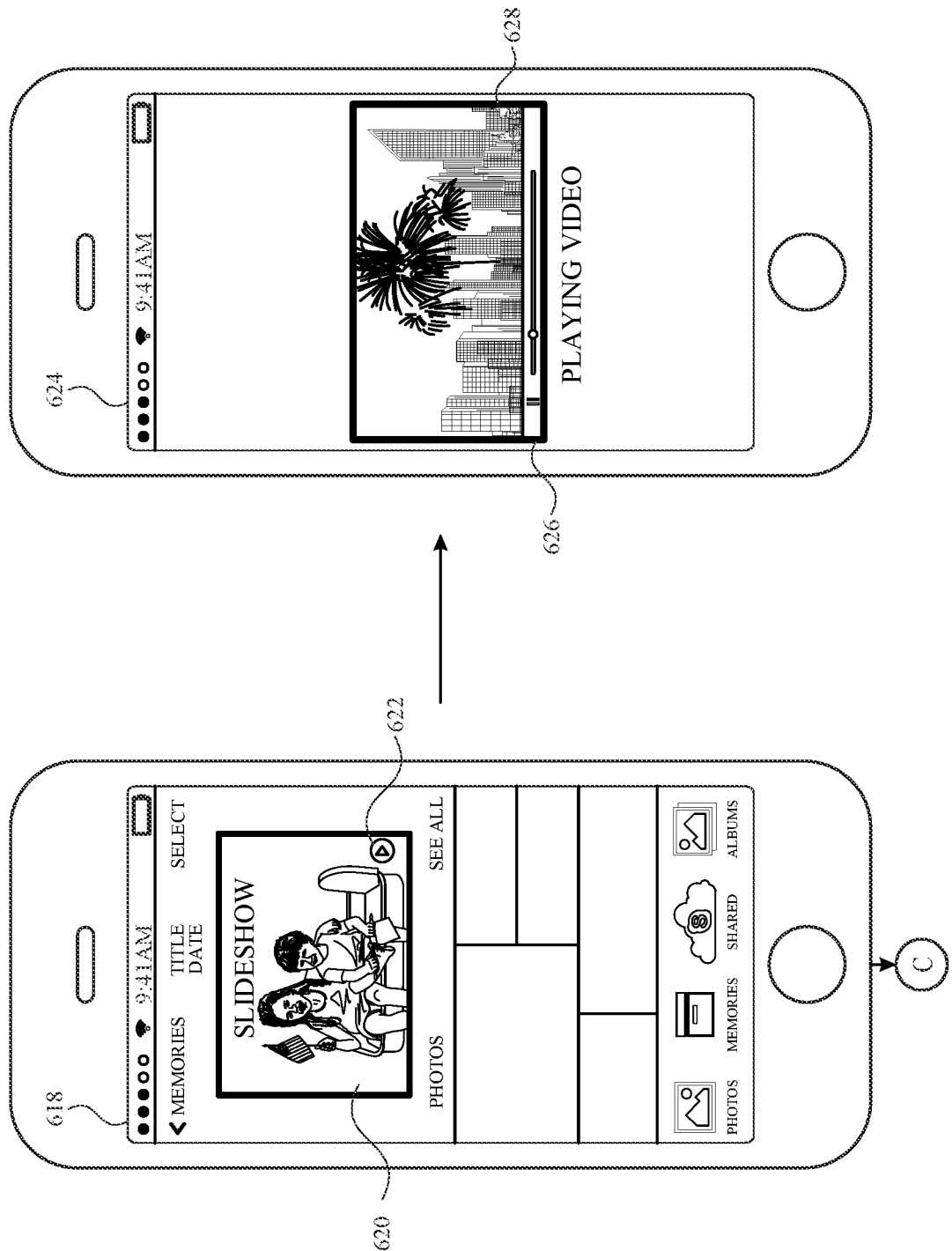

In accordance with some embodiments, device 600 receives user input corresponding to a selection of the slideshow and, in response, the device displays a video including a plurality of media items of the first collection of media items, wherein the slideshow and the video are different. For example, device 600 receives a user input touch (e.g., a "tap") on slideshow 620. In response to the tap, device 600 plays a video that is created from the media items of the corresponding memory. For instance, FIG. 6H depicts video playback interface 624, which is displayed in response to a tap on the slideshow 620 of memory detail view 618.

In some embodiments, the video and the slideshow are different. For example, the video and slideshow both include media items from the first collection of media items-however, the particular media items included in each are distinct. In other words, they use different pluralities of media items from the first collection. In some examples, the video and slideshow optionally include the same plurality of media items, however, the media items are displayed or arranged differently. For example, if the slideshow includes 10 images of a collection and a still frame image of a video in the collection, and the video includes the same 10 images but includes a video clip (instead of just a still frame) from the video in the collection, the slideshow and the video would thus be different.

In some examples, the media items included in the video are selected and/or presented to optimize for presentation as a video. For example, the media items included in the video can include a higher proportion of video media items (and/or audio from video media items) as compared to a slideshow, which can include a relatively higher proportion of still images or still frames from videos.

In some embodiments, a slideshow includes an indicator, an affordance, or the like, to indicate that it is selectable to play a video. For example, slideshow 620 includes play indicator 622, notifying the user that a video can be played.

In some embodiments, displaying a video including a plurality of media items of the first collection of media items in response to receiving the user input corresponding to a selection of the slideshow causes device 600 to display a full screen presentation of the video. For example, FIG. 6H depicts full screen interface 624, which includes the video 628 in a full screen view. In some examples, the full screen interface 624 includes play, pause, and/or seek affordances. For example, affordances menu 626 includes a play/pause affordance and a seek bar (e.g., to scrub to different times in the video). Full screen 624 depicts the video in a portrait orientation, however, in some embodiments the full screen presentation can be displayed in landscape orientation. In some embodiments, the orientation of the video is dependent on an orientation of device 600 (e.g., whether the device is currently positioned vertically or horizontally).

In some embodiments, the video replaces display of the slideshow, and plays in the portion of the display where the slideshow was displayed. For example, the slideshow 620 of memory detail view 618 is optionally replaced with the presentation of a video (e.g., video 628), while maintaining display of the remaining portions. In some embodiments, the video is displayed while still displaying a portion of a detail user interface, but does not replace the portion of the display occupied by the slideshow.

Figure 6I:
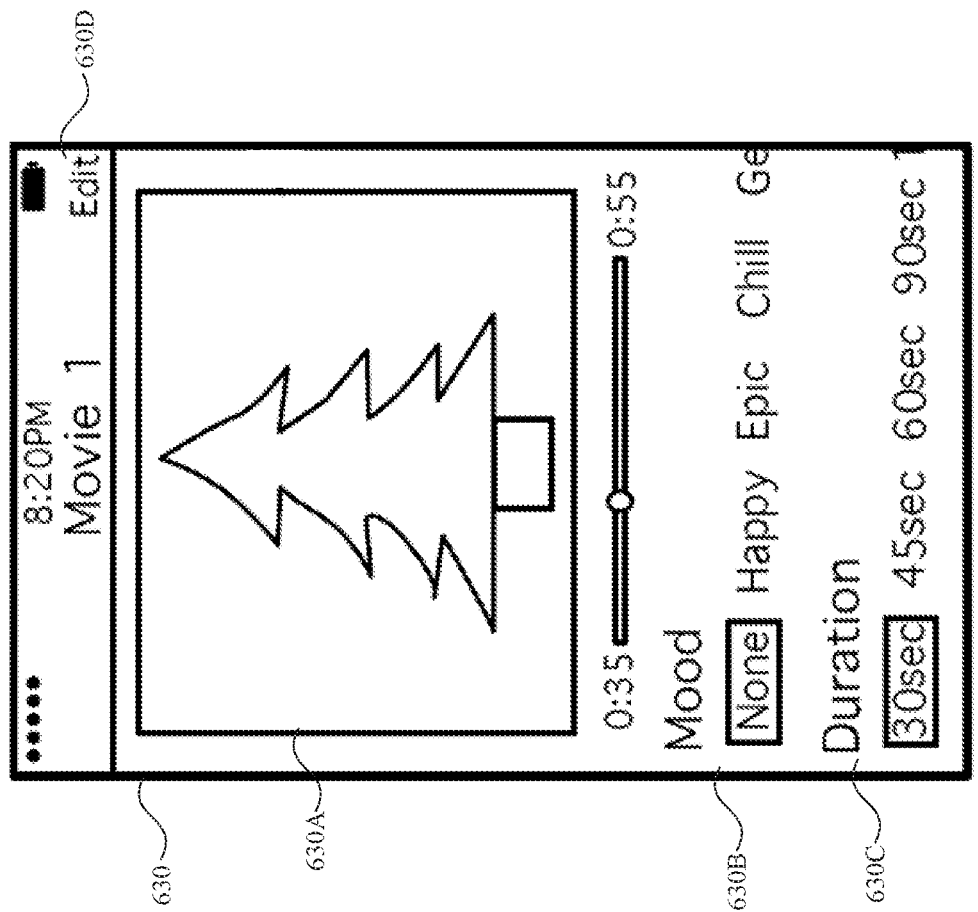

In accordance with some embodiments, while displaying the video, the user can provide video editing inputs to edit the content of the video. For example, device 600 receives a user input (having a first characteristic intensity) on video 628, and determines that the user input meets an intensity-dependent criteria, wherein the intensity-dependent criteria is satisfied when the characteristic intensity of the user input exceeds a threshold intensity (e.g., a deep press intensity threshold). In response to receiving the user input (corresponding to the request to edit the video), device 600 displays a video editing user interface. For example, an exemplary video editing user interface 630 is shown in FIG. 6I. In some examples, at a video editing user interface, the user can edit the mood, the title, the text fonts, and the like. In some examples, the video is generated automatically, and the user may desire to alter certain aspects of the video (e.g., a request to change a length of the video or a theme of the video). In some embodiments, the video is a compilation of still images, videos and, optionally, still images paired with audio and/or images captured close in time to a primary image (sometimes referred to as a "live photo").

In accordance with some embodiments, device 600 receives user input corresponding to a request to edit the slideshow. For example, device 600 receives a user input (having a first characteristic intensity) on the slideshow 620 of memory detail user interface 618, and determines that the user input meets an intensity-dependent criteria, wherein the intensity-dependent criteria is satisfied when the characteristic intensity of the user input exceeds a threshold intensity (e.g., a deep press intensity threshold). In response to receiving the user input (corresponding to the request to edit the slideshow), device 600 displays a slideshow editing user interface. An exemplary slideshow editing user interface is not depicted, however, can be similar or identical to video editing user interface 630 shown in FIG. 6I and described above. In some examples, at a slideshow editing user interface, the user can edit the mood, the title, the text fonts, and the like. In some examples, the slideshow is generated automatically, and the user may desire to tweak certain aspects of the slideshow.

Video editing user interface 630 illustrates how the UI of the application allows the user to change the content that the application automatically picks for the composite presentation. Video editing user interface 630 includes a viewer 630A, a mood slider 630B, and a duration slider 630C. Video editing user interface 630 also includes an edit affordance 630D. In some examples, in response to the selection of the edit affordance 630D, device 600 displays several edit controls, such as (1) a transition control for modifying one or more device-selected transitions in a composite presentation, (2) a music control for modifying a song (e.g., an audio clip) that is used to automatically generate a song for the composite presentation, (3) an effects control for modifying one or more device-specified effects for the composite presentation, (4) a title control for modifying one or more device-generated titles (e.g., textual identifier) for the composite presentation, and (5) a content control for adding media items and/or removing media items automatically selected for the composite presentations. Selection of any of these controls would direct the application to present one or more additional controls for effectuating the operation associated with the selected control. Video editing user interface 630 also depicts a composite presentation playing in the viewer 630A.

Additional description of techniques for video and slideshow editing can be found in U.S. Provisional Patent Application No. 62/235,550, "Novel Media Compositing Application", filed Sep. 30, 2015, and U.S. Provisional Patent Application No. 62/235,552, "Novel Media Compositing Application" filed Sep. 30, 2015, the contents of which are hereby incorporated by reference in their entirety.

Figure 6J:
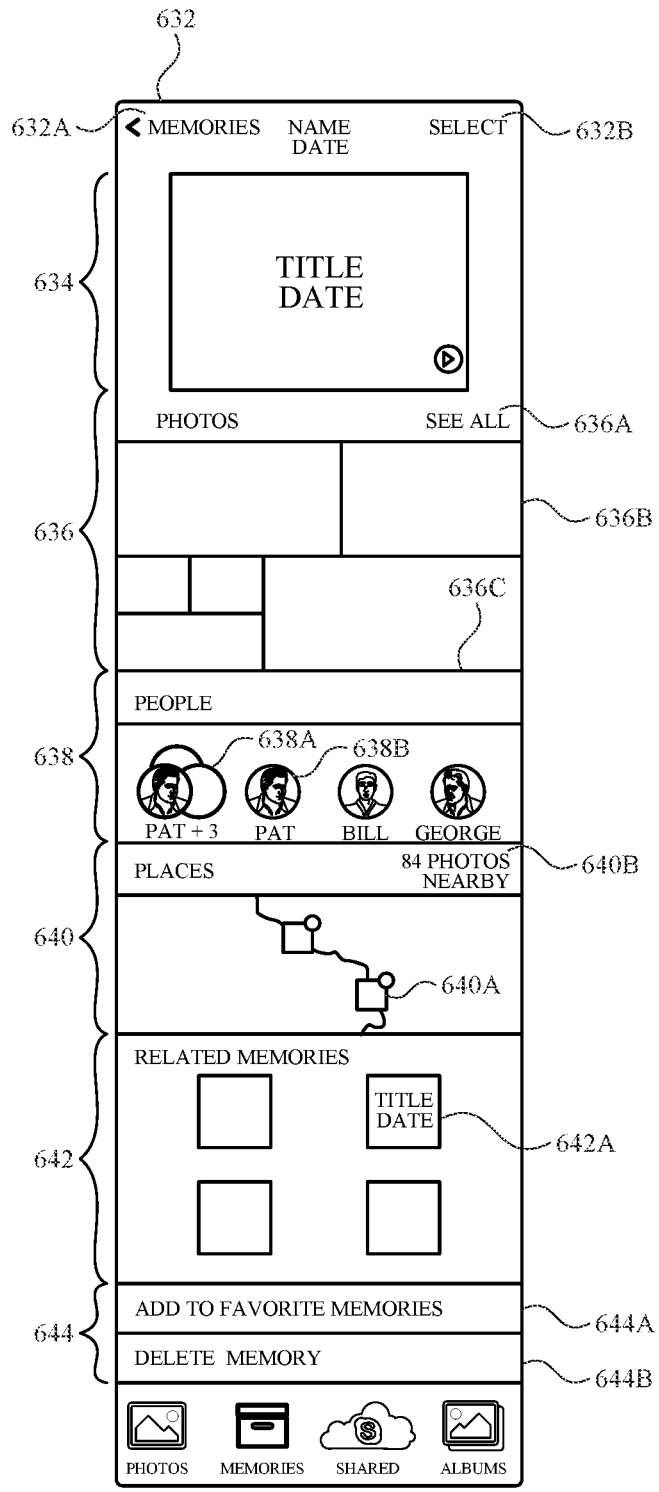

FIG. 6J illustrates an exemplary detail user interface 632 (otherwise referred to as memory detail view 632). Memory detail view 632 includes a plurality of regions 634-644, each of which contains content related to the corresponding memory organized by category in a user-friendly manner. The contents and functions of each region are explained in turn below, with reference to FIGS. 6J-6R.

In accordance with some embodiments, the first detail user interface includes a key media item region. For example, key media item region 634 depicts an exemplary key media item region. Key media item region optionally includes a slideshow. In some examples, key media item region includes the slideshow and video content and functionality as described with regard to FIG. 6H above.

In accordance with some embodiments, the first detail user interface includes a first region that includes a portion of the media items of the first collection of media items. For example, in FIG. 6J, the memory detail view 634 includes photos region 636, an exemplary first region. Photos region 636 includes see all affordance 636A and media items 636B and 636C. In some embodiment, media items 636B and 636C are representations of media items (e.g., photos, videos) included in the corresponding collection of media items. In some examples, media items included in a photos region are reduced-size depictions of media items included in the corresponding collection of media items.

In some embodiments, the first region (e.g., photos region 636) includes a curated view including a subset of the media items of the first collection of media items. For example, the media items displayed at memory detail view (e.g., 636B and 636C) of FIG. 6J do not represent all of the media items in the corresponding collection of media items. In this example, only 6 photos are depicted (e.g., represented by the blocks in photos region 636), however the collection contains 20 photos. In some embodiments, the subset of media items is selected so as to exclude lower quality photos. For example, the media items included in the subset are selected so as to exclude photos having one or more of the following qualities: blurry, depicts a person with eyes closed, poor framing or composition, excessive noise, or the like. In some examples, photos are selected so as to exclude photos depicting substantially the same subjects. For example, a user may have taken three photos of a landmark in order to ensure at least one good photo was captured. At the display of a curated view, only one such photo is optionally displayed. This allows space on the display to be conserved for displaying other photos of interest, rather than the redundant display of a three substantially-similar photos (of which the user is only interested in viewing one).

Figure 6L:
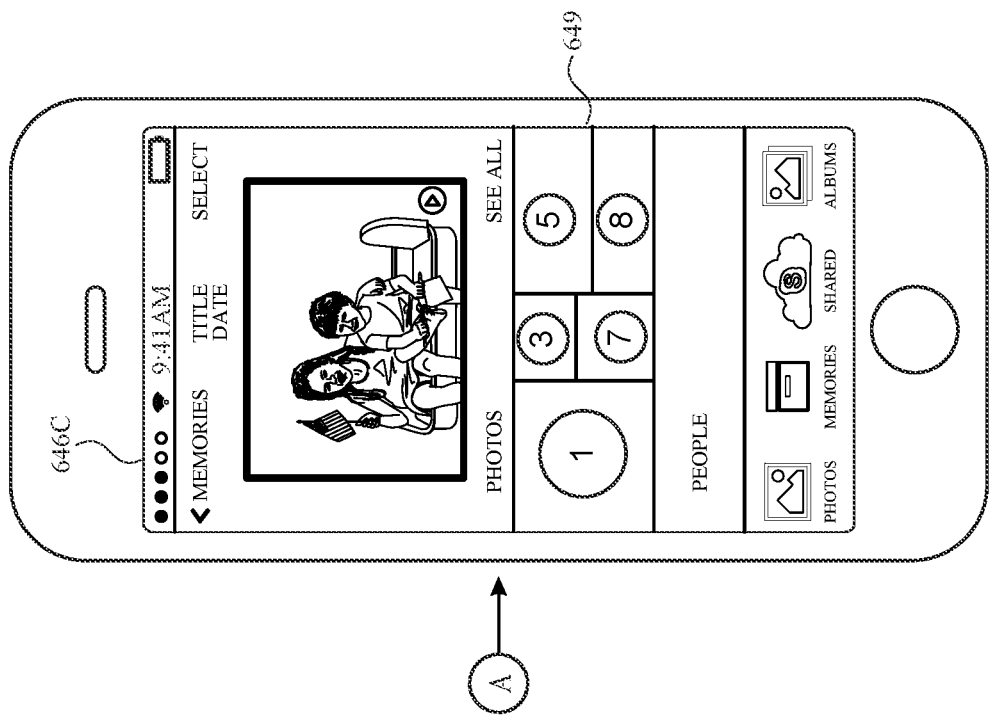

In accordance with some embodiments, the first region (e.g., photos region 636) further comprises a second affordance. For example, see all affordance 636A depicts an exemplary second affordance. Device 600 receives user input corresponding to selection of the second affordance and, in response, displays an expanded view including representations of additional media items of the first collection of media items that were not displayed prior to receiving the input corresponding to selection of the second affordance. For example, in response to receiving selection of see all affordance 636A, device 600 displays an expanded view that includes all of the photos in the corresponding memory. This operation is depicted in FIGS. 6K and 6L.

FIG. 6K depicts an exemplary memory detail user interface 646A. In the example depicted, device 600 receives user input corresponding to selection of see all affordance 648. In response, device 600 displays an expanded view, which depicts exemplary additional media items of the collection that were not displayed prior to the input selection of see all affordance 648. For instance, in memory detail user interface 646B, the photos numbered 1 through 9 are displayed after see all affordance 648 of memory detail user interface 646A is selected. However, only the photos numbered 1, 3, 5, 7, and 8 were displayed prior to selection of see all affordance 648. In this example, the photos numbered 2, 4, 6, and 9 are all additional photos which are included in the memory, but not as part of the curated view.

In accordance with some embodiments, the media items of the first collection of media items are arranged in a uniform grid in the expanded view. For example, the photos numbered 1 through 9 in memory detail view 646B are evenly-sized depictions of media items, arranged on a uniform grid. The arrangement of media items in a grid is a useful visual cue to the user that they are currently viewing additional (e.g., or all) media items of the memory, in an expanded view.

In accordance with some embodiments, in response to receiving the user input corresponding to selection of the see all affordance, device 600 displays a hide all affordance. For example, memory detail view 646B includes an exemplary hide all affordance 650. In this example, hide all affordance 650 is displayed in the same position as see all affordance 648, which is no longer displayed. In some examples, a hide all affordance is displayed in a different position than was the see all affordance. At memory detail view 646B, device 600 receives user selection of hide all affordance 650 and, in response, displays memory detail view 646C of FIG. 6L.

FIG. 6L depicts memory detail view 646C, which illustrates an exemplary memory detail view after selection of a hide all affordance. As can be seen in memory detail view 646C, additional photos numbered 2, 4, 6, and 9 are no longer displayed in response to selection of the hide all affordance 650. Thus, memory detail view 646C returns to its previous curated view, and thus is identical to memory detail view 646A in this example.

In accordance with some embodiments, the subset of media items in the curated view are arranged chronologically based on times associated with the media items of the subset of media items. For example, the items in the curated view can be arranged in a sequence wherein the time associated with the first photo is the earliest in time, and wherein the time associated with the last photo in the sequence is the most recent in time. In some examples, this sequence order is reversed. In some embodiments, the time associated with the media items are determined based on a timestamp such as the date/time that the image was taken (e.g., captured by a device). This information can be determined, for example, based on metadata, Exif data, or the like.

In accordance with some embodiments, the subset of media items included in the curated view are arranged in a curated arrangement, and the subset of media items included in the curated arrangement of media items are arranged so that edges of the media items are aligned so as to create substantially straight borders at the top and the bottom of the curated arrangement. For example, the subset of media items can be selected, sized, and/or positioned to create a curated arrangement. An exemplary curated arrangement is shown in curated view 649 in the photos region of memory detail view 646C. The media items included in curated view 649 were selected, sized, and/or positioned (into the curated arranged) such that the bottom edge of curated view 649 has a substantially straight (or straight) border. In some examples, the substantially straight border extends across a full width of the subset of media items in the curated arrangement. For example, the substantially straight border on the bottom of curated view 649 extends the full width of the subset of media items (in this example, extended to the vertical edges of the display). By creating a straight border at the top and the bottom of the curated arrangement, device 600 maximizes the display space used in the region (e.g., and other regions that abut each other at straight borders), which is important in smaller devices. By reducing the amount of unused display space, and populating the space with useful content interesting to the user, device 600 reduces use of the display and excessive user inputs to request the display of additional data, thus saving device resources.

In accordance with some embodiments, the substantially straight border at the bottom of the curated arrangement is formed by a first plurality of the subset of media items included in the curated view. For example, as shown in memory detail user interface 646C, the substantially straight edge of the border of curated view 649 is formed by the edges of the photos/videos in the curated view of the memory, while maintaining the media items in a chronological order.

In accordance with some embodiments, the first plurality of media items includes a first media item having a first size and first aspect ratio and second media item having second size and second aspect ratio. In accordance with some embodiments, the first size and the second size are different. In accordance with some embodiments, the first aspect ratio and the second aspect ratio are different. In accordance with some embodiments, wherein the substantially straight border at the bottom of the curated arrangement is formed by the edges of adjacent media items of the first plurality of media items. For example, the straight edge of the border is formed by multiple adjacent media items (e.g., photos/videos) that, optionally, have different sizes and/or aspect ratios (e.g., the photos numbered 1, 7, and 8 in memory detail view 646C of FIG. 6L). For example, by forming the border of the photos with a straight edge made up of photos, the area of the display is utilized more efficiently, with less areas of wasted (e.g., empty) space. For example, there is no wasted display space between the photos section and an adjacent section (e.g., related people), when the sections are separated by a straight border, because the photos/videos fill all usable area up to the border within the photos section of the memory.

In some examples, the media items represented in the curated view are selected based on the original size of the media item. In accordance with some embodiments, device 600 selects the curated subset of media items from the media items of the first collection of media items based in part on the dimensions of the media items. For example, the media items can be selected so that they are not cropped excessively for display in the curated view. By maintaining the original dimension (or close to it) of an image, the integrity of the user's original composition is maintained. Furthermore, minimal resizing of the images, coupled with selecting images in order to form a substantially straight border is challenging, but can create more efficient use of the display and a more aesthetically pleasing result for a viewer.

In accordance with some embodiments, device 600 receives user input corresponding to selection of a third media item of the subset of media items included in the curated view. For example, at the display of a curated view of a memory, device 600 receives selection (e.g., a tap on) a representation of a media item. In response to receiving the user input corresponding to selection of the third media item of the subset of media items included in the curated view, device 600 displays the third media item and a scrubbing affordance. For example, device 600 displays exemplary media item view 654 of FIG. 6M in response to receiving a selection of representation of the photo 654A numbered 1 at a detail user interface displaying a curated view of photos in a collection (e.g., selection of the photo numbered 1 at memory detail view 646A of FIG. 6L). In response, device 600 displays exemplary one up view 654 of the selected media item. Exemplary one up view 654 includes exemplary scrubbing affordance 654B. As shown, scrubbing affordance 654B includes representations of media items included in the subset included in the curated view. For example, only photos numbered 1, 3, 5, 7, and 8 are included in the scrubbing affordance (e.g., less than all photos in the collection).

In accordance with some embodiments, device 600 receives user input corresponding to the scrubbing affordance and, in response, replaces the display of the third media item with the display of a fourth media item of the curated subset of media items while continuing to display the scrubbing affordance. For example, device 600 replaces the display of the currently displayed photo with a new photo in the one up view with the scrubbing affordance displayed concurrently therewith. In this example, one up view 656 depicts the user input selection of the photo numbered 8 (partially obscured in the figure by the representation of the user's finger) on the scrubbing affordance 656B (e.g., corresponding to scrubbing affordance 654B, but with an updated appearance due to the user selection). In response, device 600 now displays a one up view 656 of media item 656A, and the displayed scrubbing affordance 656B now depicts a reduced-sized representation of media item 656A as the largest representation. In some embodiments, the user can drag their finger along the scrubbing affordance (via a touch-sensitive surface or display) and navigate through one up views of media items, wherein the media item being contacted in the scrubbing affordance is displayed in the one up view. Thus, using a scrubbing affordance, a user can quickly navigate through one up views (e.g., enlarged displays) of media items in the memory. In this way, the scrubbing affordance can provide a quick tool for navigating and browsing a subset of media items.

In some examples, the media items represented by a scrubbing affordance include only media items of the subset of media items included in the curated view. Thus, if a user wants to browse the curated subset of photos as larger representations (rather than smaller ones, e.g., at the memory detail view), the user can do so quickly and intuitively. In some embodiments, the media items represented in the scrubbing affordance are all photos in the collection of media items. In some embodiments, whether the media items represented are the curated media items or all media items depends on whether the memory detail user interface was in the curated view or the expanded view when the user selection corresponding to the media item was received. For example, if in the curated view, the scrubbing affordance would only include the media items from the curated set.

In accordance with some embodiments, the fourth media item is selected based on a magnitude of the user input corresponding to the scrubbing affordance. For example, a faster or longer gesture (e.g., corresponding to a touch input on a touch-sensitive surface) will cause navigation through a larger number of media items, so that the fourth media item is a media item that is further away from the third media item in the set of media items than it would be for a slower or shorter gesture. In this way, the user can modulate the speed at which they navigate through images in the scrubbing affordance by adjusting a magnitude of their user input.

In accordance with some embodiments, device 600 receives user input corresponding to a swipe gesture and, in response, displays the fourth media item. For example, at the display of the photo numbered 1, device 600 receives one or more swipe gesture inputs, and displays the photo numbered 8 in response.

In accordance with some embodiments, the detail user interface includes a second region comprising a geographic map. For example, exemplary detail user interface 632 of FIG. 6J includes a map region 640. Map region 640 depicts a geographic map that includes an exemplary location indicator 640A. Memory detail view 658 of FIG. 6N also depicts an exemplary map region 658A.

In some embodiments, if there is no location associated with a media item (or such information is unavailable), the map region is not displayed.

In some embodiments, device 600 receives user input corresponding to selection of the geographic map in the second region and, in response, replaces display of the detail user interface with the display of a geographic map view. For example, in response to the user input selection of (e.g., tap 659 on) the geographic map of map region 658A of memory detail user interface 658, device 600 displays expanded geographic map view 660. In some embodiments, the geographic map view includes the location indicator corresponding to the location associated with a fifth media item, and the geographic map view includes a third affordance. For example, exemplary geographic map view 660 also depicts the geographic map, and includes location indicators 660A and 660B, representing locations of media items, and a show nearby photos affordance 660C.

In accordance with some embodiments, to display the detail user interface further, device 600 displays a location indicator on the geographic map corresponding to a location associated with a fifth media item of the first collection of media items. For example, exemplary location indicators 658B and 658C are shown in the geographic map of map region 658A of FIG. 6N. In some examples, an indicator is a reduced-scale representation of a media item which is associated with it. For example, the indicator is a reduced-scale version of the fifth media item. In some examples, a location associated with a media item can be determined based on location data associated with a media item, such as metadata, Exif data, or the like. In some examples, a location associated with a media item represents a location where the media item (e.g., photo, video) was taken.

In accordance with some embodiments, the geographic map displays one or more indicators of a plurality of different media items in the first collection at different locations in the map that correspond to locations at which the media items were captured. In some embodiments, a single indicator represents one or more media items.

In accordance with some embodiments, the scale of the map is selected so as to include all of the locations that correspond to media items in the first collection. For example, the zoom level of the geographic map can be selected so that each indicator corresponding to a media item of the first collection is displayed concurrently on the geographic map. In some examples, the zoom level is selected thusly, and such that, while still being zoomed close to the location of the media items, the media items are roughly centered in the geographic map and there are not large borders between the edge of the map and the location of the nearest media item.

In accordance with some embodiments, while displaying the geographic map, device 600 displays a third affordance. Device 600 receives user input corresponding to selection of the third affordance and, in response, displays an additional location indicator in the geographic map view corresponding to the location of a media item that is not included in the first collection of media items. For example, device 600 receives selection of show nearby photos affordance 660C of expanded geographic map view 660 of FIG. 6N. In response, device 600 displays expanded geographic map view 662, as shown in FIG. 6O, which includes exemplary additional location indicators 662A and 662B. The additional location indicators are indicators corresponding to the location of nearby photos, which are not part of the memory. While viewing a geographic map of a memory, a user may desire to see other photos from nearby the location associated with the memory. The show nearby photos (e.g., or videos)

affordance allows them to do so, saving the user from having to perform a series of extra navigation steps to find the desired media items.

In accordance with some embodiments, the scale of the map is maintained when entering the geographic map view and/or when displaying the additional location indicator. For example, between expanded geographic map views 660 and 662, the zoom level of the map did not change when the additional indicators were added.

In accordance with some embodiments, the scale factor is changed slightly but the centering of the map is maintained, so that the additional location indicator indicates other media items that were captured at locations near where media items in the memory were captured.

In accordance with some embodiments, subsequent to displaying the additional location indicator, device 600 displays a fourth affordance. For example, device 600 displays hide nearby photos affordance 662C at expanded geographic map view 662. In some examples, the fourth affordance is the same affordance as the third affordance. For example, show nearby photos affordance 660C is replaced by hide nearby photos affordance 662C. In some examples, the affordances are distinct (e.g., in distinct positions). Device 600 receives user input corresponding to selection of the fourth affordance and, in response, ceases to display the additional location indicator in the geographic map view. For example, in response to receiving selection of hide nearby photos affordance 662C, device 600 can display expanded geographic map view 660 again, and cease displaying indicators 662A and 662B. In some examples, device 600 does so while maintaining a scale and/or centering of the map view.

In accordance with some embodiments, device 600 receives user input corresponding to selection of the location indicator and, in response, replaces the display of the geographic map view with the display of the fifth media item. For example, at expanded geographic map view, device 600 receives selection of indicator 660B, and displays one up view 664 in response. One up view 664A depicts a media item from the current memory, media item 664A. One up view 664A also depicts a media item that is not from the current memory, media item 664B (on a scrubbing affordance). Media item 664B is displayed, for example, because device 600 entered the one up view 664 from the display of all nearby photos in view 662. Thus, media item 664B corresponds to a nearby media item (e.g., represented by 662A or 662B) not included in the memory, but associated with a location geographically close to a location associated with the memory. For instance, in the displayed example, the media item 664B depicts a snowman, which is not associated with the current memory (from July 4th), but which was taken near the photos of the current memory (e.g., during a different time of year, winter).

In accordance with some embodiments, the detail user interface includes a third region comprising an indicator corresponding to an identified face in a media item of the first collection of media items. For example, exemplary detail user interface 632 of FIG. 6J includes a people region 638, an exemplary third region. People region 638 depicts person indicators 638A and 638B corresponding to identified faces (e.g., of one or more persons) in the respective collection of media items. Memory detail view 666 of FIG. 6P also depicts an exemplary people region.

In accordance with some embodiments, device 600 receives user input corresponding to selection of the indicator corresponding to the identified face and, in response displays a fourth collection of media items. For example, device 600 receives selection of person indicator 666A (e.g., corresponding to the person named "Pat") and displays exemplary person detail view 668.

In some examples, a person detail view is similar or identical in content and arrangement (e.g., contains the same regions in the same order) as the memory detail view (e.g., as illustrated in FIG. 6J).

In accordance with some embodiments, the media items of the fourth collection of media items each include the identified face. For example, each of the media items in the collection represented by person detail view 668 depicts the corresponding person (e.g., Pat in this example). In other words, a person detail view, in some examples, is a memory that is specific to a certain person (e.g., after selection of the affordance, show only photos including the first person).

In accordance with some embodiments, the fourth collection contains media items that do not include the identified face.

In accordance with some embodiments, the fourth collection includes one or more suggested images that have a face that is similar to the identified face and for which the application requests confirmation from the user before identifying the face in the images as the identified face.

In accordance with some embodiments, the detail user interface for the fourth collection has one or more of the same sections as described herein with respect to the detail user interface of the first collection, but with faces, related memories, locations, key media item selected based on the fourth collection.

In some embodiments, if there are no face(s) or person(s) identified (or such information is unavailable) in a media item, the people region is not displayed.

In accordance with some embodiments, the detail user interface includes a fourth region. For example, exemplary detail user interface 632 of FIG. 6J includes a related memories region 642, an exemplary fourth region. Related memories region 642 depicts includes a representation of a collection of media items related to the collection of the current detail user interface (e.g., memory detail view). Representation 642A corresponds to a related collection of media items (also referred to as a "related memory" hereinafter). Memory detail view 670 of FIG. 6Q also depicts an example related memories region 670A.

In accordance with some embodiments, the fourth region comprises a representation of a fifth collection of media items that share a set of common characteristics, and a media item of the fifth collection of media items shares a first characteristic with a media item of the first collection of media items. A characteristic is any identifiable feature of, property of, or information associated with a media item. For example, a characteristic can include one or more of a tag, a keyword, a date, a storage location, an author, or the like, associated with a media item. In some examples, a characteristic is a contextual property. For example, a characteristic can include one or more of: a particular time range (e.g., last week; May 4-May 26), a particular day of the year (e.g., July 4th), a particular location or set of locations (e.g., Paris, France; Home; Yosemite National Park), particular person(s) included in a media item, and the like. In this example, the first collection shares a characteristic with the fifth collection. For instance, the memory of the current memory detail view 670 (e.g., the first collection) is a memory from the Fourth of July 2019. Related memory representation 670B represents an exemplary fifth collection (e.g., a related memory), and depicts children playing in the snow and making a snowman, and is a memory for the week of Dec. 26, 2019-Jan. 1, 2020. In this example, the shared characteristic between a media item of the first and a media item of the fifth collection is the identification of the faces of the user's children. For example, the faces of user's children are identified in a media item of the current memory (e.g., in media item 614 of FIG. 6F) and in also in a media item of the Dec. 26, 2019-Jan. 1, 2020 (e.g., in the media item depicted in representation 670B, showing the children playing in the snow). Accordingly, the shared characteristic between these two media items from different collections is the presence of one or more identified face (e.g., corresponding to a known individual). As should be apparent, if the current memory includes a media item depicting an identified group of people, the related memory can be an unrelated event (e.g., New Year's Eve 2014) that includes the group of people, and therefore the shared characteristic is the identified group of people appearing in at least one media item of the collection. This feature is particularly useful as it allows the user to intuitively access and view media items, that would otherwise automatically be stored chronologically, in a more relevant and intuitive interface. The interface described above saves the user form performing unnecessary and excessive inputs to locate media items that they desire to view by presenting very relevant content in a position where the user can easily access it, thus saving time and device resources.

Related memory affordance 670C also represents a related memory of a trip to the location Paris, France. For example, the memory of the Paris trip shares a characteristic with the Fourth of July 2019 memory in that they both correspond to a holiday. For instance, device 600 recognizes that the Fourth of July 2019 memory is associated with a holiday (July 4th in the United States) and that the Paris trip also coincided with a holiday (e.g., Memorial Day on May 25, 2020 in the United States, as the memory contains media items captured between May 4-May 26, 2020). Accordingly, each of these memories would share the characteristic that they contain media items associated with the day of the year of a holiday.

The shared characteristic between the current memory and the related memory does not need to be one of the characteristics of the sets of common characteristics shared by all media items of each respective memory. For example, if the current memory is Fourth of July 2019 (e.g., a memory grouped by date/event) and the related memory is Your Recent Trip (e.g., another memory grouped by a different date/event), the shared characteristic can be the identification of a person's face in photos from both memories. Thus, the memories are related to each other based on a person (e.g., a face), which is not the characteristic common to the items of each respective memory (e.g., which, in this example, is the date/event July 4 and the dates/event on May 3-May 5, respectively).

In accordance with some embodiments, device 600 receives user input corresponding to selection of the representation of the fifth collection of media items and, in response, displays a detail user interface that includes the fifth collection of media items. For example, in response to selection of the memory representation 670B, device 600 displays memory detail view 672 corresponding to the collection of media items corresponding to representation 670B.

In accordance with some embodiments, the detail user interface that includes the fifth collection of media items is displayed in a curated view. In this example, memory detail view 672 depicts an exemplary curated view in photos region 672B of the media items included in the exemplary fifth collection.

In accordance with some embodiments, the detail user interface for the fifth collection has one or more of the same sections as described herein with respect to the detail user interface of the first collection, but with faces, related memories, locations, key media item selected based on the fifth collection. In some examples, one or more of this selected content will differ from the content selected for the first collection.

In accordance with some embodiments, a collection of media items represented in the fourth region are dynamically selected when (or substantially near in time to when) the detail user interface is displayed. For example, as described below, a user may view a memory once and see a first set of related memories in the related memories region. Upon viewing the memory a second time (e.g., a day, a week, or a month later), device 600 displays, in FIG. 6R, a second set of related memories in the related memories region of the same memory. Specifically, in memory detail interface 676 of FIG. 6R, the memory represented by representation 676B has replaced the memory represented by representation 670C (of FIG. 6Q).

In accordance with some embodiments, subsequent to displaying the detail user interface that includes the first collection of media items, device 600 receives data representing a sixth collection of media items that share a set of common characteristics. For example, after displaying the memory detail view 670 that includes related memory representations 670B (e.g., for the week of Dec. 26, 2019-Jan. 1, 2020) and 670C (e.g., for a trip to Paris, France), device 600 receives data representing a new memory (e.g., the sixth collection of media items that share a set of common characteristics). In some embodiments, the sixth collection of media items is distinct from the first collection of media items. For example, the sixth collection is a different memory, than the first (e.g., corresponds to the user's birthday).

FIG. 6R depicts a favorite memories album user interface. In accordance with some embodiments, subsequent to displaying the detail user interface that includes the first collection of media items, device 600 receives user input corresponding to a request to display the detail user interface that includes the first collection of media items. For example, device 600 receives a request to view the first collection in a memory detail view for a second time. In this example, at favorite memories album interface 674, device 600 receives selection of memory representation 674A, which corresponds to the first collection (e.g., the Fourth of July 2019 memory). As can be seen, the favorite memories album user interface 674 is displayed while the user is browsing the albums section of a photos application (e.g., as illustrated by selected albums tab 674B).

In accordance with some embodiments, in response to receiving the user input corresponding to the request to display the detail user interface that includes the first collection of media items, device 600 displays the detail user interface and a representation of the sixth collection of media items in the fourth region. For example, after receiving selection of representation 674A, device 600 displays memory detail user interface 676, which is the detail user interface for the first collection. In this example, detail user interface 676 (e.g., viewing the memory a second time) is identical to the detail user interface 670 (e.g., viewing the memory a first time) except for the related memories region. In this example, representation 676A corresponds to 670A, however, representation 676B has replaced representation 670C. Representation 676B depicts kids playing soccer (also referred to as "football" hereinafter), and corresponds to a collection of media items captured at a football tournament that was played in by the user's children. For instance, device 600 could have determined that the football memory is more relevant to the first collection than the Paris, France memory, because the children are more prominently featured throughout the media items in the football memory. In some examples, device 600 determined that the user has been browsing media items of their children, and thus promotes the football memory in accordance with what the user is likely to view. In some examples, the display of a detail view of the sixth collection causes device 600 to navigate a photos application to a memories section (e.g., memories tab 676C is selected concurrently with memory detail view 676 and back navigation from the memory would cause device 600 to display a memory timeline). In some examples, device 600 stays in the albums section of a photos application (e.g., albums tab would remain selected and back navigation from memory detail view 676 would cause the device to display favorite memories album interface 674).

In accordance with some embodiments, the detail user interface for the sixth collection has one or more of the same sections as described herein with respect to the detail user interface of the first collection, but with faces, related memories, locations, key media item selected based on the sixth collection.

As touched on above, the user is optionally provided the ability to save a memory detail view for later viewing. In accordance with some embodiments, while displaying the detail user interface that includes the first collection of media items, device 600 displays a fifth affordance. For example, exemplary memory detail view 670 of FIG. 6Q, includes add to favorites affordance 670D. Device 600 receives user input corresponding to selection of the fifth affordance and, in response, associates an identifier of the first collection of media items with a list of selected collections of media items stored in memory. For example, in response to selection of add to favorites affordance 670D, device 600 associates the corresponding memory with a list of favorited memories in memory (e.g., in the device memory, or memory otherwise associated with the device).

As described above, after a memory detail view is favorited (which may be referred to as saving a memory), the device displays an affordance for the memory with other favorited detail memory views (e.g., in a "Favorite Memories" album). In accordance with some embodiments, the device receives user input corresponding to a request to view representations of collections of media items of the list of selected collections of media items. For example, the device receives a request to display the Favorite Memories album with the photos application (e.g., by navigating to an albums section (not depicted), and choosing the album titled Favorite Memories). In accordance with some embodiments, in response to receiving the user input corresponding to a request to view representations of collections of media items of the list of selected collections of media items, device 600 displays the representation of the first collection of media items. For instance, favorite memories album interface 674 of FIG. 6R includes representation 674A corresponding to the memory saved at memory detail view 670 (e.g., the Fourth of July 2019 memory). Notably, the representation 674A of the first collection of media items at favorite memories interface 674 matches the representation 610A of memory timeline 610. Thus, the representation optionally serves as a universal identifier for the memory regardless of the particular user interface used to access the memory detail view.

FIGS. 7A-7E is a flow diagram illustrating a method for viewing collections of media items that share a set of common characteristics, and content related thereto, using a device in accordance with some embodiments. Method 700 is performed at a device (e.g., 100, 300, 500) with a display. Some operations in method 700 are, optionally, combined, the order of some operations are, optionally, changed, and some operations are, optionally, omitted.

As described below, method 700 provides an intuitive way for viewing collections of media items that share a set of common characteristics and content related thereto. The method reduces the cognitive burden on a user for navigating excessive numbers of user inputs to browse for relevant media content, thereby creating a more efficient human-machine interface. For battery-operated computing devices, enabling a user to view relevant media faster and more efficiently conserves power and increases the time between battery charges.

The device receives (702) a request to display contextually relevant media. In some embodiments, the device opens a photos application (e.g., in response to selection of affordance 602A of FIG. 6A) or navigates to a memories tab of a photos application (e.g., in response to selection of memories tab 604A of FIG. 6B).

In response to the request (704), the device, in accordance with a determination that the device is in a first context (e.g., at a first time of day, at a first day of the week, at a first day of the year, in a first location, and/or with a first set of people), displays (706), on the display, a representation of a first collection of media items (e.g., representation 610A of FIG. 6D) that share a set of common characteristics (e.g., all belong to the same memory which corresponds to media captured within a particular time range at a particular location or set of locations) and are relevant to the first context.

In response to the request (704), the device, in accordance with a determination that the device is in a second context (e.g., at a second time of day, at a second day of the week, at a second day of the year, in a second location, and/or with a second set of people), displays (704), on the display, a representation of a second collection of media items (e.g., representation 612A of FIG. 6E) that share a set of common characteristics (e.g., all belong to the same memory which corresponds to media captured within a particular time range at a particular location or set of locations) and are relevant to the second context, wherein the second collection of media items is different from the first collection of media items. Thus, the device (e.g., device 600), by displaying a first representation of a first collection if a device is in a first context, or a second representation if the device is in a second context, provides the user with access to the a collection of media items relevant to a context that the device is in, without the need for numerous additional inputs, saving device resources and user time.

In accordance with a determination that the device is in the first context (e.g., at a first time of day, at a first day of the week, at a first day of the year, in a first location, and/or with a first set of people), the device displays (710) a representation of a third collection of media items (e.g., representation 610A of FIG. 6D; concurrently displayed with the representation of the first collection of media items) that share a set of common characteristics (e.g., all belong to the same memory which corresponds to media captured within a particular time range at a particular location or set of locations) and are relevant to the first context, wherein the first collection of media items are relevant to the first context based on a first contextual property (e.g., one relevant to current date) and the third collection of media items are relevant to the first context based on a second contextual property (e.g., one relevant to current location), and wherein the second contextual property is different from the first contextual property. Thus, the device (e.g., device 600), by displaying a representation of a third collection of media items that are relevant to the first context based on a second contextual property, provides the user with access to the third collection of media items without the need for numerous additional inputs.

In accordance with some embodiments, the representation of the first collection of media items includes a reduced-scale version of a media item selected from the first collection of media items (712) (e.g., representation 610A of FIG. 6D). In some examples, the representation of the first collection of media items includes reduced-scale versions of a plurality of the media items from the first collection of media items. In some examples, other representations of collections of media items described herein optionally include reduced-scale versions of one or more media items selected from the corresponding collection of media items.

In accordance with some embodiments, the device generates (714) a textual identifier (e.g., textual identifier 615A of FIG. 6F) associated with the first collection of media items (e.g., the memory represented by 610A of FIG. 6D), identifies a face in the selected media item, wherein the selected media item is an image, and displays the textual identifier overlaid on the representation of the first collection of media items, wherein the overlaid textual identifier does not overlap the identified face in the selected media item displayed as the representation of the first collection of media items (e.g., textual identifiers 615A and 615C of FIG. 6F). In some examples, the location of the text on in the representation is determined based at least in part on a location of faces in the selected media item (e.g., as depicted in FIG. 6F). In some examples, the selected media item (e.g., media item 614 of FIG. 6F) is cropped for display in the representation of the collection of media items, and the cropping is adjusted to move the face out from underneath the text (e.g., as shown in representations 614A and 614B of FIG. 6F). In accordance with some embodiments, the textual identifier associated with the first collection of media items is selected based on the relevance of the first collection of media items to the first context and includes one or more words that explain relevance of the first collection of media items to the first context (e.g., textual identifier 615A of FIG. 6F identifies the relevance to a context of the date, July 4th). Thus, the device (e.g., device 600), by selecting and displaying a textual identifier that explains the relevance of the collection to the first collection, provides the user with an automatically-generated visual indication of a contextual state that the device is in, signaling to the user the state of the device.

In accordance with some embodiments, the representation of the first collection of media items is a first affordance (716) (e.g., representation 610A of FIG. 6D). In accordance with some embodiments, the device receives user input corresponding to selection of the first affordance, and, in response to receiving the user input, displays (716), on the display, a detail user interface (e.g., detail user interface 611 of FIG. 6D; also detail user interface 632 of FIG. 6J) that includes at least a portion of the first collection of media items (e.g. images 611A of FIG. 6D; or curated view 649 of FIG. 6K). In some examples, the first collection of media items includes more media items than can be displayed on the display at once (e.g., photos numbered 1 through 9 in expanded view 652 of FIG. 6K), and displaying the detail user interface includes displaying a portion of the first collection of media items (e.g., displaying curated view 649 of FIG. 6K of only photos numbered 1, 3, 7, 5, and 8), wherein additional media items can be displayed in the detail view by scrolling the detail view. Thus, the device (e.g., device 600), by displaying a detail user interface for a collection of media items sharing a set of characteristics, including display of a portion of the collection, allows the use to view related and contextually-relevant content in a form optimized for presenting relevant content, rather than having the user manually determine and retrieve related media items, saving device resources and user time.

In accordance with some embodiments, prior to displaying the detail user interface, the device displays, on the display, the representation of the first collection of media items visually occupying a first portion of the display (e.g., representation 616C of FIG. 6G). Subsequent to receiving the user input corresponding to selection of the first affordance, and while displaying the detail user interface, the device displays, on the display, a key media item (e.g., key media item 617A of FIG. 6G) of the first collection of media items visually occupying a second portion of the display (e.g., portion occupied by key media item 617A of FIG. 6G., distinct from the first portion of the display. Further in response to receiving the user input corresponding to selection of the first affordance, the device displays, on the display, an animated transition of the representation of the first collection of media items transitioning into the key media item (e.g., memory timeline 616B of FIG. 6G depicts representation 616C transitioning into the portion of the key media item 617A in memory detail view 617).

In accordance with some embodiments, the device, while displaying the detail user interface, displays (718), on the display, a slideshow (e.g., slideshow 620 in FIG. 6H) including a plurality of media items of the first collection of media items (e.g., sequential display of media items 620 of FIG. 6H), receives (718) user input corresponding to a selection of the slideshow (e.g., selection of play affordance 622), and, in response to receiving the user input corresponding to the selection of the slideshow, displays (718), on the display, a video (e.g., video 628 of FIG. 6H) including a plurality of media items of the first collection of media items, wherein the slideshow and the video are different (e.g., as shown in FIG. 6H). In some examples, the video replaces display of the slideshow, and plays in the portion of the display where the slideshow was displayed (e.g., the portion occupied by slideshow 620 of FIG. 6H). In some examples, the video and slideshow are different and use different pluralities of media items from the first collection. For example, the video and slideshow both include media items from the first collection of media items—however, the particular media items included in each are distinct. In some examples, the video and slideshow use the same plurality of media items, however, those items are displayed or arranged differently. For example, the slideshow shows all images of a collection and a still frame image of a video in the collection, whereas the video includes all images but includes a clip (instead of simply a still frame) from same video in the collection. In some examples, while displaying the video the user can provide video editing inputs to edit the content of the video (e.g., a request to change a length of the video or a theme of the video). In some examples, the video is a compilation of still images, videos and, optionally, still images paired with audio and/or images captured close in time to a primary image (sometimes referred to as a "live photo"). Thus, the device (e.g., device 600), by displaying a video or a slideshow that both include content from the collection (but different) allows for the presentation of media that are optimized for viewing conditions, and thus efficiently uses the display when browsing relevant media by using the display in a way that is more likely to attract a user's attention and reduce the number of additional inputs to manually browse media items, saving device resources and user time.

In accordance with some embodiments, the device receives user input corresponding to a request to edit the slideshow (e.g., a deep press on slideshow 620 of FIG. 6H), and, in response to receiving the user input corresponding to the request to edit the slideshow, displays, on the display, a slideshow editing user interface (e.g., similar or identical to editing interface 630 in FIG. 6I).

In accordance with some embodiments, the detail user interface includes a first region (e.g., photos region 636 of FIG. 6J and FIG. 6K), wherein the first region includes a curated view (e.g., curated view 649 of FIG. 6K) including a subset of the media items of the first collection of media items and the subset of media items are selected so as to exclude lower quality photos (720). In some examples, the display is a curated view that includes a subset (e.g. less than all) photos and/or videos of the first collection. In accordance with some embodiments, the subset of media items in the curated view are arranged chronologically based on times associated with the media items of the subset of media items. Thus, the device (e.g., device 600), by displaying a curated view including a subset of media items that excludes lower quality photos, reduces the number of additional inputs needed as a user is browsing a set of media items, by not displaying lower quality photos that the user is likely to quickly dismiss from the display screen if presented, thus saving user time and device resources that would otherwise be consumed by displaying and receiving the additional user inputs dismissing lower quality photos from the display.

In accordance with some embodiments, the first region further comprises a second affordance (e.g., see all affordance 648 of FIG. 6K). In accordance with some embodiments, the device receives (722) user input corresponding to selection of the second affordance, and, in response to receiving the user input corresponding to selection of the second affordance, displays (722), on the display, an expanded view (e.g., expanded view 652 of FIG. 6K) including representations of additional media items (e.g., photos numbered 2, 4, 6, and 9 in expanded view 652 of FIG. 6K) of the first collection of media items that were not displayed prior to receiving the input corresponding to selection of the second affordance. Thus, the device (e.g., device 600), by providing the user with a curated view and an option to easily access an expanded view of additional media items, provides the user with access to more items in the collection of media items, without the need for numerous additional inputs to navigate a photos application to locate the additional photos excluded from the curate view, saving device resources and user time.

In accordance with some embodiments, the subset of media items included in the curated view (e.g., photos numbered 1, 3, 5, 7 and 8 of curated view 649 in FIG. 6K) are arranged in a curated arrangement and the subset of media items included in the curated arrangement of media items are arranged so that edges of the media items are aligned so as to create substantially straight borders at the top and the bottom of the curated arrangement (724) (e.g., top border 646B and bottom border 646C of FIG. 6K). In accordance with some embodiments, the substantially straight border at the bottom of the curated arrangement is formed by a first plurality of the subset of media items included in the curated view (e.g., the photos numbered 1, 7 and 8 in curated view 649 of FIG. 6K).

In accordance with some embodiments, the detail user interface includes a second region (e.g., map region 658A of FIG. 6N) comprising a geographic map (e.g., the map depicted in map region 658A). In accordance with some embodiments, displaying the detail user interface (e.g., detail user interface 658 of FIG. 6N) further comprises displaying (726), on the display, a location indicator (e.g., location indicator 959 of FIG. 6N) on the geographic map corresponding to a location associated with a fifth media item of the first collection of media items. In some examples, the geographic map displays indicators of a plurality of different media items in the first collection at different locations in the map that correspond to locations at which the media items were captured (e.g., map region 658A includes a plurality of indicators 658B and 658C, each representing 22 media items). In some examples, the scale (e.g., zoom level) of the map is selected so as to include all of the locations that correspond to media items in the first collection (e.g., map region 658A includes the indicators for all media items the collection of the memory). In some examples, the scale of the map is selected such that the media items are roughly centered in the geographic map and that there are no large borders between the edge of the map and the location of the nearest media item. Thus, the device (e.g., device 600), by displaying a location indicator corresponding to a media item of first collection as part of a detail user interface for the collection, provides the user with quick access to relevant location information for the a collection of media items, without the need for numerous additional inputs, saving device resources and user time.

In accordance with some embodiments, the device, while displaying the geographic map (e.g., at map view 660 of FIG. 6N), displays (728), on the display, a third affordance (e.g., show nearby photos affordance 660C of FIG. 6N), receives (728) user input corresponding to selection of the third affordance, and, in response to receiving the user input corresponding to selection of the third affordance, displays (728), on the display, an additional location indicator (e.g., indicators 662A and 662B in map view 662 of FIG. 6O) in the geographic map view (e.g., map view 662 of FIG. 6O) corresponding to the location of a media item (e.g., media item 664B of FIG. 6O) that is not included in the first collection of media items. In some examples, the scale of the map is maintained when entering the geographic map view and/or when displaying the additional location indicator. In some examples, the scale factor is changed slightly but the centering of the map is maintained, so that the additional location indicator indicates other media items that were captured at locations close to where media items in the memory were captured. In some examples, the device receives user input corresponding to selection of the geographic map in the second region (e.g., map region 658A of FIG. 6N). In some examples, in response to receiving the user input corresponding to selection of the geographic map in the second region, the device replaces display of the detail user interface with the display of a geographic map view (e.g., replaces display of detail user interface 658 with map view 660), wherein the geographic map view includes the location indicator (e.g., location indicator 660A) corresponding to the location associated with the fifth media item, and wherein the geographic map view includes a third affordance (e.g., show nearby photos affordance 660C of FIG. 6N). Thus, the device (e.g., device 600), by providing access to an additional location indicator corresponding to a media item not included in the first collection, provides the user with easy access to relevant media items that can be unrelated to the first collection except based on location, and thus provides the user with a useful way to access relevant media that would otherwise require numerous additional inputs to retrieve, saving device resources and user time.

In accordance with some embodiments, the detail user interface (e.g., detail user interface 666 of FIG. 6P of FIG. 6P) includes a third region (e.g., people region 666C) comprising an indicator (e.g., face indicator 666A; face indicator 666B) corresponding to an identified face in a media item of the first collection of media items. In accordance with some embodiments, the device receives (730) user input corresponding to selection of the indicator (e.g., face indicator 666A of FIG. 6P) corresponding to the identified face, and, in response to receiving user input corresponding to selection of the indicator corresponding to the identified face, displays (730), on the display, a fourth collection of media items (e.g., media items in photo region 668C of FIG. 6P), wherein the media items of the fourth collection of media items each include the identified face. In some examples, the fourth collection includes one or more suggested images (e.g., photos numbered 1-9 in FIG. 12G) that have a face that is similar to the identified face and for which the application requests confirmation from the user before identifying the face in the images as the identified face. In some examples, the detail user interface for the fourth collection (e.g. detail user interface 668 of FIG. 6P) has one or more of the same sections as described herein with respect to the detail user interface of the first collection, but with faces, related memories, locations, key media item selected based on the fourth collection (e.g. detail user interface 646C of FIG. 6L). Thus, the device (e.g., device 600), by displaying an indicator corresponding to an identified face in a media item of first collection as part of a detail user interface for the collection, provides the user with quick access to relevant information identifying the individuals depicted in a collection of media items, without the need for numerous additional inputs, for instance to review all of the images to determine a person's attendance, saving device resources and user time.

Figure 6Q:
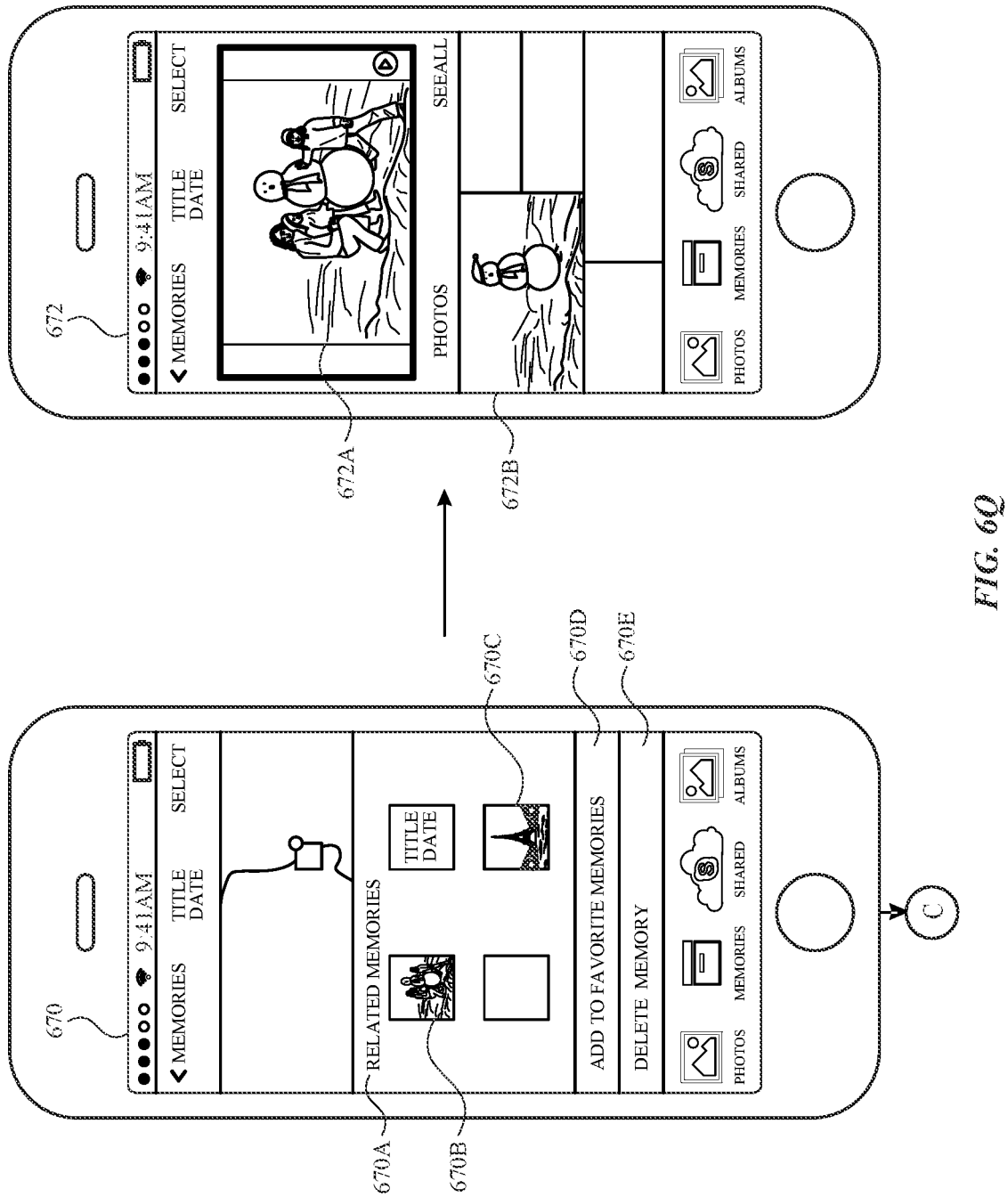
Figure 6R:
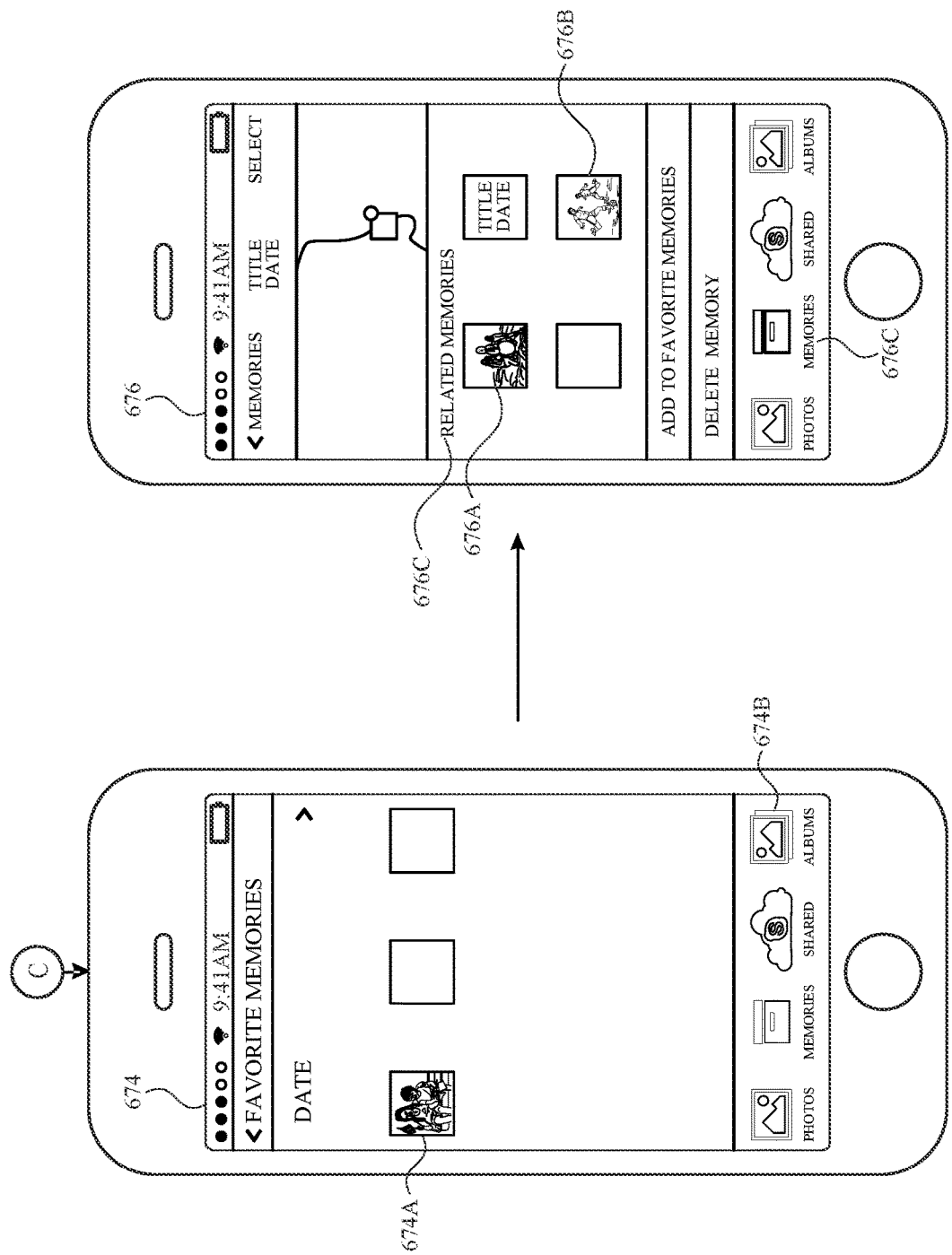

In accordance with some embodiments, the detail user interface includes a fourth region (e.g., related memories region 670A in FIG. 6Q comprising a representation (e.g., representation 670B of FIG. 6Q) of a fifth collection of media items that share a set of common characteristics, and wherein a media item of the fifth collection of media items shares a first characteristic with a media item of the first collection of media items (732). In accordance with some embodiments, the device receives (732) user input corresponding to selection of the representation of the fifth collection of media items (e.g., of representation 670B of FIG. 6Q), and, in response to receiving the user input corresponding to selection of the representation of the fifth collection of media items, displays (732), on the display, a detail user interface that includes the fifth collection of media items (e.g., detail user interface 672 of FIG. 6Q). In some examples, a characteristic includes a particular time range, a particular day of the year, a particular location or set of locations, and/or a particular person(s) included in a media item. In some examples, the first collection shares a characteristic with the fifth collection. In some examples, the shared characteristic between the current memory and the related memory does not need to be one of the characteristics of the sets of common characteristics shared by all media items of each respective memory. In some examples, the detail user interface for the fifth collection has one or more of the same sections as described herein with respect to the detail user interface of the first collection, but with faces, related memories, locations, and/or key media item selected based on the fifth collection. Thus, the device (e.g., device 600), by displaying a representation of a collection of media items that shares a characteristic with a currently viewed collection, as part of a detail user interface for the current collection, provides the user with quick access to other collections of media relevant to the user's current browsing activity, collections which otherwise would require numerous additional inputs for access by the user, thus saving device resources and user time.

In accordance with some embodiments, subsequent to displaying the detail user interface that includes the first collection of media items (e.g., memory detail user interface 646C of FIG. 6L), the device receives (734) data representing a sixth collection of media items (e.g., represented by representation 676B in FIG. 6R) that share a set of common characteristics, wherein the sixth collection of media items is distinct from the first collection of media items, and receives (734) user input corresponding to a request to display the detail user interface that includes the first collection of media items (e.g., selection of representation 674A in FIG. 6R). In response to receiving the user input corresponding to the request to display the detail user interface that includes the first collection of media items, the device displays (734), on the display, the detail user interface (e.g., detail user interface 676 of FIG. 6R) and a representation of the sixth collection of media items (e.g., representation 674A in FIG. 6R) in the fourth region (e.g., related memories region 676C). In some examples, the detail user interface for the sixth collection has one or more of the same sections as described herein with respect to the detail user interface of the first collection, but with faces, related memories, locations, and/or key media item selected based on the sixth collection. Thus, the device (e.g., device 600), by displaying a representation for a collection of media items that was created after a pre-existing collection of media items, and in a detail view for that pre-existing collection, provides the user with access to relevant media that is dynamically determined, even after creation of the collection, and without the need for numerous additional inputs, for instance to regenerate a collection to create new associations, thus saving device resources and user time.

In accordance with some embodiments, while displaying the detail user interface (e.g., detail user interface 670 of FIG. 6Q) that includes the first collection of media items, the device displays, on the display, a fifth affordance (e.g., add to favorite memories affordance 670D of FIG. 6Q), receives user input corresponding to selection of the fifth affordance, and, in response to receiving the user input corresponding to selection of the fifth affordance, associates an identifier of the first collection of media items with a list of selected collections of media items stored in memory (e.g., favorite memories album represented at interface 674 of FIG. 6R). Thus, the device (e.g., device 600), by displaying an affordance that allows a user to associate a collection with a list of selected collections, provides the user with quick access to return to a display of a collection of media items, without the need for numerous additional inputs, saving device resources and user time.

In accordance with some embodiments, the first plurality of media items includes a first media item having a first size and first aspect ratio (e.g., photo numbered 1 in curated view 649 of FIG. 6K) and second media item having second size and second aspect ratio (e.g., photo numbered 7 in curated view 649 of FIG. 6K), the first size and the second size are different, the first aspect ratio and the second aspect ratio are different, and the substantially straight border (e.g., border 646C of FIG. 6K) at the bottom of the curated arrangement is formed by the edges of adjacent media items of the first plurality of media items. In accordance with some embodiments, the device selects the curated subset of media items from the media items of the first collection of media items based in part on the dimensions of the media items (e.g., media items numbered 1, 3, 5, 7, an 8 of FIG. 6K). Thus, the device (e.g., device 600), by selecting the media items of the curated set based on their dimensions, the device can efficiently utilize the given screen space by creating a view which maximizes the space used to display images, while maintaining aesthetic integrity of the original dimensions of the image, thus saving device resources.

In accordance with some embodiments, the device receives user input corresponding to selection of a third media item (e.g., media item numbered 1 in FIG. 6L) of the subset of media items included in the curated view (e.g., curated view 649 in FIG. 6L). In response to receiving the user input corresponding to selection of the third media item of the subset of media items included in the curated view, the device displays, on the display, the third media item (e.g., in one up view 654 of FIG. 6M, wherein the media item is displayed at position 654A) and a scrubbing affordance (e.g., scrubbing affordance 654B of FIG. 6M), receives user input corresponding to the scrubbing affordance (e.g., input associated with media item 656B in FIG. 6M). In response to receiving the user input corresponding to the scrubbing affordance, the device replaces the display of the third media item (e.g., media item numbered 1 in FIG. 6M) with the display of a fourth media item (e.g., media item numbered 8 in FIG. 6M) of the curated subset of media items while continuing to display the scrubbing affordance. In some examples, the fourth media item is selected based on a magnitude of the user input corresponding to the scrubbing affordance. Thus, the device (e.g., device 600), by displaying a media item and providing a scrubbing affordance allowing for easy navigation between media items of the curated subset, the device provides the user with a quick way to view the higher quality images in a collection, without having to navigate through lower quality or redundant media items, thereby reducing the need for numerous additional inputs and additional use of the display, saving device resources and user time.

In accordance with some embodiments, subsequent to displaying the additional location indicator, the device displays, on the display, a fourth affordance (e.g., hide nearby photos affordance 662C of FIG. 6O), receives user input corresponding to selection of the fourth affordance, and, in response to receiving the user input corresponding to selection of the fourth affordance, ceases to display the additional location indicator (e.g., ceases display of location indicator 662B of FIG. 6O and returns to the display of geographic map view 660 of FIG. 6N) in the geographic map view. Thus, the device (e.g., device 600), by displaying an affordance that provides the user an easy way to return to browsing only the location indicators of the curated set, the user can more efficiently browse a reduced subset of items and thus avoid numerous additional inputs associated with navigating through larger collections of media, saving device resources and user time.

In accordance with some embodiments, the device receives user input corresponding to selection of the location indicator (e.g., location indicator 660B in FIG. 6O), and, in response to receiving user input corresponding to selection of the location indicator, replaces the display of the geographic map view with the display of the fifth media item (e.g., displays media item 664A as shown in FIG. 6O). Thus, the device (e.g., device 600) provides the user with a way to easily access a one up display of a media item from a geographic map view so the user can easily browse media items and locations, without the need for numerous additional inputs associated with accessing a separate maps application, saving device resources and user time.

In accordance with some embodiments, the device receives user input corresponding to a request to view representations of collections of media items of the list of selected collections of media items (e.g., navigation to the favorite memories album interface 674 of FIG. 6R), and, in response to receiving the user input corresponding to a request to view representations of collections of media items of the list of selected collections of media items, displays, on the display, the representation of the first collection of media items (e.g., representation 674A of FIG. 6R).

Note that details of the processes described above with respect to method 700 (e.g., FIG. 7) are also applicable in an analogous manner to the methods described below. For example, methods 1000, 1300, and 1600 optionally include one or more of the characteristics of the various methods described above with reference to method 700. For example, for example, a detail user interface for a media item can be accessed at the display of any collection of media items accessed in accordance with methods 1000, 1300, and 1600. For brevity, these details are not repeated below.

Figure 8:
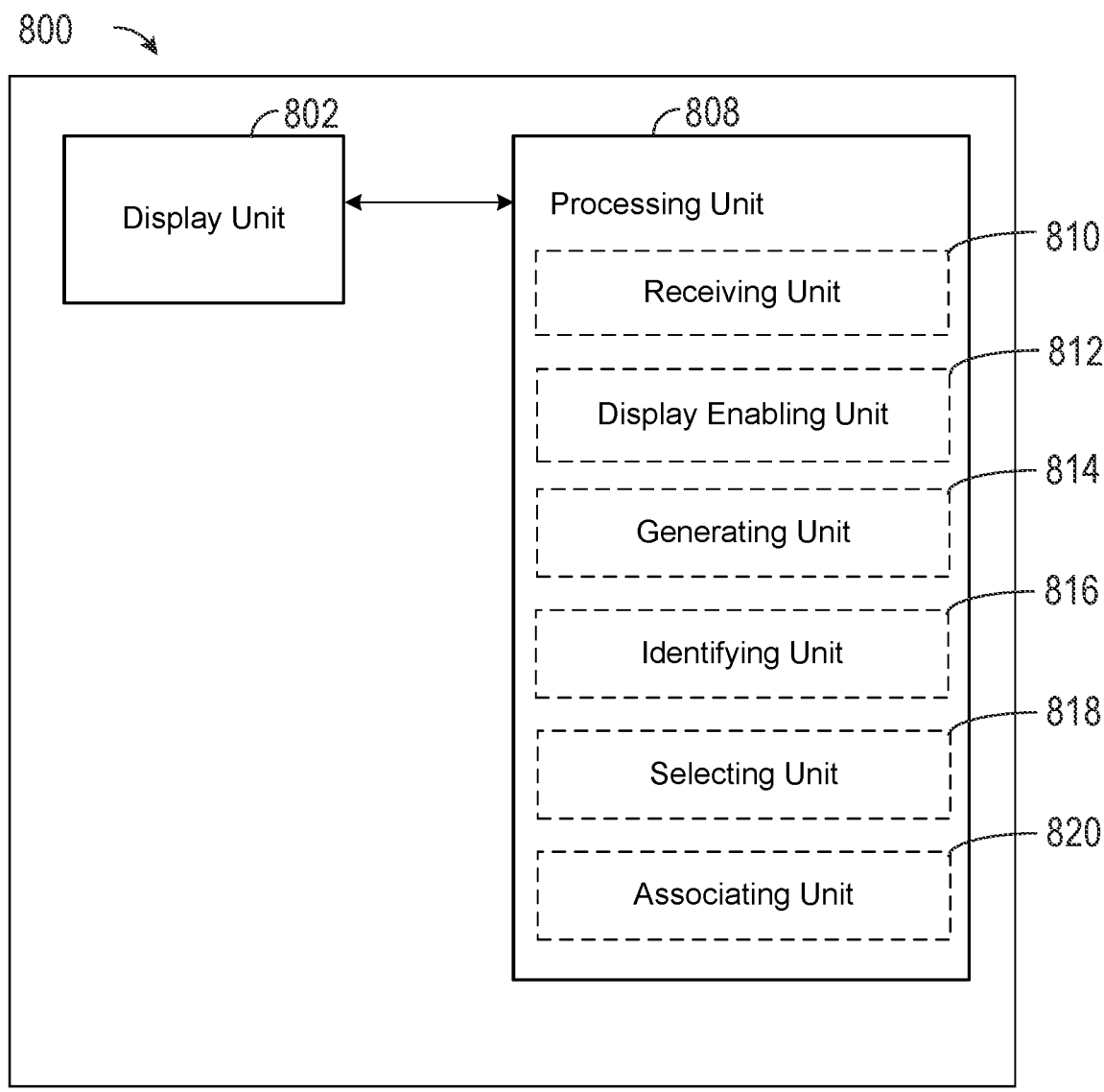
FIG. 8 illustrates a functional block diagram of an electronic device in accordance with some embodiments.

In accordance with some embodiments, FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 800 includes a display unit 802 configured to display a graphic user interface, and a processing unit 808 coupled to the display unit 802. In some embodiments, the processing unit 808 includes a receiving unit 810 and a display enabling unit 812. In some embodiments, the processing unit 808 optionally includes one or more of a generating unit 814, an identifying unit 816, a selecting unit 818, and an associating unit 820.

The processing unit is configured to: receive (e.g., with receiving unit 810) a request to display contextually relevant media; and in response to the request: in accordance with a determination that the device is in a first context, enable display (e.g., with display enabling unit 812), on display unit 802, of a representation of a first collection of media items that share a set of common characteristics and are relevant to the first context; and in accordance with a determination that the device is in a second context, enable display (e.g., with display enabling unit 812), on display unit 802, of a representation of a second collection of media items that share a set of common characteristics and are relevant to the second context, wherein the second collection of media items is different from the first collection of media items.

In some embodiments, the processing unit is further configured to: in accordance with a determination that the device is in the first context, enable display (e.g., with display enabling unit 812), on display unit 802, of a representation of a third collection of media items that share a set of common characteristics and are relevant to the first context, wherein the first collection of media items are relevant to the first context based on a first contextual property and the third collection of media items are relevant to the first context based on a second contextual property, and wherein the second contextual property is different from the first contextual property.

In some embodiments, the representation of the first collection of media items is a first affordance, and the processing unit is further configured to: receive (e.g., with receiving unit 810) user input corresponding to selection of the first affordance; and in response to receiving the user input, enable display (e.g., with display enabling unit 812), on display unit 802, of a detail user interface that includes at least a portion of the first collection of media items.

In some embodiments, the representation of the first collection of media items includes a reduced-scale version of a media item selected from the first collection of media items.

In some embodiments, the processing unit is further configured to: generate (e.g., with generating unit 814) a textual identifier associated with the first collection of media items; identify (e.g., with identifying unit 816) a face in the selected media item, wherein the selected media item is an image; enable display (e.g., with display enabling unit 812), on display unit 802, of the textual identifier overlaid on the representation of the first collection of media items, wherein the overlaid textual identifier does not overlap the identified face in the selected media item displayed as the representation of the first collection of media items.

In some embodiments, the textual identifier associated with the first collection of media items is selected based on the relevance of the first collection of media items to the first context and includes one or more words that explain relevance of the first collection of media items to the first context.

In some embodiments, the processing unit is further configured to: prior to displaying the detail user interface, enable display (e.g., with display enabling unit 812), on display unit 802, of the representation of the first collection of media items visually occupying a first portion of the display; subsequent to receiving the user input corresponding to selection of the first affordance, and while displaying the detail user interface, enable display (e.g., with display enabling unit 812), on display unit 802, of a key media item of the first collection of media items visually occupying a second portion of the display, distinct from the first portion of the display; and further in response to receiving the user input corresponding to selection of the first affordance, enable display (e.g., with display enabling unit 812), on display unit 802, of an animated transition of the representation of the first collection of media items transitioning into the key media item.

In some embodiments, the processing unit is further configured to: while displaying the detail user interface, enable display (e.g., with display enabling unit 812), on display unit 802, of a slideshow including a plurality of media items of the first collection of media items; receive (e.g., with receiving unit 810) user input corresponding to a selection of the slideshow; and in response to receiving the user input corresponding to the selection of the slideshow, enable display (e.g., with display enabling unit 812), on display unit 802, of a video including a plurality of media items of the first collection of media items, wherein the slideshow and the video are different.

In some embodiments, the processing unit is further configured to: receive (e.g., with receiving unit 810) user input corresponding to a request to edit the slideshow; and in response to receiving the user input corresponding to the request to edit the slideshow, enable display (e.g., with display enabling unit 812), on display unit 802, of a slideshow editing user interface.

In some embodiments, the detail user interface includes a first region, the first region includes a curated view including a subset of the media items of the first collection of media items, and the subset of media items are selected so as to exclude lower quality photos.

In some embodiments, the first region further comprises a second affordance, the processing unit is further configured to: receive (e.g., with receiving unit 810) user input corresponding to selection of the second affordance; and in response to receiving the user input corresponding to selection of the second affordance, enable display (e.g., with display enabling unit 812), on display unit 802, of an expanded view including representations of additional media items of the first collection of media items that were not displayed prior to receiving the input corresponding to selection of the second affordance.

In some embodiments, the subset of media items in the curated view are arranged chronologically based on times associated with the media items of the subset of media items.

In some embodiments, the subset of media items included in the curated view are arranged in a curated arrangement, and the subset of media items included in the curated arrangement of media items are arranged so that edges of the media items are aligned so as to create substantially straight borders at the top and the bottom of the curated arrangement.

In some embodiments, the substantially straight border at the bottom of the curated arrangement is formed by a first plurality of the subset of media items included in the curated view.

In some embodiments, the first plurality of media items includes a first media item having a first size and first aspect ratio and second media item having second size and second aspect ratio, wherein the first size and the second size are different, wherein the first aspect ratio and the second aspect ratio are different, and wherein the substantially straight border at the bottom of the curated arrangement is formed by the edges of adjacent media items of the first plurality of media items.

In some embodiments, the processing unit is further configured to: select (e.g., with selecting unit 818) the curated subset of media items from the media items of the first collection of media items based in part on the dimensions of the media items.

In some embodiments, the processing unit is further configured to: receive (e.g., with receiving unit 810) user input corresponding to selection of a third media item of the subset of media items included in the curated view; in response to receiving the user input corresponding to selection of the third media item of the subset of media items included in the curated view, enable display (e.g., with display enabling unit 812), on display unit 802, of the third media item and a scrubbing affordance; receive (e.g., with receiving unit 810) user input corresponding to the scrubbing affordance; and in response to receiving the user input corresponding to the scrubbing affordance, replace the display (e.g., with display enabling unit 812), on display unit 802, of the third media item with the display of a fourth media item of the curated subset of media items while continuing to display the scrubbing affordance.

In some embodiments, the detail user interface includes a second region comprising a geographic map, and displaying the detail user interface further comprises: enable display (e.g., with display enabling unit 812), on display unit 802, of a location indicator on the geographic map corresponding to a location associated with a fifth media item of the first collection of media items.

In some embodiments, the processing unit is further configured to: while displaying the geographic map, enable display (e.g., with display enabling unit 812), on display unit 802, of a third affordance; receive (e.g., with receiving unit 810) user input corresponding to selection of the third affordance; and in response to receiving the user input corresponding to selection of the third affordance, enable display (e.g., with display enabling unit 812), on display unit 802, of an additional location indicator in the geographic map view corresponding to the location of a media item that is not included in the first collection of media items.

In some embodiments, the processing unit is further configured to: subsequent to displaying the additional location indicator: enable display (e.g., with display enabling unit 812), on display unit 802, of a fourth affordance; receive (e.g., with receiving unit 810) user input corresponding to selection of the fourth affordance; and in response to receiving the user input corresponding to selection of the fourth affordance, cease to display (e.g., with display enabling unit 812), on display unit 802, the additional location indicator in the geographic map view.

In some embodiments, the processing unit is further configured to: receive (e.g., with receiving unit 810) user input corresponding to selection of the location indicator; and in response to receiving user input corresponding to selection of the location indicator, replace the display (e.g., with display enabling unit 812), on display unit 802, of the geographic map view with the display of the fifth media item.

In some embodiments, the detail user interface includes a third region comprising an indicator corresponding to an identified face in a media item of the first collection of media items; and the processing unit is further configured to: receive (e.g., with receiving unit 810) user input corresponding to selection of the indicator corresponding to the identified face; and in response to receiving user input corresponding to selection of the indicator corresponding to the identified face, enable display (e.g., with display enabling unit 812), on display unit 802, of a fourth collection of media items, wherein the media items of the fourth collection of media items each include the identified face.

In some embodiments, the detail user interface includes a fourth region comprising a representation of a fifth collection of media items that share a set of common characteristics, and a media item of the fifth collection of media items shares a first characteristic with a media item of the first collection of media items, and the processing unit is further configured to: receive (e.g., with receiving unit 810) user input corresponding to selection of the representation of the fifth collection of media items; and in response to receiving the user input corresponding to selection of the representation of the fifth collection of media items, enable display (e.g., with display enabling unit 812), on display unit 802, of a detail user interface that includes the fifth collection of media items.

In some embodiments, the processing unit is further configured to: subsequent to displaying the detail user interface that includes the first collection of media items: receive (e.g., with receiving unit 810) data representing a sixth collection of media items that share a set of common characteristics, wherein the sixth collection of media items is distinct from the first collection of media items; receive (e.g., with receiving unit 810) user input corresponding to a request to display the detail user interface that includes the first collection of media items; and in response to receiving the user input corresponding to the request to display the detail user interface that includes the first collection of media items, enable display (e.g., with display enabling unit 812), on display unit 802, of the detail user interface and a representation of the sixth collection of media items in the fourth region.

In some embodiments, the processing unit is further configured to: while displaying the detail user interface that includes the first collection of media items: enable display (e.g., with display enabling unit 812), on display unit 802, of a fifth affordance; receive (e.g., with receiving unit 810) user input corresponding to selection of the fifth affordance; and in response to receiving the user input corresponding to selection of the fifth affordance, associate (e.g., with associating unit 820) an identifier of the first collection of media items with a list of selected collections of media items stored in memory.

In some embodiments, the processing unit is further configured to: receive (e.g., with receiving unit 810) user input corresponding to a request to view representations of collections of media items of the list of selected collections of media items; and in response to receiving the user input corresponding to a request to view representations of collections of media items of the list of selected collections of media items, enable display (e.g., with display enabling unit 812), on display unit 802, of the representation of the first collection of media items.

The operations described above with reference to FIGS. 7A-7E are, optionally, implemented by components depicted in FIGS. 1A-1B or FIG. 8. For example, receiving operation 702 and displaying operation 706 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Always-Available Related Content View

The content and organization of an exemplary memory detail view as described above can also be used to present content relevant to individual media items, in some embodiments, and thus is not limited to being utilized in connection with collections of media items.

FIGS. 9A-9L illustrate exemplary user interfaces for viewing content related to a media item, in accordance with some embodiments. The user interfaces in these figures are used to illustrate the processes described below, including the processes in FIG. 10A-10D.

Figure 9A:
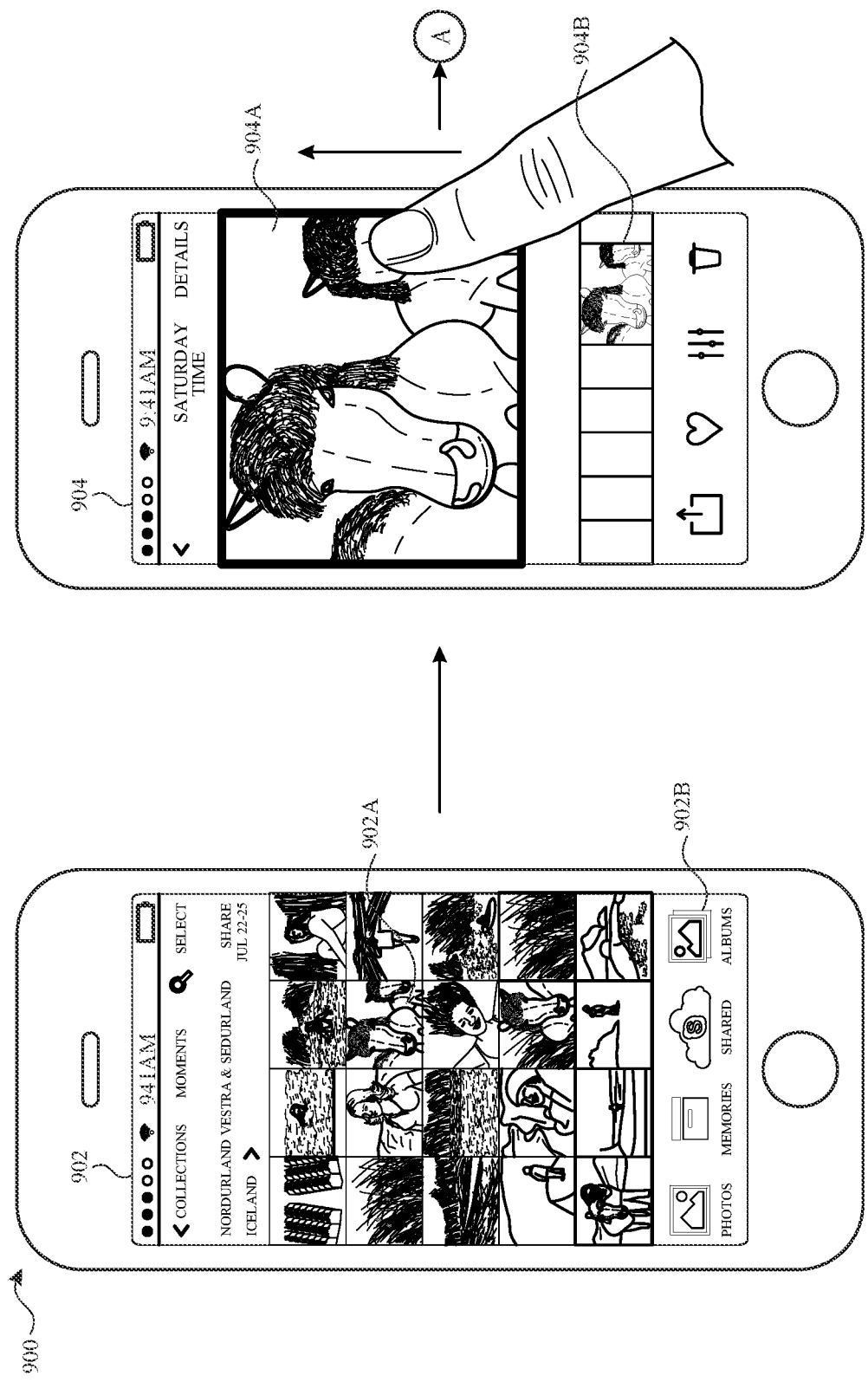

FIG. 9A illustrates an exemplary collection of media items in a media browsing interface 902 of device 900. In some embodiments, device 900 includes one or more features of device 100, device 300, device 500, or device 600. Media browsing interface 902 depicts a plurality of media items. In this example, the media browsing interface 902 does not depict the collection of media items in a memory detail view. Rather media browsing interface 902 depicts a more traditional interface for browsing media items. For example, the user is browsing all media items (e.g., photos, videos) associated with their device (e.g., albums tab 902B is selected). In some examples, as the media items are displayed, they are accompanied by a banner displaying location and date (e.g., Nordurland vestra & Sedurland, Iceland, and July 22-25 in media browsing interface 902). Typically, browsing in this way allows a user to scroll chronologically through media items and view them. However, interface 902 does not provide related content that can enhance the usability of a media item interface, the user is forced to perform excessive navigation seek out content related to the browsed media items, which can be time-consuming and waste device resources.

In accordance with some embodiments, device 900 receives selection of a first visual media item of a sequence of visual media items. For example, in media browsing interface 902, device 900 receives selection of media item 902A. Media item 902A is an exemplary first visual media item of a sequence of visual media items, wherein the sequence is the comprised of the photos depicted at media browsing user interface, the sequence beginning in the top left corner and sequentially including each media item to the right (and repeating for each line, to form a single sequence for the media items). In some examples, the sequence only includes media items that share an association with a particular location and/or a particular date range. For example, the sequence of media items in this example optionally only includes media items captured in Iceland and between July 22-25.

In accordance with some embodiments, device 900 displays a first visual media item of a sequence of visual media items. For example, at FIG. 9A, device 900 displays one up view 904 of media item 904A. In some examples, device 900 displays the one up view in response to the selection of the media item at a media browsing interface. In some examples, the displayed item is a photo or a video. One up view 904 also includes scrubbing affordance 904B. One up view 904 and scrubbing affordance 904B can operate similar to one up views 654 and 656 and scrubbing affordances 654B and 656B of FIG. 6M, respectively, and thus the descriptions of the features related thereto are hereby incorporated.

In accordance with some embodiments, while displaying the first visual media item, device 900 receives a user input that includes movement in a respective direction. For example, at one up view 904 of FIG. 9A, device 900 receives a user input corresponding to a swipe gesture in an upward direction. In accordance with some embodiments, in response to receiving the user input, device 900 determines whether the user input corresponds to a swipe gesture in a first direction. In this example, the first direction is the upward direction (e.g., toward the top edge of the display when the displayed content is oriented correctly as intended for viewing). In some examples, the first direction is the upward direction, but because device 900 is oriented in a landscape made, the upward direction is toward a side edge of the display (e.g., a long edge). In some examples, the gesture direction is any suitable direction.

In accordance with some embodiments, in accordance with a determination that the user input corresponds to a swipe gesture in the first direction, device 900 displays a detail user interface comprising related content for the first visual media item that has been determined to be related to the first visual media item. For example, in response to an upward swipe, device 900 displays a media item detail interface that comprises content related to the first visual media. In the example depicted in FIG. 9B, device 900 displays exemplary media item detail interface 906 (at one up view 904) in response to the received upward swipe.

Media item detail interface 906 includes content related to the first visual media item (e.g., media item 904A of FIG. 9A). Related content includes one or more of media items, collections of media items (e.g., memories), locations, and identified faces.

In accordance with some embodiments, the related content for the first visual media item includes one or more representations of related content organized by a first category and one or more representations of related content organized by a second category. For example, media item detail interface 906 of FIG. 9B includes content organized (e.g., grouped together visually) by location of the content (e.g., a maps region under the heading "Places") and by content that are collections of media items (e.g., a related memories region under the heading "Related Memories"). Other examples of categories of related content includes organized by time of the content (e.g., by date), and organized by people identified in the content (e.g., by persons under the "People" heading)

In accordance with some embodiments, the first category is different from the second category. As described above and shown in FIG. 9B, for example, an exemplary first category is the location of the content, and an exemplary second category is content organized as collections of media items.

Figure 9B:
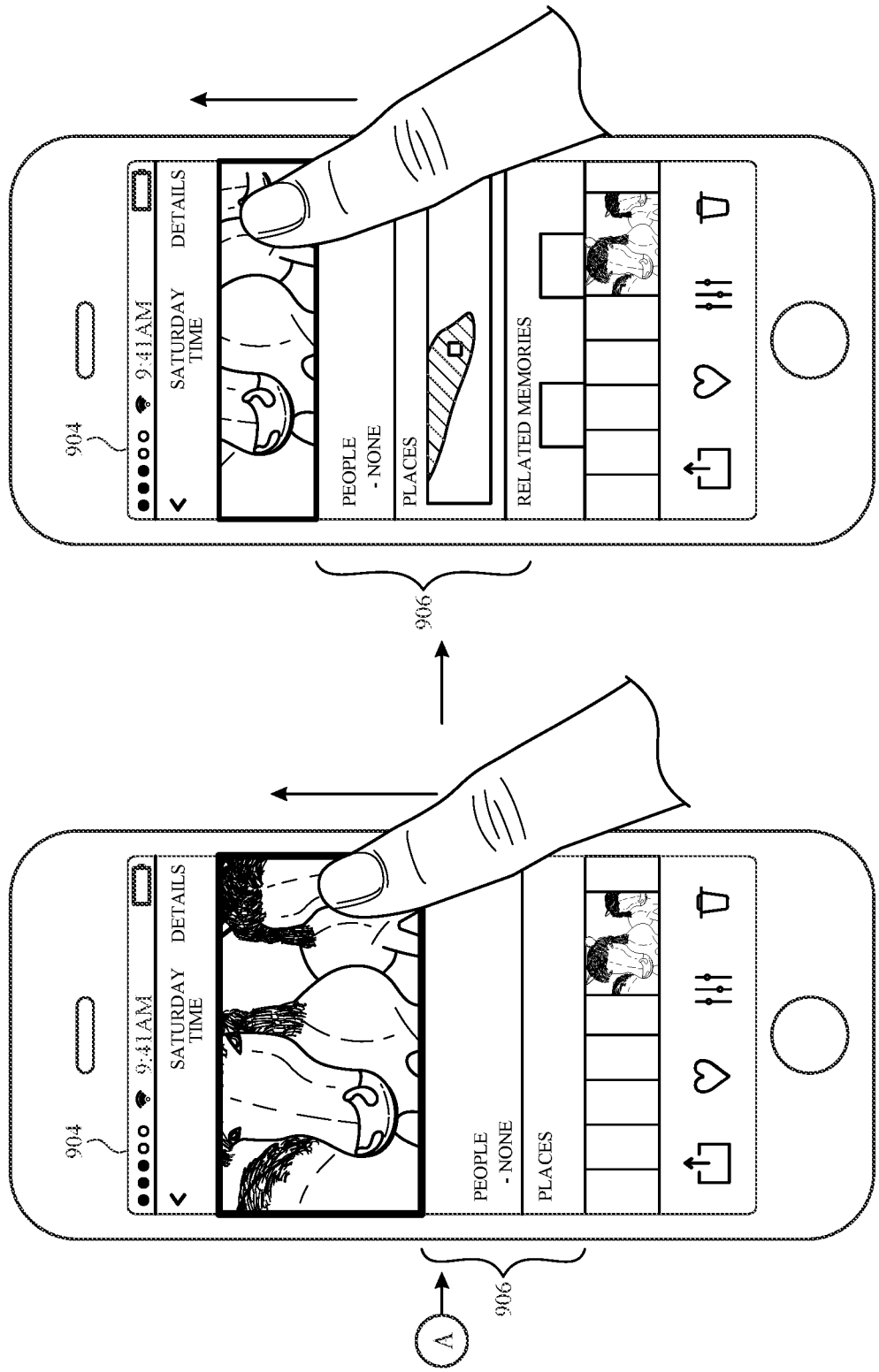
Figure 9C:
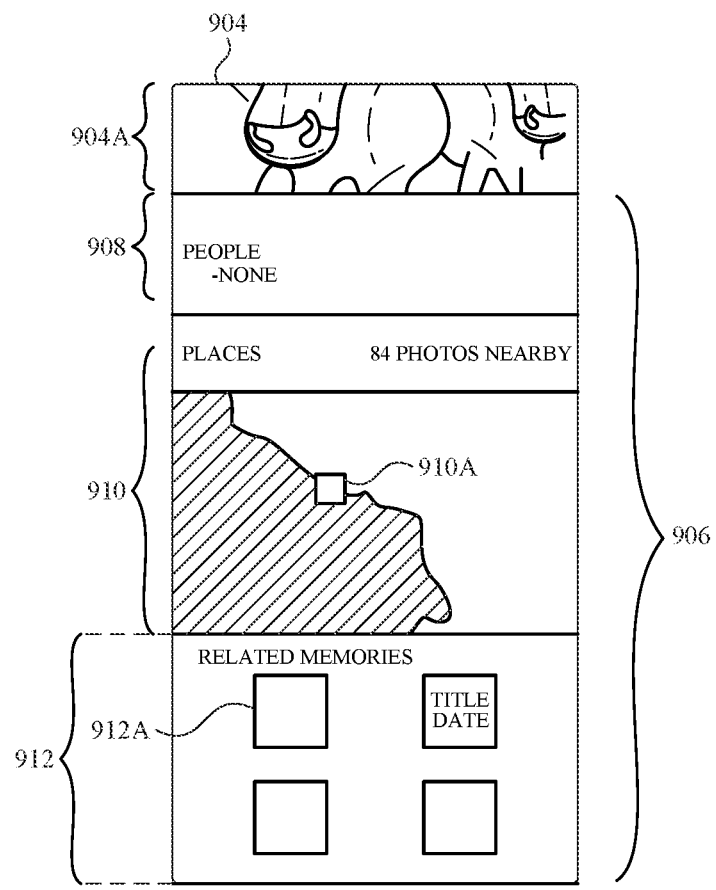

FIG. 9C illustrates an exemplary media item detail interface 906. In some examples, a media item detail interface includes display of a portion of its corresponding media item. For example, this can provide a useful visual reference to the user to identify the current media item for which related content is being viewed. In some examples, the displayed portion can be used to quickly redisplay the media item (e.g., in a one up view, for example, by swiping or tapping on the portion). Exemplary media item detail interface 906 includes a portion of the corresponding media item 904A. In some examples, the media item detail interface includes one or more of a people region (e.g., people region 908), a places region (e.g., places region 910, including location indicator 910A), and a related memories region (e.g., related memories region 912, including a related memory 912A). The descriptions of these features with reference to FIGS. 6A-6R are hereby incorporated.

Thus, in accordance with some embodiments, the media item detail interface for the first visual media item has one or more of the same sections as described herein with respect to the detail user interface of the first collection described with reference to the user interfaces in FIGS. 6A-6R and method 700 of FIG. 7, but with faces, related memories, locations, key media item selected based on the first visual media item.

In accordance with some embodiments, the user input is detected at a location on the touch-sensitive surface that corresponds to the first visual media item. For example, as depicted in FIGS. 9A-9B, device 900 receives the user input on a touch-sensitive surface (e.g., a touch-sensitive display) at location corresponding to visual media item 904A (e.g., input received on the displayed photo).

FIGS. 9D-9E depict navigation to display another media item and accessing the memory detail view for that media item. In accordance with some embodiments, the user input that includes movement in a respective direction is a first user input. While displaying the first visual media item, device 900 receives a second user input that includes movement in a respective direction. Device 900 determines whether the second user input corresponds to a swipe gesture in a second direction, different than the first direction and, in accordance with a determination that the user input corresponds to a swipe gesture in the second direction, device 900 replaces display of the first visual media item with display of a second visual media item of the sequence of visual media items. For example, at the display of exemplary first media item 916 in the exemplary one up view 914A of FIG. 9D, device 900 receives an input corresponding to a swipe in a horizontal direction (e.g., from left to right). In this example, because the first user input was a vertical swipe (e.g., an upward swipe), the directions of each are different. One up view 914B depicts an intermediate display—as can be seen, as the gesture moves in the second direction (e.g., from left to right), device 900 displays a portion of media item 918. At one up view 914B, the media item 916 is being shifted to the right, and off of the display, while media item 918 is being shifted to the right and onto the display. One up view 914C illustrates an exemplary one up view of media item 918, after the second user input gesture is complete. Referring back to media browsing interface 902 of FIG. 9A, media item 918 corresponds to the media item that is adjacent in the sequence of media items of media browsing interface 902. For instance, a reduced-scale version of media item 918 is seen immediately adjacent and to the left of a reduced-scale version of media item 916 of FIG. 9D—thus, when the user swipes from right to left at media item 916, they get the media item adjacent in the sequence of media items, namely media item 918. Thus, with a gesture in a second direction, the user can quickly access the next photo in a sequence of views from a one up view.

In accordance with some embodiments, the first visual media item is displayed along with a scrubbing affordance for navigating through the sequence of media items. For example, scrubbing affordance 920 is depicted in FIG. 9E. In response to selection of the scrubbing affordance, the user can navigate through the sequence of media items. The operation of scrubbing affordance 920 is similar to scrubbing affordances 654B and 656B of FIG. 6M, the descriptions of which are hereby incorporated.

In accordance with some embodiments, the detail user interface is a first detail user interface and, while displaying the second visual media item, device 900 receives a second user input that includes movement in a respective direction. Device 900 determines whether the second user input corresponds to a swipe gesture in the first direction and, in accordance with a determination that the user input corresponds to a swipe gesture in the first direction, device 900 displays a second detail user interface comprising related content for the second visual media item that has been determined to be related to the second visual media item. For example, at one up view 914C of FIG. 9E, device 900 receives a vertical swipe (e.g., upward swipe), and displays media item detail interface 922 at one up view 914D. The features of media item detail interface 922 are the same as described above with respect to media item detail user interface 906 of FIG. 9B.

Figure 9F:
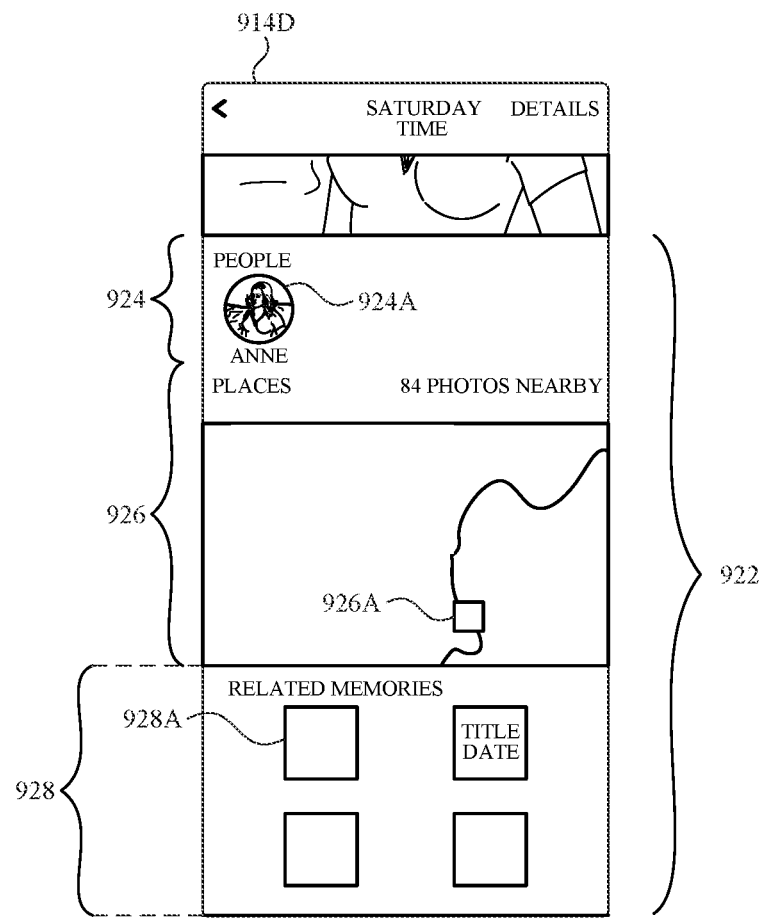

In accordance with some embodiments, the related content for the second visual media item is different from the related content for the first media item. For example, an expanded exemplary media item detail interface 914D is shown in FIG. 9F. Media item detail interface 914D includes a people region 924 (including a face indicator 924A, also referred to as a "person indicator"), a places region 926 (including a location indicator 926A), and related memories region 928 (including a related memory representation 928A). In this example, the related content is of the second visual media item is different than for the first. For instance, the people region 924 now includes a face indicator 924A, identifying the woman in the photo as the person named "Anne". Recall that the first visual media in this example (904A of FIG. 9A) depicts a horse and thus has no indicators in its respective people region (e.g., media item detail interface 906 of FIG. 9B). In some embodiments, if there are no faces or people identified (or such information is unavailable) in a media item, the people region is not displayed.

In some embodiments, the related content for the second visual media item includes one or more representations of related content organized by a third category and one or more representations of related content organized by a fourth category. For example, the third and fourth categories are similar to those described above with respect to the first and second categories. For instance, a third category can be organized by time of the content, and a fourth can be organized by people identified in the content. In some examples, the third category is different from the fourth category. In some examples, the related content for the second visual media is different from the related content for the first media item—for example, the second photo has different related memories, different faces, than the first photo.

In accordance with some embodiments, the detail user interface for the second visual media item has one or more of the same sections as described herein with respect to the detail user interface of the first collection described with reference to the user interfaces in FIGS. 6A-6R and method 700 of FIG. 7, but with faces, related memories, locations, key media item selected based on the second visual media item.

As touched on above with regard to the people region, two adjacent media items (e.g., photos, videos) in a media sequence can have different related content. This can be due to, for example, different faces identified in each media item, different locations associated with each media item, different dates corresponding to each media item, different scenes depicted in each media item (e.g., one media item depicts a beach while another media item depicts a forest), or the like, and thus would cause each media item to have different related content. In some examples, the sequence of media items includes media items from a variety of contexts, and it is thus possible that adjacent media items share no set of characteristics. For example, if a user is browsing all of their photos on a device, two adjacent media items in the sequence (e.g., all photos) can be completely unrelated (contextually) because they are adjacent first and last photos corresponding to different events.

Figure 9G:
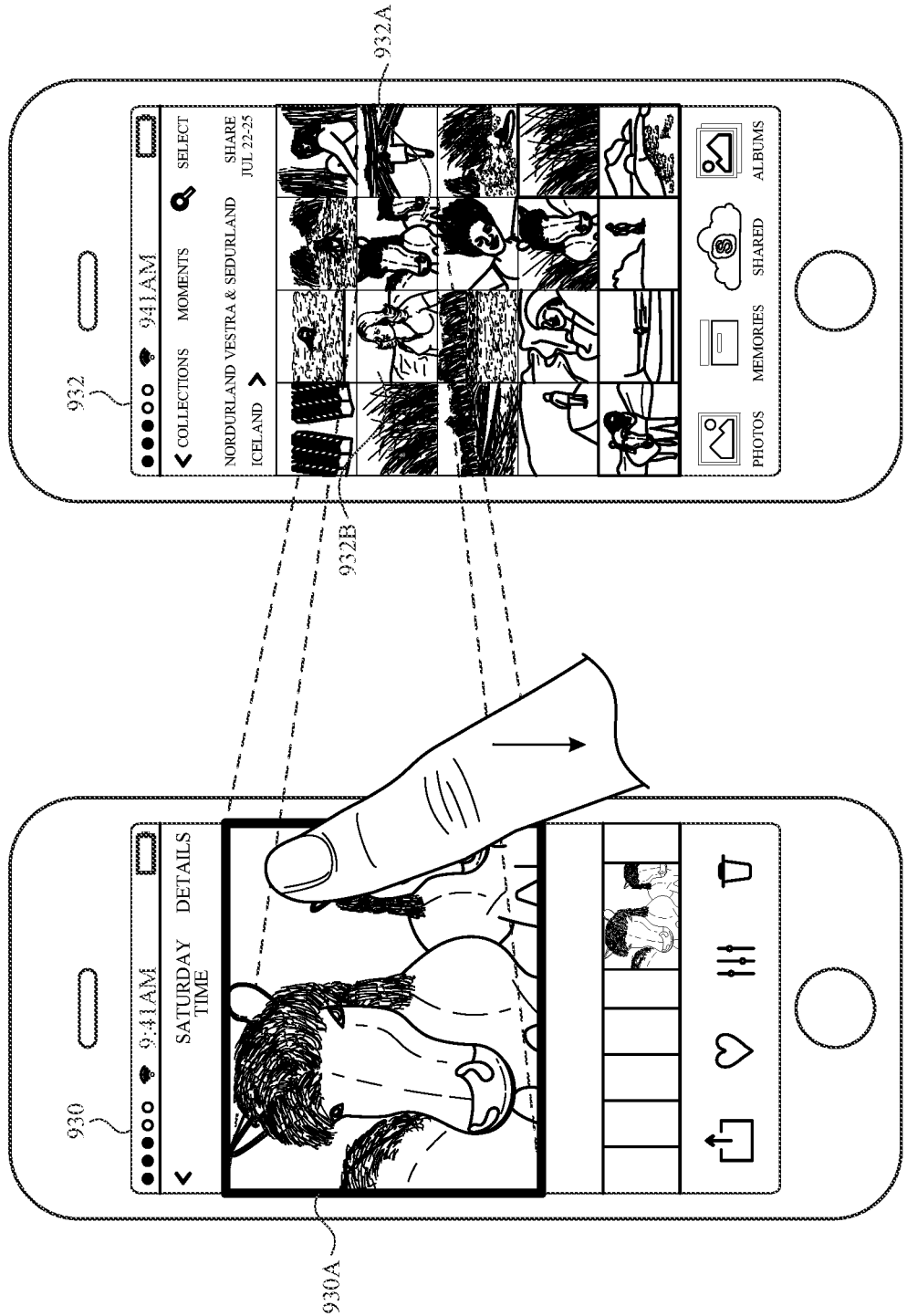
Figure 9H:
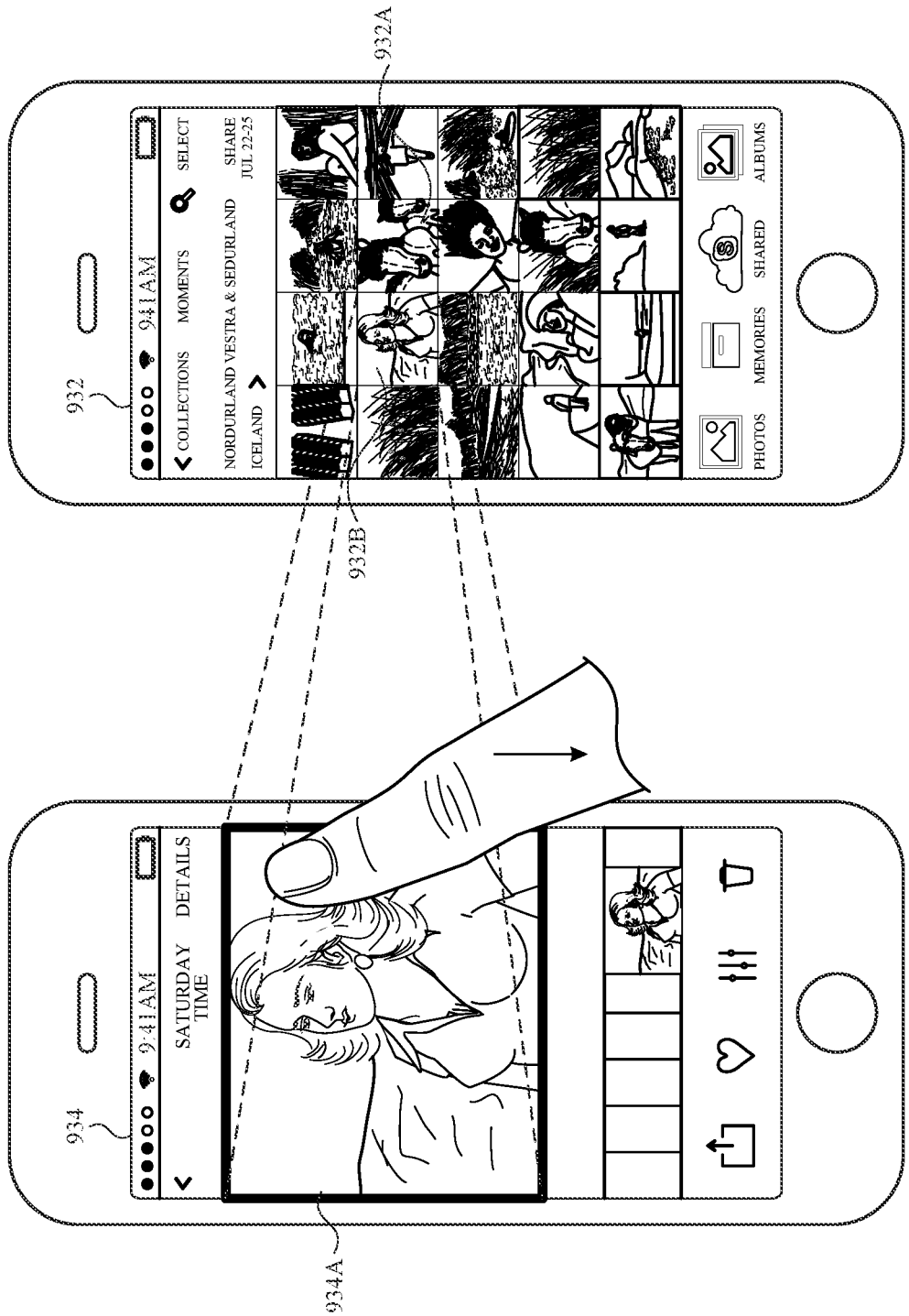

FIGS. 9G and 9H illustrate navigation from a one up view back to the display of a sequence of media items. In accordance with some embodiments, while displaying the first visual media item, device 900 receives a third user input that includes movement in a respective direction. Device 900 determines whether the third user input corresponds to a swipe gesture in a third direction, different from the first and second directions and, in accordance with a determination that the third user input corresponds to a swipe gesture in the third direction, displays reduced-scale versions of the media items of the sequence of visual media items. For example, in one up view 930 of FIG. 9G, device 900 receives a vertical swipe (e.g., a downward swipe) on media item 930A. In response, device 900 displays media browsing interface 932. As illustrated in FIG. 9G, device 900 displays the media item 930A, displayed in the one up view 930, animatedly transitioning into its corresponding position (e.g., at thumbnail 932A) of media browsing interface 932. In this example, the exemplary third user input was in a direction (e.g., downward) different than the exemplary first (e.g. upward) and second (e.g., left to right) inputs.

Using the technique described herein, in accordance with some embodiments, the user can use an upward swipe to access a detail user interface (e.g., containing related content) or use a downward swipe to return to an interface for displaying a plurality of media items of the sequence of media items (e.g., in a chronological listing).

In accordance with some embodiments, the reduced scale versions of the media items of the sequence of visual media items are arranged chronologically. For example, as described above, the sequence of media items depicted in media browsing interface 902 of FIG. 9A depicts media items arranged chronologically.

In accordance with some embodiments, the reduced-scale versions of the media items of the sequence of visual media items are visually grouped by a geographic location associated with each respective visual media item. For example, as described above, the media items of the sequence of visual media items in media browsing interface 902 are grouped in part based on geographic location. In some examples, media items of the sequence of visual media items are visually grouped based on time and/or date. For example, the items can be grouped as a moment, which has media items that share a geographic location and a time period contextual property.

In accordance with some embodiments, while displaying the second visual media item, device 900 receives a fourth user input that includes movement in a respective direction. Device 900 determines whether the fourth user input corresponds to a swipe gesture in the third direction and, in accordance with a determination that the user input corresponds to a swipe gesture in the third direction, displays the reduced scale versions of the media items of the sequence of visual media items. For example, FIG. 9H depicts the same operation as described above with respect to FIG. 9G, with the difference being that a downward swipe is received at one up view 934 of an adjacent media item, media item 934A. In response to the downward swipe, device 900 displays the same media browsing interface 932 as was displayed in response to the swipe gesture on media item 930A. Similarly, media item 934A optionally animatedly transitions into its corresponding position (e.g., at thumbnail 932B) of media browsing interface 932. Thus, in accordance with some embodiments, a user can easily access related content for each media item (which can be different for each item) or access a display of several media items as reduced-scale versions (which can be the same for each item).

In accordance with some embodiments, the representations of related content for the first visual media item are arranged non-chronologically. For example, exemplary media item detail interface 906 includes representations of related content arranged non-chronologically. For example, related content corresponding to places is arranged above related content correspond to related memories, thus are arranged by category rather than chronology. Further, in this example, the related memories represented (e.g., representation 912A) included in memory region 912 are not ordered chronologically—rather, the related memories can be arranged based on relevance to the first media item (e.g., most relevant first).

Figure 9I:
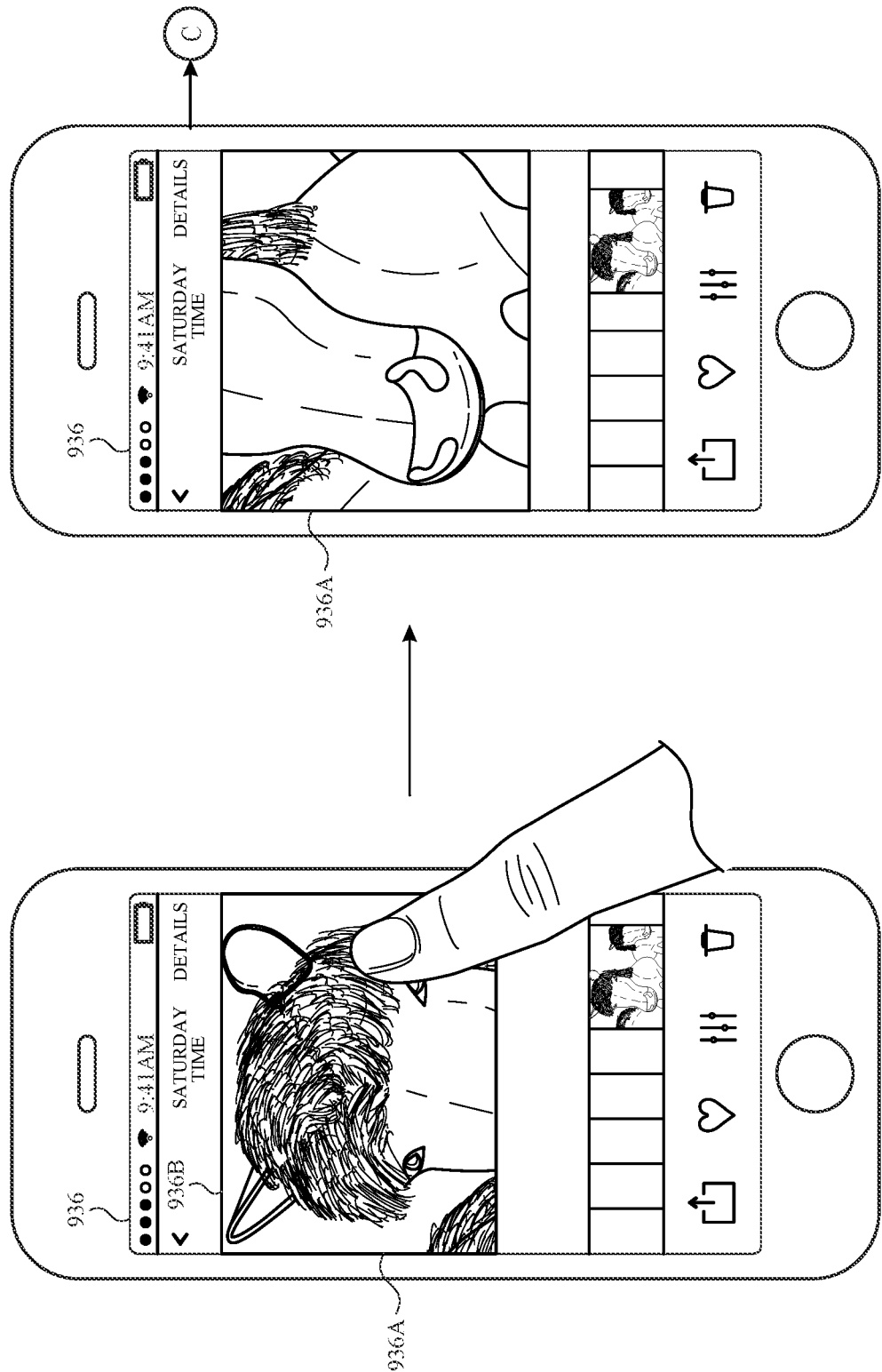
Figure 9J:
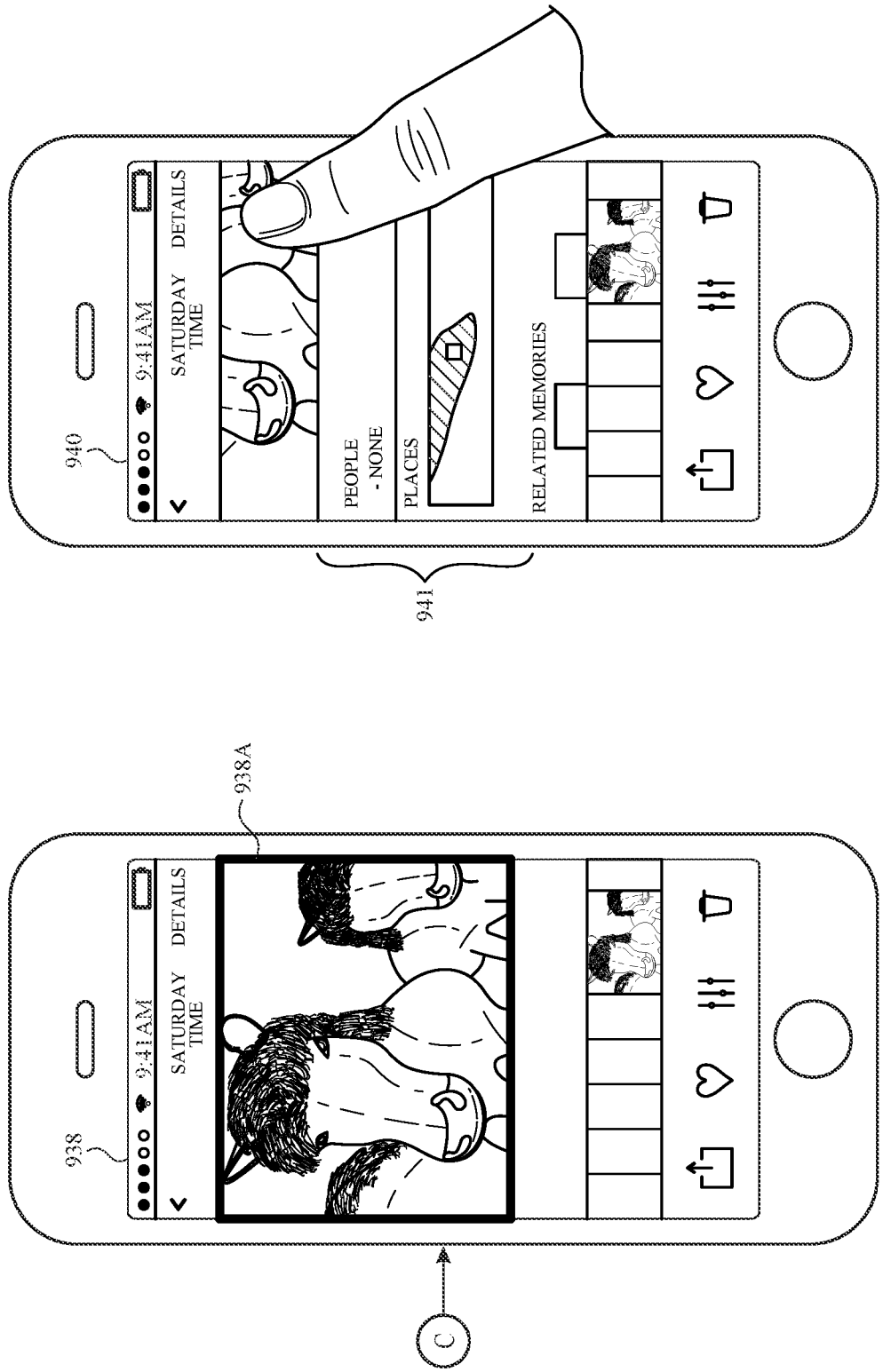

FIGS. 9I and 9J illustrate accessing a media item detail interface when a media item is zoomed in a one up view. In some embodiments, when device 900 receives a user input request to view the media item detail interface, device 900 responds in a slightly different manner than described above.

In accordance with some embodiments, while displaying the first visual media item, device 900 receives a fifth user input that includes movement in the first direction and. In response, and in accordance with a determination that the first visual media item is enlarged beyond a predetermined threshold, device 900 moves the first visual media item on the display in accordance with the fifth user input without displaying the detail user interface. For example, in response to the fifth user input, and in accordance with a determination that the first visual media item is larger in at least one dimension than the size of the display, device 900 moves the first visual media item without displaying the media item detail interface, even though the gesture was in the first direction (e.g., an upward swipe). In the example depicted in FIG. 9I, exemplary media item 936A is shown in a zoomed view (e.g., one or more of its dimensions exceeds the size of the display) at interface 936, and an exemplary fifth user input is received (e.g., an upward swipe). In response to the upward swipe, the media item 936A has moved on the display, however a media item detail interface is not displayed in response. Thus, if a photo is zoomed, for example, device 900 moves (e.g., shifts, pans, translates) the photo, but does not display a media item detail interface.

In accordance with some embodiments, further in accordance with a determination that the first visual media item is enlarged beyond a predetermined threshold, device 900 adjusts the displayed size of the media so that it is not enlarged beyond the predetermined threshold. For example, if the photo is zoomed, then device 900 unzooms (e.g., zooms out from the displayed photo by reducing a scale of the photo) the displayed photos but does not display the media item detail interface in response to the fifth user input, in the first direction. For instance, in response to the user input shown in FIG. 9I, device 900 displays one up view 938 of FIG. 9J, showing the media item 936A of FIG. 9I unzoomed (e.g., labeled as media item 938A of FIG. 9J).

Further in response to the fifth user input that includes movement in the first direction, in accordance with a determination that the first visual media item is not enlarged beyond a predetermined threshold, device 900 moves the first visual media item on the display in accordance with the fifth user input and displays the detail user interface. For example, if the media item is not larger in at least one dimension than the size of the display, device 900 moves the first visual media item and displays the media detail interface, if the gesture was in the first direction (e.g., an upward swipe). Thus, in this example, if the media item is not zoomed, then the media item detail interface is displayed. For example, this operation is illustrated in one up view 940, which includes media item detail interface 941. In this example, device 900 was displaying unzoomed media item 938A in one up view 938 when an upward swipe gesture was received, and displayed interface 941 in response.

In accordance with some embodiments, if a subsequent input that includes movement in the first direction is detected, then device 900 moves the first visual media item on the display in accordance with the subsequent user input and displays the detail user interface even if the first visual media item is enlarged beyond the predetermined threshold. For example, device 900 moves the media item and display a media item detail interface. For instance, in response to receiving the upward swipe gesture illustrated in FIG. 9I, device 900 displays media detail user interface 941 for the media item 936A, as shown in FIG. 9J.

In accordance with some embodiments, the detail user interface includes a first region that includes related content organized by the first category, and the first category is faces identified in the first visual media item, and wherein the first region includes an identified face from the first visual media item. For example, device 900 displays a people region 924 as illustrated in media item detail interface 922 of FIG. 9F, which includes identified face indicator 924A.

In accordance with some embodiments, device 900 receives user input corresponding to selection of the identified face and, in response, displays a first collection of media items, wherein each item in the first collection of media items is selected so as to include the identified face. For example, device 900 displays a person detail user interface for the identified face, as described above with reference to FIG. 6P.

In accordance with some embodiments, the first region is a people region. The features of a people region are described above, with reference to at least FIGS. 6J and 6P, and are also applicable to a people region in a media item detail interface. Accordingly, one or more of the features described above can be included in one or more embodiments of a media item detail interface, and therefore the above description is hereby incorporated.

In accordance with some embodiments, the detail user interface includes a second region that includes related content organized by the second category, wherein the second category is location, and wherein the second region includes a geographic map that includes a location indicator corresponding to a location associated with the first visual media item. For example, the media item detail interface includes a map region, as described above with reference to FIG. 6N, that includes a geographic map. In this example, an exemplary detail user interface map region 942A is shown in media item detail interface 942 of FIG. 9K. Media item detail interface 922 of FIG. 9F also depicts an exemplary map region 926, which includes an exemplary indicator 926A corresponding to the location of the first visual media item in this example.

In accordance with some embodiments, the second region is a maps region. The features of a maps region are described above, with reference to at least FIGS. 6J, 6N, and 6O, and are also applicable to a maps region in a media item detail interface. Accordingly, one or more of the features described above can be included in one or more embodiments of a media item detail interface, and therefore the above description is hereby incorporated.

In accordance with some embodiments, device 900 receives user input corresponding to selection of the second region and, in response, displays a map user interface that includes a visual representation of the location associated with the first visual media. For example, at media detail user interface 942 of FIG. 9K, device 900 receives user input selection of map region 942A and, in response, displays an exemplary map user interface 944, which includes a representation of the location associated with the first visual media. Map user interface 944 includes a geographic map 946 and an address 948. In some examples, the map user interface includes an address (e.g., such as address 948) associated with the media item. Because a user is viewing details for a single media item, device 900 displays the exact address of the particular media item. Thus, in contrast to the geographic map for a collection, which can include many addresses, the map user interface for the media item can include a map with a high level of detail (e.g., centered on the address). For example, geographic map 946 is displayed zoomed into the map location of the address 948.

In accordance with some embodiments, device 900 receives user input corresponding to selection of the address and, in response, displays a user interface of a map application. For example, in response to selection of the address 948 or map 946 of map user interface 944, device 900 displays the user interface of a maps application. Thus, the user can continue to interact with the address of the media item, such as, by getting directions to the address.

In accordance with some embodiments, the detail user interface includes a third region that includes related content organized by a third category, wherein the third category is collections of visual media items that share a set of common characteristics. In accordance with some embodiments, the third region includes a representation of a second collection of visual media items that share a set of common characteristics. For example, device 900 displays a related memories region 928 as illustrated in media item detail interface 922 of FIG. 9F, which includes a representation 928A of a related memory, an exemplary representation of a second collection of visual media items that share a set of common characteristics. Media item detail user interface 942 also depicts related memories region 942B.

In accordance with some embodiments, a visual media item of the second collection of visual media items shares a first characteristic with the first visual media item, device 900 receives user input corresponding to selection of the representation of the second collection of visual media items and, in response, device 900 displays a representation of the visual media items of the second collection of visual media items. For example, at media item detail view 942, of FIG. 9K, device 900 receives selection of representation 942D, and in response displays a memory detail view for the memory corresponding to the representation. In some examples, device 900 displays the memory in a curated view that includes a subset of the second collection of visual media items, as described above.

In accordance with some embodiments, the third region is a related memories region. The features of a related memories region are described above, with reference to at least FIGS. 6J, 6Q, and 6R, and are also applicable to a related memories region in a media item detail interface. Accordingly, one or more of the features described above can be included in one or more embodiments of media item detail interface, and therefore the above description is hereby incorporated.

In accordance with some embodiments, the second collection of visual media items excludes the first visual media item. For example, the related memories displayed in the media item detail interface do not necessarily need to contain the media item. Thus, in accordance with some embodiments, device 900 does not merely show the user collections which a media item is a part of, but shows at least one collection that is related to the media item based on some contextual property. In this way, the related memories feature goes beyond simply displaying collections that include the media item, providing a user a richer browsing experience when viewing media items.

Figure 9K:
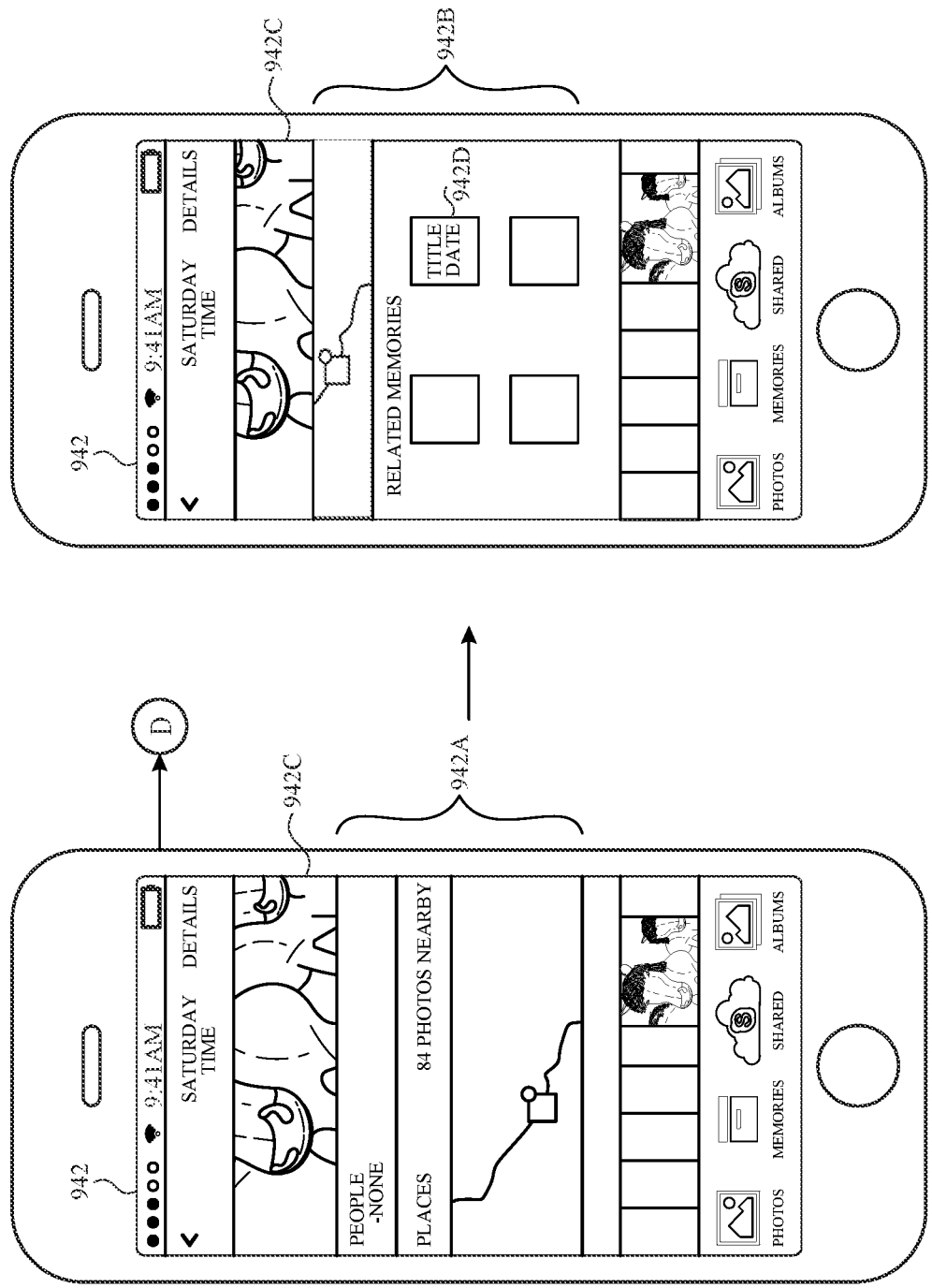
Figure 9L:
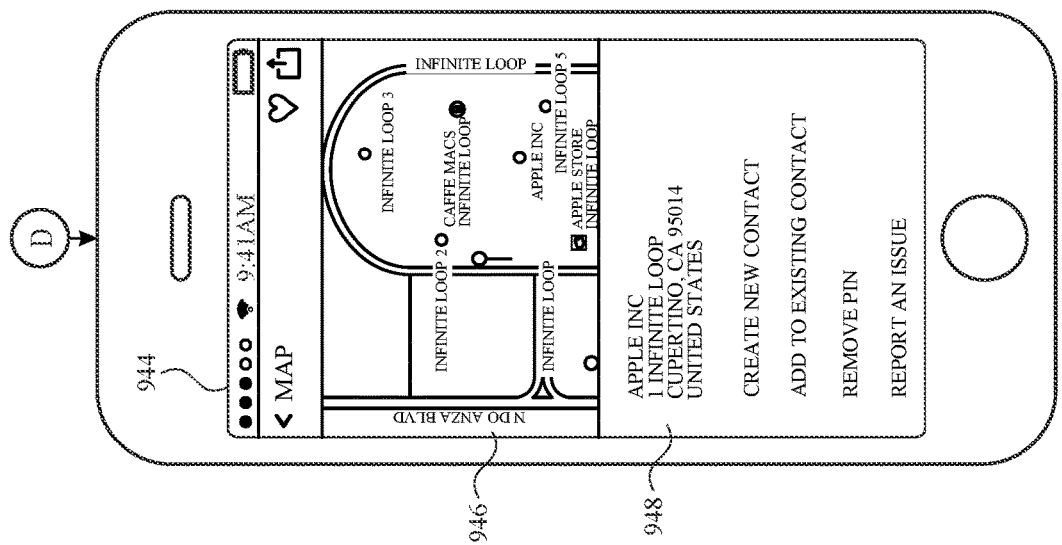
Figure 10B:
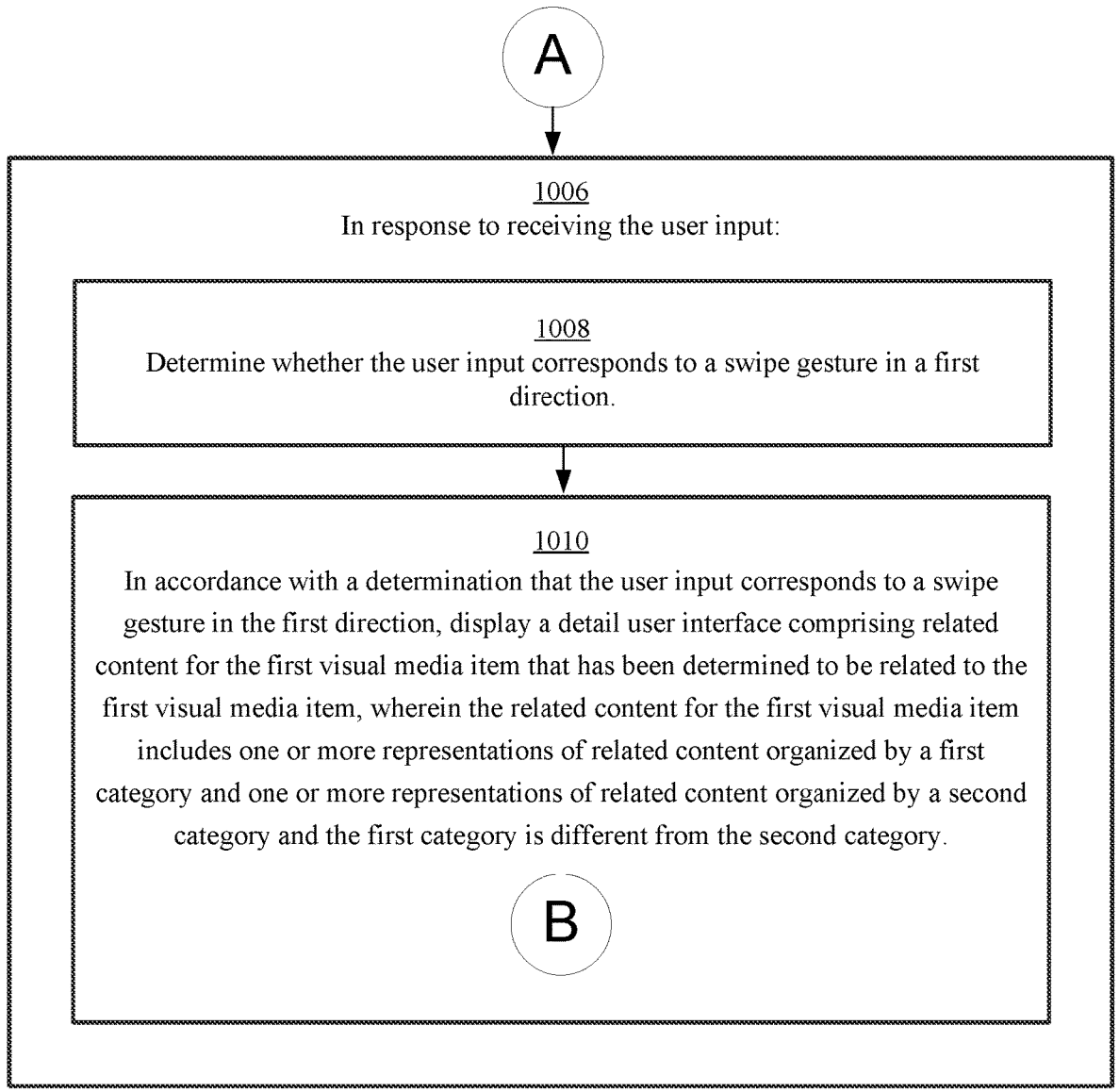

FIGS. 9A, 9B, and 9K illustrate the scrolling of the display to reveal an exemplary media item detail user interface. In accordance with some embodiments, to display the detail user interface comprising related content for the first visual media item, device 900 scrolls the displayed first visual media item in the first direction to reveal the detail user interface. For example, referring back to FIGS. 9A and 9B, device 900 scrolls the first media item (e.g., 904A) in the direction of the gesture (e.g., upward).

In accordance with some embodiments, to scroll the displayed first visual media item in the first direction to reveal the detail user interface, device 900 scrolls the displayed first visual media item in the first direction until the portion of the first visual media item that remains displayed is a predetermined portion of the first visual media item. For example, device 900 continues to scroll until the depiction of detail user interface 906 in FIG. 9B, until the position depicted in media item detail view 942 of FIG. 9K is displayed. Media item detail view 942 depicts an exemplary predetermined portion 942C of the first media item displayed. After scrolling until the predetermined portion is the displayed portion, device 900 ceases scrolling of the first visual media item, and continues scrolling to reveal the detail user interface while the predetermined portion of the first media item remains stationary. For example, if device 900 continues scrolling the first direction (e.g., upward), the predetermining portion 942C remains stationary, while the regions (e.g., 942B and 942C) of the memory detail user interface 942B continue scrolling upward (e.g., and appear to slide under and disappear under portion 942C). In some examples, the predetermined portion is a particular amount of the first media item (e.g., a fixed linear dimension, a proportion of a linear dimension of the media item, a proportion of the area of the media item, or the like).

In accordance with some embodiments, the first visual media item is an image or a video.

In accordance with some embodiments, the detail user interface is an interface of an application installed on device 900, and wherein the detail user interface is accessible at the display of any visual media item displayed using the application. For example, as touched on above, a media item detail interface is optionally accessed at the one up (e.g., full screen) display of any media item in any interface of a photos application.

FIG. 10 is a flow diagram illustrating a method for viewing content relevant to a media item using a device in accordance with some embodiments. Method 1000 is performed at a device (e.g., 100, 300, 500) with a display and a touch-sensitive surface. Some operations in method 1000 are, optionally, combined, the order of some operations are, optionally, changed, and some operations are, optionally, omitted.

As described below, method 1000 provides an intuitive way for viewing content relevant to a media item. The method reduces the cognitive burden on a user for locating a viewing relevant content related to media items, thereby creating a more efficient human-machine interface. For battery-operated computing devices, enabling a user to browse media items and related content faster and more efficiently conserves power and increases the time between battery charges.

The device displays (1002), on the display, a first visual media item (e.g., visual media item 904A in FIG. 9A) of a sequence of visual media items (e.g., sequence of visual media items represented at media browsing interface 902 of FIG. 9A). In accordance with some embodiments, the representations of related content for the first visual media item are arranged non-chronologically. In accordance with some embodiments, the device, while displaying the first visual media item, receives a fifth user input that includes movement in the first direction (e.g., a vertical or upward swipe on 904A, as depicted in FIG. 9A). In response to receiving the fifth user input, the device, in accordance with a determination that the first visual media item is enlarged beyond a predetermined threshold (e.g., zoomed media item 936A in FIG. 9I), moves the first visual media item on the display (e.g. as shown in FIG. 9I) in accordance with the fifth user input (e.g., moves upward if the swipe is upward) without displaying the detail user interface (e.g., as shown in FIG. 9I), and, in accordance with a determination that the first visual media item is not enlarged beyond a predetermined threshold (e.g., unzoomed media item 938A of FIG. 9J, moves the first visual media item on the display (e.g., as shown in FIG. 9J) in accordance with the fifth user input and displays, on the display, the detail user interface (e.g., detail user interface 941 in FIG. 9J). In some examples, if a subsequent input that includes movement in the first direction is detected, then the device moves the first visual media item on the display in accordance with the subsequent user input and displays the detail user interface even if the first visual media item is enlarged beyond the predetermined threshold. In accordance with some embodiments, the first visual media item is an image or a video. Thus, the device (e.g., device 900), by displaying a detail user interface for a media item when it is not enlarged beyond a predetermined threshold, but not when it is, prevents user action corresponding to panning of a zoomed photo from accidentally causing the detail user interface to be displayed, which would require additional user input to undo, saving device resources and user time.

While displaying the first visual media item (e.g., media item 916 of FIG. 9D), the device receives (1004) a user input that includes movement in a respective direction. In accordance with some embodiments, the user input that includes movement in a respective direction is a first user input, and the device, while displaying the first visual media item, receives (1012) a second user input that includes movement in a respective direction, determines (1012) whether the second user input corresponds to a swipe gesture in a second direction (e.g., swipe from left to right depicted in FIGS. 9D and 9E), different than the first direction (e.g., upward swipe), and, in accordance with a determination that the user input corresponds to a swipe gesture in the second direction (e.g., horizontal swipe), replaces display (1012) of the first visual media item with display of a second visual media item (e.g., media item 918 of FIG. 9E) of the sequence of visual media items. In some examples, the first visual media item is displayed along with a scrubber (e.g., scrubbing affordance 920 of FIG. 9E) for navigating through the sequence of media items. Thus, the device (e.g., device 900), by displaying a detail user interface for a media item that is accessed with a swipe gesture at the display of the media item, allows the user to quickly view related and contextually-relevant content in a form optimized for presenting relevant content, rather than the user having to manually determine and retrieve related media items, saving device resources and user time.

In accordance with some embodiments, the detail user interface is a first detail user interface (e.g., detail user interface 906 of FIG. 9C). In accordance with some embodiments, the device, while displaying the second visual media item (e.g., media item 918 at one up view 914C of FIG. 9E), receives (1014) a second user input (e.g., upward swipe depicted at FIG. 9E) that includes movement in a respective direction, determines whether the second user input corresponds to a swipe gesture in the first direction (e.g., a vertical swipe), and, in accordance with a determination that the user input corresponds to a swipe gesture in the first direction, displays (1014), on the display, a second detail user interface (e.g., detail user interface 922 of FIG. 9F) comprising related content (e.g., related memories in region 928, identified people in region 924 of FIG. 9F) for the second visual media item that has been determined to be related to the second visual media item, wherein the related content for the second visual media item is different from the related content for the first media item. In some examples, the related content for the second visual media item includes one or more representations of related content organized by a third category (e.g., organized by time of the content) and one or more representations of related content organized by a fourth category (e.g., organized by people identified in the content, organized by location of the content). In some examples, the third category is different from the fourth category (e.g., in FIG. 9F, categories are people, places, related memories). In some examples, the related content for the second visual media is different from the related content for the first media item. In some examples, the detail user interface (e.g., media item detail interface 922 of FIG. 9F) for the second visual media item has one or more of the same sections as described herein with respect to the detail user interface (e.g., detail user interface 906) of the first collection described with reference to method 700, but with faces, related memories, locations, and/or key media item selected based on the second visual media item. Thus, the device (e.g., device 900), by displaying a second media item from the display of a first in response to a swipe gesture, allows the user to quickly access other media items and view different related and contextually-relevant content for those media items, reducing the number of excessive user inputs that would otherwise be needed to access different contextually-relevant content for each of a plurality of media items, thus saving device resources and user time.

In accordance with some embodiments, the device, while displaying the first visual media item (e.g., media item 930A of FIG. 9G), receives a third user input (e.g., a downward swipe as illustrated in FIG. 9G) that includes movement in a respective direction (e.g., downward), determines whether the third user input corresponds to a swipe gesture in a third direction, different from the first (e.g., upward) and second directions (e.g., right to left), and, in accordance with a determination that the third user input corresponds to a swipe gesture in the third direction, displays, on the display, reduced-scale versions of the media items of the sequence of visual media items (e.g., displays media browsing interface 632 as shown in FIG. 9G, which includes reduced-scale versions of media items in the sequence. Thus, the device (e.g., device 900), by displaying reduced-scale versions of media items of a sequence of media items in response to a swipe, allows quick navigate between one up displays of media items and reduced-scale displays, allowing for expedited navigation by the user, thus reducing the time that the display is used, saving device resources.

In accordance with some embodiments, the reduced scale versions of the media items (e.g., represented at media browsing interface 902 of FIG. 9A) of the sequence of visual media items are arranged chronologically. In accordance with some embodiments, the reduced scale versions of the media items of the sequence of visual media items are visually grouped by a geographic location associated with each respective visual media item. (e.g., grouped as a moment, as depicted in interface 932 of FIG. 9H). In accordance with some embodiments, the device, while displaying the second visual media item (e.g., media item 904), receives a fourth user input that includes movement in a respective direction, determines whether the fourth user input corresponds to a swipe gesture in the third direction (e.g., a swipe down as depicted in FIGS. 9G and 9H), and, in accordance with a determination that the user input corresponds to a swipe gesture in the third direction, displays, on the display, the reduced scale versions of the media items of the sequence of visual media items (e.g., displays media browsing interface 932 as depicted in FIGS. 9G and 9H).

In response to receiving the user input (1006), the device determines (1008) whether the user input corresponds to a swipe gesture in a first direction (e.g. an upward swipe on the one up view 904, as illustrated in FIGS. 9A and 9B).

In accordance with a determination that the user input corresponds to a swipe gesture in the first direction, the device displays (1010), on the display, a detail user interface (e.g., detail user interface 906) comprising related content (e.g., people, places, memories) for the first visual media item (e.g., media item 904 of FIG. 9C) that has been determined to be related to the first visual media item, wherein the related content for the first visual media item includes one or more representations of related content organized by a first category (e.g., people, places, related memories) and one or more representations of related content organized by a second category (e.g., people, places, related memories) and the first category is different from the second category. In some examples, the detail user interface for the first visual media item has one or more of the same sections as described herein with respect to the detail user interface of the first collection described with reference to method 700, but with faces, related memories, locations, and/or key media item selected based on the first visual media item. In accordance with some embodiments, the user input is detected at a location on the touch-sensitive surface that corresponds to the first visual media item.

In accordance with some embodiments, the detail user interface includes a first region (e.g., people region 924 of detail user interface 922 in FIG. 9F) that includes related content organized by the first category (e.g. faces of people), the first category is faces identified in the first visual media item, and the first region includes an identified face from the first visual media item. In accordance with some embodiments, the device receives (1016) user input corresponding to selection of the identified face (face indicator 924A of FIG. 9F), and, in response to receiving user input corresponding to selection of the identified face, displays (1016), on the display, a first collection of media items, wherein each item in the first collection of media items is selected so as to include the identified face. Thus, the device (e.g., device 900), by displaying an indicator corresponding to an identified face in the media item, provides the user with quick access to a collections of media items including the identified face, without the need for numerous additional inputs, for instance, to navigate several collections of photos just to view images of an individual, saving device resources and user time.

In accordance with some embodiments, the detail user interface includes a second region (e.g., map region 926 of FIG. 9F) that includes related content organized by the second category, wherein the second category is location and the second region includes a geographic map that includes a location indicator corresponding to a location associated with the first visual media item (1018).

In accordance with some embodiments, the device receives (1020) user input corresponding to selection of the second region (e.g. map region 626 of FIG. 9F), and, in response to the user input corresponding to selection of the second region, displays (1020), on the display, a map user interface (e.g. such as map user interface 660 of FIG. 6N) that includes a visual representation of the location associated with the first visual media. In accordance with some embodiments, the device receives user input corresponding to selection of the address (e.g., address 948 or 946 of FIG. 9L), and, in response to the user input corresponding to selection of the address, displays, on the display, a user interface of a map application. Thus, the device (e.g., device 900), by displaying a specific address corresponding to the media item and displaying a maps application upon selection, provides the user with quick access to highly-relevant location information for the media item, without the need for numerous additional inputs, saving device resources and user time.

In accordance with some embodiments, the detail user interface includes a third region (e.g., related memories region 928 of FIG. 9F) that includes related content organized by a third category, wherein the third category is collections of visual media items that share a set of common characteristics, the third region includes a representation of a second collection of visual media items that share a set of common characteristics, and a visual media item of the second collection of visual media items shares a first characteristic with the first visual media item. In accordance with some embodiments, the device receives (1022) user input corresponding to selection of the representation of the second collection of visual media items (e.g., selection of representation 928A at FIG. 9F), and, in response to receiving the user input corresponding to selection of the representation of the first collection of media items, displays (1022), on the display, a representation of the visual media items of the second collection of visual media items (e.g., a curated view of media items in a memory detail view such as that shown in FIG. 6J). In accordance with some embodiments, the second collection of visual media items excludes the first visual media item (1024). Thus, the device (e.g., device 900), by displaying a representation of a collection of media items that shares a characteristic with a currently viewed media item, as part of a detail user interface for the media item, provides the user with quick access to collections of media relevant to the user's current browsing activity, collections which otherwise would require numerous additional inputs for access by the user, thus saving device resources and user time.

In accordance with some embodiments, displaying the detail user interface comprising related content for the first visual media item comprises scrolling (1026) the displayed first visual media item in the first direction to reveal the detail user interface (e.g., FIGS. 9J-9K depicts an exemplary first visual media item scrolling upward).

In accordance with some embodiments, scrolling the displayed first visual media item in the first direction to reveal the detail user interface comprises scrolling (1028) the displayed first visual media item (e.g., FIGS. 9J-9K depicts an exemplary first visual media item scrolling upward) in the first direction until the portion of the first visual media item that remains displayed is a predetermined portion of the first visual media item (e.g., the portion of 942C display in FIG. 9K, and, after scrolling until the predetermined portion is the displayed portion, cease scrolling (1028) of the first visual media item and continue scrolling to reveal the detail user interface while the predetermined portion of the first media item remains stationary (e.g. detail user interface 942A is shown at a first scrolled position and detail user interface 942B is shown at a second scrolled position 942B, but portion of 942C remained stationary after scrolling from 942A to 942B, as shown in FIG. 9K). Thus, the device (e.g., device 900), by maintaining a portion of the media item on the display when displaying the detail user interface, provides the user with an indication of the device's current state (e.g., currently browsing relevant information for a single media item) and also signals to the user which media item they are currently viewing related information for, thus saving device resources and user time by reducing superfluous user inputs to determine the device's current state.

In accordance with some embodiments, the detail user interface is an interface of an application installed on the device, and the detail user interface is accessible at the display of any visual media item displayed using the application (e.g., at the display of any one up view as described with reference to FIGS. 9A-L).

Note that details of the processes described above with respect to method 1000 (e.g., FIG. 10) are also applicable in an analogous manner to the methods described below and above. For example, methods 700, 1300, and 1600 optionally include one or more of the characteristics of the various methods described above with reference to method 1000. For example, for example, a detail user interface for a media item can be accessed at the display of any media item accessed in accordance with methods 700, 1300, and 1600. For brevity, these details are not repeated below.

Figure 11:
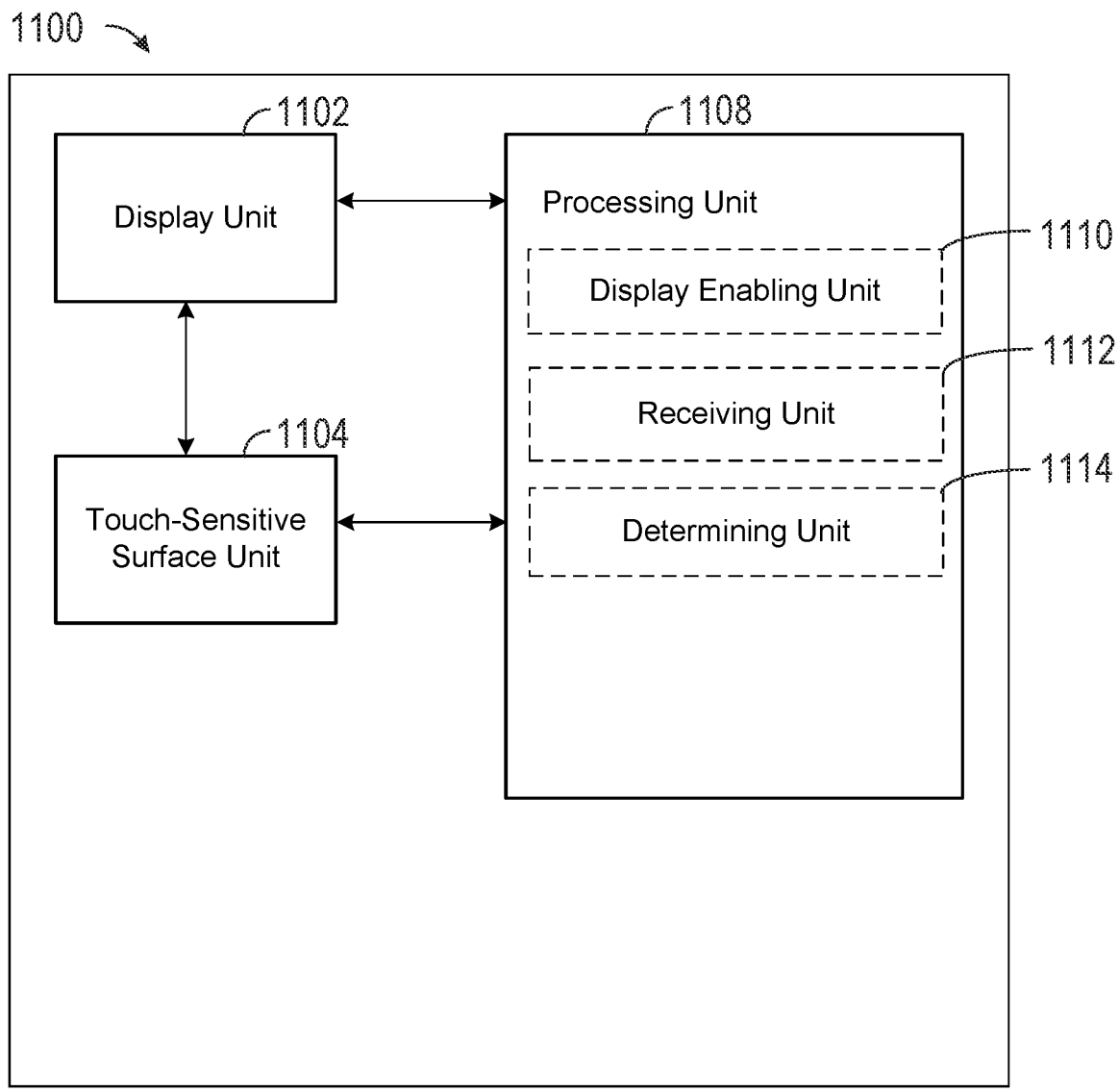
FIG. 11 illustrates a functional block diagram of an electronic device in accordance with some embodiments.

In accordance with some embodiments, FIG. 11 shows an exemplary functional block diagram of an electronic device 1100 configured in accordance with the principles of the various described embodiments. In accordance with some embodiments, the functional blocks of electronic device 1100 are configured to perform the techniques described above. The functional blocks of the device 1100 are, optionally, implemented by hardware, software, or a combination of hardware and software to carry out the principles of the various described examples. It is understood by persons of skill in the art that the functional blocks described in FIG. 11 are, optionally, combined or separated into sub-blocks to implement the principles of the various described examples. Therefore, the description herein optionally supports any possible combination or separation or further definition of the functional blocks described herein.

As shown in FIG. 11, an electronic device 1100 includes a display unit 1102 configured to display a graphic user interface, a touch-sensitive surface unit 1104 configured to receive contacts, and a processing unit 1108 coupled to the display unit 1102 and the touch-sensitive surface unit 1104. In some embodiments, the processing unit 1108 includes a display enabling unit 1110, a receiving unit 1112, and a determining unit 1114.

The processing unit 1108 is configured to: enable display (e.g., with display enabling unit 1110), on display unit 1102, of a first visual media item of a sequence of visual media items; while displaying the first visual media item, receive (e.g., with receiving unit 1112) a user input that includes movement in a respective direction; in response to receiving the user input: determine (e.g., with determining unit 1114) whether the user input corresponds to a swipe gesture in a first direction; in accordance with a determination that the user input corresponds to a swipe gesture in the first direction, enable display (e.g., with display enabling unit 1110), on display unit 1102, of a detail user interface comprising related content for the first visual media item that has been determined to be related to the first visual media item, wherein the related content for the first visual media item includes one or more representations of related content organized by a first category and one or more representations of related content organized by a second category, and wherein the first category is different from the second category.

In some embodiments, the user input is detected at a location on the touch-sensitive surface unit 1104 that corresponds to the first visual media item.

In some embodiments, the user input that includes movement in a respective direction is a first user input, and the processing unit 1108 is further configured to: while displaying the first visual media item, receive (e.g., with receiving unit 1112) a second user input that includes movement in a respective direction; determine (e.g., with determining unit 1114) whether the second user input corresponds to a swipe gesture in a second direction, different than the first direction; in accordance with a determination that the user input corresponds to a swipe gesture in the second direction, replace display (e.g., with display enabling unit 1110) of the first visual media item with display of a second visual media item of the sequence of visual media items.

In some embodiments, the detail user interface is a first detail user interface, and the processing unit 1108 is further configured to: while displaying the second visual media item, receive (e.g., with receiving unit 1112) a second user input that includes movement in a respective direction; determine (e.g., with determining unit 1114) whether the second user input corresponds to a swipe gesture in the first direction; in accordance with a determination that the user input corresponds to a swipe gesture in the first direction, enable display (e.g., with display enabling unit 1110), on display unit 1102, of a second detail user interface comprising related content for the second visual media item that has been determined to be related to the second visual media item, wherein the related content for the second visual media item is different from the related content for the first media item.

In some embodiments, the processing unit 1108 is further configured to: while displaying the first visual media item, receive (e.g., with receiving unit 1112) a third user input that includes movement in a respective direction; determine (e.g., with determining unit 1114) whether the third user input corresponds to a swipe gesture in a third direction, different from the first and second directions; in accordance with a determination that the third user input corresponds to a swipe gesture in the third direction, enable display (e.g., with display enabling unit 1110), on display unit 1102, of reduced scale versions of the media items of the sequence of visual media items.

In some embodiments, the reduced scale versions of the media items of the sequence of visual media items are arranged chronologically.

In some embodiments, the reduced scale versions of the media items of the sequence of visual media items are visually grouped by a geographic location associated with each respective visual media item.

In some embodiments, the processing unit 1108 is further configured to: while displaying the second visual media item, receive (e.g., with receiving unit 1112) a fourth user input that includes movement in a respective direction; determine (e.g., with determining unit 1114) whether the fourth user input corresponds to a swipe gesture in the third direction; in accordance with a determination that the user input corresponds to a swipe gesture in the third direction, enable display (e.g., with display enabling unit 1110), on display unit 1102, of the reduced scale versions of the media items of the sequence of visual media items.

In some embodiments, the representations of related content for the first visual media item are arranged non-chronologically.

In some embodiments, the processing unit 1108 is further configured to: while displaying the first visual media item, receive (e.g., with receiving unit 1112) a fifth user input that includes movement in the first direction; in response to receiving the fifth user input: in accordance with a determination that the first visual media item is enlarged beyond a predetermined threshold, moving the first visual media item on display unit 1102 in accordance with the fifth user input without displaying the detail user interface; and in accordance with a determination that the first visual media item is not enlarged beyond a predetermined threshold, moving the first visual media item on display unit 1102 in accordance with the fifth user input and enable display (e.g., with display enabling unit 1110), on display unit 1102, of the detail user interface.

In some embodiments, the detail user interface includes a first region that includes related content organized by the first category, the first category is faces identified in the first visual media item, and the first region includes an identified face from the first visual media item, and the processing unit 1108 is further configured to: receive (e.g., with receiving unit 1112) user input corresponding to selection of the identified face; and in response to receiving user input corresponding to selection of the identified face, enable display (e.g., with display enabling unit 1110), on display unit 1102, of a first collection of media items, wherein each item in the first collection of media items is selected so as to include the identified face.

In some embodiments, the detail user interface includes a second region that includes related content organized by the second category, the second category is location, and the second region includes a geographic map that includes a location indicator corresponding to a location associated with the first visual media item.

In some embodiments, the processing unit 1108 is further configured to: receive (e.g., with receiving unit 1112) user input corresponding to selection of the second region; and in response to the user input corresponding to selection of the second region, enable display (e.g., with display enabling unit 1110), on display unit 1102, of a map user interface that includes a visual representation of the location associated with the first visual media.

In some embodiments, the processing unit 1108 is further configured to: receive (e.g., with receiving unit 1112) user input corresponding to selection of the address; and in response to the user input corresponding to selection of the address, enable display (e.g., with display enabling unit 1110), on display unit 1102, of a user interface of a map application.

In some embodiments, the detail user interface includes a third region that includes related content organized by a third category, the third category is collections of visual media items that share a set of common characteristics, the third region includes a representation of a second collection of visual media items that share a set of common characteristics, and a visual media item of the second collection of visual media items shares a first characteristic with the first visual media item, and the processing unit 1108 is further configured to: receive (e.g., with receiving unit 1112) user input corresponding to selection of the representation of the second collection of visual media items; and in response to receiving the user input corresponding to selection of the representation of the first collection of media items, enable display (e.g., with display enabling unit 1110), on display unit 1102, of a representation of the visual media items of the second collection of visual media items.

In some embodiments, the second collection of visual media items excludes the first visual media item.

In some embodiments, displaying the detail user interface comprising related content for the first visual media item comprises: scrolling (e.g., with display enabling unit 1110) the displayed first visual media item in the first direction to reveal the detail user interface.

In some embodiments, scrolling the displayed first visual media item in the first direction to reveal the detail user interface comprises: scrolling (e.g., with display enabling unit 1110) the displayed first visual media item in the first direction until the portion of the first visual media item that remains displayed is a predetermined portion of the first visual media item; and after scrolling until the predetermined portion is the displayed portion: cease scrolling (e.g., with display enabling unit 1110) of the first visual media item; and continue scrolling (e.g., with display enabling unit 1110) to reveal the detail user interface while the predetermined portion of the first media item remains stationary.

In some embodiments, the first visual media item is an image or a video.

In some embodiments, the detail user interface is an interface of an application installed on the device, and wherein the detail user interface is accessible at the display of any visual media item displayed using the application.

The operations described above with reference to FIG. 10 are, optionally, implemented by components depicted in FIGS. 1A-1B or FIG. 11. For example, displaying operation 1002, receiving operation 1004, and determining operation 1008 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Social Groups

FIGS. 12A-12K illustrate exemplary user interfaces for viewing social groups in media items, in accordance with some embodiments. The user interfaces in these figures are used to illustrate the processes described below, including the processes in FIGS. 13A-13D.

FIG. 12A illustrates an exemplary memory detail view 1202 that includes an indication of a social group, displayed on device 1200. In some embodiments, device 1200 includes some or all of the features of device 100, device 300, device 500, or device 600. In this example, a user can access a memory detail view for a social group (e.g., a group of people, a group of identified faces).

In accordance with some embodiments, device 1200 displays a first detail user interface that includes a representation of first visual media corresponding to a first event. For example, memory detail view 1202, an exemplary first detail user interface, includes photos region 1202A, which depicts photos from the corresponding collection of media items in a curated view (an exemplary representation of first visual media). Memory detail view 1202 depicts a memory corresponding to the Fourth of July 2019, described above with reference to FIGS. 6A-6R. In this example, the memory detail user interface includes representations of visual media corresponding to an exemplary first event, namely a family party on Jul. 4, 2019 at the park.

In accordance with some embodiments, device 1200 determines an event based on contextual information associated with one or more visual media items. In some embodiments, the contextual information used to determine an event includes one or more of a location where the visual media item was captured by an imaging device, and a time when the visual media item was captured by an imaging device. In some embodiments, the contextual information used to determine an event is determined based on metadata associated with one or more visual media items (e.g., a keyword, a tag), Exif data, or the like. In some embodiments, device 1200 determines an event based on virtual calendar data. In some embodiments, the virtual calendar data includes one or more of a user-specified virtual calendar entry (e.g., a scheduled birthday, vacation, meeting, or the like), automatically-generated virtual calendar entries (e.g., the user accepted a virtual invitation or meeting request and an entry was automatically created on their virtual calendar), and a holiday (e.g., a scheduled national or state holiday). In some embodiments, device 1200 determines an event based on detecting that a plurality of individuals appears in a plurality of related photos.

In accordance with some embodiments, while displaying the first detail user interface, device 1200 displays an affordance corresponding to a plurality of individuals identified as having attended the first event. For example, in exemplary memory detail user interface 1202 of FIG. 12A, device 1200 displays social group indicator 1203A. Social group indicator 1203A corresponds to the plurality of individuals (e.g., identified as "Pat+3 others" at the interface in this example), which attended the first event. For instance, in this example the memory includes media items corresponding to the event on Jul. 4, 2019. Accordingly, the plurality of individuals corresponding to social group indicator 1203A (e.g., Pat and three others) are identified as having attended the event on Jul. 4, 2019. For example, the plurality of individuals Pat and three others can correspond to the user's four cousins, as mentioned previously.

Figure 12B:
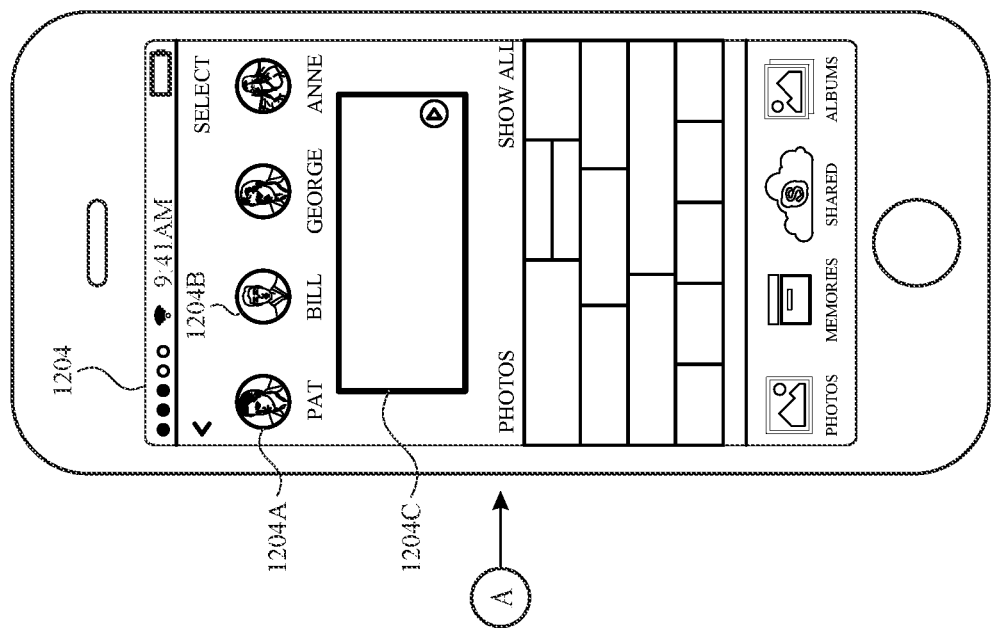

FIG. 12B illustrates an exemplary social group detail user interface. In accordance with some embodiments, while displaying the first detail user interface, device 1200 receives a user input corresponding to selection of the affordance and, in response, displays a second detail user interface that includes a representation (e.g., a detail user interface) of second visual media (e.g., a collection of photos and videos that correspond to a second event). For example, in response to receiving selection of social group indicator 1203A, device 1200 displays exemplary social group detail interface 1204 as shown in FIG. 12B. Social group detail interface 1204 includes representations of second visual media (e.g., reduced-scale representations in the photos region depicted as boxes) and indicators 1204A-1204B.

Figure 12C:
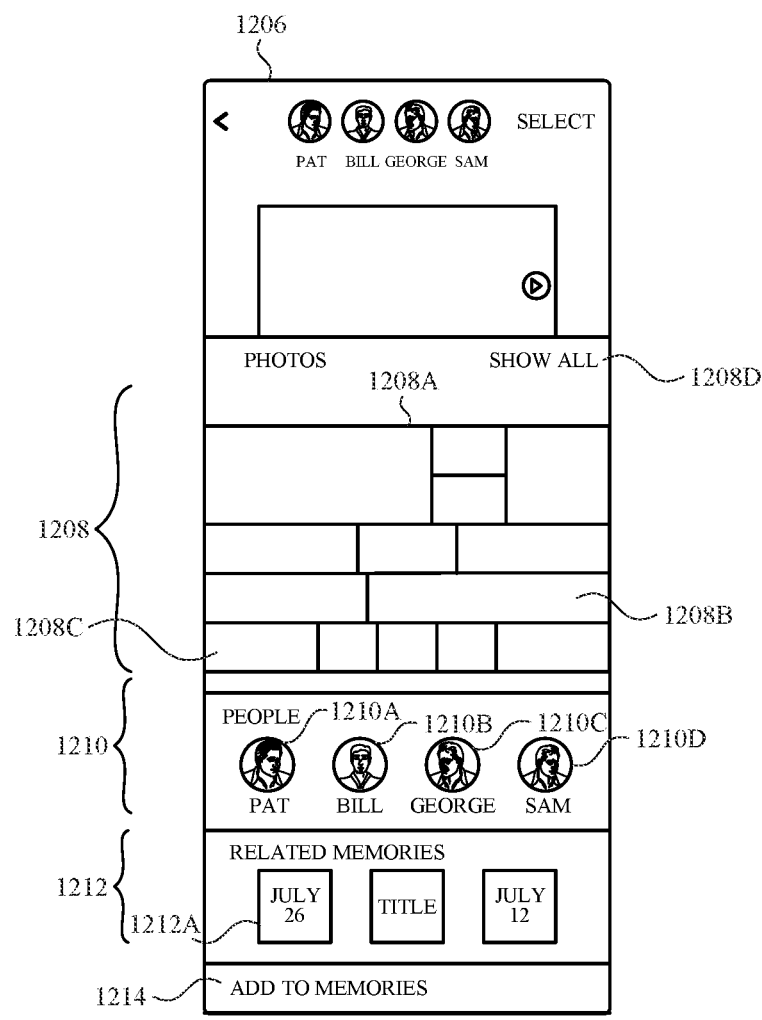
Figure 12D:
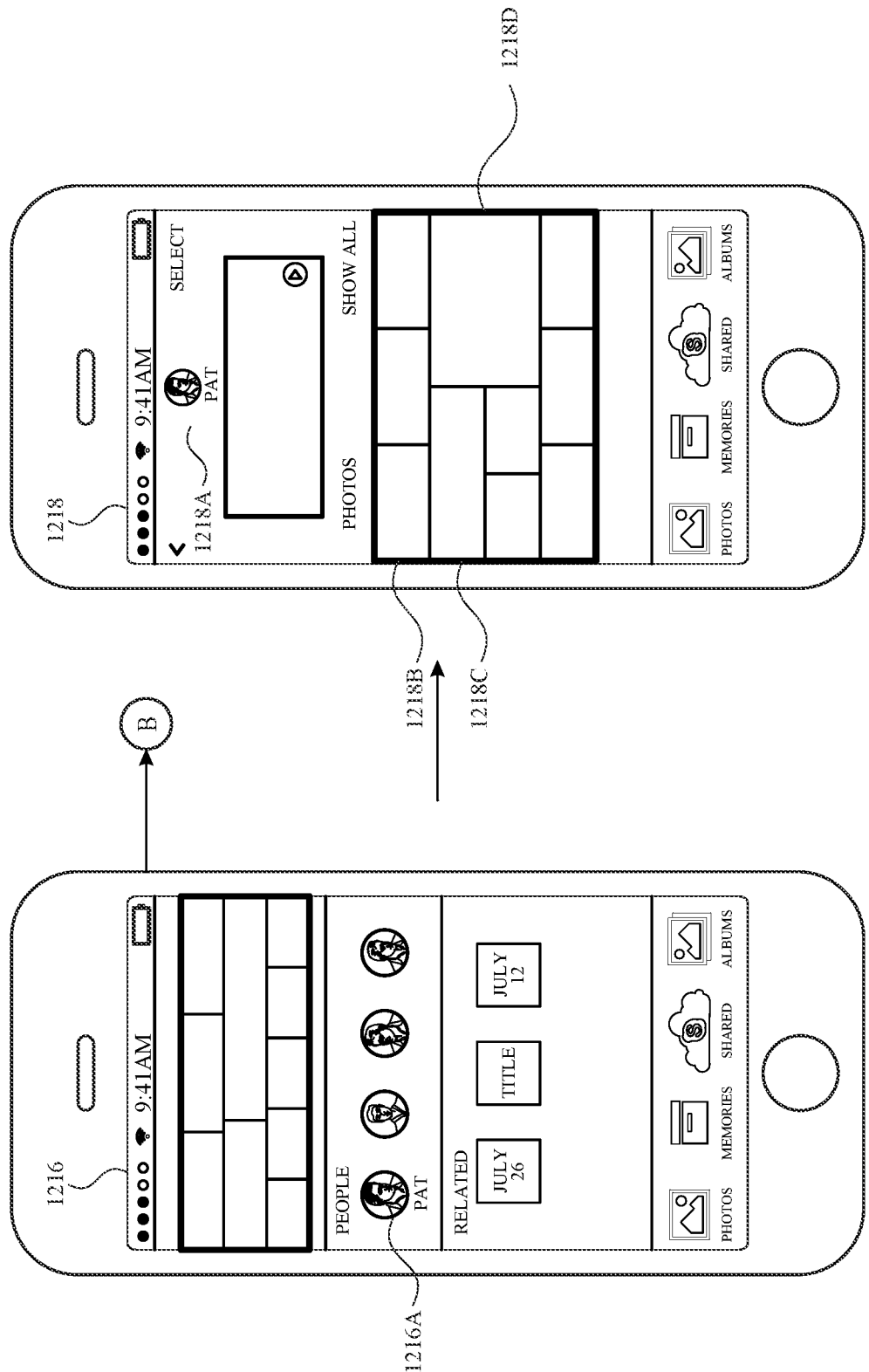
Figure 12E:
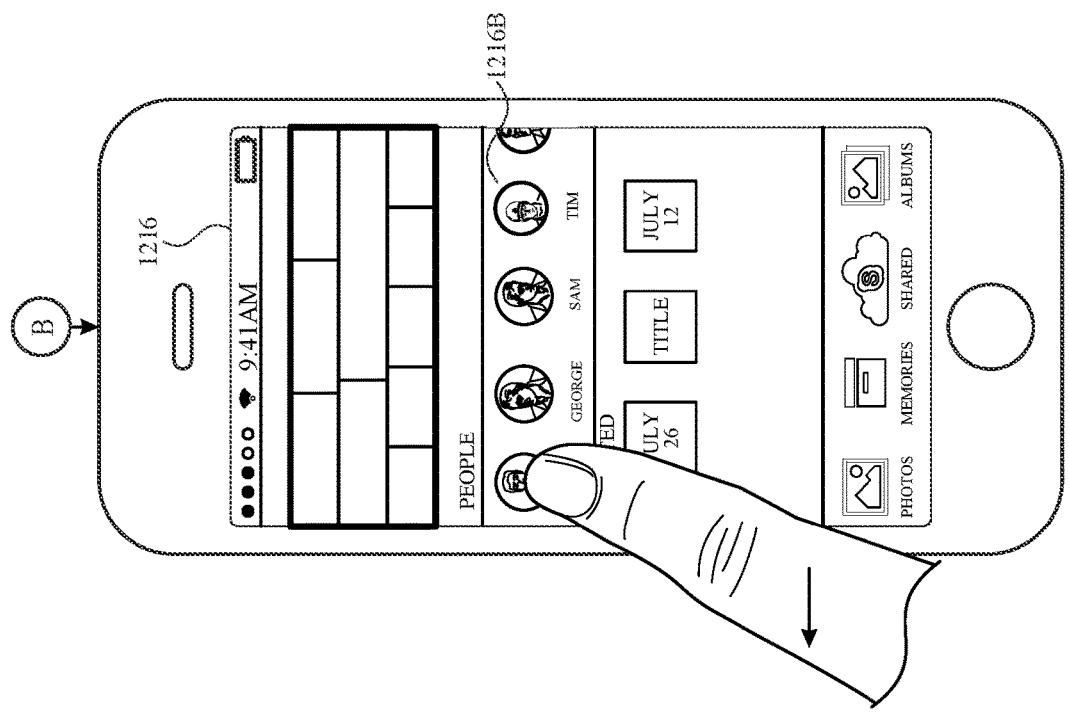

FIG. 12C depicts an expanded version of social group detail interface 1204 of FIG. 12B. Social group detail user interface 1206 includes a photos region 1208 (e.g., including media items 1208A-1208C), a people region 1210 (including face indicators 1210A-1210D), a related memories region 1212 (e.g., including a related memory representation 1212A), and an add to memories affordance 1214.

In accordance with some embodiments, the second visual media includes a first plurality of media items corresponding to a second event identified as having been attended by the plurality of individuals and a second plurality of media items corresponding to a third event identified as having been attended by the plurality of individuals. In some embodiments, the second event and the third event are different. For example, exemplary social group detail interface 1206 includes representations 1208A-1208C of media items included in the corresponding memory. In this example, the media item represented by 1208A depicts all four individuals of the social group (e.g., Pat, Bill, George, and Sam) and corresponds to Event 1, the media item represented by 1208B depicts three of the individuals of the social group (e.g., Pat, Bill, and George; not Sam) and corresponds to Event 2, and the media item represented by 1208C depicts two of the individuals of the social group (e.g., Pat and Bill; not George and Sam) and corresponds to Event 3, wherein Events 1, 2, and 3 are different. For instance, Event 1 is the family party on Jul. 4, 2019; Event 2 is the user's wedding day on Sep. 6, 2014; and Event 3 is a birthday party on May 4, 2019. Thus, the events are each different.

In accordance with some embodiments, the display of a social group indicator is determined based on relationship data. For example, device 1200 can prioritize presenting social group indicators of known family members (e.g., give a higher weighting when determining which social group indicators to display). That is, a user is more likely to want to view a social group comprised of the user and their family (e.g., spouse, kids, mother, father, etc.). Such relationships are optionally provided to device 1200 (e.g., the user selects identified faces as family members).

In accordance with some embodiments, relationship data is inferred from media associated with device 1200. For example, if three people appear together in a large proportion of photos, device 1200 optionally prioritizes the presentation of a social group indicator corresponding to the three people. That is, the three people are likely to have a close relationship to the user, and thus the user is likely to want to view media of these individuals.

In accordance with some embodiments, the display of a social group indicator is determined based on one or more selected attributes. For example, a user can have designated a person (corresponding to an identified face) as a favorite person. Thus, indicators for social groups including that person are optionally prioritized.

Other techniques for prioritizing the display of indicators for social groups are contemplated, and are intended to be within the scope of this disclosure.

In accordance with some embodiments, the detail user interface for the plurality of individuals has one or more of the same sections as described herein with respect to the detail user interface of the first collection described with reference to the user interfaces in FIGS. 6A-6R and method 700 of FIG. 7, but with faces, related memories, locations, key media item selected based on the plurality of individuals (e.g., in the social group).

Thus, in the example described above, the user can view media items corresponding to events in which a specific group of people attended. For instance, using the example above, the user may wish to see photos of events in which all four of user's cousins were in attendance. Normally, such photos would be dispersed throughout the user's library, requiring an excessive number of user inputs in order to navigate through discrete event albums, looking though all photos chronologically, and scrolling through undesired photos (e.g., of events not attended by the four cousins). On the other hand, the user could create separate albums for any and all combinations of individuals in their social circle (e.g., family, friends, coworkers, etc.) for later reference. However, this would still require the user to manually navigate through all of their photos, albums, etc. to locate the relevant media items, select them, and save them into an album. Further, such a method is cumbersome, as the user would have to continually maintain the albums (e.g., add in new photos as they are added to the user's photo library).

In accordance with some embodiments, attendance of a particular event by the plurality of individuals is identified based on identifying the face of an individual of the plurality of individuals in at least one media item corresponding to the particular event. For example, an individual's attendance at an event is optionally determined using facial recognition. For instance, if an individual's face is identified in a photo of a collection of photos corresponding to that event, then the person is identified to have attended that event.

In accordance with some embodiments, attendance of a particular event by the plurality of individuals is identified based on location data associated with the plurality of individuals, wherein the location data includes data identifying a device corresponding to an individual of the plurality of individuals as having been at a location of the particular event at a time of the particular event. For example, attendance by an individual at an event can be determined by determining that a device known to be associated with that individual (e.g., their smartphone) identifies that the user was present at the same time and place as the event. For example, in the example described above with respect to social group detail interface 1206, the individual named Bill was determined to have attended Event 2 based on location data that showed that his smartphone was present at the event.

In accordance with some embodiments, the location data associated with an individual or a plurality of individuals is determined based on one or more of: social media (e.g., a user posts their location at a particular time), proximity detection by device 1200 (e.g., detecting the individual's device is within range of Bluetooth, AirDrop, Wi-Fi, or other suitable connection that requires relatively close proximity), or the like.

Other techniques for determining location data associated with individuals are contemplated, and are intended to be within the scope of this disclosure.

In accordance with some embodiments, the second visual media includes a first media item that depicts fewer than all of the individuals of the plurality of individuals. For example, as described above, each visual media item that is included in a social group detail interface does not need to depict every individual in the plurality of individuals. In this example, some photos can include only three of the user's cousins (e.g., media item 1208B) or only two of the user's cousins (e.g., media item 1208C). In some examples, the second visual media includes a media item that depicts none of the individuals of the plurality of individuals. For instance, if the media items included in the collection of media items of the social group detail interface correspond to an event which was a vacation to Paris, the collection can include a photo of the Eiffel Tower in order to provide context to the collection of media items.

In accordance with some embodiments, the second detail user interface includes a first region comprising a slideshow including the media items of the second visual media. In some embodiments, the slideshow and the video are different. The features of an exemplary slideshow are described above with reference to at least FIG. 6H, the description of which is hereby incorporated. In accordance with some embodiments, device 1200 receives user input corresponding to selection of the slideshow and, in response, displays a video including media items of the second visual media. For example, at social group detail interface 1204 of FIG. 12B, key media item 1204C displays a slideshow of media items from the corresponding collection, and when selected, plays a video.

In accordance with some embodiments, the second detail user interface includes a second region, wherein the second region includes a curated view including a subset of the media items of the second visual media. For example, the second region is a photos region. The features of a photos region are described above, with reference to at least FIGS. 6J-6L, and are also applicable to a photos region in a social group detail interface. Accordingly, one or more of the features described above can be included in one or more embodiments of a social group detail interface, and therefore the above description is hereby incorporated.

In accordance with some embodiments, the second region further comprises a first affordance. For example, a "see all" affordance. Device 1200 receives user input corresponding to selection of the first affordance and, in response, displays an expanded view of the media items of the second visual media. For example, all photos of the corresponding collection are displayed in the social group detail interface.

In accordance with some embodiments, the second detail user interface includes a third region comprising a geographic map. For example, the third region is a maps region. The features of a maps region are described above, with reference to at least FIGS. 6J, 6N, and 6O, and are also applicable to a maps region in a social group detail interface. Accordingly, one or more of the features described above can be included in one or more embodiments of a social group detail interface, and therefore the above description is hereby incorporated.

In accordance with some embodiments, device 1200 displays a location indicator on the geographic map corresponding to a location associated with a second media item of the second visual media. For example, device 1200 displays the location of a photo using an indicator on a geographic map.

In accordance with some embodiments, the second detail user interface includes a fourth region comprising a representation of a first collection of visual media items that share a set of common characteristics, wherein a visual media item of the first collection of visual media items shares a first characteristic with a visual media item of the second visual media.

In accordance with some embodiments, the second detail user interface includes a fourth region comprising a representation of a first collection of visual media items that share a set of common characteristics, wherein a visual media item of the first collection of visual media items shares a first characteristic with a visual media item of the second visual media. For example, the fourth region is a related memories region. The features of a related memories region are described above, with reference to at least FIGS. 6J, 6Q, and 6R, and are also applicable to a photos region in a social group detail interface. Accordingly, one or more of the features described above can be included in one or more embodiments of a social group detail interface, and therefore the above description is hereby incorporated.

In accordance with some embodiments, device 1200 receives user input corresponding to selection of the representation of the first collection of visual media items and, in response, displays a representation of the visual media items of the first collection of visual media items. For example, device 1200 displays a memory detail interface for the related memory, including a curated view of photos in the related memory.

In accordance with some embodiments, the first collection of visual media items excludes the media items of the second visual media. For example, the related memory optionally contains none of the photos of the current memory (e.g., corresponding to the current social group). For instance, the related memory does not share any media items with the social group (e.g., currently displayed as a memory), but are related based on some contextual property and/or characteristic.

In accordance with some embodiments, while displaying the second detail user interface, device 1200 displays a fifth region that includes a plurality of affordances. For example, the fifth region is a people region. The features of a people region are described above, with reference to at least FIGS. 6J and 6P, and are also applicable to a people region in a social group detail interface. Accordingly, one or more of the features described above can be included in one or more embodiments of a social group detail interface, and therefore the above description is hereby incorporated.

In accordance with some embodiments, each affordance of the plurality of affordances corresponds to a single different individual of the plurality of individuals.

Figure 12F:
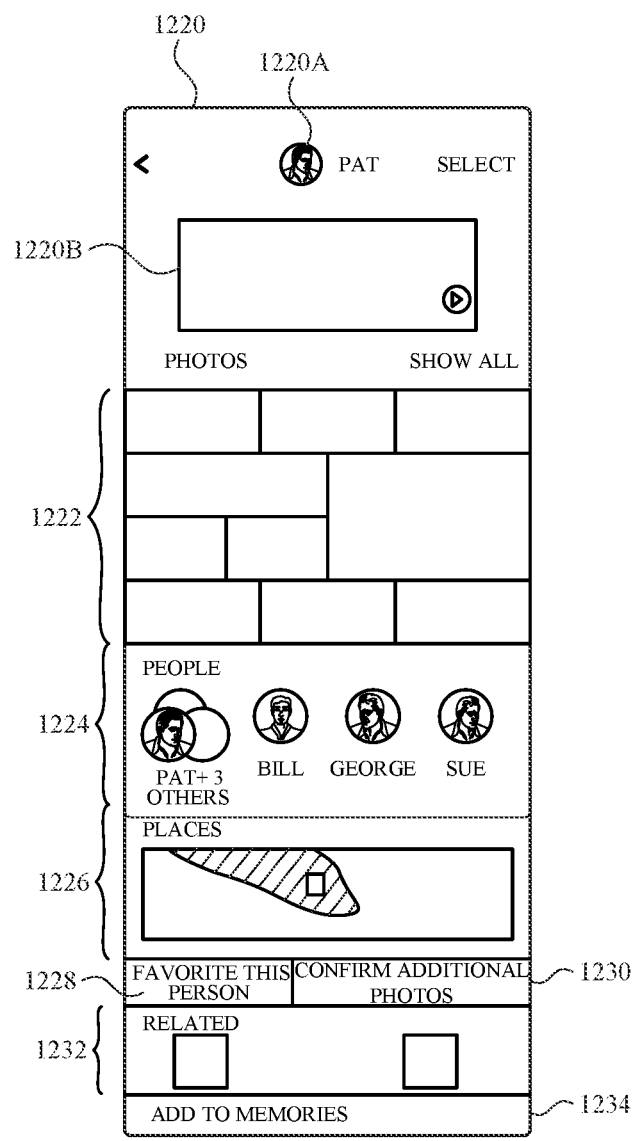

In accordance with some embodiments, device 1200 receives user input corresponding to selection of an affordance of the plurality of affordances in the fifth region, wherein the affordance corresponds to a first individual, and, in response, displays a third detail user interface that includes a representation of third visual media. For example, social group detail user interface 1216 of FIG. 12D includes a people region that includes a plurality of affordances. In particular, interface 1216 includes an affordance for each individual in the plurality of individuals (e.g., Pat, Bill, George, and Sam). In the example depicted in FIG. 12D, device 1200 receives selection of face indicator 1216A and, in response, displays person detail user interface 1218 (e.g., with features similar to the person detail interface 668 of FIG. 6P). An expanded exemplary person detail interface 1220 is shown in FIG. 12F, and individual identifier 1220A (e.g., identifying the individual associated with the current memory view), key media item 1220B, photos region 1222, people region 1224, map region 1226, favorite affordance 1228, confirm additional photos affordance 1230, related memories region 1232, and add to memories affordance 1234.

In accordance with some embodiments, the third visual media includes a third plurality of media items, and each of the third plurality of media items is identified as depicting the first individual. For example, each of the media items 1218B-1218D depict the individual. As described previously, the person detail interface can include only media items that depict the corresponding individual.

In accordance with some embodiments, the third plurality of media items comprises a media item corresponding to a fourth event identified as having been attended by the first individual, and wherein the second event, the third event, and the fourth event are different. For example, the photos of the first individual are from an event not included in the memory corresponding to the social group detail interface 1206 of FIG. 12B. For instance, the individual associated with the person detail user interface 1218 is depicted in photos from an event (e.g., an exemplary fourth event) that was not attended by the three other individuals of the plurality of individuals (Bill, George, and Sam). Thus, photos of this fourth event were not included in the social group's memory view, but are included in the individual's memory detail view.

In accordance with some embodiments, device 1200 receives user input corresponding to a request to scroll the fifth region, and, in response to receiving the user input corresponding to the request to scroll the fifth region, scrolls the plurality of affordances included in the fifth region while the fifth region remains stationary. For example, in FIG. 12E, device 1200 receives a swipe gesture in a direction from right to left on the people region. In response, the people region has scrolled from right to left.

In accordance with some embodiments, scrolling the plurality of affordances causes a previously non-displayed affordance to be displayed in the fifth region, and wherein the previously non-displayed affordance corresponds to a second individual that is not included in the plurality of individuals. For example, face indicator 1216B of FIG. 6E corresponds to an individual who was not displayed before the user input was received (e.g., named "Tim") and who is not part of the plurality of individuals. For example, at the display of social group detail view 1216 in FIG. 12D, there is no affordance for Tim before the people region is scrolled.

Figure 12G:
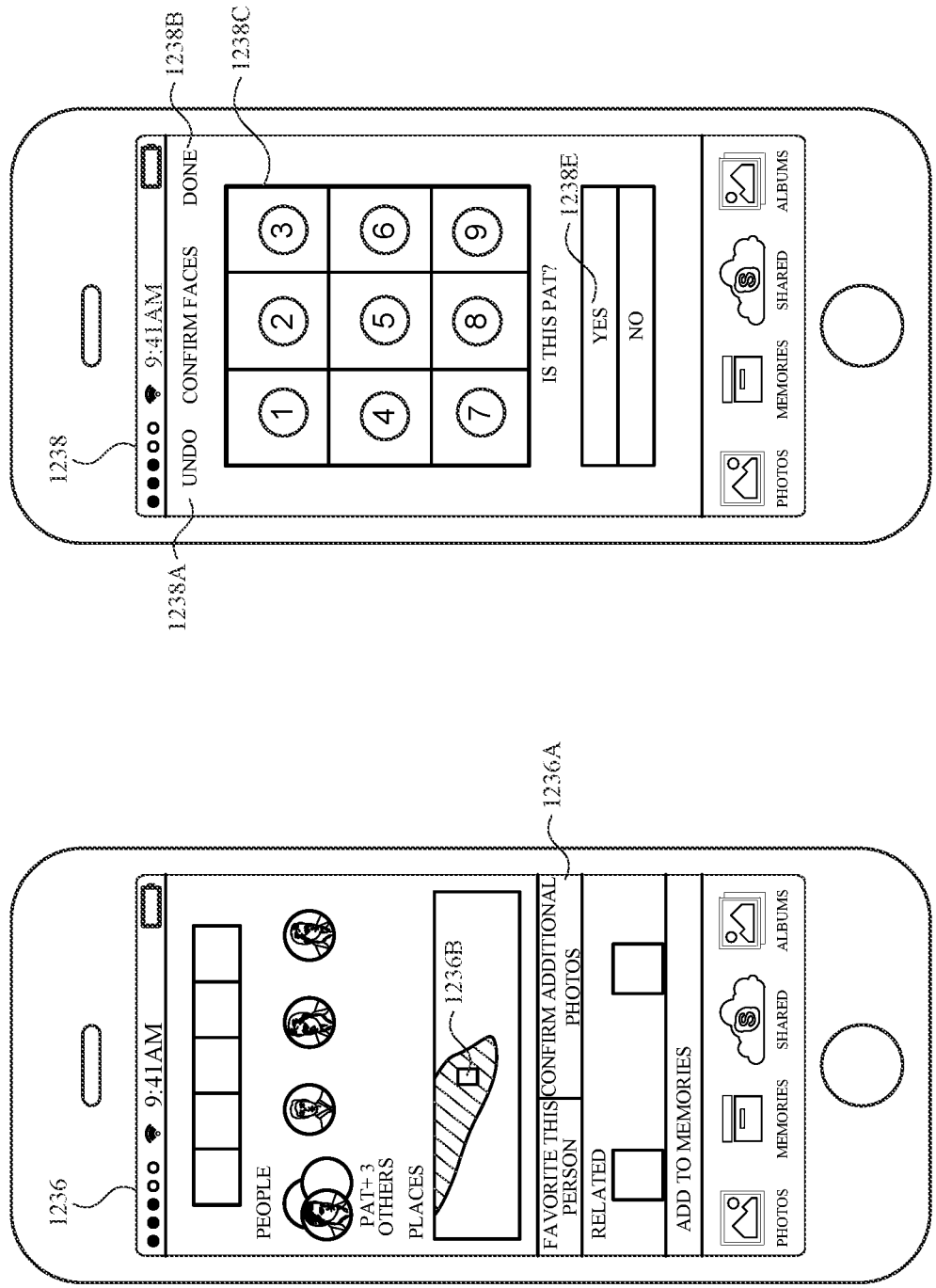

In accordance with some embodiments, while displaying the third detail user interface, device 1200 displays a second affordance. For example, at person detail interface 1236, shown in FIG. 12G, device 1200 receives selection of confirm additional photos affordance 1236A. In response, device 1200 displays confirm faces interface 1238, as shown in FIG. 12G. Device 1200 receives user input corresponding to selection of the second affordance and, in response, displays an individual confirmation user interface that includes a candidate visual media item that has been identified as potentially depicting the first individual, wherein the candidate visual media item is not included in the third visual media (e.g., the photo is not one of the photos displayed in the person's memory). For example, in response to selection of confirm additional photos affordance 1236A, device 1200 displays exemplary individual confirmation user interface 1238 (also referred to as confirm faces interface 1238). Individual confirmation user interface 1238 includes a display of a plurality of media items (e.g., nine) in region 1238C. Each of the plurality of media items 1238C depict an identified face from a media item, where the identified face potentially matches the individual whose memory detail view was previously displayed. In this example, device 1200 is prompting the user to confirm whether the plurality of media items depict the individual Pat. Individual confirmation user interface 1238 also depicts an undo affordance 1238A and a done affordance 1238B.

In accordance with some embodiments, device 1200 displays a single candidate visual media item that has been identified as potentially depicting the first individual at the individual confirmation user interface.

In accordance with some embodiments, device 1200 receives user input associated with the individual confirmation user interface and, in response, determines whether the user input associated with the individual confirmation user interface represents a confirmation input or a rejection input. For example, device 1200 determines whether a user input corresponds to a selection an affordance 1238E of confirming or rejecting the displayed plurality of media items as depicting Pat.

In accordance with some embodiments, in accordance with a determination that the user input associated with the individual confirmation user interface represents a confirmation input, device 1200 associates the candidate media item with the first individual. For example, device 1200 includes the media item in the collection of media items included in the person's memory, or otherwise associates the candidate media item with the individual (e.g., with their profile).

In accordance with some embodiments, device 1200 confirms that faces matching a face pattern of the face detected in the candidate media item are also associated with the first individual. For example, device 1200 uses the confirmed candidate media item to check other media items.

In accordance with some embodiments, in accordance with a determination that the user input associated with the individual confirmation user interface represents a rejection input, device 1200 forgoes associating the candidate media item with the first individual. For example, device 1200 does not associate the confirmed photo with the person's profile, in device memory.

FIG. 12H depicts a contextual menu for an identified face. In accordance with some embodiments, the user input corresponding to selection of the affordance of the plurality of affordances is a touch user input with a first characteristic intensity detected on the touch-sensitive surface. For example, the touch on affordance 1240A depicted in FIG. 12H has a characteristic intensity, detected by a touch-sensitive surface (e.g., display).

In accordance with some embodiments, device 1200 determines a first characteristic intensity of the user input and, in accordance with a determination that the user input meets intensity-dependent criteria, displays a contextual menu user interface. In some embodiments, the intensity-dependent criteria require that first characteristic intensity of the touch user input exceeds an intensity threshold in order for the intensity-dependent criteria to be met. For example, if the touch input on affordance 1240A exceeds the intensity threshold in satisfaction of the intensity-dependent criteria, device 1200 displays contextual menu interface 1242.

In accordance with some embodiments, the contextual menu user interface comprises a first contextual affordance. Rename affordance 1242A is an exemplary first affordance. Device 1200 receives user input corresponding to selection of the first contextual affordance and, in response, displays a name editing user interface for editing a name used as an identifier for the first individual. For example, device 1200 displays naming interface 1246 shown in FIG. 12I.

In accordance with some embodiments, while displaying the name editing user interface, device 1200 receives an updated name of the first individual and, in response, updates the existing name associated with the first individual stored in memory to the updated name. For example, device 1200 can receive input of a new name in exemplary field 1246A of the interface 1246, and update the profile of the individual Pat (e.g., in device memory) to the new received name.

Figure 12I:
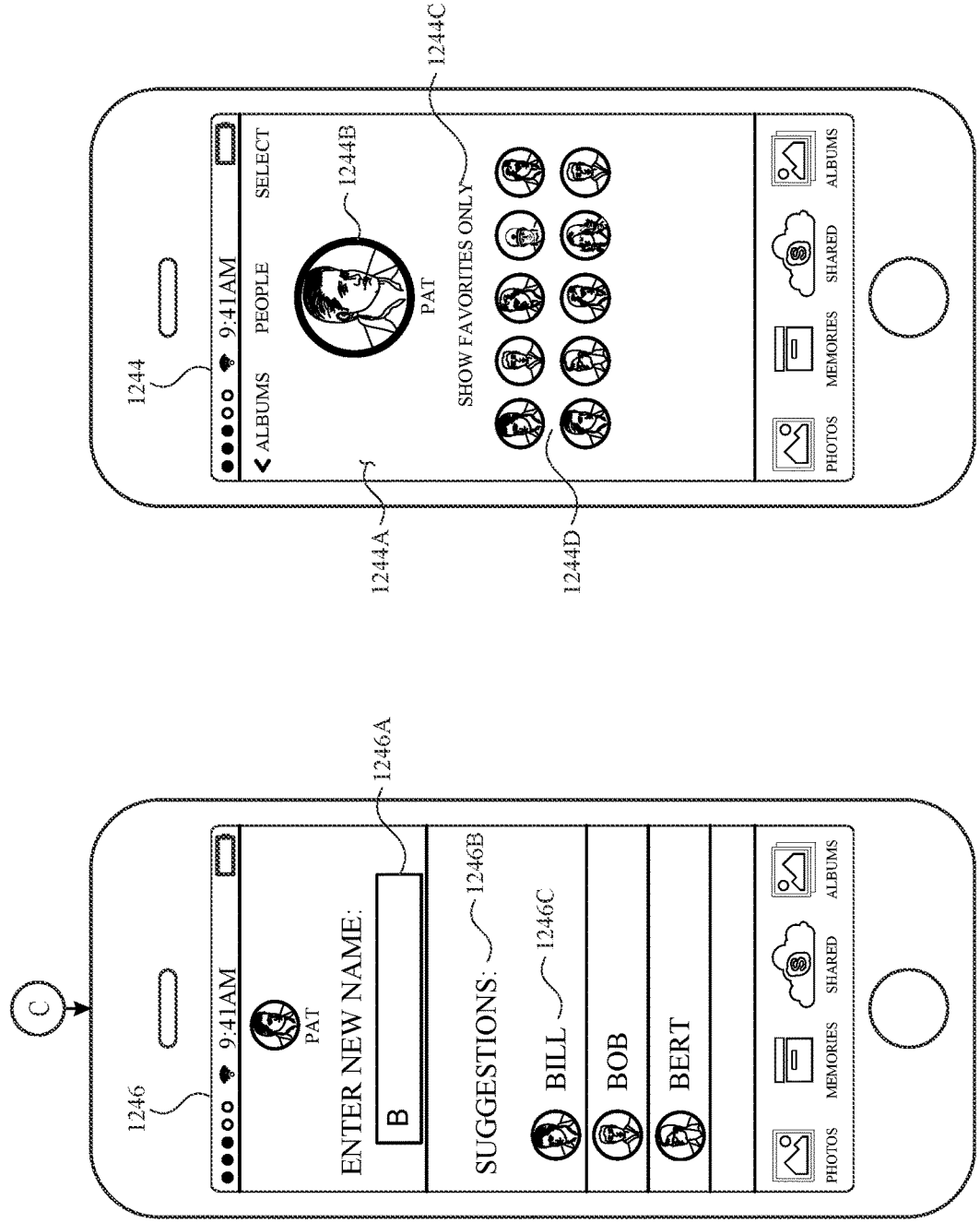

In accordance with some embodiments, device 1200 displays an affordance corresponding to a suggested individual, wherein the suggested individual corresponds to a contact in a contacts list accessible to device 1200. For example, device 1200 can offer suggestions 1246B to the user when renaming, based on individuals saved as contacts accessible to device 1200 (e.g., associated with a phone application on device 1200). One such suggestion 1246C is shown in FIG. 12I, corresponding to Bill, based on the user's input of the character "B" in the input field.

In accordance with some embodiments, device 1200 receives user input corresponding to selection of the affordance corresponding to the suggested individual and, in response, updates the existing name associated with the first individual stored in memory to a name of the suggested individual.

In accordance with some embodiments, the contextual menu user interface comprises a third contextual affordance. Forget affordance 1242B is an exemplary third affordance. Device 1200 receives user input corresponding to selection of the third contextual affordance. In some embodiments, device 1200 deletes the name associated with the identified face or otherwise dissociates the face with an individual's profile.

In accordance with some embodiments, the contextual menu user interface comprises a second contextual affordance. Add to favorites affordance 1242C is an exemplary second affordance. Device 1200 receives user input corresponding to selection of the second contextual affordance and, in response, associates an identifier of the first individual with a list of identifiers of selected individuals. For example, device 1200 associates (e.g., in memory) the individual to a favorite person list.

In accordance with some embodiments, device 1200 displays a user interface that includes a third affordance and representations of identified individuals. For example, device 1200 displays an album for people, illustrated in people album interface 1244 of FIG. 12I. Show only favorites affordance 1244C is an exemplary third affordance. In some embodiments, the representations of identified individuals include the individuals of the list of selected individuals. For example, the people album interface 1244 includes a representation of favorites users (e.g., in area 1244A, representation 1244B), as well as other users (e.g., non-favorited users in area 1244D).

In accordance with some embodiments, device 1200 receives user input corresponding to selection of the third affordance and, in response, ceases display of representations of individuals that do not correspond to an identifier associated with the list of identifiers of selected individuals. For example, in response to selection of show only favorites affordance 1244C, device 1200 would cease display (not depicted) of the representations in area 1244D, representing non-favorited individuals.

As should be apparent based on the description thus far, a memory detail view (and the other detail views) is a highly useful way of organizing information relevant to one or more media items. In some embodiments creation of a memory (or saving, or adding to favorites, or viewing a collection of media items in a detail view format) does not create new instances of the media items included in the collection corresponding to the detail view. Rather, in some examples, the memory is created/stored independent of the storage of the media items, but with one or more references to the media items included in the collection of media items of the memory. In some examples, information associated with the media items can be updated or created to denote that the media item is a member of a memory.

In some examples, the user can save a detail view that is not otherwise already saved, as a memory. For example, the user may want to recall the social group detail view that included their four cousins, without having to navigate to a memory/album/photo/etc. that causes an indicator corresponding to that social group to be displayed in a people region.

Figure 12J:
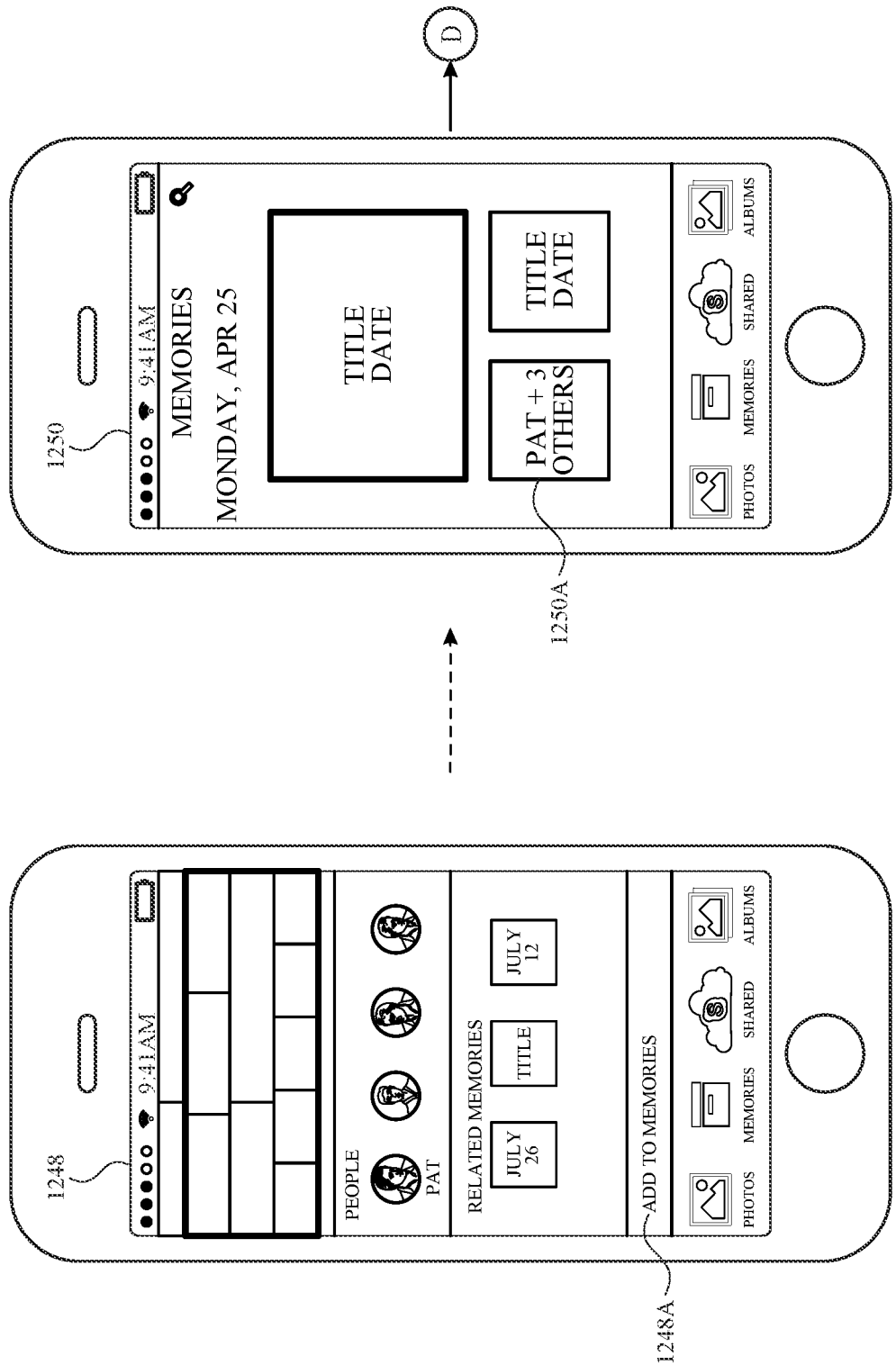
Figure 12K:
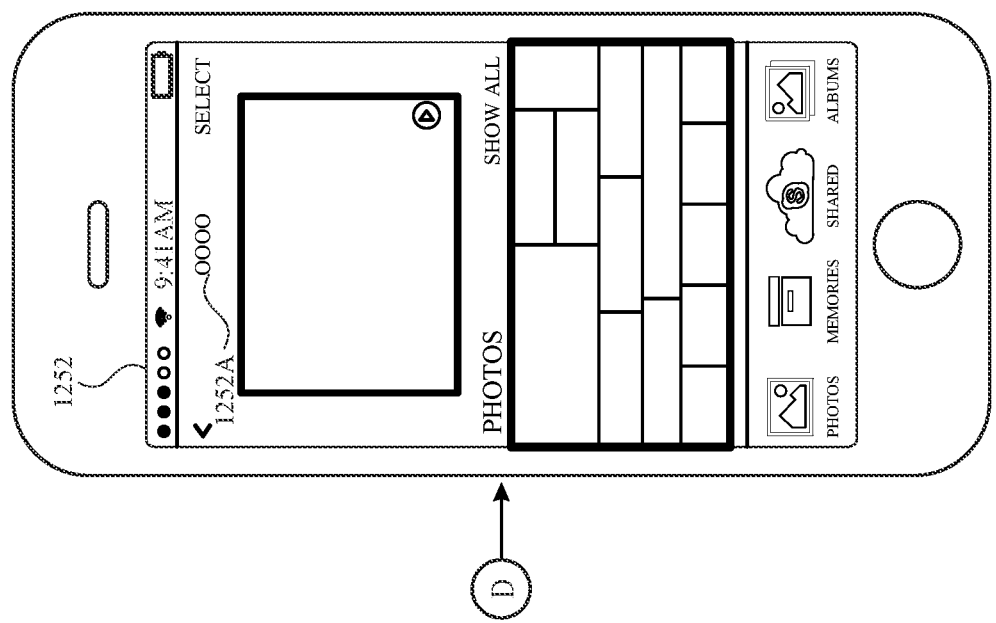

FIGS. 12J and 12K illustrates an exemplary method of saving and viewing a detail view (also referred to as a detail user interface) as a memory. In accordance with some embodiments, the second detail user interface comprises a fourth affordance. For example, social group detail interface 1248 includes an exemplary fourth affordance, add to memories affordance 1248A. Device 1200 receives user input corresponding to selection of the fourth affordance and, in response, adds the second detail user interface to a set of detail user interfaces saved by the user. For example, device 1200 stores an identifier associated with the second visual media (e.g., in device memory).

In accordance with some embodiments, device 1200 ceases display of the second detail user interface. Subsequent to ceasing display of the second detail user interface, device 1200 receives user input corresponding to a request to display the second detail user interface, and displays the second detail user interface. In some examples, device 1200 displays the second detail user interface based in part on the stored identifier associated with the second visual media. For example, subsequent to displaying the social group detail interface 1248, the user navigates device 1200 to the memories tab of a photos application. In this example, device 1200 displays memory timeline 1250, which includes a representation 1250A of a memory for "Pat+3 Others", thus corresponding to the collection of media items of the plurality of individuals.

FIG. 12K depicts the social group detail interface 1252 corresponding to the plurality of individuals, which is displayed in response to the selection of representation 1250A of FIG. 12J, and includes indicators 1252A.

FIG. 13 is a flow diagram illustrating a method for viewing media content relevant to a plurality of individuals using an electronic device in accordance with some embodiments. Method 1300 is performed at a device (e.g., 100, 300, 500) with a display and, optionally, a touch-sensitive surface. Some operations in method 1300 are, optionally, combined, the order of some operations are, optionally, changed, and some operations are, optionally, omitted.

As described below, method 1300 provides an intuitive way for viewing media content relevant to a plurality of individuals. The method reduces the cognitive burden on a user for locating and viewing media content relevant to a plurality of individuals, thereby creating a more efficient human-machine interface. For battery-operated computing devices, enabling a user to browse media content relevant to a plurality of individuals faster and more efficiently conserves power and increases the time between battery charges.

The device displays (1302), on the display, a first detail user interface (e.g., detail user interface 1202 at FIG. 12A) that includes a representation of first visual media (e.g., media items in curated view 1202A of FIG. 12A) corresponding to a first event. In some examples, the device determines an event based on contextual information associated with one or more visual media items (e.g., based on the exemplary contexts listed in FIGS. 6D and 6E). In some examples, the contextual information used to determine an event includes one or more of a location where the visual media item is captured by an imaging device, and a time when the visual media item is captured by an imaging device. In some examples, the contextual information used to determine an event includes metadata associated with one or more visual media items (e.g., a keyword, a tag). In some examples, the device determines an event based on virtual calendar data. In some examples, the virtual calendar data includes one or more of a user-specified virtual calendar entry (e.g., a scheduled birthday, a vacation, a meeting), automatically-generated virtual calendar entries, and a holiday. In some examples, the device determines an event based on detecting that a plurality of individuals appears in a plurality of related photos.

While displaying the first detail user interface (1304), the device displays (1306), on the display, an affordance (e.g., indicator 1203A in FIG. 12A) corresponding to a plurality of individuals identified as having attended the first event, and receives (1308) a user input corresponding to selection of the affordance.

In accordance with some embodiments, attendance of a particular event by the plurality of individuals is identified (1312) based on the face of an individual of the plurality of individuals in at least one media item corresponding to the particular event (e.g., similar to the detection of faces of the two children in the media item 614). In accordance with some embodiments, attendance of a particular event by the plurality of individuals is identified (1314) based on location data associated with the plurality of individuals, wherein the location data includes data identifying a device corresponding to an individual of the plurality of individuals as having been at a location of the particular event at a time of the particular event (e.g., similar to the determination of a context based on the current group of people the user is currently near, as depicted with regards to memory representation 610B in FIG. 6D).

In response to receiving the user input, the device displays (1310), on the display, a second detail user interface (e.g., detail user interface 1204 in FIG. 12B) that includes a representation of second visual media (e.g., in the photos region of memory detail interface 1204), wherein the second visual media includes a first plurality of media items corresponding to a second event identified as having been attended by the plurality of individuals and a second plurality of media items corresponding to a third event identified as having been attended by the plurality of individuals, and wherein the second event and the third event are different. In some examples, the detail user interface for the plurality of individuals has one or more of the same sections as described herein with respect to the detail user interface of the first collection described with reference to method 700, but with faces, related memories, locations, and/or key media item selected based on the plurality of individuals. Thus, the device (e.g., device 1200), by displaying a detail user interface for a collection of media items corresponding to a plurality of events attended by a plurality of identified individuals, allows the user to selectively view media corresponding to events in which a select group of individuals attended, reducing the number of user inputs that would otherwise be required by the user manually navigating separately through media collections of events to determine attendance and/or access images, saving device resources and user time.

In accordance with some embodiments, the second visual media includes a first media item that depicts fewer than all of the individuals of the plurality of individuals (1316). In accordance with some embodiments, the second detail user interface includes a first region comprising a slideshow (e.g., slideshow 1204C of FIG. 12B) including the media items of the second visual media. In accordance with some embodiments, the device receives user input corresponding to selection of the slideshow, and, in response to the user input corresponding to selection of the slideshow, displays, on the display, a video (e.g., such as that shown in video 628 of FIG. 6H) including media items of the second visual media, wherein the slideshow and the video are different. In accordance with some embodiments, the second detail user interface includes a second region (e.g., photos region 1208 of FIG. 12C), wherein the second region includes a curated view including a subset (e.g., media items 1208A-1208C of FIG. 12C) of the media items of the second visual media. In some examples, the photos section includes a display of the photos in the memory. In some examples, the display is a curated view that includes a subset of the photos and/or videos of the second visual media. In accordance with some embodiments, the second region further comprises a first affordance (e.g., show all affordance 1208D in FIG. 12C). In accordance with some embodiments, the device receives user input corresponding to selection of the first affordance, and, in response to receiving the user input corresponding to selection of the first affordance, displays, on the display, an expanded view of the media items of the second visual media (e.g., such as that shown in 652 of FIG. 6K). Thus, the device (e.g., device 1200), by displaying a curated view including a subset of media items, reduces the number of additional inputs needed as a user is browsing a reduced set of media items, thus saving user time and device resources that would otherwise be consumed by displaying and receiving the additional user inputs associated with viewing a larger set of media items.

The device (e.g., device 1200), by displaying a video or a slideshow that both include content from the collection (but different) allows for the presentation of media that are optimized for viewing conditions, and thus efficiently uses the display when browsing relevant media by using the display in a way that is more likely to attract a user's attention and reduce the number of additional inputs to manually browse media items, saving device resources and user time.

In accordance with some embodiments, the second detail user interface (e.g., detail user interface 1206 in FIG. 12C) includes a third region (e.g., map region, such as the map region 1226 shown in FIG. 12F) comprising a geographic map, and displaying the detail user interface further comprises displaying, on the display, a location indicator (e.g., location indicator 1236B on memory detail view 1236 of FIG. 12G) on the geographic map corresponding to a location associated with a second media item of the second visual media. In accordance with some embodiments, the second detail user interface includes a fourth region comprising a representation of a first collection of visual media items that share a set of common characteristics, wherein a visual media item of the first collection of visual media items shares a first characteristic with a visual media item of the second visual media. In accordance with some embodiments, the device receives user input corresponding to selection of the representation of the first collection of visual media items, and, in response to receiving the user input corresponding to selection of the representation of the first collection of media items, displays, on the display, a representation of the visual media items of the first collection of visual media items. In accordance with some embodiments, the first collection of visual media items excludes the media items of the second visual media. Thus, the device (e.g., device 1200), by displaying a location indicator corresponding to a media item of the visual media, provides the user with quick access to relevant location information for visual media, without the need for numerous additional inputs, saving device resources and user time.

In accordance with some embodiments, the device, while displaying the second detail user interface, displays (1318), on the display, a fifth region (e.g., people region 1210 of FIG. 12C) that includes a plurality of affordances (e.g., indicators 1210A-1210D), each corresponding to a single different individual of the plurality of individuals, receives (1318) user input corresponding to selection of an affordance (e.g., of indicator 1210A of FIG. 12C) of the plurality of affordances in the fifth region, wherein the affordance corresponds to a first individual (e.g., Pat), and, in response to receiving the user input corresponding to selection of the affordance that corresponds to the first individual, displays (1318), on the display, a third detail user interface (e.g., detail user interface 1220 of FIG. 12F) that includes a representation of third visual media (e.g., in photos region 1222 of FIG. 12F), wherein the third visual media includes a third plurality of media items, each of the third plurality of media items is identified as depicting the first individual (e.g., Pat), the third plurality of media items comprises a media item corresponding to a fourth event identified as having been attended by the first individual, and the second event, the third event, and the fourth event are different. Thus, the device (e.g., device 1200), by displaying an indicator corresponding to an identified face in a media item of first collection as part of a detail user interface for the collection, provides the user with quick access to relevant information identifying the individuals depicted in a collection of media items, without the need for numerous additional inputs, for instance to review all of the images to determine a person's attendance, saving device resources and user time.

In accordance with some embodiments, the device receives (1320) user input corresponding to a request to scroll the fifth region (e.g., people region 1224 of FIG. 12F), and, in response to receiving the user input corresponding to the request to scroll the fifth region, scrolls (1320) the plurality of affordances included in the fifth region while the fifth region remains stationary, wherein scrolling the plurality of affordances causes a previously non-displayed affordance (e.g., affordance 1216B of detail user interface 1216 of FIG. 12E) to be displayed in the fifth region and the previously non-displayed affordance corresponds to a second individual that is not included in the plurality of individuals.

In accordance with some embodiments, the device, while displaying the third detail user interface, displays (1322), on the display, a second affordance (e.g., confirm additional photos affordance 1236A of FIG. 12G), receives (1322) user input corresponding to selection of the second affordance, and, in response to receiving the user input corresponding to selection of the second affordance, displays (1322), on the display, an individual confirmation user interface (e.g., interface 1238 of FIG. 12G) that includes a candidate visual media item (e.g., photos numbered 1 through 9 in region 1238C of FIG. 12G) that has been identified as potentially depicting the first individual, wherein the candidate visual media item is not included in the third visual media.

In accordance with some embodiments, the device receives user input (e.g., selection of yes or no on affordance 1238E at individual confirmation user interface 1238 of FIG. 12G) associated with the individual confirmation user interface, and, in response to receiving the user input associated with the individual confirmation user interface, determines whether the user input associated with the individual confirmation user interface represents a confirmation input or a rejection input, and, in accordance with a determination that the user input associated with the individual confirmation user interface represents a confirmation input (e.g., selection of yes at affordance 1238E of FIG. 12G), associates the candidate media item with the first individual, and, in accordance with a determination that the user input associated with the individual confirmation user interface represents a rejection input (e.g. selection of no at affordance 1238E of FIG. 12G), forgoes associating the candidate media item with the first individual. In accordance with some embodiments, the user input corresponding to selection of the affordance of the plurality of affordances is a touch user input with a first characteristic intensity detected on the touch-sensitive surface. In accordance with some embodiments, the device determines (1324) a first characteristic intensity of the user input, and, in accordance with a determination that the user input meets intensity-dependent criteria, wherein the intensity-dependent criteria require that first characteristic intensity of the touch user input exceeds an intensity threshold in order for the intensity-dependent criteria to be met, displays (1324) a contextual menu user interface (e.g., contextual affordances 1242A-1242C). The device (e.g., device 1200), by displaying a contextual menu in response to an intensity-dependent criteria, increases the number of possible interactions with a selected affordance, thus reducing the number of inputs necessary to perform different operations, saving device resources and user time.

In accordance with some embodiments, the contextual menu user interface comprises a first contextual affordance (e.g., renaming affordance 1242A of FIG. 12H). In accordance with some embodiments, the device receives (1326) user input corresponding to selection of the first contextual affordance, and, in response to receiving the user input corresponding to selection of the first contextual affordance, displays (1326), on the display, a name editing user interface (e.g., interface 1246 of FIG. 12I) for editing a name used as an identifier for the first individual (e.g., Pat), and, while displaying the name editing user interface, receives (1326) an updated name (e.g., "B" at FIG. 12I) of the first individual, and, in response to receiving the updated name of the first individual, updates (1326) the existing name associated with the first individual stored in memory to the updated name.

In accordance with some embodiments, the device displays (1328), on the display, an affordance corresponding to a suggested individual (e.g., individual 1246C at FIG. 12I), wherein the suggested individual corresponds to a contact in a contacts list accessible to the device, receives (1328) user input corresponding to selection of the affordance corresponding to the suggested individual, and, in response to receiving the user input corresponding to selection of the affordance corresponding to the suggested individual, updates (1328) the existing name associated with the first individual stored in memory to a name of the suggested individual.

In accordance with some embodiments, the contextual menu user interface comprises a second contextual affordance (e.g., add to favorites affordance 1242C at FIG. 12H). In accordance with some embodiments, the device receives (1330) user input corresponding to selection of the second contextual affordance, and, in response to receiving the user input corresponding to selection of the second contextual affordance, associates (1333) an identifier of the first individual with a list of identifiers of selected individuals (e.g., in device memory), and displays (1330), on the display, a user interface (e.g., people album interface 1244 of FIG. 12I) that includes a third affordance (e.g., show favorites only affordance 1244C of FIG. 12I) and representations of identified individuals, wherein the representations of identified individuals includes the individuals of the list of selected individuals (e.g., favorited individuals), and receives (1330) user input corresponding to selection of the third affordance, and, in response to receiving the user input corresponding to selection of the third affordance, ceases display (1330) of representations of individuals that do not correspond to an identifier associated with the list of identifiers of selected individuals.

In accordance with some embodiments, the second detail user interface and comprises a fourth affordance (e.g., add to memories affordance 1214 of FIG. 12C). In accordance with some embodiments, the device receives (1332) user input corresponding to selection of the fourth affordance, and, in response to receiving the user input corresponding to selection of the fourth affordance, adds (1332) the second detail user interface to a set of detail user interfaces saved by the user (e.g., favorited by the user), and ceases display (1332) of the second detail user interface (e.g., interface 1206 of FIG. 12C), and, subsequent to ceasing display of the second detail user interface, receives user input corresponding to a request to display the second detail user interface (e.g., at memory timeline interface 1250 of FIG. 12J), and displays (1332), on the display, the second detail user interface (e.g., at detail user interface 1252 of FIG. 12K).

Note that details of the processes described above with respect to method 1300 (e.g., FIG. 13) are also applicable in an analogous manner to the methods described below and above. For example, methods 700, 1000, and 1600 optionally include one or more of the characteristics of the various methods described above with reference to method 1300. For example, for example, a detail user interface for a plurality of individuals can be accessed at the display of any detail user interface in accordance with methods 700, 1000, and 1600. For brevity, these details are not repeated below.

Figure 14:
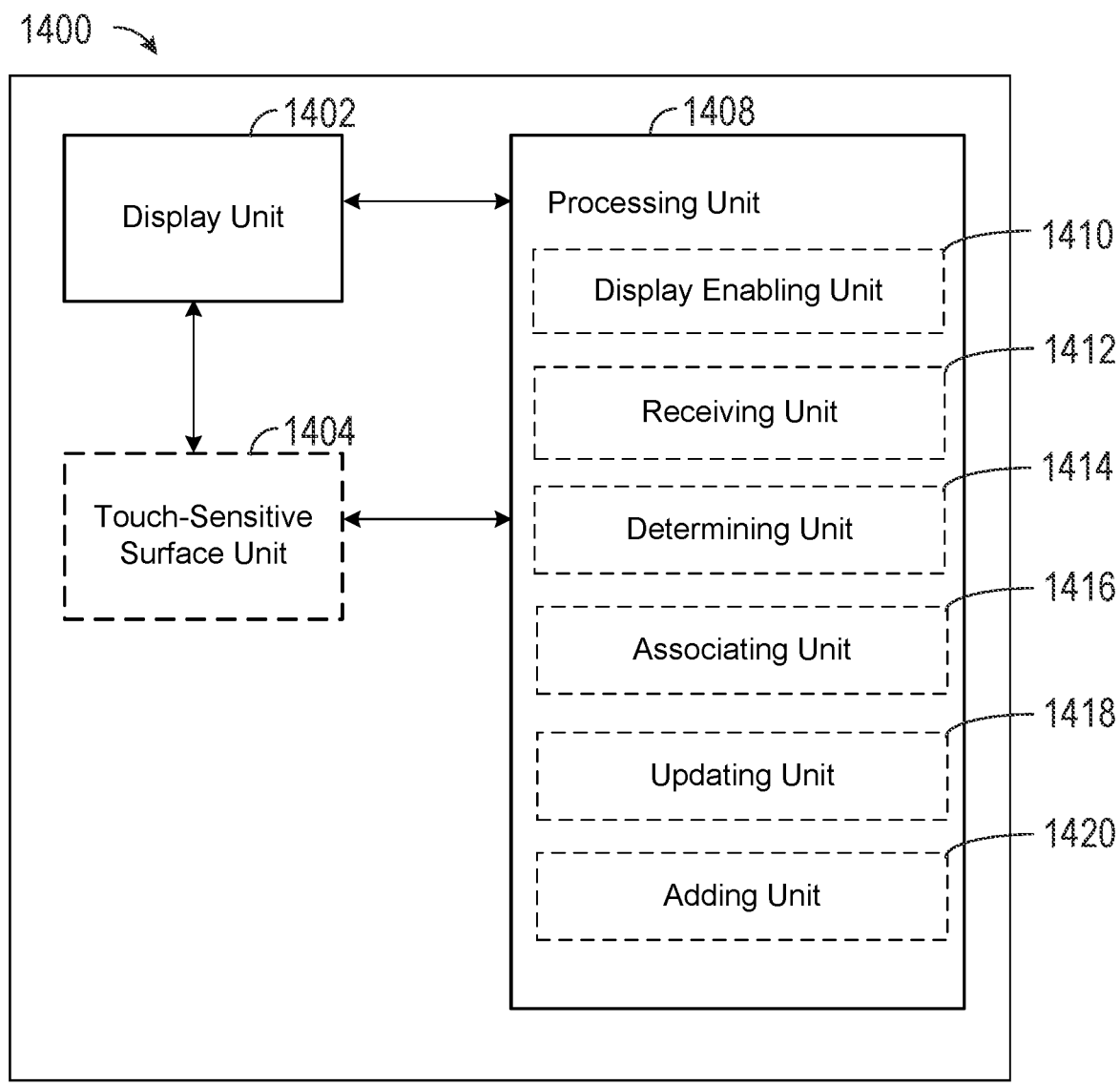
FIG. 14 illustrates a functional block diagram of an electronic device in accordance with some embodiments.

In accordance with some embodiments, FIG. 14 shows an exemplary functional block diagram of an electronic device 1400 configured in accordance with the principles of the various described embodiments. In accordance with some embodiments, the functional blocks of electronic device 1400 are configured to perform the techniques described above. The functional blocks of the device 1400 are, optionally, implemented by hardware, software, or a combination of hardware and software to carry out the principles of the various described examples. It is understood by persons of skill in the art that the functional blocks described in FIG. 14 are, optionally, combined or separated into sub-blocks to implement the principles of the various described examples. Therefore, the description herein optionally supports any possible combination or separation or further definition of the functional blocks described herein.

As shown in FIG. 14, an electronic device 1400 includes a display unit 1402 configured to display a graphic user interface, optionally, a touch-sensitive surface unit 1404 configured to receive contacts, and a processing unit 1408 coupled to the display unit 1402 and, optionally, the touch-sensitive surface unit 1404. In some embodiments, the processing unit 1408 includes a display enabling unit 1410 and a receiving unit 1412. In some embodiments, the processing unit 1408 optionally includes one or more of a determining unit 1414, an associating unit 1416, an updating unit 1418, and an adding unit 1420.

The processing unit 1402 is configured to: enable display (e.g., with display enabling unit 1410), on display unit 1402, of a first detail user interface that includes a representation of first visual media corresponding to a first event; while displaying the first detail user interface: enable display (e.g., with display enabling unit 1410), on display unit 1402, of an affordance corresponding to a plurality of individuals identified as having attended the first event; and receive (e.g., with receiving unit 1412) a user input corresponding to selection of the affordance; and in response to receiving the user input, enable display (e.g., with display enabling unit 1410), on display unit 1402, of a second detail user interface that includes a representation of second visual media, wherein the second visual media includes a first plurality of media items corresponding to a second event identified as having been attended by the plurality of individuals and a second plurality of media items corresponding to a third event identified as having been attended by the plurality of individuals, and wherein the second event and the third event are different.

In some embodiments, attendance of a particular event by the plurality of individuals is identified based on identifying the face of an individual of the plurality of individuals in at least one media item corresponding to the particular event.

In some embodiments, attendance of a particular event by the plurality of individuals is identified based on location data associated with the plurality of individuals, wherein the location data includes data identifying a device corresponding to an individual of the plurality of individuals as having been at a location of the particular event at a time of the particular event.

In some embodiments, the second visual media includes a first media item that depicts fewer than all of the individuals of the plurality of individuals.

In some embodiments, the second detail user interface includes a first region comprising a slideshow including the media items of the second visual media, and the processing unit 1408 is further configured to: receive (e.g., with receiving unit 1412) user input corresponding to selection of the slideshow; in response to the user input corresponding to selection of the slideshow, enable display (e.g., with display enabling unit 1410), on display unit 1402, of a video including media items of the second visual media, wherein the slideshow and the video are different.

In some embodiments, the second detail user interface includes a second region, the second region includes a curated view including a subset of the media items of the second visual media.

In some embodiments, the second region further comprises a first affordance, and the processing unit 1408 is further configured to: receive (e.g., with receiving unit 1412) user input corresponding to selection of the first affordance; and in response to receiving the user input corresponding to selection of the first affordance, enable display (e.g., with display enabling unit 1410), on display unit 1402, of an expanded view of the media items of the second visual media.

In some embodiments, the second detail user interface includes a third region comprising a geographic map, and wherein displaying the detail user interface further comprises: enable display (e.g., with display enabling unit 1410), on display unit 1402, of a location indicator on the geographic map corresponding to a location associated with a second media item of the second visual media.

In some embodiments, the second detail user interface includes a fourth region comprising a representation of a first collection of visual media items that share a set of common characteristics, a visual media item of the first collection of visual media items shares a first characteristic with a visual media item of the second visual media, and the processing unit 1408 is further configured to: receive (e.g., with receiving unit 1412) user input corresponding to selection of the representation of the first collection of visual media items; and in response to receiving the user input corresponding to selection of the representation of the first collection of media items, enable display (e.g., with display enabling unit 1410), on display unit 1402, of a representation of the visual media items of the first collection of visual media items.

In some embodiments, the first collection of visual media items excludes the media items of the second visual media.

In some embodiments, the processing unit 1408 is further configured to: while displaying the second detail user interface, enable display (e.g., with display enabling unit 1410), on display unit 1402, of a fifth region that includes a plurality of affordances, each corresponding to a single different individual of the plurality of individuals; receive (e.g., with receiving unit 1412) user input corresponding to selection of an affordance of the plurality of affordances in the fifth region, wherein the affordance corresponds to a first individual; and in response to receiving the user input corresponding to selection of the affordance that corresponds to the first individual, enable display (e.g., with display enabling unit 1410), on display unit 1402, of a third detail user interface that includes a representation of third visual media, wherein the third visual media includes a third plurality of media items, wherein each of the third plurality of media items is identified as depicting the first individual, wherein the third plurality of media items comprises a media item corresponding to a fourth event identified as having been attended by the first individual, and wherein the second event, the third event, and the fourth event are different.

In some embodiments, the processing unit 1408 is further configured to: receive (e.g., with receiving unit 1412) user input corresponding to a request to scroll the fifth region; in response to receiving the user input corresponding to the request to scroll the fifth region, scrolling (e.g., with display enabling unit 1410, on display unit 1402, the plurality of affordances included in the fifth region while the fifth region remains stationary, wherein scrolling the plurality of affordances causes a previously non-displayed affordance to be displayed in the fifth region, and wherein the previously non-displayed affordance corresponds to a second individual that is not included in the plurality of individuals.

In some embodiments, the processing unit 1408 is further configured to: while displaying the third detail user interface, enable display (e.g., with display enabling unit 1410), on display unit 1402, of a second affordance; receive (e.g., with receiving unit 1412) user input corresponding to selection of the second affordance; in response to receiving the user input corresponding to selection of the second affordance, enable display (e.g., with display enabling unit 1410), on display unit 1402, of an individual confirmation user interface that includes a candidate visual media item that has been identified as potentially depicting the first individual, wherein the candidate visual media item is not included in the third visual media.

In some embodiments, the processing unit 1408 is further configured to: receive (e.g., with receiving unit 1412) user input associated with the individual confirmation user interface; and in response to receiving the user input associated with the individual confirmation user interface: determine (e.g., with determining unit 1414) whether the user input associated with the individual confirmation user interface represents a confirmation input or a rejection input; in accordance with a determination that the user input associated with the individual confirmation user interface represents a confirmation input, associate (e.g., with associating unit 1416) the candidate media item with the first individual; and in accordance with a determination that the user input associated with the individual confirmation user interface represents a rejection input, forgoing associate (e.g., with associating unit 1416) the candidate media item with the first individual.

In some embodiments, the device includes a touch-sensitive surface unit 1404 coupled to the display unit 1402 and the processing unit 1408, the user input corresponding to selection of the affordance of the plurality of affordances is a touch user input with a first characteristic intensity detected on the touch-sensitive surface unit, the processing unit 1408 is further configured to: determine (e.g., with determining unit 1414) a first characteristic intensity of the user input; in accordance with a determination that the user input meets intensity-dependent criteria, wherein the intensity-dependent criteria require that first characteristic intensity of the touch user input exceeds an intensity threshold in order for the intensity-dependent criteria to be met, displaying a contextual menu user interface.

In some embodiments, the contextual menu user interface comprises a first contextual affordance, and the processing unit 1408 is further configured to: receive (e.g., with receiving unit 1412) user input corresponding to selection of the first contextual affordance; in response to receiving the user input corresponding to selection of the first contextual affordance, enable display (e.g., with display enabling unit 1410), on display unit 1402, of a name editing user interface for editing a name used as an identifier for the first individual; while displaying the name editing user interface, receive (e.g., with receiving unit 1412) an updated name of the first individual; and in response to receiving the updated name of the first individual, update (e.g., with updating unit 1418) the existing name associated with the first individual stored in memory to the updated name.

In some embodiments, the processing unit 1408 is further configured to: enable display (e.g., with display enabling unit 1410), on display unit 1402, of an affordance corresponding to a suggested individual, wherein the suggested individual corresponds to a contact in a contacts list accessible to the device; receive (e.g., with receiving unit 1412) user input corresponding to selection of the affordance corresponding to the suggested individual; and in response to receiving the user input corresponding to selection of the affordance corresponding to the suggested individual, update (e.g., with updating unit 1418) the existing name associated with the first individual stored in memory to a name of the suggested individual.

In some embodiments, the contextual menu user interface comprises a second contextual affordance, and the processing unit 1408 is further configured to: receive (e.g., with receiving unit 1412) user input corresponding to selection of the second contextual affordance; in response to receiving the user input corresponding to selection of the second contextual affordance, associate (e.g., with associating unit 1416) an identifier of the first individual with a list of identifiers of selected individuals; enable display (e.g., with display enabling unit 1410), on display unit 1402, of a user interface that includes a third affordance and representations of identified individuals, wherein the representations of identified individuals includes the individuals of the list of selected individuals; receive (e.g., with receiving unit 1412) user input corresponding to selection of the third affordance; and in response to receiving the user input corresponding to selection of the third affordance, cease display (e.g., with display enabling unit 1410), on display unit 1402, of representations of individuals that do not correspond to an identifier associated with the list of identifiers of selected individuals.

In some embodiments, the second detail user interface comprises a fourth affordance, and the processing unit 1408 is further configured to: receive (e.g., with receiving unit 1412) user input corresponding to selection of the fourth affordance; in response to receiving the user input corresponding to selection of the fourth affordance, add (e.g., with adding unit 1420) the second detail user interface to a set of detail user interfaces saved by the user; cease display (e.g., with display enabling unit 1410), on display unit 1402, of the second detail user interface; subsequent to ceasing display of the second detail user interface, receive (e.g., with receiving unit 1412) user input corresponding to a request to display the second detail user interface; and enable display (e.g., with display enabling unit 1410), on display unit 1402, of the second detail user interface.

The operations described above with reference to FIG. 13 are, optionally, implemented by components depicted in FIGS. 1A-1B or FIG. 14. For example, displaying operation 1302 and receiving operation 1308 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Automatically-Generated Memories

FIGS. 15A-15E illustrate exemplary user interfaces for obtaining contextually-relevant memories, in accordance with some embodiments. The user interfaces in these figures are used to illustrate the processes described below, including the processes in FIG. 16A-16D.

FIG. 15A illustrates an exemplary memory timeline 1502A displayed on device 1500. In some embodiments, device 1500 includes some or all of the features of device 100, device 300, device 500, or device 600, discussed above. Memory timeline 1502A includes a date indication 1504, representing a current date in this example (e.g., Monday, April 25). Memory timeline 1502A also includes three representations of three memories, respectively, labeled 1506A-1506C.

In accordance with some embodiments, device 1500 displays a plurality of affordances corresponding to a plurality of automatically-generated collections of visual media. For example, the representations 1506A-1506C are exemplary affordances corresponding to automatically-generated collections of visual media (e.g., memories). In some examples, an automatically-generated collection of visual media is a collection that is automatically determined when a photos application was opened. In some examples, an automatically-generated collection of visual media is automatically determined earlier in the day (e.g., at some predefined time, or based on the user's activity on device).

In accordance with some embodiments, while displaying the plurality of affordances, device 1500 receives a first user input. For example, at memory timeline 1502A in FIG. 15A, device 1500 receives input corresponding to a downward swipe gesture.

In accordance with some embodiments, in response to receiving the first user input, device 1500 obtains an automatically-generated first collection of visual media that was not previously included in the plurality of collections of visual media (a second memory), distinct from the each of the collections of the automatically-generated collections of visual media. In some examples, obtaining an automatically-generated collection of media items comprises selecting and/or generating the collection of media items. For example, memory timeline 1502B depicts device 1500 while obtaining an automatically-generated collection of visual media. The device (e.g., device 1500) obtains an automatically-generated collection of media items in response to user input, and the user does not have to perform an excessive number of inputs to obtain contextually relevant content, saving device resources and user time.

The device (e.g., device 1500), by generating and/or selecting the subset of media items an automatically-generated collection of media items in response to user input, saves devices resources by generating a contextually relevant media collection on demand when a user specifically asks for it, meaning that the content is much or more likely to be relevant to the user's needs, saving device resources and user time as compared to pre-generating a multitude of suggested collections that a user is likely not to desire.

Figure 15B:
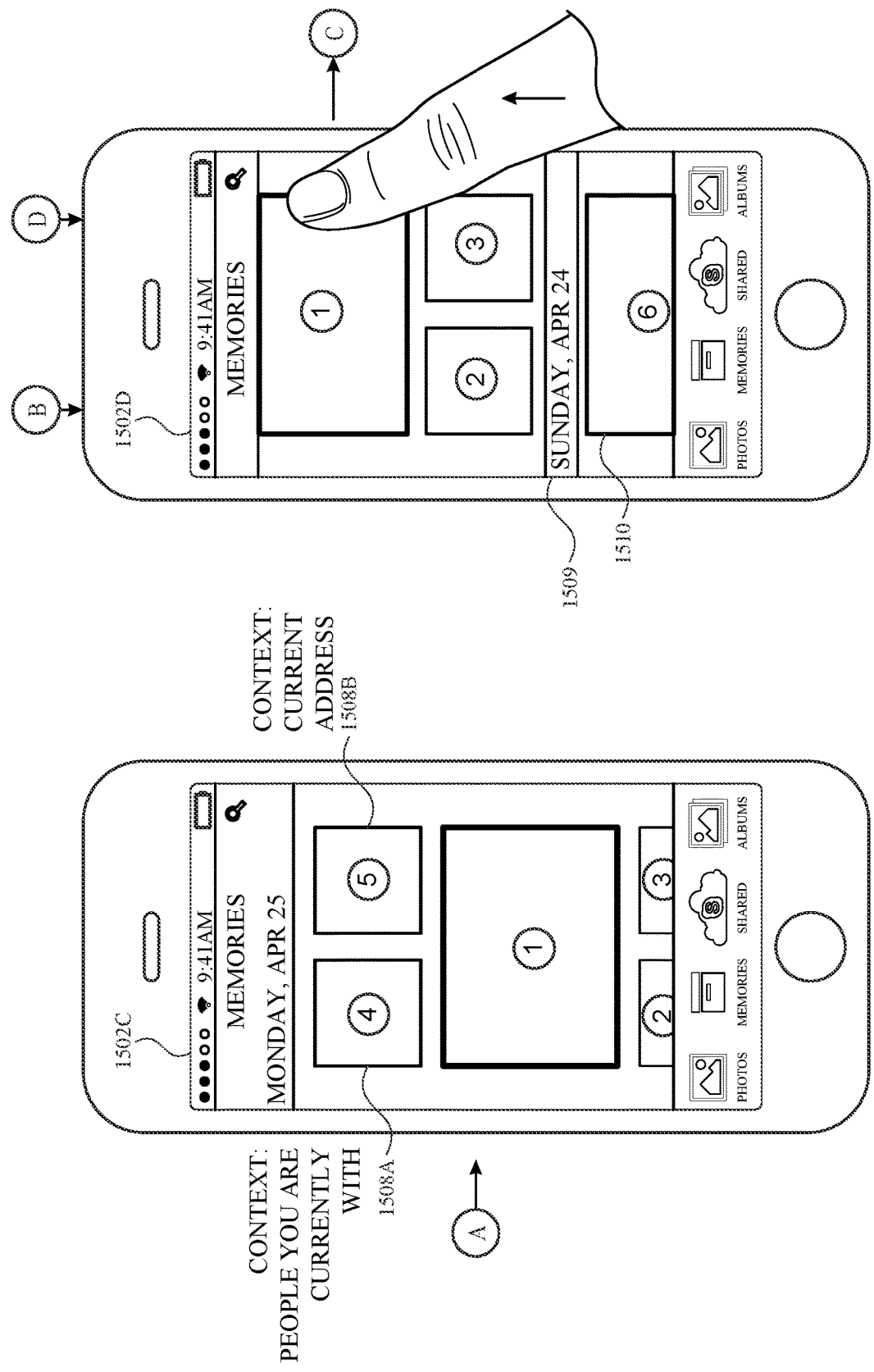

FIG. 15B depicts a memory tile for a new memory obtained in response to user input. In accordance with some embodiments, further in response to receiving the first user input, device 1500 adds, to the plurality of affordances displayed on the display, a first affordance corresponding to the first collection of visual media. For example, memory timeline 1502C in FIG. 15B depicts the memory timeline after receiving the user input and after an automatically-generated first collection of visual media was obtained. In this example, the memory timeline 1502C now includes representations 1508A and 1508B, each of which correspond to a collection of visual media that was not previously included in the plurality of collections of visual media. Thus, a new memory tile is displayed in response to the user input, and which corresponds to a newly-created memory. The device (e.g., device 1500), by adding an affordance which corresponds to an automatically-generated collection of visual media, to the to the display of other contextually-relevant collections, so the user can quickly access many different collections of media items that are displayed because of contextual relevance, reduces the number of additional inputs required for a user to browse for such collections of media manually, saving device resources and user time.

In accordance with some embodiments, device 1500 receives a second user input corresponding to selection of the first affordance and, in response, device 1500 displays a detail user interface that includes a representation (e.g., a curated view) of the second collection of visual media (e.g., photos in the memory). For example, in response to selection of representation 1508A, device 1500 displays memory detail view 1512 of FIG. 15C.

In accordance with some embodiments, to obtain the automatically-generated first collection of visual media that was not previously included in the plurality of collections of visual media, device 1500 generates the first collection of media items in response to the first user input. Thus, in some examples, device 1500 generates new memories dynamically in response to user input.

In accordance with some embodiments, to generate the first collection of media items in response to the first user input, device 1500 determines a collection of media items that share a set of common characteristics, and selects a smaller subset of the set of the collection of media items that share the set of common characteristics to create a curated set of media items. For example, as part of generating the memory, device 1500 determines media items with a set of common characteristics (e.g., a contextual property) and selects the subset of media items that will be included in the curated view of the memory detail view of the generated memory.

FIG. 15B further illustrates the scrolling of a memory timeline to access undisplayed memories. In accordance with some embodiments, prior to receiving the second user input, device 1500 receives a third user input. In response to receiving the third user input, device 1500 scrolls the displayed plurality of affordances corresponding to the plurality of automatically-generated collections of visual media. For example, at memory time line 1502D, device 1500 has scrolled the displayed representations (e.g., upward) and now displays previously-undisplayed representation 1510.

In accordance with some embodiments, to scroll the displayed plurality of affordances corresponding to the plurality of automatically-generated collections of visual media, device 1500 scrolls the displayed plurality of affordances to reveal a second affordance corresponding to an automatically-generated second collection of visual media, wherein the second affordance was not previously included in the displayed plurality of affordances, wherein the first affordance is associated with a first date, and wherein the second affordance is associated with a second date different than the first. For example, as described above, representation 1510 is an exemplary affordance that was not previously displayed. Further, as illustrated by date indicator 1509, representation 1510 corresponds to the date April 24th, and thus is associated with a different date than exemplary first affordance, representation 1508A (which is associated with April 25th).

Figure 15C:
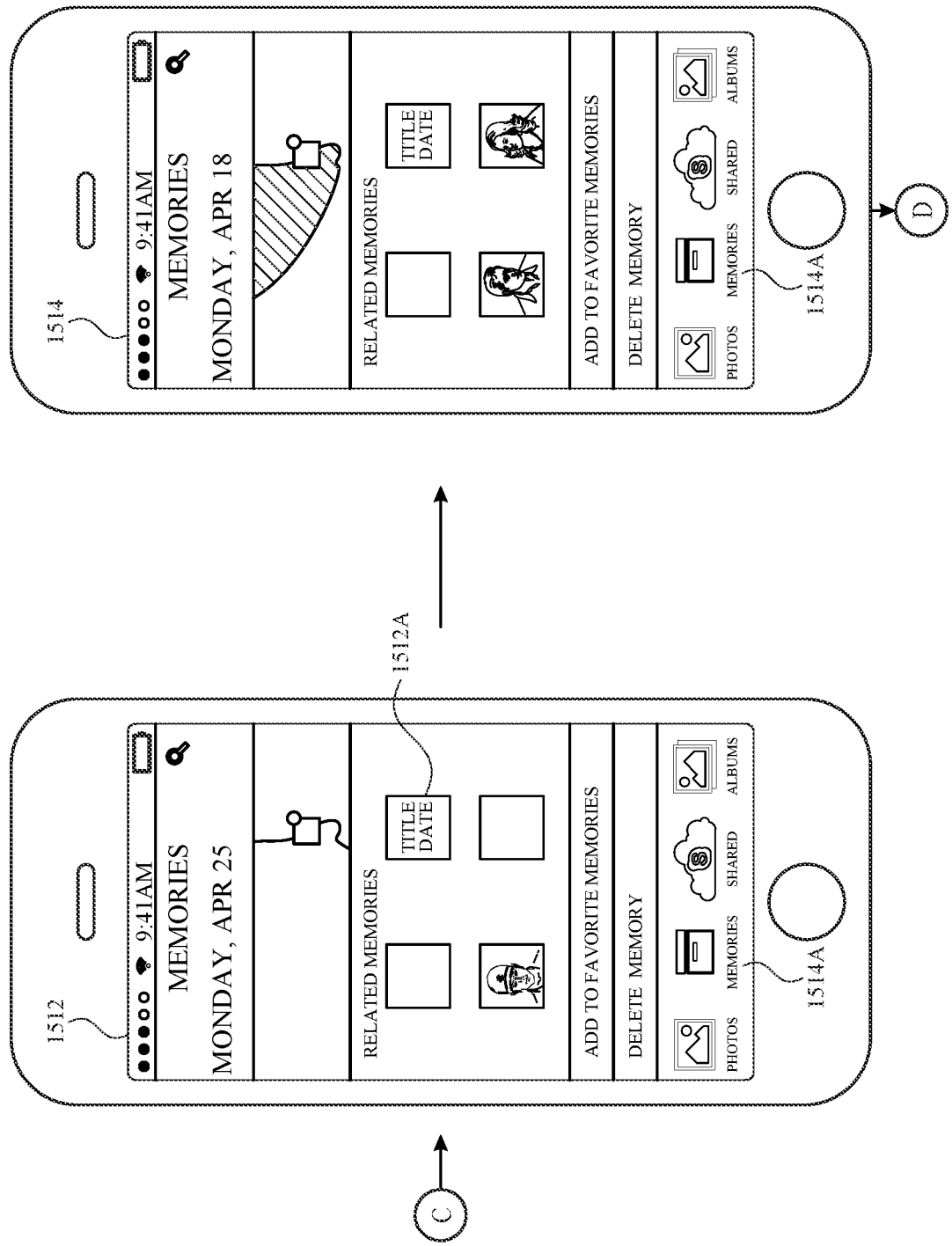
Figure 15E:
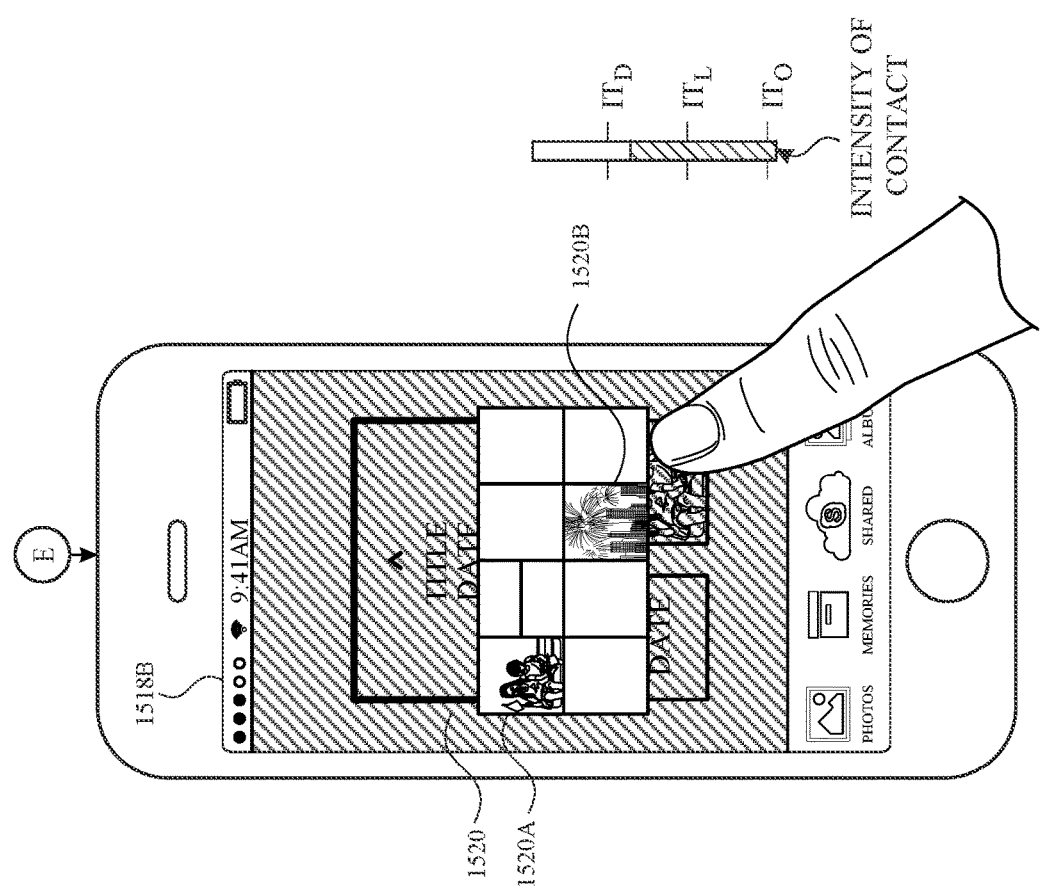
Figure 16A:
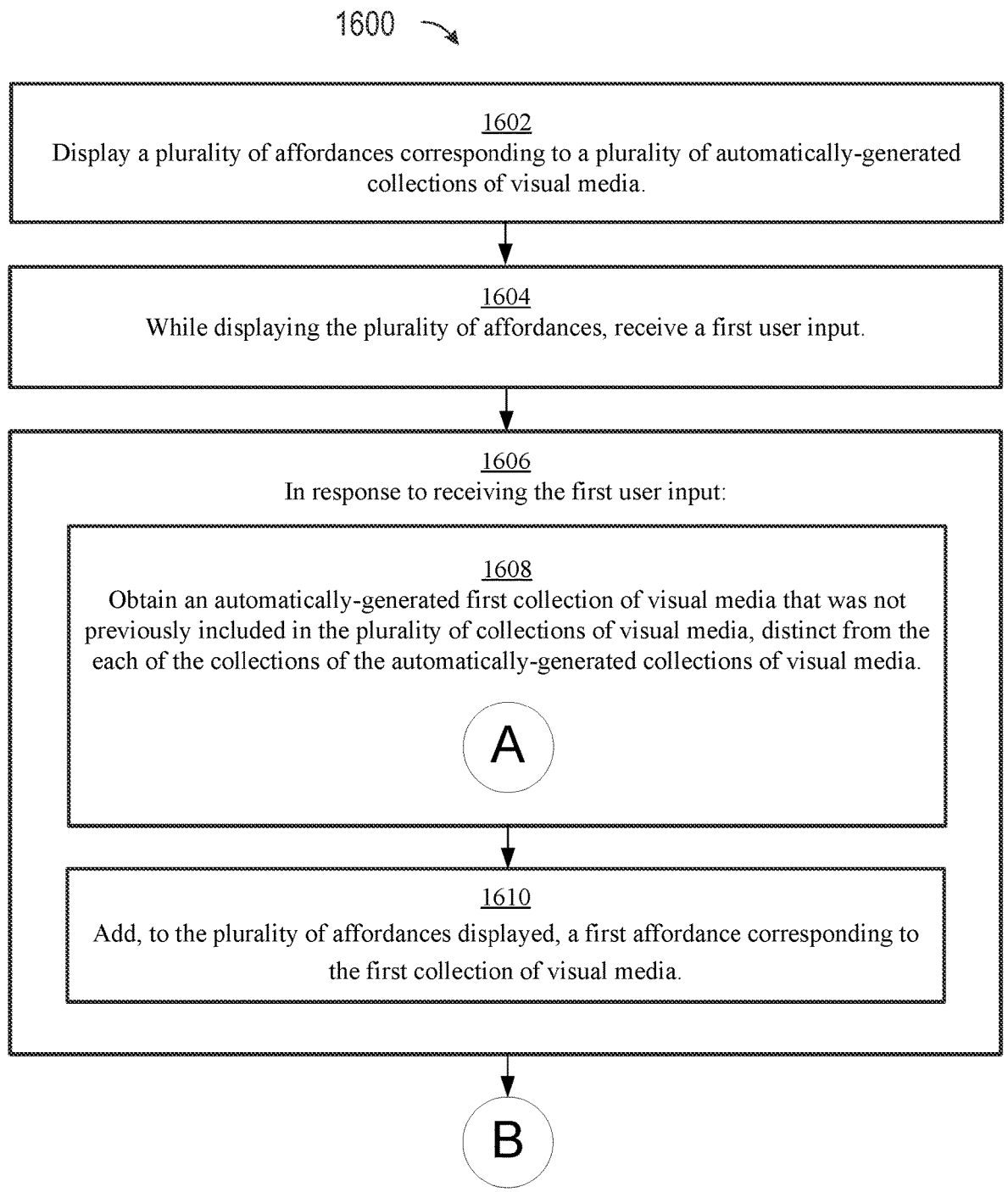

In some embodiments, selection of the memories tab allows for accelerated back navigation. For example, after navigating through memories, a user can tap on the memories tab to return to the previously-displayed scroll position in a memory timeline. This operation is illustrated in FIGS. 15B and 15C.

In accordance with some embodiments, the detail user interface is a first detail user interface, and to scroll the displayed plurality of affordances device 1500 scrolls the plurality of affordances from a first view to a second view. For example, memory timeline 1502D depicts an exemplary displayed affordance in a second view.

While displaying the plurality of affordances in the second view, device 1500 receives the second user input corresponding to selection of the first affordance and, in response to receiving the second user input corresponding to selection of the first affordance, displaying, on the display, the first detail user interface, wherein the first detail user interface includes a second affordance corresponding to a third collection of visual media, and wherein the first detail user interface includes a third affordance (e.g., the memories tab). For example, in response to the selection of 1508A, device 1500 displays an exemplary first memory detail user interface 1512 of FIG. 15C. An exemplary third collection is represented by related memories affordance 1512A, and an exemplary third affordance is the memories tab 1514A. Thus, in this example, the user is one memory deep into navigating memories.

While displaying the first detail user interface, the device receives the second user input corresponding to selection of the second affordance and, in response, displays a second detail user interface that includes a representation of a collection of visual media corresponding to the third affordance, and wherein the detail user interface includes the third affordance. For example, in response to selection of representation 1512A, device 1500 displays exemplary second memory detail view 1514. Exemplary third affordance (e.g., the memories tab 1514A) is still displayed. Thus, in this example, the user is two memories deep into navigating memories.

In accordance with some embodiments, while displaying the second detail user interface, device 1500 receives user input corresponding to selection of the third affordance. For example, the user selects the memories tab. In response to receiving the user input corresponding to selection of the third affordance, device 1500 displays the plurality of affordances in the second view. For example, device 1500 returns to the display of the memory timeline in the scrolled position (e.g., the second view), as shown in memory time line 1502D of FIG. 15B. Thus, the device (e.g., device 1500), by allowing accelerated back navigation to return to a previous view using a single input (even after descending many levels deep in series of interfaces), reduces the excessive number of inputs required to navigate between collections of media items, saving device resources and user time.

In accordance with some embodiments, the displayed plurality of affordances corresponding to a plurality of automatically-generated collections of visual media are arranged in a chronological order based on a date that each respective automatically-generated collection of the automatically-generated collections was obtained. For example, the memory tiles (representations) on exemplary memory time 1502D of FIG. 15B are arranged based on a date that the each memory was obtained (e.g., generated and/or selected).

In accordance with some embodiments, to display the plurality of affordances corresponding to a plurality of automatically-generated collections of visual media, device 1500 displays a plurality of affordances corresponding to a current period of time. For example, memory timeline 1502C of FIG. 15B includes two memory tiles corresponding to the current date April 25th (e.g., today).

In accordance with some embodiments, to display the plurality of affordances corresponding to a plurality of automatically-generated collections of visual media, device 1500 displays a plurality of affordances corresponding to a period of time, for each of a plurality of different periods of time wherein the plurality of affordances is a predetermined number of affordances. For example, device 1500 can display three automatically-generated memories for each period. In some embodiments, as described above, device 1500 can obtain additional memories. For instance, the memory timeline 1502C of FIG. 15B illustrates a plurality of memory tiles for today (April 25th).

In accordance with some embodiments, the automatically-generated collections of visual media were determined to be contextually relevant to a general context of device 1500. For example, a general context of device 1500 is a context of device 1500 that will be true all day, such as a recent event, an event that occurred a set amount of time ago (such as 1 year ago or 1 month ago), or a general device location such as state or city. In some examples, a general context of device 1500 is a context of device 1500 based on information for an extended period of time. For example, the general context can be a collection of contexts of device 1500 throughout a period of 24 hours (e.g., the last day) before the collections are automatically-generated. For instance, the general context can be an average location of the user over a 24 hour period.

In accordance with some embodiments, the first collection of visual media is contextually relevant to a specific context of device 1500. For example, a specific context of device 1500 is a context of device 1500 that is likely to change throughout the day, such as specific device location such as street address or GPS coordinates, time of day, presence of other users, or the like. In some examples, the current context of device 1500 includes the current location, time, or date. Thus, in some examples, the collection obtained in response to user input can be more relevant to the specific context of device 1500 than existing collections.

In accordance with some embodiments, a context includes one or more of an anniversary, a birthday, a recent trip, last week, visual media of individuals identified as currently near a current location of device 1500, visual media of a point of interest currently near the current location of device 1500, and an event on a calendar accessible by device 1500, or the like.

In accordance with some embodiments, to display the plurality of affordances corresponding to a plurality of automatically-generated collections of visual media, device 1500 displays contextual information with each of the plurality of affordances. For example, device 1500 can display text associated with a memory tile. For instance, at memory time line 1516, device 1500 can display contextual information overlaid on representation 1516A, which corresponds to the Fourth of July 2019 memory. An example of such contextual information is be "Fourth of July 2019, Jul. 4, 2019".

In accordance with some embodiments, device 1500 includes a touch-sensitive surface, and the second user input is a touch user input with a first characteristic intensity detected on the touch-sensitive surface. Device 1500 determines a first characteristic intensity of the touch user input. In accordance with a determination that the touch user input meets selection criteria, wherein the selection criteria do not require that the first characteristic intensity of the touch user input exceeds a first intensity threshold or a second intensity threshold in order for the selection criteria to be met, device 1500 replaces display of the plurality of affordances with display of the detail user interface. For example, the selection criteria are met when the second touch user input is a tap input where liftoff of a contact is detected within a predetermined time period of detecting touchdown of the contact. In this case, a memory detail user is displayed in response (e.g., as described above with respect to at least FIGS. 6A-6R). For example, if the user selects the representation 1516A of memory timeline 1516 shown in FIG. 15D, device 1500 displays the Fourth of July 2019 memory detail view.

In accordance with a determination that the touch user input meets a first intensity-dependent criteria, device 1500 displays, while continuing to display a portion of the plurality of affordances, a preview user interface that includes a representation of the second collection of visual media, wherein the first intensity-dependent criteria require that the first characteristic intensity of the touch user input exceeds the first intensity threshold in order for the first intensity-dependent criteria to be met, and wherein the first intensity-dependent criteria do not require that the first characteristic intensity of the touch user input exceeds the second intensity threshold in order for the first intensity-dependent criteria to be met. For example, device 1500 can display a preview (e.g., a "peek") of the media items (e.g., photos and videos) in the memory, without entering the memory detail view, as shown in curated view 1520 of preview user interface 1518B of FIG. 15E, which includes media items 1520A and 1520B. The device (e.g., device 1500), by allowing a preview of content before actually displaying a memory detail view, allows a user to quickly determine whether they would like to view a collection of media items-if not, they can simply remove the single input contact, as opposed to having to enter another input to navigate back out of a detail user interface. Thus, the user does not have to perform an excessive number of inputs to view a preview of media content, saving device resources and user time.

In accordance with some embodiments, the preview user interface includes a playing video that includes content from the second collection of visual media and plays while at least a portion of the plurality of affordances are displayed. For example, user interface 1518A depicts device 1500 displaying a video 1522A in an exemplary preview user interface. The portion of the plurality of affordances is blurred on the display, in some examples (e.g., represented by the hatching in 1518A and 1518B.). In accordance with some embodiments, the plurality of affordances is redisplayed if liftoff of the contact is detected before the characteristic intensity of the touch input reaches the second intensity threshold.

In accordance with some embodiments, the preview user interface includes displaying a curated view of a subset of media items included in the second collection of visual media while at least a portion of the plurality of affordances are displayed. For example, user interface 1518B depicts device 1500 displaying a portion of an exemplary curated view 1520 in a preview user interface.

In accordance with a determination that the touch user input meets a second intensity-dependent criteria, device 1500 replaces display of the plurality of affordances with display of the detail user interface, wherein the second intensity-dependent criteria require that the first characteristic intensity of the touch user input exceeds the first intensity threshold and the second intensity threshold in order for the second intensity-dependent criteria to be met. For example, if the user decides to enter the memory after viewing preview user interface, they can increase the intensity of their input and cause device 1500 to display the memory detail user interface (e.g., without having to remove their finger and reapply it to select the memory tile).

FIG. 16 is a flow diagram illustrating a method for viewing and obtaining contextually-relevant collections of media items using an electronic device in accordance with some embodiments. Method 1600 is performed at a device (e.g., 100, 300, 500) with a display and, optionally, a touch-sensitive surface. Some operations in method 1600 are, optionally, combined, the order of some operations are, optionally, changed, and some operations are, optionally, omitted.

As described below, method 1600 provides an intuitive way for viewing and obtaining contextually-relevant collections of media items. The method reduces the cognitive burden on a user for viewing and obtaining contextually-relevant collections of media items, thereby creating a more efficient human-machine interface. For battery-operated computing devices, enabling a user to browse and obtain media items faster and more efficiently conserves power and increases the time between battery charges.

The device displays (1602), on the display, a plurality of affordances (e.g., 1506A-1506B in FIG. 15A) corresponding to a plurality of automatically-generated collections of visual media. In accordance with some embodiments, the displayed plurality of affordances corresponding to a plurality of automatically-generated collections of visual media are arranged in a chronological order based on a date that each respective automatically-generated collection of the automatically-generated collections was obtained. In accordance with some embodiments, displaying the plurality of affordances corresponding to a plurality of automatically-generated collections of visual media comprises displaying, on the display, a plurality of affordances corresponding to a current period of time (e.g., today). In accordance with some embodiments, displaying the plurality of affordances corresponding to a plurality of automatically-generated collections of visual media comprises displaying, on the display, a plurality of affordances corresponding to a period of time, for each of a plurality of different periods of time (e.g., today, yesterday), wherein the plurality of affordances is a predetermined number of affordances (e.g., three per day, as shown in memory timeline 1502A of FIG. 15A). In accordance with some embodiments, displaying the plurality of affordances corresponding to a plurality of automatically-generated collections of visual media comprises displaying, on the display, contextual information with each of the plurality of affordances.

The device, while displaying the plurality of affordances, receives (1604) a first user input. In some examples, the first user input is a pull down refresh request (e.g., as illustrated in FIG. 15A).

In response to receiving the first user input (1606), the device obtains (1608) an automatically-generated first collection of visual media that was not previously included in the plurality of collections of visual media, distinct from the each of the collections of the automatically-generated collections of visual media, and adds (1610), to the plurality of affordances displayed, on the display, a first affordance (e.g., representation 1508A and 1508B of memory timeline 1502C in FIG. 15B) corresponding to the first collection of visual media.

In accordance with some embodiments, obtaining the automatically-generated first collection of visual media that was not previously included in the plurality of collections of visual media comprises generating (1616) the first collection of media items in response to the first user input. In accordance with some embodiments, generating the first collection of media items in response to the first user input comprises determining (1618) a collection of media items (e.g., media items 1520A and 1520B of FIG. 15E) that share a set of common characteristics, and selecting a smaller subset of the set of the collection of media items that share the set of common characteristics to create a curated set of media items.

In accordance with some embodiments, the automatically-generated collections of visual media were determined to be contextually relevant to a general context of the device (1620) (e.g., exemplary contexts listed in FIGS. 6D and 6E). In some examples, a general context of the device is a context of the device based on information for an extended period of time. In some examples, the general context can be a collection of contexts of the device throughout a period of 24 hours (e.g., the last day) before the collections are automatically-generated. In some examples, the general context can be an average location of the user over a 24 hour period. In some examples, a general context of the device will be true all day, such as a recent event, an event that occurred a set amount of time ago (such as 1 year ago or 1 month ago), or a general device location (such as state or city).

In accordance with some embodiments, the first collection of visual media is contextually relevant to a specific context of the device (1622) (e.g., exemplary contexts listed in FIGS. 6D and 6E). In some examples, a specific context is a context of the device that is likely to change throughout the day, such as specific device location such as street address or GPS coordinates, time of day, presence of other users. In accordance with some embodiments, a context includes one or more of an anniversary, a birthday, a recent trip, last week, visual media of individuals identified as currently near a current location of the device, visual media of a point of interest currently near the current location of the device, and an event on a calendar accessible by the device.

The device receives (1612) a second user input corresponding to selection of the first affordance (e.g., selection of representation 1508B of FIG. 15B). In accordance with some embodiments, the device, prior to receiving the second user input, receives (1626) a third user input, and, in response to receiving the third user input, scrolls (1626) the displayed plurality of affordances corresponding to the plurality of automatically-generated collections of visual media (e.g. as shown in memory timeline 1502D of FIG. 15B). In accordance with some embodiments, scrolling the displayed plurality of affordances corresponding to the plurality of automatically-generated collections of visual media comprises scrolling (1628) the displayed plurality of affordances to reveal a second affordance (e.g., affordance 1510 of FIG. 15B) corresponding to an automatically-generated second collection of visual media, wherein the second affordance was not previously included in the displayed plurality of affordances, the first affordance is associated with a first date, and the second affordance is associated with a second date different than the first.

In accordance with some embodiments, the device includes a touch-sensitive surface and the second user input is a touch user input with a first characteristic intensity detected on the touch-sensitive surface. In accordance with some embodiments, the device determines (1624) a first characteristic intensity of the touch user input. In accordance with a determination that the touch user input meets selection criteria, wherein the selection criteria do not require that the first characteristic intensity of the touch user input exceeds a first intensity threshold (e.g., $IT_L$ in FIGS. 15D and 15E) or a second intensity threshold (e.g., $IT_D$ in FIGS. 15D and 15E) in order for the selection criteria to be met, the device replaces display (1624) of the plurality of affordances with display of the detail user interface (e.g., with a detail user interface such as that depicted in FIG. 6J). In accordance with a determination that the touch user input meets a first intensity-dependent criteria, the device displays (1624), on the display, while continuing to display a portion of the plurality of affordances, a preview user interface that includes a representation of the second collection of visual media (e.g., preview user interface 1518A or 1518B of FIGS. 15D and 15E), wherein the first intensity-dependent criteria require that the first characteristic intensity of the touch user input exceeds the first intensity threshold (e.g., $IT_L$ in FIGS. 15D and 15E) in order for the first intensity-dependent criteria to be met and the first intensity-dependent criteria do not require that the first characteristic intensity of the touch user input exceeds the second intensity threshold (e.g., $IT_D$ in FIGS. 15D and 15E) in order for the first intensity-dependent criteria to be met. In accordance with a determination that the touch user input meets a second intensity-dependent criteria, the device replaces display (1624) of the plurality of affordances with display of the detail user interface (e.g., with a detail user interface such as that depicted in FIG. 6J), wherein the second intensity-dependent criteria require that the first characteristic intensity of the touch user input exceeds the first intensity threshold and the second intensity threshold in order for the second intensity-dependent criteria to be met. In some examples, the preview user interface includes a playing video that includes content from the second collection of visual media and plays while at least a portion of the plurality of affordances are displayed (e.g., with blurring) on the display. In some examples, the plurality of affordances is redisplayed if liftoff of the contact is detected before the characteristic intensity of the touch input reaches the second intensity threshold.

In accordance with some embodiments, the detail user interface is a first detail user interface (e.g., detail user interface 1512 of FIG. 15C). In accordance with some embodiments, scrolling the displayed plurality of affordances comprises scrolling the plurality of affordances from a first view to a second view (e.g., second view depicted at memory timeline 1502D of FIG. 15B). In accordance with some embodiments, the device, while displaying the plurality of affordances in the second view (e.g., at the display of memory timeline 1502D of FIG. 15B), receives the second user input corresponding to selection of the first affordance (e.g., representation 1506A of FIG. 15A). In response to receiving the second user input corresponding to selection of the first affordance, the device displays, on the display, the first detail user interface (e.g., detail user interface 1512 of FIG. 15C) wherein the first detail user interface includes a second affordance corresponding to a third collection of visual media and the first detail user interface includes a third affordance (e.g., memories tab 1514A of FIG. 15C). While displaying the first detail user interface, the device receives the second user input (e.g., a tap) corresponding to selection of the second affordance (e.g., related memory affordance 1512A of FIG. 15C). In response to receiving the user input corresponding to selection of the second affordance, the device displays, on the display, a second detail user interface that includes a representation of a collection of visual media corresponding to the third affordance, wherein the detail user interface includes the third affordance (e.g., memories tab 1514A of FIG. 15C). While displaying the second detail user interface, the device receives user input corresponding to selection of the third affordance (e.g., memories tab 1514A of FIG. 15C). In response to receiving the user input corresponding to selection of the third affordance, the device displays, on the display, the plurality of affordances in the second view (e.g., displays memory timeline 1502D of FIG. 15B).

In response to receiving the second user input, the device displays (1614), on the display, a detail user interface that includes a representation of the second collection of visual media (e.g., memory detail view 1512 of FIG. 15C).

Note that details of the processes described above with respect to method 1600 (e.g., FIG. 16) are also applicable in an analogous manner to the methods described above. For example, methods 700, 1000, and 1300 optionally include one or more of the characteristics of the various methods described above with reference to method 1600. For example, contextually-relevant content can be viewed at the display of any detail user interface in accordance with methods 700, 1000, and 1300. For brevity, these details are not repeated below.

Figure 17:
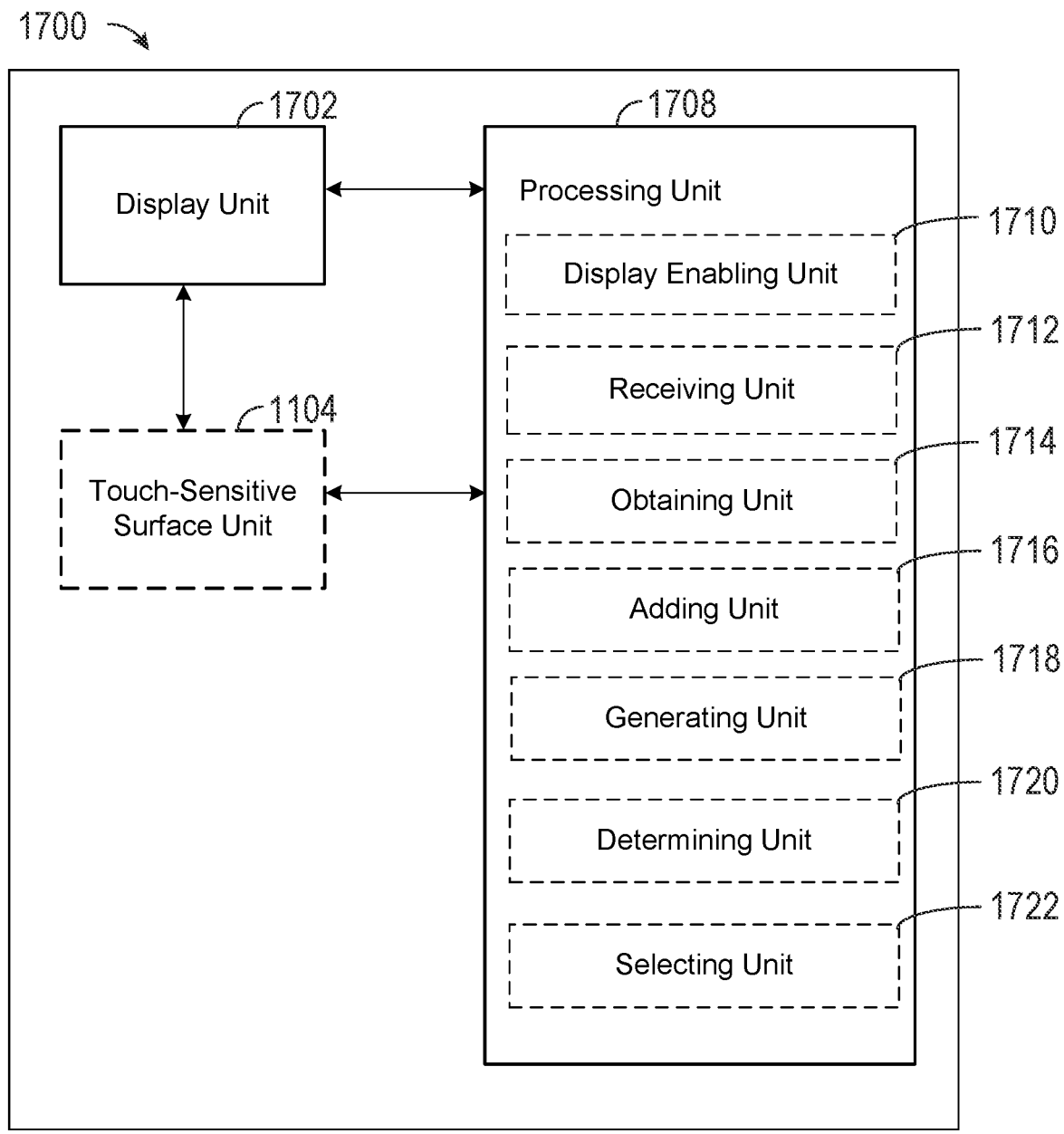
FIG. 17 illustrates a functional block diagram of an electronic device in accordance with some embodiments.

In accordance with some embodiments, FIG. 17 shows an exemplary functional block diagram of an electronic device 1700 configured in accordance with the principles of the various described embodiments. In accordance with some embodiments, the functional blocks of electronic device 1700 are configured to perform the techniques described above. The functional blocks of the device 1700 are, optionally, implemented by hardware, software, or a combination of hardware and software to carry out the principles of the various described examples. It is understood by persons of skill in the art that the functional blocks described in FIG. 17 are, optionally, combined or separated into sub-blocks to implement the principles of the various described examples. Therefore, the description herein optionally supports any possible combination or separation or further definition of the functional blocks described herein.

As shown in FIG. 17, an electronic device 1700 includes a display unit 1702 configured to display a graphic user interface, optionally, a touch-sensitive surface unit 1704 configured to receive contacts, and a processing unit 1708 coupled to the display unit 1702 and, optionally, the touch-sensitive surface unit 1704. In some embodiments, the processing unit 1708 includes a display enabling unit 1710, a receiving unit 1712, an obtaining unit 1714, and an adding unit 1716. In some embodiments, the processing unit 1708 optionally includes one or more of a generating unit 1718, a determining unit 1720, and a selecting unit 1722.

The processing unit 1708 is configured to: enable display (e.g., with display enabling unit 1710), on display unit 1702, of a plurality of affordances corresponding to a plurality of automatically-generated collections of visual media; while displaying the plurality of affordances, receive (e.g., with receiving unit 1712) a first user input; in response to receiving the first user input: obtain (e.g., with obtaining unit 1714) an automatically-generated first collection of visual media that was not previously included in the plurality of collections of visual media, distinct from the each of the collections of the automatically-generated collections of visual media; and add (e.g., with adding unit 1716), to the plurality of affordances displayed, on display unit 1702, a first affordance corresponding to the first collection of visual media; receive (e.g., with receiving unit 1712) a second user input corresponding to selection of the first affordance; and in response to receiving the second user input, enable display (e.g., with display enabling unit 1710), on display unit 1702, of a detail user interface that includes a representation of the second collection of visual media.

In some embodiments, obtaining (e.g., with obtaining unit 1714) the automatically-generated first collection of visual media that was not previously included in the plurality of collections of visual media comprises: generating (e.g., with generating unit 1718) the first collection of media items in response to the first user input.

In some embodiments, generating (e.g., with generating unit 1718) the first collection of media items in response to the first user input comprises: determine (e.g., with determining unit 1720) a collection of media items that share a set of common characteristics; and select (e.g., with selecting unit 1722) a smaller subset of the set of the collection of media items that share the set of common characteristics to create a curated set of media items.

In some embodiments, the processing unit 1708 is further configured to: prior to receiving the second user input, receive (e.g., with receiving unit 1712) a third user input; in response to receiving the third user input, scrolling the displayed plurality of affordances corresponding to the plurality of automatically-generated collections of visual media.

In some embodiments, scrolling (e.g., with display enabling unit 1710), on the display unit 1702, the displayed plurality of affordances corresponding to the plurality of automatically-generated collections of visual media comprises: scroll (e.g., with display enabling unit 1710), on the display unit 1702, the displayed plurality of affordances to reveal a second affordance corresponding to an automatically-generated second collection of visual media, wherein the second affordance was not previously included in the displayed plurality of affordances, wherein the first affordance is associated with a first date, and wherein the second affordance is associated with a second date different than the first.

In some embodiments, the detail user interface is a first detail user interface, scrolling (e.g., with display enabling unit 1710), on the display unit 1702, the displayed plurality of affordances comprises scrolling (e.g., with display enabling unit 1710), on the display unit 1702, the plurality of affordances from a first view to a second view, the method further comprising: while displaying the plurality of affordances in the second view, receive (e.g., with receiving unit 1712) the second user input corresponding to selection of the first affordance; in response to receiving the second user input corresponding to selection of the first affordance, enable display (e.g., with display enabling unit 1710), on display unit 1702, of the first detail user interface wherein the first detail user interface includes a second affordance corresponding to a third collection of visual media, and wherein the first detail user interface includes a third affordance; while displaying the first detail user interface, receive (e.g., with receiving unit 1712) the second user input corresponding to selection of the second affordance; in response to receiving the user input corresponding to selection of the second affordance, enable display (e.g., with display enabling unit 1710), on display unit 1702, of a second detail user interface that includes a representation of a collection of visual media corresponding to the third affordance, and wherein the detail user interface includes the third affordance; while displaying the second detail user interface, receive (e.g., with receiving unit 1712) user input corresponding to selection of the third affordance; in response to receiving the user input corresponding to selection of the third affordance, enable display (e.g., with display enabling unit 1710), on display unit 1702, of the plurality of affordances in the second view.

In some embodiments, the displayed plurality of affordances corresponding to a plurality of automatically-generated collections of visual media are arranged in a chronological order based on a date that each respective automatically-generated collection of the automatically-generated collections was obtained.

In some embodiments, displaying (e.g., with display enabling unit 1710), on the display unit 1702, the plurality of affordances corresponding to a plurality of automatically-generated collections of visual media comprises: enable display (e.g., with display enabling unit 1710), on display unit 1702, of a plurality of affordances corresponding to a current period of time.

In some embodiments, displaying (e.g., with display enabling unit 1710), on the display unit 1702, the plurality of affordances corresponding to a plurality of automatically-generated collections of visual media comprises: enable display (e.g., with display enabling unit 1710), on display unit 1702, of a plurality of affordances corresponding to a period of time, for each of a plurality of different periods of time, wherein the plurality of affordances is a predetermined number of affordances.

In some embodiments, the automatically-generated collections of visual media were determined to be contextually relevant to a general context of the device.

In some embodiments, the first collection of visual media is contextually relevant to a specific context of the device.

In some embodiments, a context includes one or more of an anniversary, a birthday, a recent trip, last week, visual media of individuals identified as currently near a current location of the device, visual media of a point of interest currently near the current location of the device, and an event on a calendar accessible by the device.

In some embodiments, displaying (e.g., with display enabling unit 1710), on the display unit 1702, the plurality of affordances corresponding to a plurality of automatically-generated collections of visual media comprises: enable display (e.g., with display enabling unit 1710), on display unit 1702, of contextual information with each of the plurality of affordances.

In some embodiments, the device includes a touch-sensitive surface unit 1704 coupled to the display unit 1702 and the processing unit 1708, and the second user input is a touch user input with a first characteristic intensity detected on the touch-sensitive surface, and the processing unit 1708 is further configured to: determine (e.g., with determining unit 1720) a first characteristic intensity of the touch user input; in accordance with a determination that the touch user input meets selection criteria, wherein the selection criteria do not require that the first characteristic intensity of the touch user input exceeds a first intensity threshold or a second intensity threshold in order for the selection criteria to be met, replace display (e.g., with display enabling unit 1710), on display unit 1702, of the plurality of affordances with display of the detail user interface; in accordance with a determination that the touch user input meets a first intensity-dependent criteria, enable display (e.g., with display enabling unit 1710), on display unit 1702, of while continuing to display a portion of the plurality of affordances, a preview user interface that includes a representation of the second collection of visual media, wherein the first intensity-dependent criteria require that the first characteristic intensity of the touch user input exceeds the first intensity threshold in order for the first intensity-dependent criteria to be met, and wherein the first intensity-dependent criteria do not require that the first characteristic intensity of the touch user input exceeds the second intensity threshold in order for the first intensity-dependent criteria to be met; and in accordance with a determination that the touch user input meets a second intensity-dependent criteria, replace display (e.g., with display enabling unit 1710), on display unit 1702, of the plurality of affordances with display of the detail user interface, wherein the second intensity-dependent criteria require that the first characteristic intensity of the touch user input exceeds the first intensity threshold and the second intensity threshold in order for the second intensity-dependent criteria to be met.

The operations described above with reference to FIG. 16 are, optionally, implemented by components depicted in FIGS. 1A-1B or FIG. 17. For example, displaying operation 1602, receiving operation 1604, obtaining operation 1608, and adding operation 1610 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data can include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In some examples, users can select not to provide location information for targeted content delivery services. In some examples, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. An electronic device, comprising:
   a display;
   one or more processors;
   memory; and
   one or more programs, wherein the one or more programs are stored in the memory and configured to be executed by the one or more processors, the one or more programs including instructions for:
   displaying, via the display, a first visual media item of a collection of visual media items;
   while displaying the first visual media item, detecting a first input;
   in response to detecting the first input, displaying, via the display, a user interface that includes a first geographic map with a first location indicator representative of a first location characteristic of the first visual media item;
   detecting a second input directed to the first geographic map;
   in response to detecting the second input, replacing display of the user interface with a geographic map interface that includes a second geographic map with the first location indicator and a first graphical object that, when activated, causes the display of a second location indicator representative of a second location characteristic of a second visual media item of the collection of visual media items;
   detecting a third input directed to the first graphical object; and
   in response to detecting the third input, displaying on the second geographic map the second location indicator representative of the second location characteristic of the second visual media item.

2. The electronic device of claim 1, wherein the device includes a touch-sensitive surface, and wherein the first input is a swipe gesture on the touch-sensitive surface in a first direction.

3. The electronic device of claim 1, wherein the first location indicator is a reduced-scale representation of the first visual media item.

4. The electronic device of claim 1, wherein the second location indicator is a reduced-scale representation of the second visual media item.

5. The electronic device of claim 1, wherein the first location indicator is centered in the first geographic map and in the second geographic map.

6. The electronic device of claim 1, the one or more programs further including instructions for:
in response to detecting the third input:
ceasing to display the first graphical object; and
displaying a second graphical object that, when activated, ceases the display of the second location indicator.

7. The electronic device of claim 6, the one or more programs further including instructions for:
detecting a fourth input directed to the second graphical object; and
in response to detecting the fourth input:
ceasing to display the second graphical object and the second location indicator representative of the second location characteristic of the second visual media item; and
displaying the first graphical object.

8. The electronic device of claim 1, the one or more programs further including instructions for:
detecting a fifth input directed to the second location indicator; and
in response to detecting the fifth input:
ceasing to display the geographic map interface; and
displaying the second visual media item of the visual media items.

9. The electronic device of claim 1, wherein the geographic map interface further includes a third location indicator representative of a third location characteristic of a third visual media item of the collection of visual media items.

10. A non-transitory computer-readable storage medium storing one or more programs configured to be executed by one or more processors of an electronic device with a display, the one or more programs including instructions for:
displaying, via the display, a first visual media item of a collection of visual media items;
while displaying the first visual media item, detecting a first input;
in response to detecting the first input, displaying, via the display, a user interface that includes a first geographic map with a first location indicator representative of a first location characteristic of the first visual media item;
detecting a second input directed to the first geographic map;
in response to detecting the second input, replacing display of the user interface with a geographic map interface that includes a second geographic map with the first location indicator and a first graphical object that, when activated, causes the display of a second location indicator representative of a second location characteristic of a second visual media item of the collection of visual media items;
detecting a third input directed to the first graphical object; and
in response to detecting the third input, displaying on the second geographic map the second location indicator representative of the second location characteristic of the second visual media item.

11. The non-transitory computer-readable storage medium of claim 10, wherein the device includes a touch-sensitive surface, and wherein the first input is a swipe gesture on the touch-sensitive surface in a first direction.

12. The non-transitory computer-readable storage medium of claim 10, wherein the first location indicator is a reduced-scale representation of the first visual media item.

13. The non-transitory computer-readable storage medium of claim 10, wherein the second location indicator is a reduced-scale representation of the second visual media item.

14. The non-transitory computer-readable storage medium of claim 10, wherein the first location indicator is centered in the first geographic map and in the second geographic map.

15. The non-transitory computer-readable storage medium of claim 10, the one or more programs further including instructions for:
in response to detecting the third input:
ceasing to display the first graphical object; and
displaying a second graphical object that, when activated, ceases the display of the second location indicator.

16. The non-transitory computer-readable storage medium of claim 15, the one or more programs further including instructions for:
detecting a fourth input directed to the second graphical object; and
in response to detecting the fourth input:
ceasing to display the second graphical object and the second location indicator representative of the second location characteristic of the second visual media item; and
displaying the first graphical object.

17. The non-transitory computer-readable storage medium of claim 10, the one or more programs further including instructions for:
detecting a fifth input directed to the second location indicator; and
in response to detecting the fifth input:
ceasing to display the geographic map interface; and
displaying the second visual media item of the visual media items.

18. The non-transitory computer-readable storage medium of claim 10, wherein the geographic map interface further includes a third location indicator representative of a third location characteristic of a third visual media item of the collection of visual media items.

19. A method, comprising:
at an electronic device with a display:
displaying, via the display, a first visual media item of a collection of visual media items;
while displaying the first visual media item, detecting a first input;
in response to detecting the first input, displaying, via the display, a user interface that includes a first geographic map with a first location indicator representative of a first location characteristic of the first visual media item;

detecting a second input directed to the first geographic map;

in response to detecting the second input, replacing display of the user interface with a geographic map interface that includes a second geographic map with the first location indicator and a first graphical object that, when activated, causes the display of a second location indicator representative of a second location characteristic of a second visual media item of the collection of visual media items;

detecting a third input directed to the first graphical object; and in response to detecting the third input, displaying on the second geographic map the second location indicator representative of the second location characteristic of the second visual media item.

20. The method of claim 19, wherein the device includes a touch-sensitive surface, and wherein the first input is a swipe gesture on the touch-sensitive surface in a first direction.

21. The method of claim 19, wherein the first location indicator is a reduced-scale representation of the first visual media item.

22. The method of claim 19, wherein the second location indicator is a reduced-scale representation of the second visual media item.

23. The method of claim 19, wherein the first location indicator is centered in the first geographic map and in the second geographic map.

24. The method of claim 19, further comprising:
in response to detecting the third input:
  ceasing to display the first graphical object; and
  displaying a second graphical object that, when activated, ceases the display of the second location indicator.

25. The method of claim 24, further comprising:
detecting a fourth input directed to the second graphical object; and
in response to detecting the fourth input:
  ceasing to display the second graphical object and the second location indicator representative of the second location characteristic of the second visual media item; and
  displaying the first graphical object.

26. The method of claim 19, further comprising:
detecting a fifth input directed to the second location indicator; and
in response to detecting the fifth input:
  ceasing to display the geographic map interface; and
  displaying the second visual media item of the visual media items.

27. The method of claim 19, wherein the geographic map interface further includes a third location indicator representative of a third location characteristic of a third visual media item of the collection of visual media items.

* * * * *